US005781753A

United States Patent [19]
McFarland et al.

[11] Patent Number: 5,781,753
[45] Date of Patent: Jul. 14, 1998

[54] SEMI-AUTONOMOUS RISC PIPELINES FOR OVERLAPPED EXECUTION OF RISC-LIKE INSTRUCTIONS WITHIN THE MULTIPLE SUPERSCALAR EXECUTION UNITS OF A PROCESSOR HAVING DISTRIBUTED PIPELINE CONTROL FOR SPECULATIVE AND OUT-OF-ORDER EXECUTION OF COMPLEX INSTRUCTIONS

[75] Inventors: Harold L. McFarland; David R. Stiles, both of Los Gatos; Korbin S. Van Dyke, Fremont; Shrenik Mehta; John Gregory Favor, both of San Jose; Dale R. Greenley, Los Gatos, all of Calif.; Robert A. Cargnoni, Austin, Tex.

[73] Assignee: Advanced Micro Devices, Inc., Austin, Tex.

[21] Appl. No.: 403,988

[22] Filed: Mar. 13, 1995

(Under 37 CFR 1.47)

Related U.S. Application Data

[63] Continuation-in-part of Ser. No. 25,439, Mar. 3, 1993, Pat. No. 5,442,757, which is a continuation of Ser. No. 483,223, Feb. 21, 1990, Pat. No. 5,226,126, which is a continuation-in-part of Ser. No. 315,358, Feb. 24, 1989, abandoned.

[51] Int. Cl.⁶ ............................................. G06F 9/38
[52] U.S. Cl. ........................ 395/394; 395/385; 395/391
[58] Field of Search .............................. 395/375, 800, 395/385, 388, 389, 391, 394, 581, 586, 591

[56] References Cited

U.S. PATENT DOCUMENTS

| 4,425,617 | 1/1984 | Sherwood | 395/885 |
|---|---|---|---|
| 4,521,851 | 6/1985 | Trubisky et al. | 395/394 |
| 4,578,750 | 3/1986 | Amdahl et al. | 395/562 |
| 4,594,660 | 6/1986 | Guenthner et al. | 395/250 |
| 4,689,765 | 8/1987 | Hooper | 395/445 |
| 4,736,288 | 4/1988 | Shintani et al. | 395/393 |
| 4,760,519 | 7/1988 | Papworth et al. | 395/393 |
| 4,773,041 | 9/1988 | Hassler et al. | 395/421.03 |
| 4,774,659 | 9/1988 | Smith et al. | 395/418 |

(List continued on next page.)

OTHER PUBLICATIONS

Anderson, D.W. et al., "The IBM System/360 Model 91: Machine Philosophy and Instruction-Handling," *IBM Journal of Research and Development*, pp. 8–24 (Jan. 1967).

Anderson, S.M. et al., "The IBM System/300 Model 91: Floating Point Execution Unit," *IBM Journal of Research and Development*, pp. 34–53 (Jan. 1967).

(List continued on next page.)

*Primary Examiner*—Parshotam S. Lall
*Assistant Examiner*—Viet Vu
*Attorney, Agent, or Firm*—Townsend and Townsend and Crew LLP

[57] ABSTRACT

A pipeline control system for implementing a virtual architecture having a complex instruction set is distributed over RISC-like semi-autonomous functional units in a processor. Decoder logic fetches instructions of the target architecture and translates them into simpler RISC-like operations. These operations, each having an associated tag, are issued to the functional units. Address processing unit computes addresses of the instructions and operands, performs segment relocation, and manages the processor's memory. Operations are executed by the units in a manner that is generally independent of operation processing by the other units. The units report termination information back to the decoder logic, but do not irrevocably change the state of the machine. Based on the termination information, the decoder logic retires normally terminated operations in order. Thus, the functional units enable multiple operations to be executed in a speculative and out-of-order manner to fully utilize the resources of the processor.

61 Claims, 49 Drawing Sheets

Microfiche Appendix Included
(2 Microfiche, 155 Pages)

U.S. PATENT DOCUMENTS

| | | | |
|---|---|---|---|
| 4,775,927 | 10/1988 | Hester et al. | 395/383 |
| 4,782,441 | 11/1988 | Inagami et al. | 395/800 |
| 4,783,736 | 11/1988 | Ziegler et al. | 395/457 |
| 4,785,395 | 11/1988 | Keeley | 395/449 |
| 4,794,521 | 12/1988 | Ziegler et al. | 395/457 |
| 4,807,115 | 2/1989 | Torng | 395/391 |
| 4,831,515 | 5/1989 | Kamada et al. | 395/393 |
| 4,894,772 | 1/1990 | Langendorf | 395/587 |
| 4,901,233 | 2/1990 | Liptay | 395/394 |
| 4,903,196 | 2/1990 | Pomerene et al. | 395/393 |
| 4,908,750 | 3/1990 | Jablow | 395/673 |
| 4,916,652 | 4/1990 | Schwarz et al. | 364/748 |
| 4,924,466 | 5/1990 | Gregor et al. | 395/181 |
| 4,942,525 | 7/1990 | Shintani et al. | 395/393 |
| 4,943,916 | 7/1990 | Asano et al. | 395/800 |
| 4,970,641 | 11/1990 | Hester et al. | 395/733 |
| 4,991,090 | 2/1991 | Emma et al. | 395/185.03 |
| 4,992,934 | 2/1991 | Portanova et al. | 395/385 |
| 5,010,482 | 4/1991 | Keller et al. | 364/230 |
| 5,018,063 | 5/1991 | Liu | 395/451 |
| 5,063,497 | 11/1991 | Cutler et al. | 395/800 |
| 5,067,069 | 11/1991 | Fite et al. | 395/394 |
| 5,075,840 | 12/1991 | Grohoski et al. | 395/800 |
| 5,133,077 | 7/1992 | Karne et al. | 395/800 |
| 5,487,156 | 1/1996 | Popesar et al. | 395/393 |
| 5,539,911 | 7/1996 | Nguyen et al. | 395/800 |
| 5,546,552 | 8/1996 | Coon et al. | 395/385 |

OTHER PUBLICATIONS

Boland, L.J. et al., "IBM System/360 Model 91: Storage System," *IBM Journal of Research and Development*, pp. 54–58 (Jan. 1967).

Flynn, M.J. et al., "The IBM system/360 Model 91: Some Remarks on System Development," *IBM Journal of Research and Development*, pp. 2–7 (Jan. 1967).

Lilja, "Reducing the Branch Penalty in Pipeline Processors," *IEEE*, pp. 47–55 (Jul. 1988).

Raza, A., "Technology Constraints on VLSI Processor Implementation,"*Computer Society of the Thirty–Fourth IEEE*, pp. 509–512 (1989).

Smith et al., "Implementing Precise Interrupts in Pipelined Processors," *IEEE*, 37(5): 562–573 (May 1988).

Stiles, D.R. et al., "Pipeline Control for a Single Cycle VLSI Implementation of a Complex Instruction Set Computer," *Computer Society of the IEEE*, pp. 504–508 (1989).

Thomas, A.T., "A Single Cycle VLSI CISC–Based Workstation: System Overview and Performance Characteristics," *Computer Society of the IEEE*, pp. 500–503 (1989).

Tomasulo, R.M., "An Efficient Algorithm for Exploiting Multiple Arithmetic Units," *Journal of Research and Development*, pp. 25–33 (Jan. 1967).

FIG. 2 Address Processor Block Diagram

FIG. 3  Integer Execution Unit (IEU) Block Diagram

FIG. 4 Add/Move Unit Block Diagram

FIG. 5 Dual EIP (DEIP) Unit (DEU) Block Diagram

MCS Block Diagram

Transparent Latch

Enabled Latch

Recirculating Latch

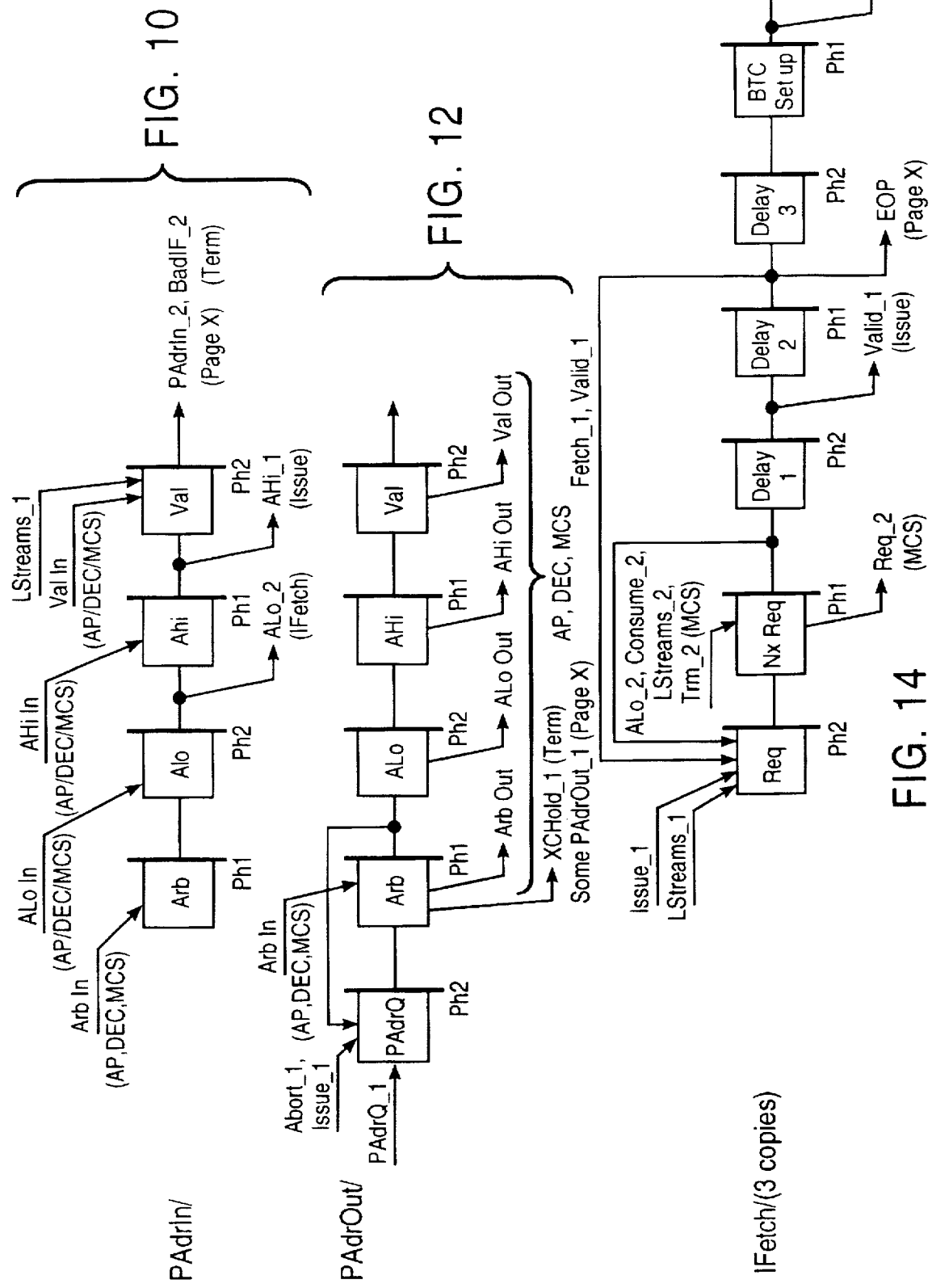

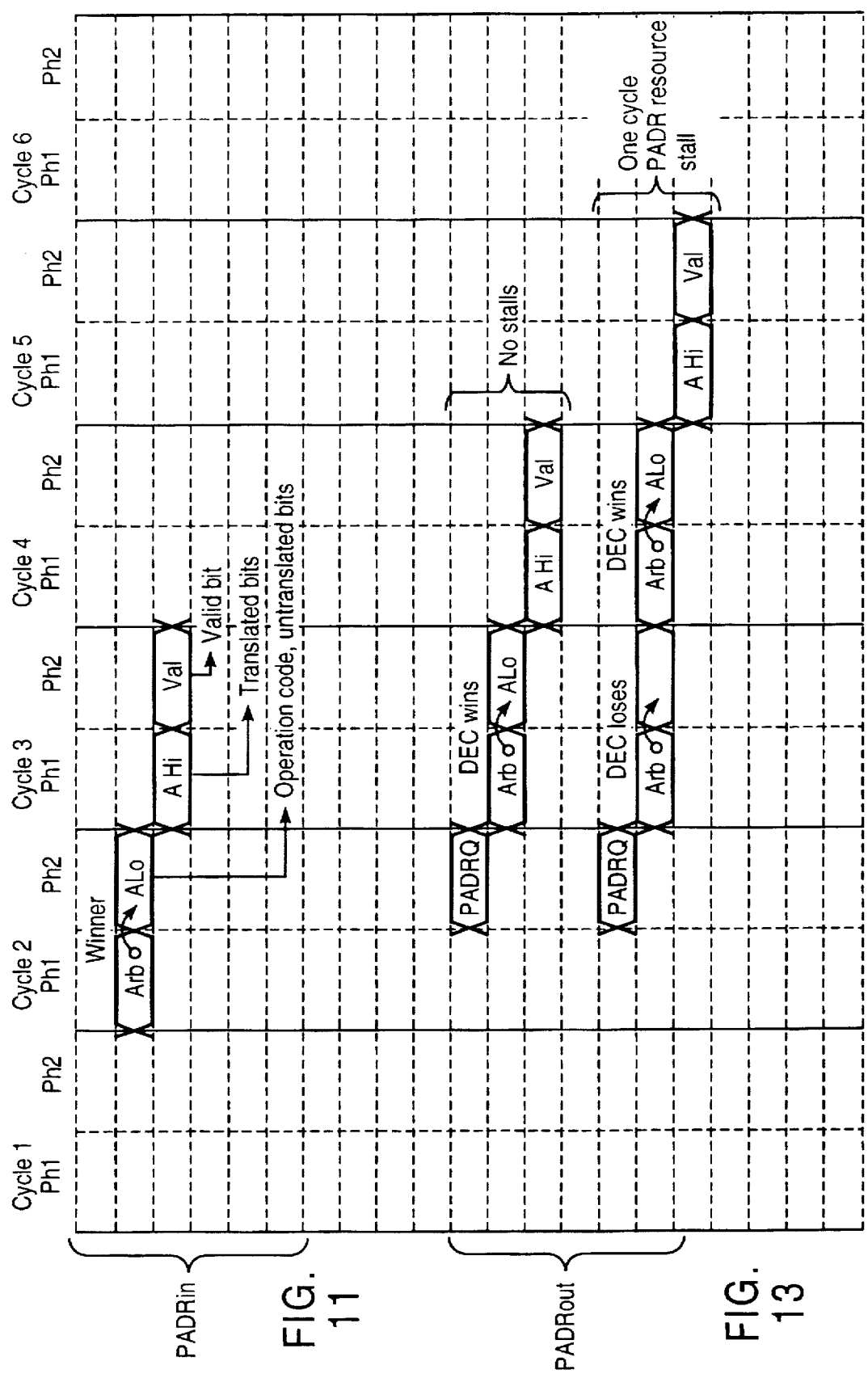

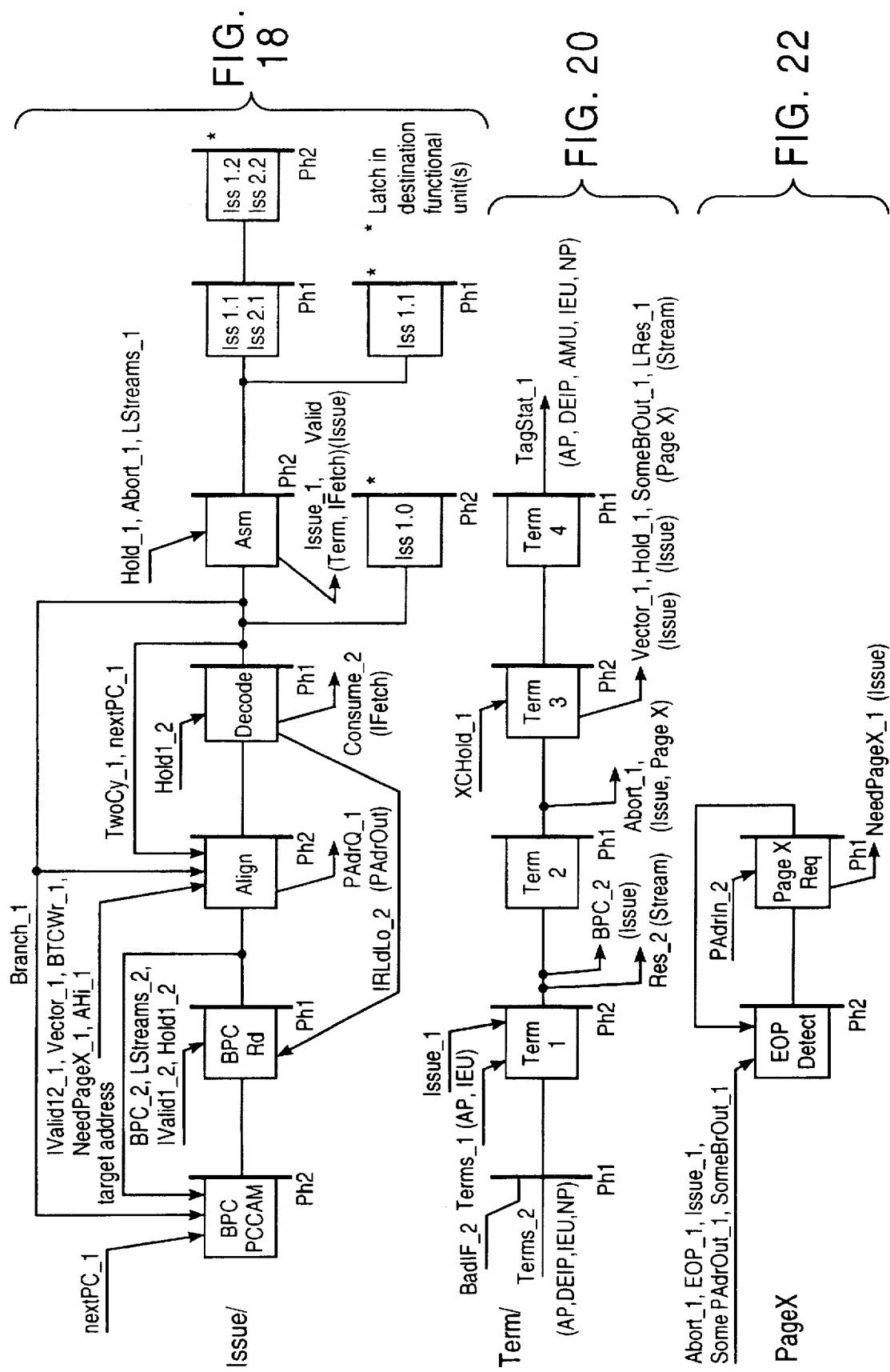

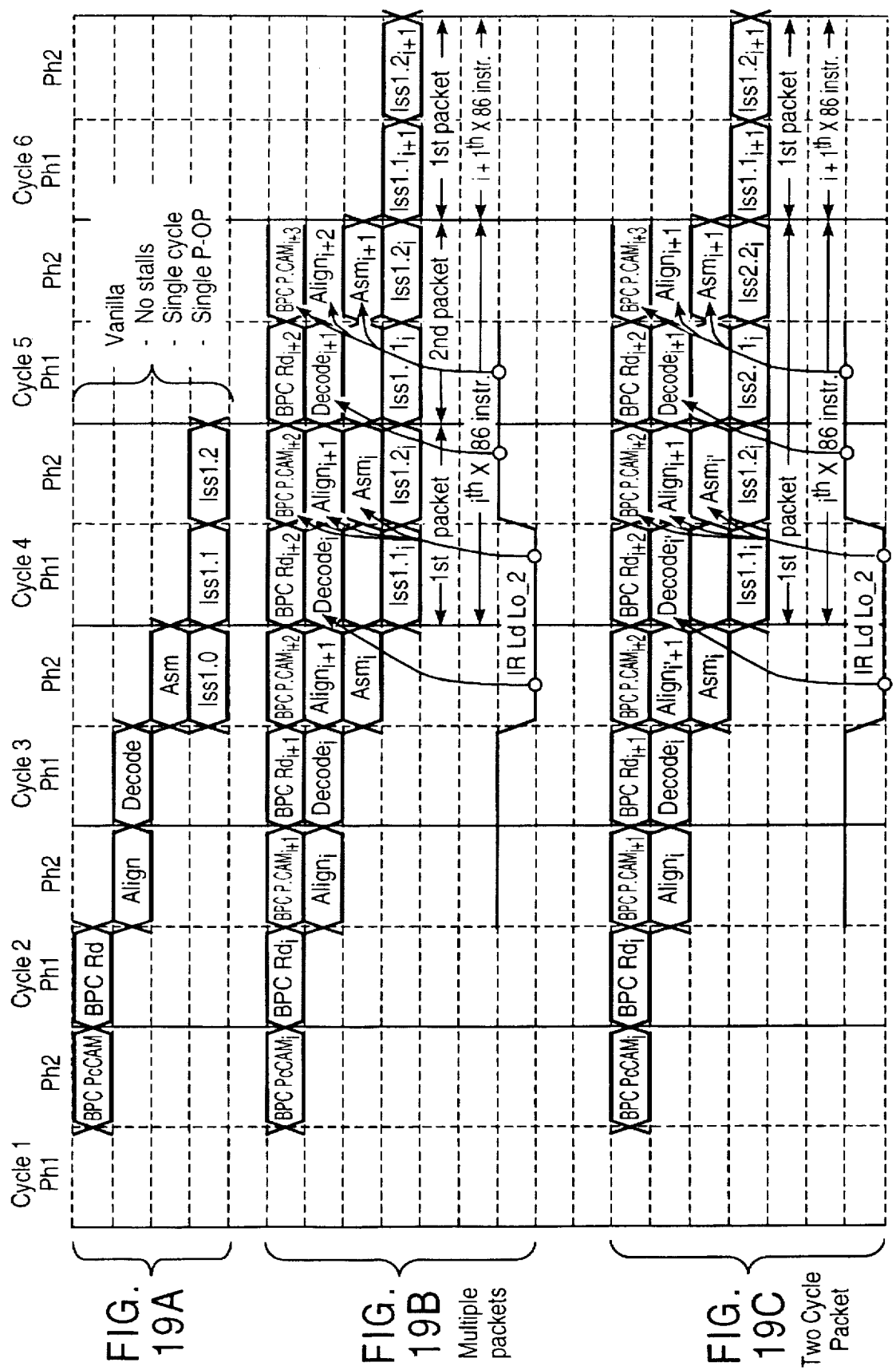

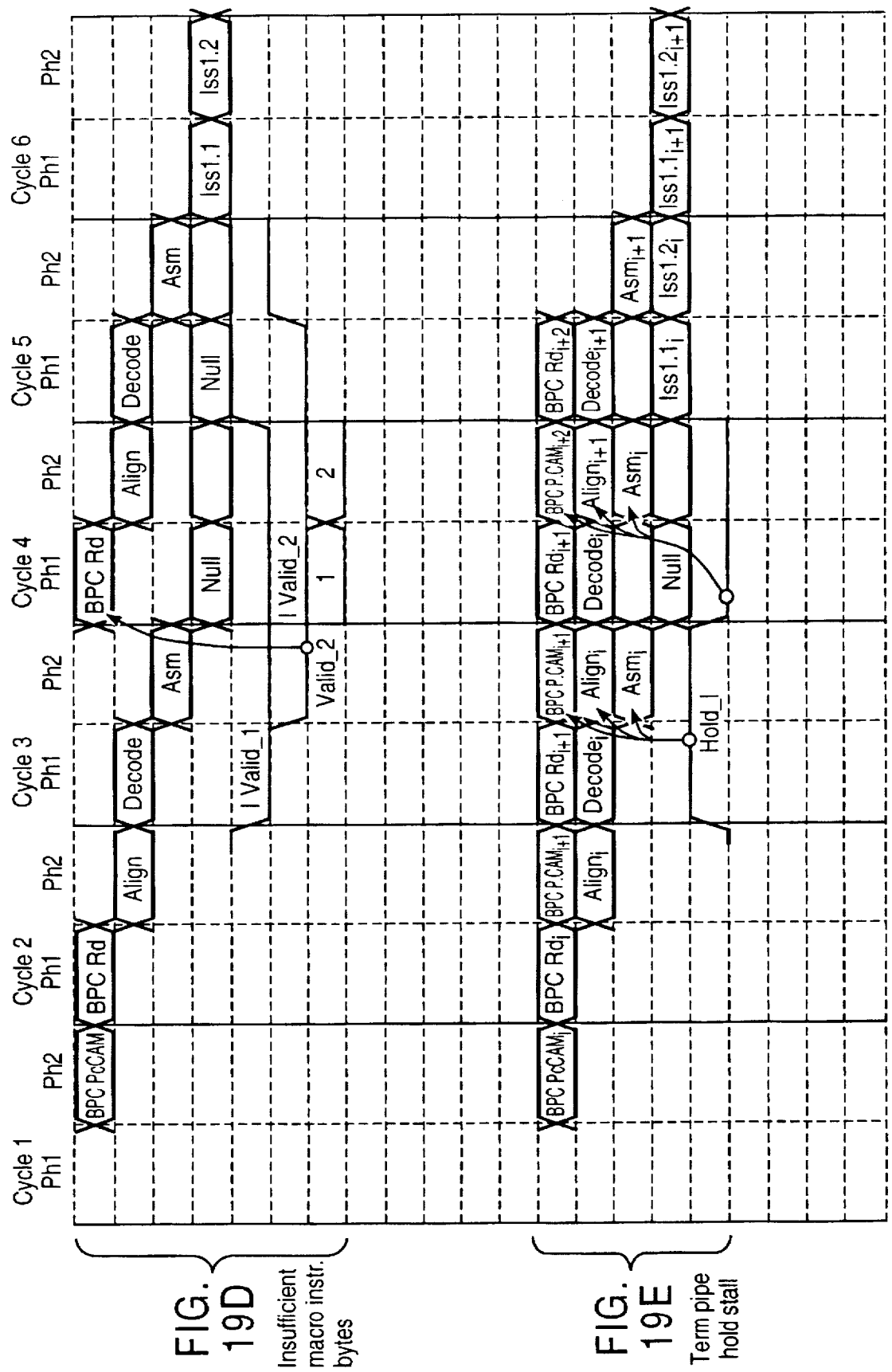

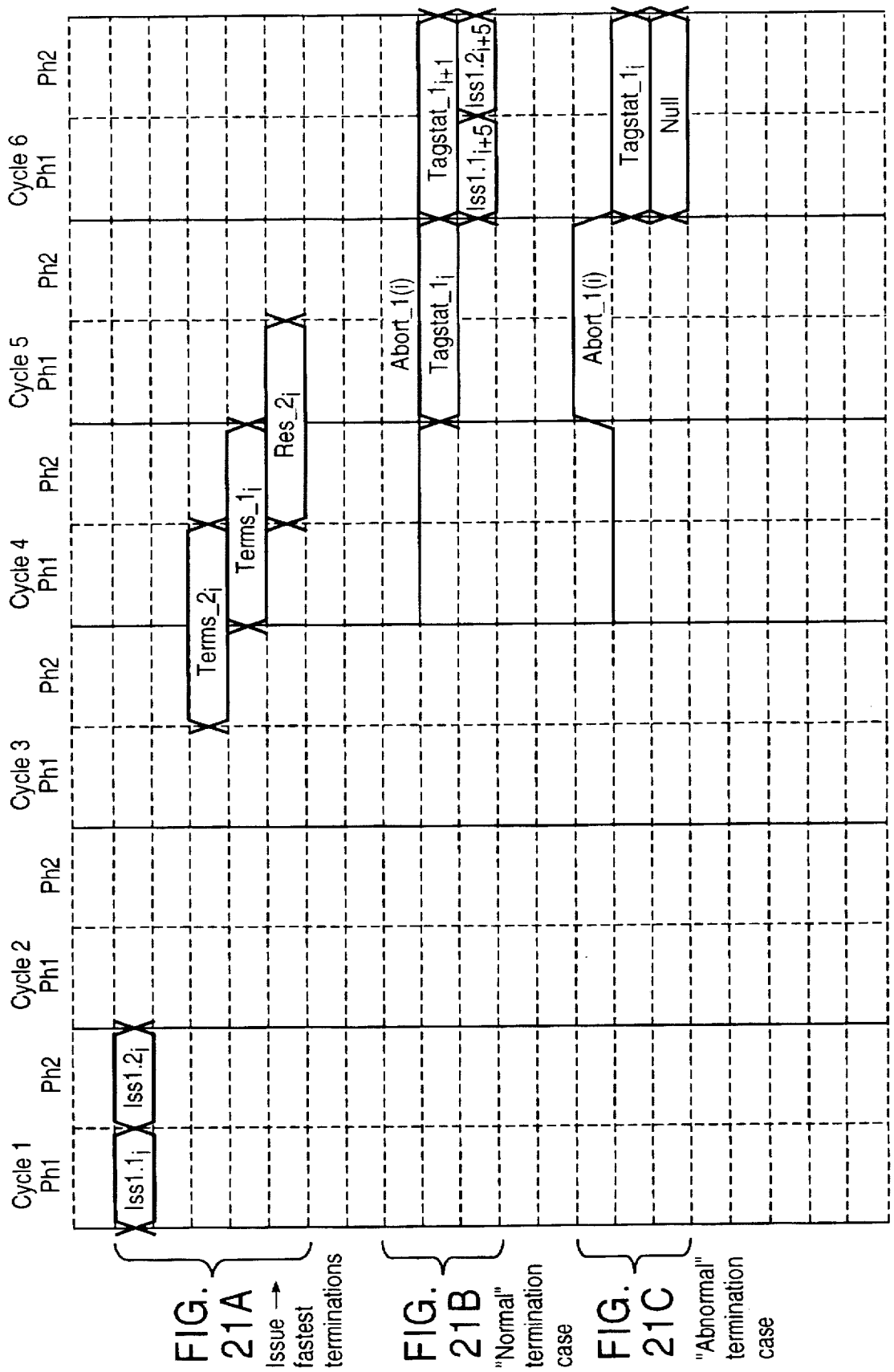

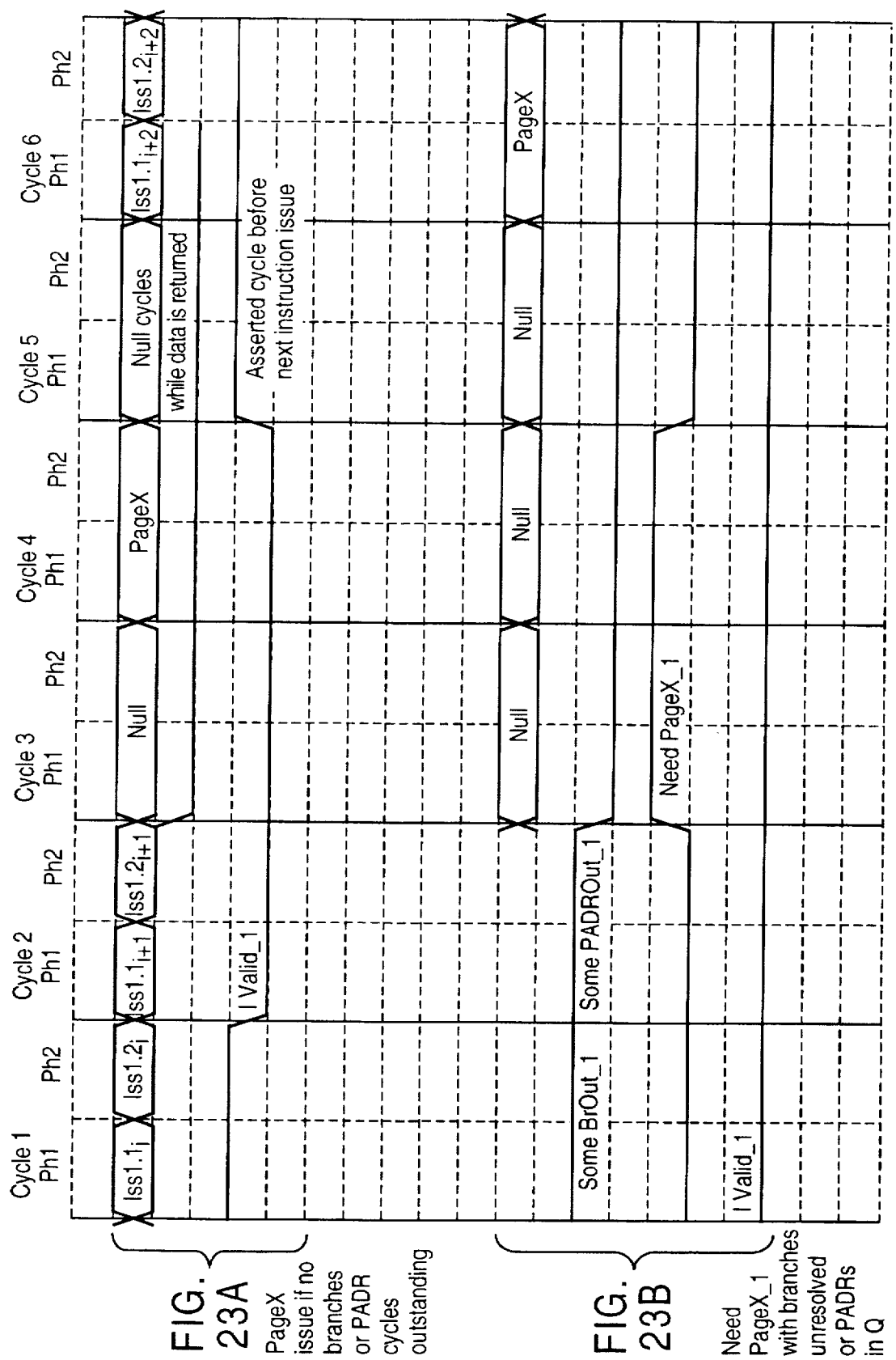

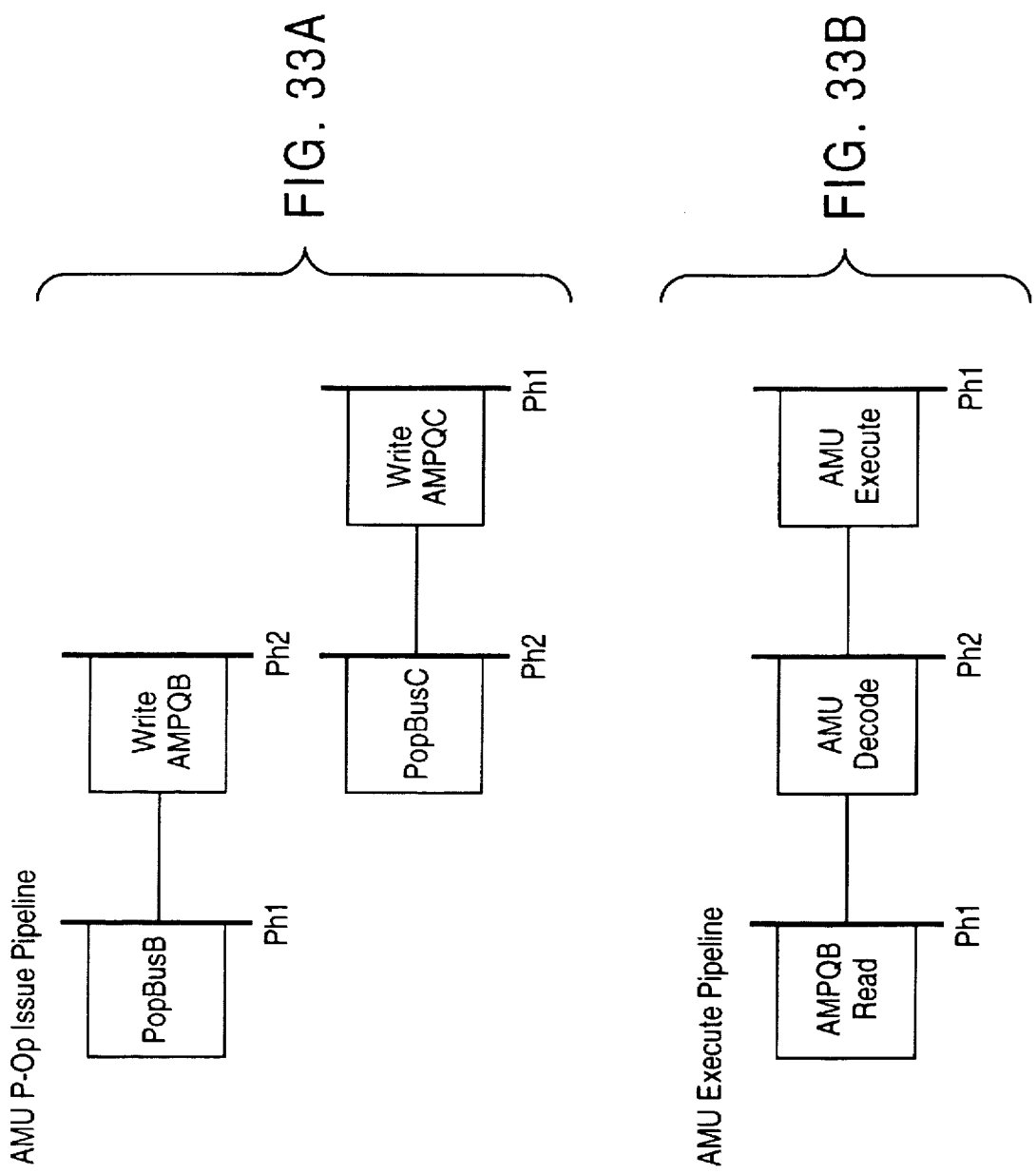

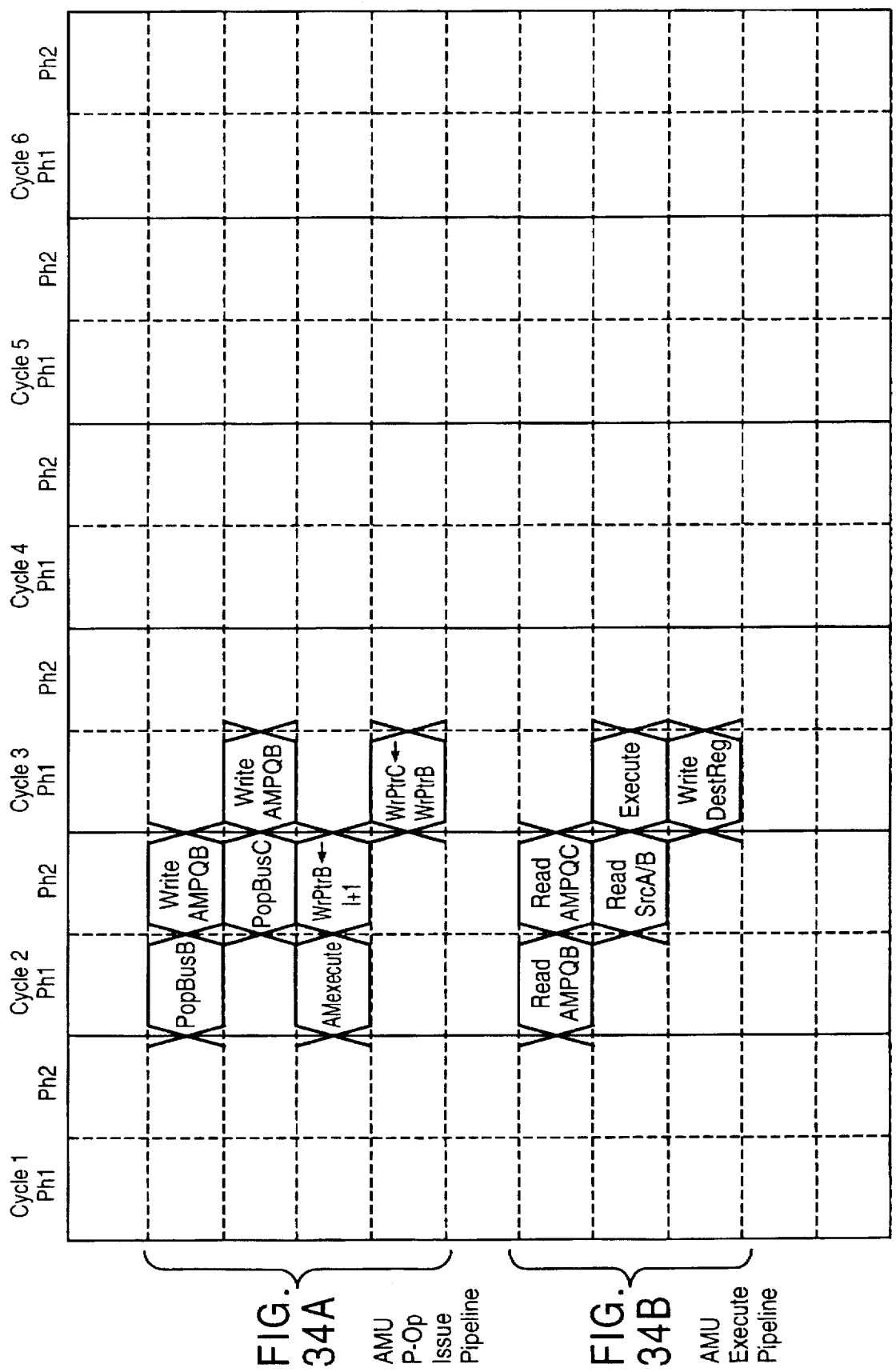

FIG. 41 MCS_RQ_PIPE

SEMI-AUTONOMOUS RISC PIPELINES FOR OVERLAPPED EXECUTION OF RISC-LIKE INSTRUCTIONS WITHIN THE MULTIPLE SUPERSCALAR EXECUTION UNITS OF A PROCESSOR HAVING DISTRIBUTED PIPELINE CONTROL FOR SPECULATIVE AND OUT-OF-ORDER EXECUTION OF COMPLEX INSTRUCTIONS

CROSS-REFERENCE TO RELATED APPLICATIONS

This application is a continuation-in-part of U.S. application Ser. No. 08/025,439, filed Mar. 3, 1993, now U.S. Pat. No. 5,442,757, which is a continuation of U.S. application No. 07/483,223, filed Feb. 21, 1990, now U.S. Pat. No. 5,226,126, which is a continuation-in-part of U.S. application No. 07/315,358, filed Feb. 24, 1989, now abandoned.

The following U.S. patents and applications are assigned to the assignee of the present invention and are incorporated herein by reference for all purposes:

- U.S. Pat. No. 5,226,126, issued Jul. 6, 1993, for PROCESSOR HAVING PLURALITY OF FUNCTIONAL UNITS FOR ORDERLY RETIRING OUTSTANDING OPERATIONS BASED UPON ITS ASSOCIATED TAGS (the '126 patent);
- U.S. Pat. No. 5,394,351, issued Feb. 28, 1995, for OPTIMIZED BINARY ADDER AND COMPARATOR HAVING AN IMPLICIT CONSTANT FOR AN INPUT;
- U.S. Pat. No. 5,230,068, issued Jul. 20, 1993, for CACHE MEMORY SYSTEM FOR DYNAMICALLY ALTERING SINGLE CACHE MEMORY LINE AS EITHER BRANCH TARGET ENTRY OR PRE-FETCH INSTRUCTION QUEUE BASED UPON INSTRUCTION SEQUENCE;
- U.S. Pat. No. 5,226,130, issued Jul. 6, 1993, for METHOD AND APPARATUS FOR STORE-INTO-INSTRUCTION-STREAM DETECTION AND MAINTAINING BRANCH PREDICTION CACHE CONSISTENCY;
- U.S. Pat. No. 5,163,140, issued Nov. 10, 1992, for TWO-LEVEL BRANCH PREDICTION CACHE;
- U.S. Pat. No. 5,093,778, issued Mar. 3, 1992, for INTEGRATED SINGLE-STRUCTURE BRANCH PREDICTION CACHE;
- U.S. application No. 08/340,183, filed Nov. 15, 1994, now U.S. Pat. No. 5,675,758 for IMPROVED PIPELINE THROUGHPUT VIA PARALLEL OUT-OF-ORDER EXECUTION OF ADDS AND MOVES IN A SUPPLEMENTAL INTEGER EXECUTION UNIT;
- U.S. application No. 08/185,488, filed Jan. 21, 1994, now U.S. Pat. No. 5,590,351 for SUPERSCALAR EXECUTION UNIT FOR SEQUENTIAL INSTRUCTION POINTER UPDATES AND SEGMENT LIMIT CHECKS INTEGER EXECUTION UNIT;
- U.S. application Ser. No. 08/405,268, filed Mar. 13, 1995, for CACHE CONTROL SYSTEM; and
- U.S. application Ser. No. 08/403,011, filed Mar. 10, 1995, now U.S. Pat. No. 5,583,806, for OPTIMIZED BINARY ADDER FOR CONCURRENTLY GENERATING EFFECTIVE AND INTERMEDIATE ADDRESSES.

APPENDIX

A microfiche appendix comprising two sheets with 155 frames is included in this application. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to computers, and more particularly to techniques for advanced processor design and operation.

The explosion of the Personal Computer industry has until recently been fueled primarily by the 68000 family incorporated into most Apple Macintosh personal computers and the x86 family incorporated into most IBM-PC compatible products (PCs). The IBM-PC quickly achieved a dominant position due to its open architecture that allowed a host of vendors to make compatible peripherals and system units. The PC is now a mass-market consumer item.

The initial IBM PC was designed around the 8088, an 16-bit internal, 8-bit external bus, microprocessor manufactured by Intel. Subsequent advances in microprocessor fabrication and design were incorporated into later microprocessors developed by NexGen, AMD, Cyrix, Intel, and others. Each of these microprocessors became the engines for more advanced versions of the IBM-compatible PC.

Early on it was recognized that the x86 basic architecture had a number of technical limitations. A number of these limitations are related to the x86's use of a CISC (Complex Instruction Set Computer) Architecture. The CISC architecture requires that the processor hardware be built to execute a large number of complex instructions. Many of these instructions are infrequently used but have design consequences that slow down all instructions, due to, for example, complexities that must be introduced in the decoder and datapath timing. The hardware needed to implement these infrequently used instructions results in a poor use of silicon resources—resources which could be better used doing such things as aggressive instruction prefetch. Advanced microprocessor techniques such as pipelining and superscalar decoding are difficult to implement on a CISC-type architecture. Furthermore, it is difficult to design optimizing compilers that make effective use of more than just a subset of the CISC instructions. As a result, CISC processors are often not able to enjoy the benefits of advanced static instruction scheduling.

In addition, the x86 architecture includes a number of limitations above and beyond those inherent in CISC. Among these additional limitations are a limited number of on-chip registers, variable length instructions included in the instruction set, non-consistent field encodings, and a requirement that interrupts be precise (be generated and handled a determined number of instructions from the instruction that caused the interrupt). Additionally, the x86's segmented memory architecture, protection mode features, and compatible paging make it especially difficult to apply advanced microprocessor techniques.

Some aspects related to the x86 architecture are discussed in two U.S. Patents assigned to Intel: U.S. Pat. Nos. 4,972,338 and 5,321,836, which are incorporated herein by reference to the extent necessary to understand those parts of this disclosure related to the x86 architecture.

With respect to the microprocessors disclosed in '338 and '836, pipelining is really not done in the contemporary sense. However, instruction fetch and instruction execution are loosely coupled, permitting parallel instruction fetch and execution. Furthermore, microprocessors designed during the associated period typically relied heavily on microcode implementations that resulted in multiple cycles per instruction to execute and had a single conventional register file in the execution unit. Additional limitations include that the address generation is implemented with sequential generation of effective and intermediate addresses and the bus interface has a flat memory hierarchy with no explicit cache subsystem.

The Intel patents also discuss an architecture that is lacking in many advanced features. The architecture is scalar, meaning that there is just one integer add unit, for example, and that it must be accessed over a number of cycles to execute one instruction so that all of the adds associated with address computation, operand fetching, and the operation on the operand can be performed. It is believed that there is no pipeline within any of the functional blocks of the microprocessors discussed in the patents and no queues other that for instruction fetch. Execution of instructions is in order and the use of hardware in the processor is sequential.

Despite these numerous limitations, the x86 has remained the industry standard primarily due to market factors. There currently exists in the market a massive installed base of both hardware and software compatible with the x86. Virtually all PC software is distributed in binary form only, so that end users can not recompile their software to target different architectures. The typical user has a large investment in all software types: operating systems (OS), applications programs, device drivers, and utilities. Further major investments are likely to exist in multiple system units and compatible peripherals. As a result, the cost of switching to a new architecture can be quite daunting.

What is needed is a collection of microprocessor structures and techniques that permit an advanced microprocessor to maintain compatibility with the large installed base of x86 hardware and software while overcoming the limitations of the x86 architecture to provide performance competitive to other contemporary processors implementing other architectures.

SUMMARY OF THE INVENTION

The present invention extracts to a high degree the available inter-instruction and intra-instruction parallelism present in the existing complex-instruction software, while offering competitive execution speed, via dynamic instruction scheduling of existing complex-instruction binaries, to that available through static instruction scheduling via recompilation, of the corresponding complex-instruction source code. The present invention extends the competitive lifetime of the industry standard X86 architecture through pervasive application of RISC techniques throughout all levels of processor microarchitecture.

The present invention provides semi-autonomous RISC pipelines that perform overlapped execution of RISC-like instructions within the multiple superscalar execution units of a processor having distributed pipeline control for speculative and out-of-order execution of complex instructions.

The instant invention executes existing software, developed for a complex-instruction-set (CISC) architecture, at performance levels competitive with the execution of software that has been recompiled to maximize the instruction level parallelism of the source code.

These and other features and advantages of the invention will be better understood in view of the accompanying drawings and the following detailed description including at least one exemplary embodiment, which illustrates various objects and features thereof. The specific embodiment shows how various features of a particular CISC architecture, the industry standard X86 architecture, can implemented using superscalar pipelined RISC-like execution units. The use of the structures and methods taught here is not limited to the context of the exemplary embodiment.

BRIEF DESCRIPTION OF THE DRAWINGS

FIG. 10 is a structural diagram of the DEC's PAdrIn pipeline;

FIG. 11 is a timing diagram of the DEC's PAdrIn pipeline;

FIG. 12 is a structural diagram of the DEC's PAdrOut pipeline;

FIG. 13 is a timing diagram of the DEC's PAdrOut pipeline;

FIG. 14 is a structural diagram of the DEC's IFetch pipeline;

FIG. 18 is a structural diagram of the DEC's Issue pipeline;

FIGS. 19A–19E are timing diagrams of the DEC's Issue pipeline;

FIG. 20 is a structural diagram of the DEC's Term pipeline;

FIGS. 21A–21C are timing diagrams of the DEC's Term pipeline;

FIG. 22 is a structural diagram of the DEC's PageX pipeline;

FIGS. 23A and 23B are timing diagrams of the DEC's PageX pipeline;

FIGS. 33A and 33B are structural diagrams of the AMU's P-op Issue and Execute pipelines;

FIG. 34A and 34B are timing diagrams of the AMU's P-op Issue and Execute pipelines;

DESCRIPTION OF A SPECIFIC EMBODIMENT

I. F86 OVERVIEW

Figure 1:
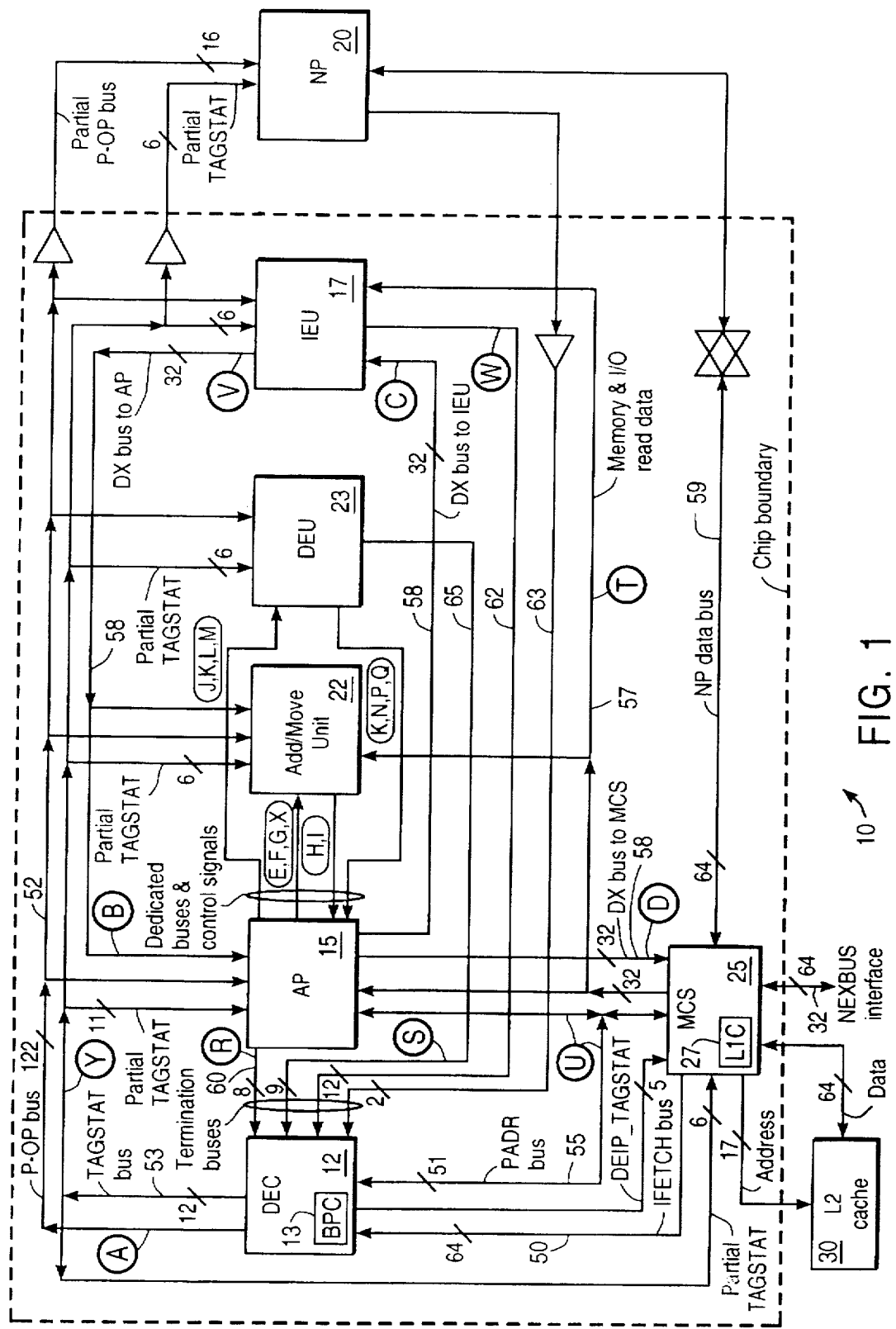
FIG. 1 is a block diagram of a computer system incorporating the present invention.

I.A. Virtual Architecture and Virtual Memory Concepts

In Computer Science, "virtual" is a term applied to programmer visible objects or systems that are in fact illusions created using underlying physical resources that may be quite different from that which is perceived by the programmer. The F86 Processor employs a distributed pipeline technique that enables a virtual CISC architecture to be implemented with underlying multiple semi-autonomous RISC-like function units that function largely as miniature "independent processors" hidden "under the hood" of the F86 seen by the outside world. These RISC-like function units behave in a speculative and out-of-order manner. Applicant will describe the F86 Processor approach sometimes as CISC-on-RISC.

The particular CISC architecture that is virtualized using this CISC-on-RISC technique is referred to as the target architecture. The target CISC architecture of the illustrative embodiments of the present invention is the industry standard X86 architecture. There are many distinguishing and challenging to implement characteristics of the X86 architecture. These characteristics include variable length instructions, variable length operands, and memory management (virtual memory) scheme for translating the virtual (logical) addresses viewed by the programmer. The memory management scheme includes the use of segmentation and paging to produce the physical addresses used to reference main memory. This specification will pay particular attention to how the virtual memory aspects of the X86 CISC architecture are physically implemented in the F86.

X86 is but one example of possible target architectures. Virtualizing the X86 CISC architecture onto superscalar pipelined RISC engines that execute in a speculative and out-of-order manner provides compatibility with the massive X86 installed software base while providing performance competitive with state-of-the-art architectures. The F86 Processor of the instant invention is based on, but an improvement of, the teachings of U.S. Pat. No. 5.226.126 ('126), which is assigned to the assignee of the present invention and is hereby incorporated by reference. There are differences between the illustrated embodiments of the instant invention and that of '126. These differences will be noted where pertinent to making and using the present invention and carrying out the best mode.

I.B. F86 Function Units

Each of the F86 function units conssits of one or more pipelines. A first pipelined function unit of the F86, the Decoder Unit (DEC), manages the fetching and decoding of x86 instructions and the overall control of the other function units. DEC consists of three sub-units: the Frontend, Decoder, and Backend. F86 also consists of multiple pipelined RISC execution units. Unlike other processors, each of the F86 Processor's execution units is highly specialized to perform a particular job. The execution units include an Integer Execution Unit (IEU), an Address Preparation unit (AP), a Add/Move Unit (AMU), and a Dual EIP Unit (DEU), and the optional Numerics Processor (a floating-point unit). (While the applicant has tried to be consistent in usage, the AMU may also be referred here and elsewhere as the Address Assist Unit (AAU) or Move/Add Unit (MAU).) The execution units of the F86 are only loosely coupled to one another. They individually process operations fed to them in a manner that is generally independent of operation processing by the other execution units. A final function unit is the Memory and Cache Subsystem (MCS). The MCS, also pipelined, interfaces the function units with the external memory system. Data reads and writes to memory and instruction fetches are all routed through the MCS.

I.B. 1 The CISC-to-RISC Translation

DEC's Frontend is responsible for fetching x86 instructions and delivering them to DEC's Decoder. DEC's Decoder decodes the x86 instructions and translates them into simpler (RISC-like) operations that the pipelined RISC execution units understand. The simpler operations are called pseudo-ops, or p-ops. DEC retains information about the translation process for later action based on terminations (completion status signals, discussed infra) from the RISC core described infra. DEC also issues (transmits) the p-ops to the RISC core. A plurality of the p-op control fields are operation commands unique to a specific execution unit. Other p-op fields (such as source and destination specifiers) are shared among multiple execution units. Each p-op is a collection or "packet" of all unique and shared control command fields. The fields are either largely unencoded or recoded into formats that greatly facilitate or eliminate any further decoding by the execution units. Every p-op packet is issued to all units simultaneously. Since multiple execution units are capable of simultaneous operation, it is accurate to describe the F86 as performing superscalar issue. (However, superscalar command issue to both AMU and NP is not possible in the illustrated embodiment.) Each x86 instruction will result in one or more p-ops being issued. DEC's Decoder time-stamps each p-op it generates. These time-stamps are called tags. The tagged p-ops are issued to the execution units and each unit autonomously executes the p-ops for which it is responsible. Whether or not a particular execution unit will execute a given p-op varies according to whether the original x86 instruction required the specialized function associated with the execution unit.

I.B.2 The Superecalar Speculative Risc Core

The F86 RISC core includes the pipelined AP, DEU, MAU, IEU, and NP function units. These function units are referred to as execution units because they execute (carry out) the data or address manipulations required by the p-ops. Generally, these units are capable of superscalar pipelined speculative and out-of-order execution. As mentioned previously, DEC provides decode control information to the execution units via the issued p-ops. DEC also provides other information to the execution units, X86 instruction length, including stream identification information (stream ID), branch information and X86 mode information. The execution units provide terminations used for pipeline control to DEC. The use of terminations is discussed further in the section on speculative execution, infra. The execution units receive memory and I/O requests including returned data and instructions from the X86 environment via the MCS, discussed infra.

The AP unit contains a relabeled copy of the general purpose registers and segment registers and has the hardware resources for performing segmentation and paging of virtual memory addresses. A duplicate copy of the general purpose registers is also maintained in the IEU. The segment and descriptor virtual register file is entirely and solely within the address unit. The AP calculates addresses for memory operand reads and writes, control transfers (including branches, calls, and protected-mode gates), and sequential instruction execution across page boundaries (page crosses). The AP also manages the processor's program counter for non-sequential instruction execution. The program counter was historically referred to as the instruction pointer (IP). When the architecture was extended to 32-bits, the IP became the EIP. For the purpose of this discussion, the terms EIP, instruction pointer, and program counter (PC), are used interchangeably.

DEU is dedicated to maintaining the Extended Instruction Pointer (EIP) for sequential instruction execution within page boundaries. DEU also does independent limit checks for the Code (Instruction) Segment. AP and DEU are responsible for performing all address calculations implicit and explicit in the executed p-ops. DEU provides the instruction pointer to AP for PC-relative branches and receives an updated instruction pointer from AP following changes in control flow. The DEU can execute up to two p-ops per clock and in so doing advance the EIP by a value corresponding to the instruction lengths of up to two x86 instructions (hence the name Dual EIP Unit).

DEU enables better use of the expensive limited resource of AP. Previously, sequential EIP updates used little of the expensive hardware resources of AP, yet consumed valuable pipeline slots. These slots represented lost opportunity to execute tasks that make more demanding use of AP's facilities. Such "demanding" tasks include memory reference operations, control transfers, and page crosses. Because AP no longer nominally processes p-ops requiring only a sequential EIP update, it can proceed directly to later operations in the instruction stream that include the demanding tasks just mentioned. The presence of DEU thus removes resource dependencies and thereby increases the available instruction level parallelism. The increased instruction level parallelism is readily exploited by the processors ability to perform out-of-order and speculative execution, and performance is enhanced as a result.

A statistically significant number of times, a first x86 instruction requiring several IEU cycles is followed by a second simple integer instruction, involving only register or register and immediate operands, and then a third instruction, requiring AP only and depending upon the result of the second instruction. In this situation, the AP may be stalled while the first instruction finishes. AMU's sole purpose is to remove this data dependencies that may stall the AP. AMU has a basic Arithmetic Logic Unit (ALU) that can perform primitive operations on register operands and register/immediate operands and feed the results to the AP. Just as with the DEU, the AMU is a specialized execution unit that permits the expensive resources of the AP to be better used.

IEU is responsible for executing integer arithmetic operations. As mentioned supra, IEU also contains a relabeled virtual copy of the general purpose registers (kept coherent with AP's copy) and has the hardware resources for performing integer arithmetic and logical operations. Duplicate general register files insure minimal delays between the registers and the logic than manipulates their values. It also permits read and write accesses based on the needs of each execution unit, which would otherwise require an increase in the number of read and write ports.

The Numerics Processor (NP) contains the floating-point register file and has the floating-point arithmetic hardware resources. The Numerics Processor is entirely optional.

I.B. 3 Translating back to CISC from the RISC Core

To achieve compatibility with the X86 installed software base the RISC core must translate core operations back to an X86 memory and I/O defined environment. The Memory and Cache Subsystem (MCS) and DEC's Frontend and Backend play key roles in this translation process.

MCS includes a first level (LI) 16-KB instruction cache and a separate 16-KB data cache; an on-chip cache-controller for a second level (L2) external 256-KB or 1-MB unified cache; write reservation queues for integer, floating-point, and system writes operations; and read after write short-circuit paths. The L1 instruction cache includes a memory array for the instructions and an Instruction Tag unit (ITAG) that includes the associated cache tags and control logic. ITAG is tightly coupled to the DEC Frontend and plays an integral role in instruction fetch operations, discussed infra.

The write reservation queues permit the execution units to post their results for a p-op to the MCS and then proceed without waiting to execute their next p-op. The write reservation queues independently accept physical addresses and result data, which are generally independently generated out-of-order by different units. All addresses and data are sent to MCS with the tag of the p-op associated with the address or data. The write reservation queues then use the tags to correctly associate the addresses with the data. The write reservation queues also use the tags to enforce the original sequential program order for all stores to memory. Stores to memory are considered irreversible, and hence are only performed when it is completely safe to do so. The MCS waits to do the store until the tag associated with the store is older than the oldest outstanding p-op, as indicated by the DEC Backend.

Reads to locations where an "older" write is pending in the write reservation queues get their data from the write reservation queue instead of from memory. This is the read after write short-circuit mentioned above.

Certain special X86 events cause DEC to command that AP generate special physical address transactions. The transactions ultimately result in MCS generating external memory system bus cycles. The X86 events that cause such activity include Halt, Shutdown, Interrupt Acknowledge, and I/O cycles.

I.C. Exploiting Instruction Level Parallelism in X86 Code

I.C. 1 Removing Dependencies Via Dynamic Instruction Scheduling

High performance pipeline computers are limited by conditions referred to as dependencies, or hazards. The types of hazards include: data, resource, and control dependencies. A data dependency exists when a pipelined processor might violate an assumption of non-overlapping sequential instruction order implicit in the original program. A resource dependency exists when the processor cannot perform an operation because a limited resource is already in use. A control dependency exists when the outcome of a branch is not yet resolved. In conventional pipelined processors, these dependencies require interlock logic to stall the pipeline until the dependency is removed. Such stalls represent an interruption in the flow of instructions in the pipeline, a situation referred to as a pipeline bubble. Stalls reduce the instruction throughput of the processor and hence reduce performance.

Many of these stalls can be avoided if a program is compiled initially or later recompiled using an optimizing compiler that rearranges program instructions in a manner that is custom tailored to the microarchitecture of the processor. Such optimizing compilers are relatively new, have restricted availability, and do not benefit programs that are already in the field. Rearranging instructions using an optimizing compiler is referred to as static instruction scheduling. The Intel Pentium™ Processor is an example of a processor that relies on static instruction scheduling to achieve its full promised performance. The speculative and out-of-order execution techniques, discussed below, used by the F86 Processor are a type of dynamic instruction scheduling. Dynamic instruction scheduling acts to rearrange the program instructions at the time the program is running. Dynamic scheduling does not require the use of an optimizing compiler and thus benefits all programs, both new and existing.

I.C. 2 Out-of-Order Execution

The execution units consist of one or more pipelines (sometimes referred to as pipes). Each execution unit has its own queue into which incoming p-ops are placed pending execution and is free to execute its p-ops largely independent of the other execution units. Each execution unit only executes those p-ops that require processing by that unit. Thus, the pipelines within each execution unit are only used for useful work. It is possible for one unit to finish a p-op associated with a "younger" x86 instruction, while another unit is still executing a p-op corresponding to an "older" x86 instruction. Thus, instructions can be executed in other than their original program order. Such out-of-order execution tends to localize the effects of dependencies to a single execution unit. Thus a dependency in AP need not stall the IEU, and vice versa. Because of their loose coupling and independent execution, stalls that affect only one execution unit can be effectively absorbed when that unit is later able to proceed past another execution unit that is held up due to a different dependency. If out-of-order execution were not used, often many of the function units would be unnecessarily idle. Out-of-order execution results in the function units doing useful work most of the time.

I.C. 3 Speculative Execution

There are limited occasions when it is completely safe to irreversibly execute instructions out-of-order. This is because the program being executed may expect certain operations to be performed in the program's original sequential order. Also, all program results must be completely consistent with what a conventional processor would generate. Finally, in the x86 architecture it is necessary to be able to identify precisely in the program where error conditions and other externally generated interrupt events occur. In order to fully exploit the benefits of out-of-order execution and branch prediction (discussed below), out-of-order execution is not limited to only safe occasions, but is instead performed in a manner that is reversible. That is, there must be a capability to restore the state of the processor to the condition existing at some earlier time in the program. Since it is not known whether out-of-order results will actually be used, the processor is said to perform speculative execution.

While the execution units are busy, the pipeline in DEC continues to fetch, decode, and issue p-ops, in a manner largely decoupled from the activity of the execution units. DEC's Frontend predicts the directions that branches will take and DEC's Decoder issues p-ops for the direction predicted. Upon completing execution of each p-op, the execution units send termination signals to DEC's Backend. These terminations are sent with the p-op's tag. DEC's Backend keeps track of all terminations corresponding to each tagged p-op. Since the tags are like time-stamps, the relative age of p-ops is discernable from the tags. Issued p-ops that have yet to be retired or aborted are considered outstanding. If a p-op is normally terminated by all units involved, DEC's Backend will "retire" the p-op, unless an older p-op is still outstanding. If a p-op is abnormally terminated, due to a mispredicted branch or due to any manner of fault condition, DEC's Backend will "abort" all p-ops equal to and younger than the p-op that was abnormally terminated. Instruction aborts cause the processor state to revert to that associated with some previously executed instruction. Multiple p-ops may be retired or aborted simultaneously. A p-op may be aborted because it was in the predicted target stream of a branch that was ultimately resolved as being mispredicted, or because it was after a p-op that terminated abnormally, requiring intervening interrupt processing.

The execution units maintain archival versions of those portions of the F86 processor state that have changed in association with the execution of the outstanding p-ops. When p-ops are retired, the changes made by the retiring p-ops are made irreversible. In contrast, when p-ops are aborted, the processor state reverts to that existing prior to the execution of the aborted p-ops. Again, the tags are used to define the precise time to which the processor state is reverted. (Tags are also used in the MCS to enforce the order in which the program expects data to be stored.) Aborts are largely transparent to the execution units, due to the use of register relabeling, discussed infra.

I.C. 4. Branch Prediction

DEC's Frontend employs branch prediction techniques using a Branch Prediction Cache (BPC). U.S. Pat. Nos. 5,230,068; 5,226,130; 5,163,140; and 5,093,778, are assigned to the assignee of the present invention, and are hereby incorporated by reference. Branches are a class of instructions that may occur as frequently as every third instruction for some types of programs. Branches are crucial to implementing the decision making capability of .computers. Branches are instructions that can evaluate the results of previous instructions and conditionally alter the program's direction accordingly. A conventional computer does not know what instruction to execute following a branch until the branch instruction is executed. Branch prediction employs sophisticated techniques to maintain statistics and important data for branches previously encountered and to predict in which direction and to what address the program should proceed. The execution units are issued p-ops corresponding to x86 instructions that follow the branch instruction, in the direction predicted. The branch must be evaluated to check that the prediction is accurate. Nevertheless, the execution units are allowed to independently proceed before the check is completed. In essence, the execution units are again allowed to execute p-ops out-of-order.

Two possible program paths, or instruction streams, are considered to be associated with every branch. If the branch is not taken, execution will continue sequentially. The branch itself is considered to lie within this first sequential instruction stream. If the branch is taken, execution in the first stream is suspended and execution is resumed at a non-sequential location, referred to as the branch target. Execution will continue from the branch target in a sequential manner, until another branch instruction is encountered. The new sequential path, starting from the branch target, is considered a second instruction stream. If there is another branch within the second instruction stream, its target is considered to be the start of yet a third instruction stream.

The F86 uses branch prediction to speculative execute past up to two branches whose taken/not-taken status is not yet resolved. As described above, two unresolved branches correspond to three instruction streams. One stream is considered the active stream and the others, if present, are alternates. The active stream corresponds to the stream for which p-ops are currently being issued and executed. DEC's Frontend pre-fetches down the active stream, ahead of the p-ops being issued. The Frontend also pre-fetches down the two alternate streams when conditions permit. In the event that a branch prediction proves incorrect, the processor will need to execute down one of the (previously) alternate streams. By prefetching down the alternate streams, DEC's Decoder can be kept from stalling when the active stream switches to one of the alternates.

I.C. 5. Register Relabeling

Register relabeling (reassignment) is a technique that is integral to the processor's ability to perform speculative execution. It is the method by which the F86 Processor maintains the archival versions of the general register file, the segment registers, and the associated "hidden" descriptor registers, all of the x86 architecture. The register files within AP and IEU are larger than required by the x86 architecture. Specifically they have as many additional registers as there are possible outstanding p-ops than can change the registers. Unlike conventional x86 register files, the AP and IEU register files do not have permanently assigned x86 register names. Instead, the x86 register name of each physical register varies with time and the requirements of the program. Further, multiple physical registers can correspond to the same x86 register, each of the multiple registers being associated with the execution of different outstanding p-ops.

The register relabeling is transparently managed by DEC. At the time each p-op is issued, DEC's Decoder "relabels" (or reassigns) the (virtual) register specifiers used by the x86 instructions into new and different (physical) register specifiers that are part of each p-op. The physical register specifiers are provided to the DEC Decoder sub-unit by the DEC Backend sub-unit. The DEC Backend is responsible for tracking the tagged p-ops, maintaining a pool of available physical registers (the free list), maintaining the mapping between the physical and virtual register specifiers for each p-op, and controlling whether to retire or abort p-ops, as discussed, above. Register relabeling minimizes performance degradation associated with the aborting of speculatively executed p-ops. A processor that uses register relabeling may also be said to use a virtual register file.

In a conventional register file, registers are specified entirely by the instruction encoding. The instruction decode unit has no say in which registers are used. In the F86 Processor, DEC's Decoder and Backend manage the virtual register files and dynamically decide which physical registers will be used in generating the virtual address. Therefore, DEC must be considered an integral part of the logic for providing virtual memory addresses.

The underlying physical register files also act as focal point for interactions between the pipe stages and pipes of AP and IEU. Specifically the multiple ports of the physical register files are destinations for multiple pipelines and the register numbers and valid bits are used to effect pipeline interlocks. These and other interactions are described in detail below.

I.D. CISC-on-RISC Virtual-to-Physical Address Translation

It will be useful to refer to virtual, intermediate, and physical addresses and address spaces. Segmentation is the process by which virtual addresses are mapped to intermediate addresses. Paging is the process by which intermediate addresses are mapped to physical addresses. Except for degenerate cases, the intermediate address will be different from the original virtual address. Similarly, except when paging is disabled, the physical address will be different from the associated intermediate address. When paging is disabled, the intermediate and physical addresses are identical.

I.D.1.Segmentation

The x86 Architecture encourages the division of programs into modules referred to as segments. There can be many segments. In essence, the segment is its own address space. Intra-segment addressing may be performed that is oblivious to the fact that the segment is not necessarily located at the bottom of the intermediate address space. Within a segment, locations are referenced using an Offset that is a measure of the distance of the location relative to the bottom of the segment. The bottom of the segment is the segment base.

Every segment has an associated segment descriptor. The segment descriptor has attributes that describe the segment. Two very important components of a segment descriptor are the segment base address and the segment limit. The segment base address identifies the location within the intermediate address space at which the segment begins. The segment limit is used to define the maximum Offset allowed and thereby the size of the segment.

A particular segment is identified using a 13-bit (Segment) Index and a 1-bit (Segment) Table Indicator (TI). The TI identifies which of two tables, the Global Descriptor Table (GDT) or the Local Descriptor Table (LDT), contains the desired descriptor. Furthermore, the F86 Processor can select from as many LDTs as there are tasks.

The base of the current LDT is specified by the current LDT descriptor, which is identified by the currently active task, which is specified by the current task state descriptor, which is identified by the task state register. The location of the GDT is specified by a GDT Base Register. The Index is used to provide an offset to the desired descriptor relative to the base of the indicated table. The 13-bit Index can reference $2^{13}$, or 8,192 descriptors. For interrupts, an Interrupt Descriptor Table (IDT) is indexed using a scaled version of the interrupt vector to provide an offset to the desired descriptor within the IDT.

To reference a segment, the Index and Table Indicator must be loaded into a segment register. Any time an x86 instruction implicitly or explicitly changes any of the segment registers, the Index and TI are used to load the segment base and limit into programmer hidden registers from the descriptor tables in memory. Once the segment base and limit are loaded for the associated segment, the Index and TI are no longer used.

Intersegment changes in control flow always involve a change in the segment register. The segment register is loaded and the descriptor read from memory as prerequisites to adding any offset to the segment base address. Virtual register file techniques are used to hold the segment's Index, TI, and the descriptor information. Separate virtual register files are used for the segment Index/TI combination, segment base addresses, and limits. When instructions implicitly or explicitly refer to a location within a particular segment, DEC's Decoder will specify the physical register address of the associated segment register. This address is used to read the segment base address for routing to the relocation adder, discussed next.

Collectively, the GDT Base Register, Task State Register, active Task State Descriptor, active Local Descriptor Table Descriptor, Segment Index, Table Indicator, Segment Descriptor (particularly the base address, segment limit, B, D, and G bits), and Offset can be viewed as a programmer's virtual (logical) address. This view is accurate because all of this state information may affect the resulting intermediate and physical addresses.

The segment base address is added to the Offset to generate the corresponding intermediate address. The adder used is often referred to as the relocation adder. The adder effectively relocates all locations within the segment to an area in the intermediate address space that begins at the segment base address. Note that only the Offset and the segment base address participate in the addition. The Index and Table Indicator, previously used to obtain the segment base address, do not participate in the relocation addition.

Memory operands are addressed using an effective address calculation that may involve a base and index register as well as a displacement from the instruction. AP reads the base and index registers from the General Registers using the physical register addresses specified by DEC's Decoder within a p-op. The index is scaled as required. Conceptually, the sum of the base, scaled index, and displacement, form the Offset, discussed supra.

In the F86 Processor, the Offset is not generated prior to the relocation adder. Instead the relocation adder has four inputs for the base, scaled index, displacement and segment base address. The relocation adder uses intermediate carry-save stages prior to a final carry-propagate stage. Carry propagation is a time consuming process. By avoiding the prior generation of the Offset, the F86 Processor eliminates an unnecessary carry propagation associated with the Offset. Thus, the path from address registers to the intermediate address has been optimized for minimum delay.

I.D. 2. Paging

When paging is enabled, the F86 Processor always translates intermediate addresses into physical addresses using the TLB. That is, the F86 processor combines the offset part of the intermediate address only with a page-frame base-address (page entry output) from a TLB. If there is a miss in the TLB, the F86 Processor will first service the page cache, and then it will restart the memory access. It never directly uses the result of a page table look-up to translate a intermediate address.

In the event of a TLB miss, the missing entry is fetched from memory from a location specified by a two-level page directory and page-table lookup. The fetched page table entry is routed only to the page cache. The fetched page table entry is not routed to any other destination. Once, the TLB is filled with the previously missing entry, the address translation is restarted. Upon restart, the translation will proceed as for the case where there is a hit in the page cache.

I.D. 3. Address Translation Schemes in F86

In the F86 Processor, address translation occurs differently for single-cycle operand addressing, multi-cycle operand addressing, sequential instruction fetching with breakpoints enabled, sequential instruction fetching with breakpoints disabled, and branch target and page cross instruction fetching. Also, the AP can be checking operand addresses concurrently with EIP checking two instruction addresses.

These differences in behavior are associated with various specialized structures that are called upon as a function of the operation requiring the translation.

The Instruction Pointer (called EIP in the x86 architecture) is a component of the virtual addresses used for instruction fetching. The F86 processor fetches instructions down three instruction streams and therefore has three instruction pointer registers. Any one of these three registers can serve as the source for calculating an instruction fetch address.

The three instruction pointer (EIP) registers are maintained in the Dual EIP Unit (DEU). Up to two are used for alternate streams, corresponding to instruction streams that are currently being prefetched but not executed. One of the instruction pointer registers is associated with the currently active stream, which is being executed.

The Instruction (Cache) Tag Unit (ITAG) of the Memory and Cache System (MCS) maintains three Instruction Stream Address Registers (ISARs) which contain physical addresses corresponding to the three instruction streams. The addresses contained in the ISARs are used to prefetch instructions into the up to three instruction queues maintained inside DEC's Frontend. Fetching is performed from the instruction cache when the instructions are available therein and from main memory otherwise. Fetching by ITAG and associated advancement of the ISARs is under remote control of DEC's Frontend. Advancement of ISARs is done only for sequential instruction execution within a page.

DEC's Frontend has logic that recognizes when an instruction fetch would cross a page boundary. DEC's Decoder issues special p-ops that will command the various function units to perform the page cross. In response to these pops, the current EIP is retrieved from the DEU by the AP unit and an address translation is performed. The translated address is subsequently broadcast by AP to both DEC's Frontend and ITAG, so that subsequent sequential instruction fetches can be performed using the ISAR technique. By performing sequential instruction fetching within a page without the use of AP, the expensive hardware resources of AP are available more often for p-ops that absolutely require their use.

Whenever a transfer of control operation is executed and the transfer of control is associated with a hit in DEC's Branch Prediction Cache (BPC), the new fetch address is predicted by DEC's based on the branch history information maintained by DEC. All of this happens in DEC's Frontend. The new fetch address is broadcast to both ITAG and to AP. AP subsequently performs an address translation using the current EIP retrieved from the DEU and compares the translated address to the address predicted by DEC's Frontend. If AP's calculations agree with the prediction, AP terminates normally and prefetching will have progressed in the meantime. If AP's calculations disagree with the prediction. AP terminates abnormally and broadcasts the translated address to both DEC's Frontend and ITAG. as done for a page cross operation. Whenever a transfer of control operation is executed and there is no associated hit in the BPC. the new fetch address is calculated by AP as done for a page cross operation.

DEC's behavior in invoking the use of the translation hardware is a function of its implicit knowledge of and dependence on the ISAR sequential fetching technique and the target address predictions made using the BPC. As such, the logic for providing virtual memory addresses is intertwined with the F86 Processor's use of an instruction cache, ITAG. and BPC. It has also been seen that F86's logic related to providing virtual memory addresses is distributed over diverse areas of the processor, including the DEC Frontend, DEC Decoder, DEC Backend, AP, IEU, and Memory and Cache Subsystem (MCS).

II. BLOCK DIAGRAM PARADIGM FOR INTERACTING FUNCTION UNITS

This section presents block diagrams of the F86's function units. Such block diagrams are the traditional exposition for patent disclosures. In these diagrams the perspective and focus is on physical topology, timing independent functionality, and how functions are physically, electrically, or logically interconnected or coupled. In the following section, a more appropriate perspective will be made based on the data, address, and control flow through the independent, interacting, multi-pipelined function units.

FIG. 1 is a block diagram of a CPU 10 incorporating the present invention. CPU 10 is a RISC-like machine designed to execute an instruction set (macro-instructions) normally associated with a target family of CISC microprocessors. This approach makes it possible to achieve performance levels normally associated with RISC machines while retaining compatibility with a large installed base of software written for CISC machines. In the specific embodiment, the CPU is designed to execute an instruction set compatible with that of the x86 industry standard, as described in the Intel 80386 Programmer's Reference Manual and other documents published by Intel Corporation, Santa Clara, Calif. 1986.

In broad terms, the CPU operates to convert each macro-instruction into one or more decoded instruction words, referred to as pseudo-ops (p-ops) or sometimes as operations or internal instructions, which are dispatched to a number of semi-autonomous RISC-like functional units. A unit 12, referred to as the DEC is a highly pipelined functional unit which performs a number of functions, including instruction fetch, instruction decode, instruction issue, and instruction tracking. The appropriate functional units execute the p-ops, and provide termination information to the DEC.

In the specific embodiment DEC 12 optionally interleaves instruction prefetch of up to three simultaneous instruction streams, and includes a fully associative Branch Prediction Cache (BPC) 13. On each cycle, a macro-instruction is selected from one of the three instruction buffers or a branch target buffer in the BPC. The macro-instruction is decoded, assembled into a 122-bit p-op, and dispatched to the various functional units. Each p-op issued by DEC 12 is given a tag which uniquely identifies each p-op currently outstanding in the machine. Tags are issued in increasing order, allowing easy determination of relative age of any two outstanding tags. Bus transactions between functional units include the tag of the originating p-op. Functional units pair up p-op, addresses, and operands with these tags.

In the specific embodiment, the functional units include an address preparation unit (AP) 15, an integer execution unit (IEU) 17, a numerics processor (NP) 20, a Move/Add unit (MAU) 22, also sometimes referred to as the Add/Move unit (AMU) or the address assist unit (AAU), and a dual extended instruction pointer unit (DEU) 23. DEC 12 and AP 15 interface to memory through a memory cache subsystem (MCS) 25. MCS 25 contains a level 1 cache (L1C) 27 and communicates with an off-chip level 2 cache (L2C) 30. The MCS communicates with main memory via a system bus 32, sometimes referred to as the NexBus.

Communications among the various functional units are carried out over a number of internal buses, namely:

a 64-bit IFETCH bus 50 for instruction fetches;

a 122-bit p-op bus 52 for communicating issued p-ops to the AP, the IEU, the NP, the DEU, and the MAU;

a 12-bit tag status bus 53 for communicating outstanding p-op information to the AP, the IEU, the MCS and the NP;

a 51-bit physical address bus (PAdrBus) 55 for communicating physical addresses;

a 32-bit memory and I/O read data bus 57 for from the MCS to the AP, the MAU, and the IEU;

a set of 32-bit unidirectional data exchange buses (DXBus) 58 for communications among the MCS, the AP, the MAU, and the IEU;

a 64-bit NP data bus 59; and a number of termination buses, namely an 8-bit AP termination bus 60, a 12-bit IEU termination bus 62, a 2-bit NP termination bus 63, and a 9-bit DEU termination bus 65, from the functional units to DEC 12.

The embodiment described herein incorporates a significant number of the same features as the embodiment described in the '126 patent, but represents a later implementation. There are a number of differences that will be outlined here for the purpose of clarifying the relationship between the two embodiments. The most evident difference is that the earlier embodiment had each functional unit on a separate chip, with buses interconnecting the chips, while the present embodiment has the DEC, the MCS, and all the functional units except the NP on a single chip. In view of this difference, the buses that communicate among the functional units are, for the most part, internal buses, and the timing and phases may be different. Additionally, while the previous embodiment allowed up to 7 p-ops to be outstanding, the present embodiment allows up to 14 p-ops to be outstanding. Thus, a 5-bit tag is necessary to allow relative ages to be determined from the tag values alone. Furthermore, the AMU and DEU are functional units that were not present in the earlier embodiment.

Overview of the Functional Units

Figure 2:
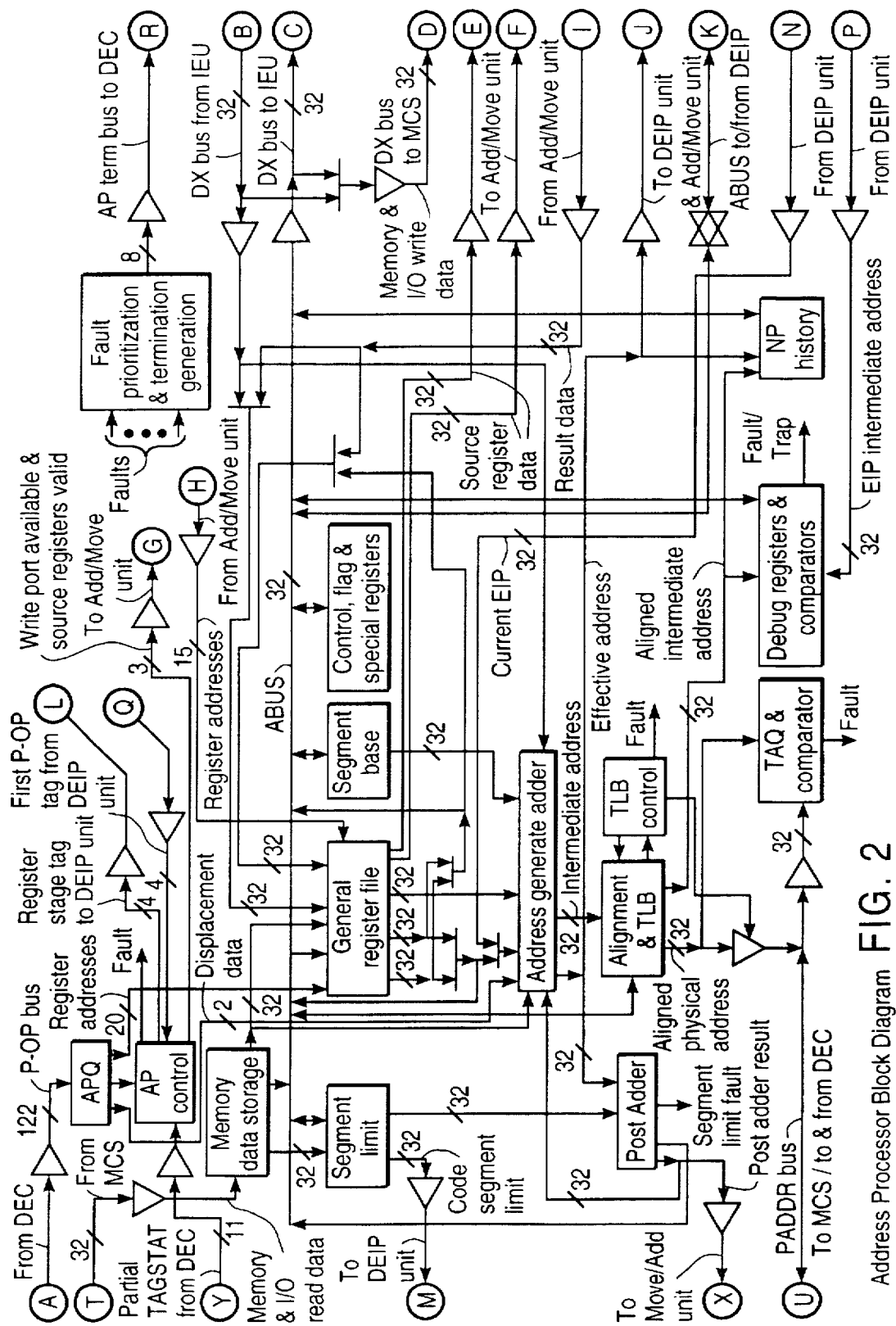
FIG. 2 is a block diagram of the address preparation unit (AP)

FIG. 2 is a block diagram of AP 15. AP 15 is a highly pipelined functional unit which calculates effective addresses, performs segment relocation, and implements a demand paged memory management system. It contains a translation lookaside buffer (TLB). AP 15 generates and checks addresses for all load and store operations, manages the segmentation and paging hardware, and performs some arithmetic operations in parallel with IEU or the MAU, updating a copy of the general purpose registers it shares with the MAU. A register update mechanism between AP and IEU keeps the two separate files coherent. AP queues only operations it must perform work on, and tracks the internal issue tag by incrementing it for non-null p-ops and synchronizing to the abort tag on abort cycles.

Figure 3:
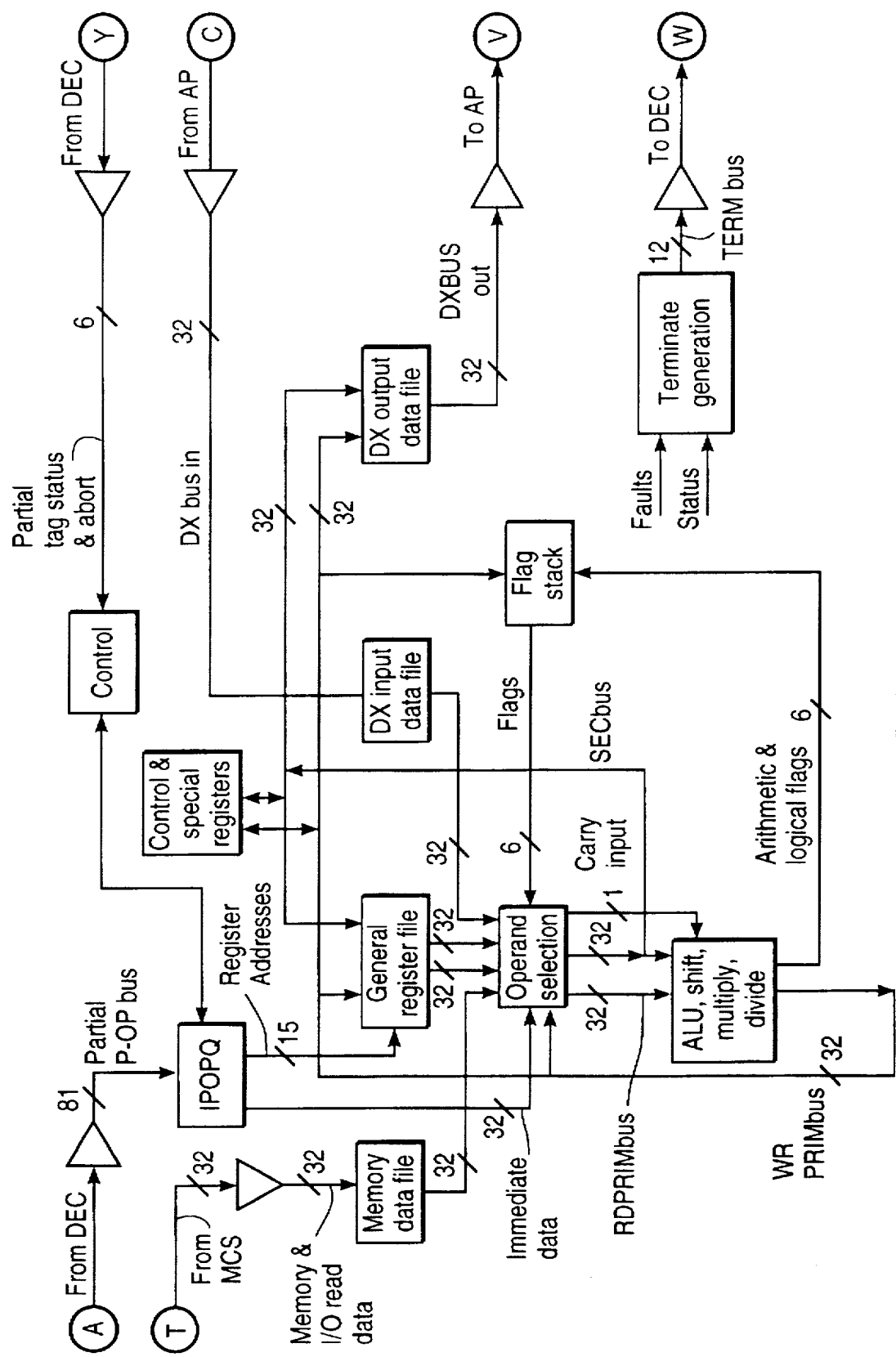
FIG. 3 is a block diagram of the integer execution unit (IEU)

FIG. 3 is a block diagram of IEU 17. IEU 17 is a highly pipelined functional unit which performs single cycle execution of most integer instructions. IEU performs all arithmetic and logical operations, including manipulating the arithmetic flags and verifying the predicted direction of conditional transfer controls. IEU contains its own copy of the general purpose registers. A register update mechanism between AP and IEU keeps the two separate register files coherent. IEU queues p-ops it must perform work on, and tracks the issue tag similar to AP. IEU also queues information for every p-op issued, even those not specifically directed to it. Specifically the flag management hardware records a p-op with no work for IEU as requiring passing forward without change the flags from the previous p-op.

NP 20 is a highly pipelined functional unit which may optionally be included in the CPU. It is a high performance implementation of the IEEE floating point standard. The NP is integrated into the pipeline and does not incur any special overhead for the transfer of instructions and operands. Integer (IEU) and floating point (NP) instructions execute concurrently.

Figure 4:
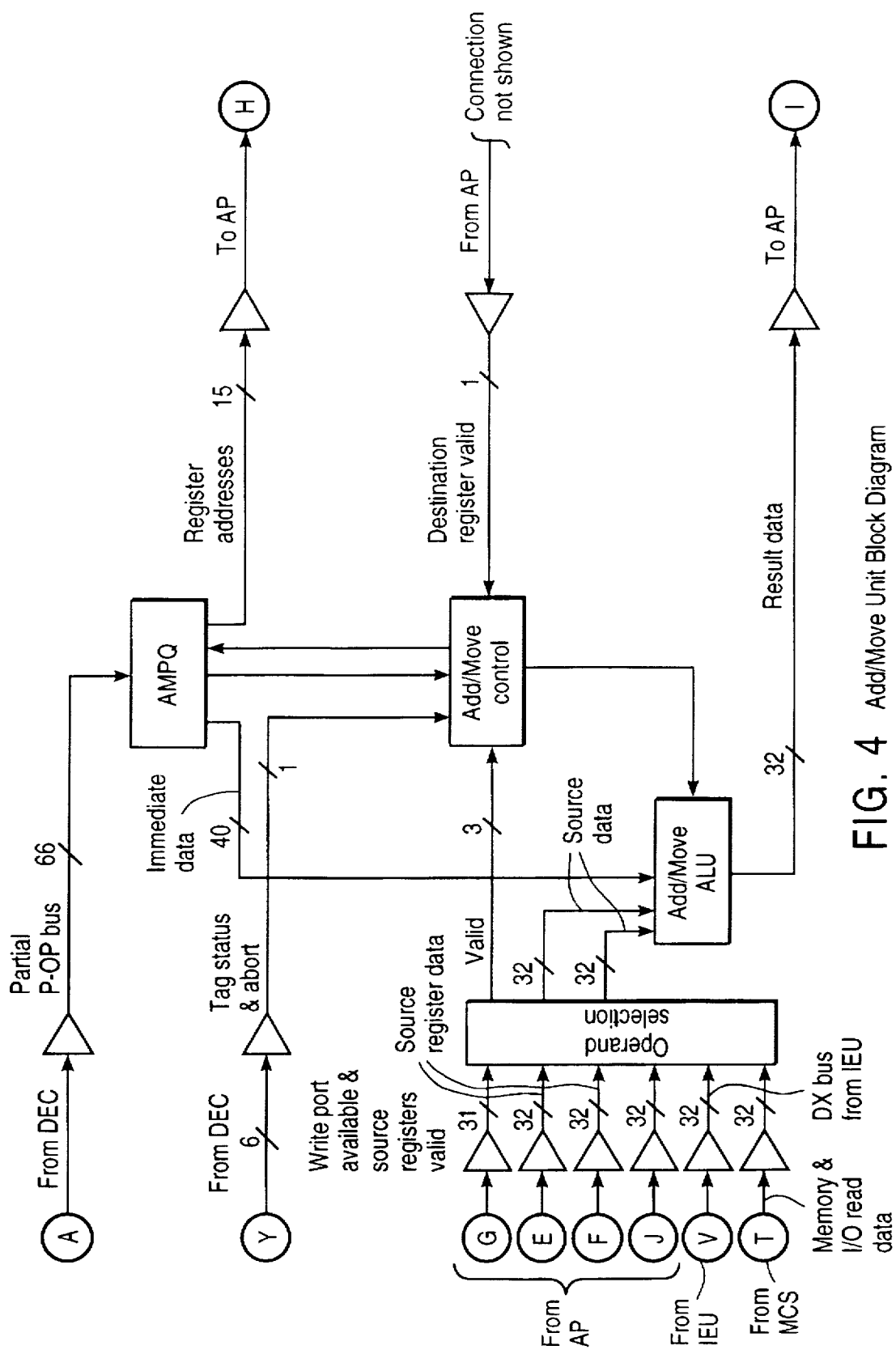
FIG. 4 is a block diagram of the Add/Move unit (AMU)

FIG. 4 is a block diagram of AMU 22. AMU 22 is a highly pipelined functional unit which performs simple register or immediate-to-register operations: ADD, SUB, INC, DEC, MOV, OR, and AND, updating a copy of the general purpose registers it shares with AP. AMU only queues p-ops it must perform work on, and tracks the issue tag identically to AP. The AMU, is described in copending application Ser. No. 08/340,183, filed Nov 15, 1994, for "Improved Pipeline Throughput Via Parallel Out-of-Order Execution of Adds and Moves in a Supplemental Integer Execution Unit," hereby incorporated by reference.

Figure 5:
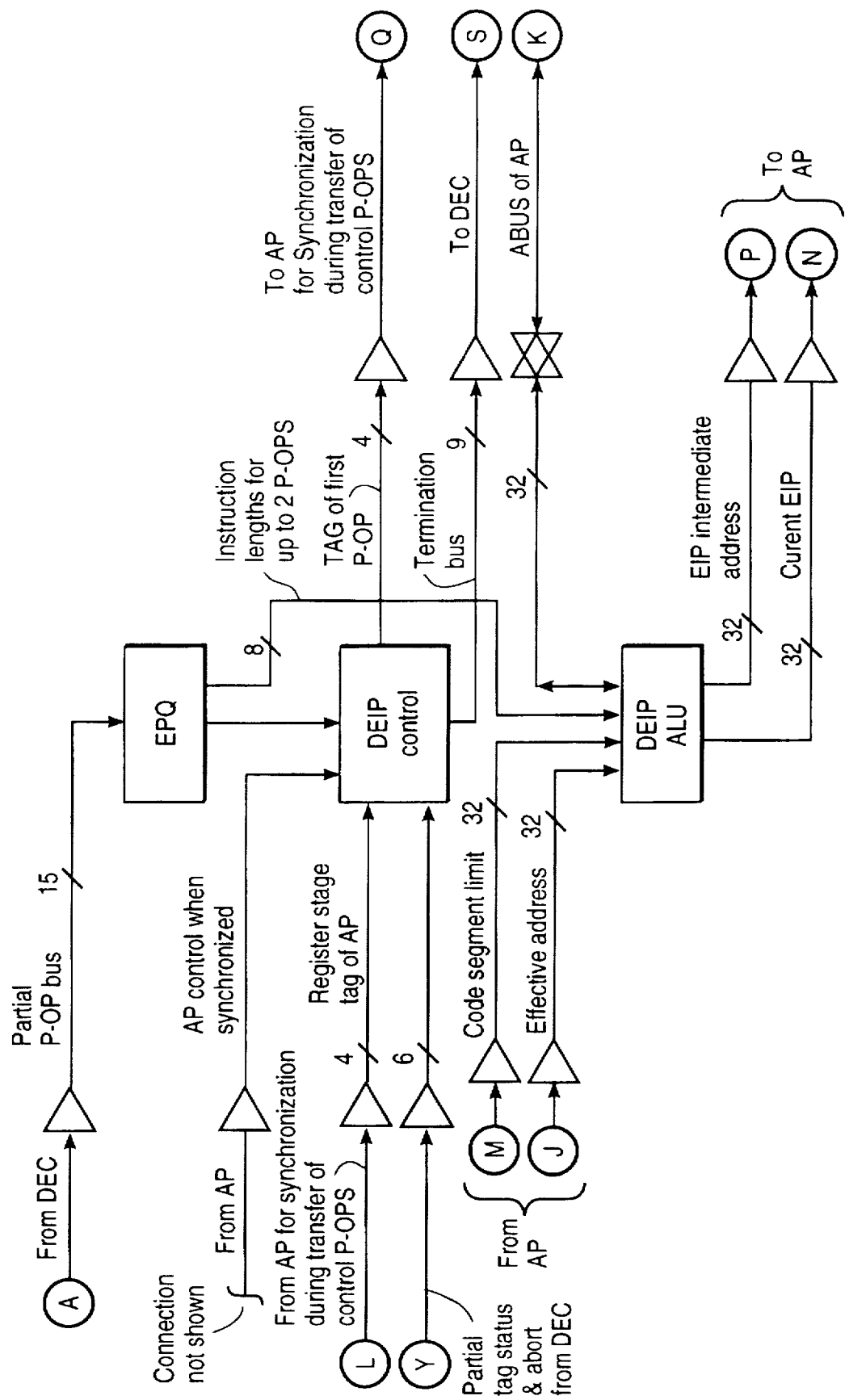
FIG. 5 is a block diagram of the dual extended instruction pointer unit (DEU)

FIG. 5 is a block diagram of DEU 23. DEU 23 is a highly pipelined functional unit which checks the x86 specified code segment limit for all x86 macro instructions, verifying the entire instruction is within the current code segment limit. Two such checks may be performed in a single cycle. DEU queues one internal instruction for each p-op (since it must process something for each clock of issue); it tracks issue tags identically to AP. The DEU, is described in copending application No. 08/185,488, filed Jan. 21, 1994, for "Superscalar Execution Unit For Sequential Instruction Pointer Updates And Segment Limit Checks Integer Execution Unit," hereby incorporated by reference.

Figure 6:
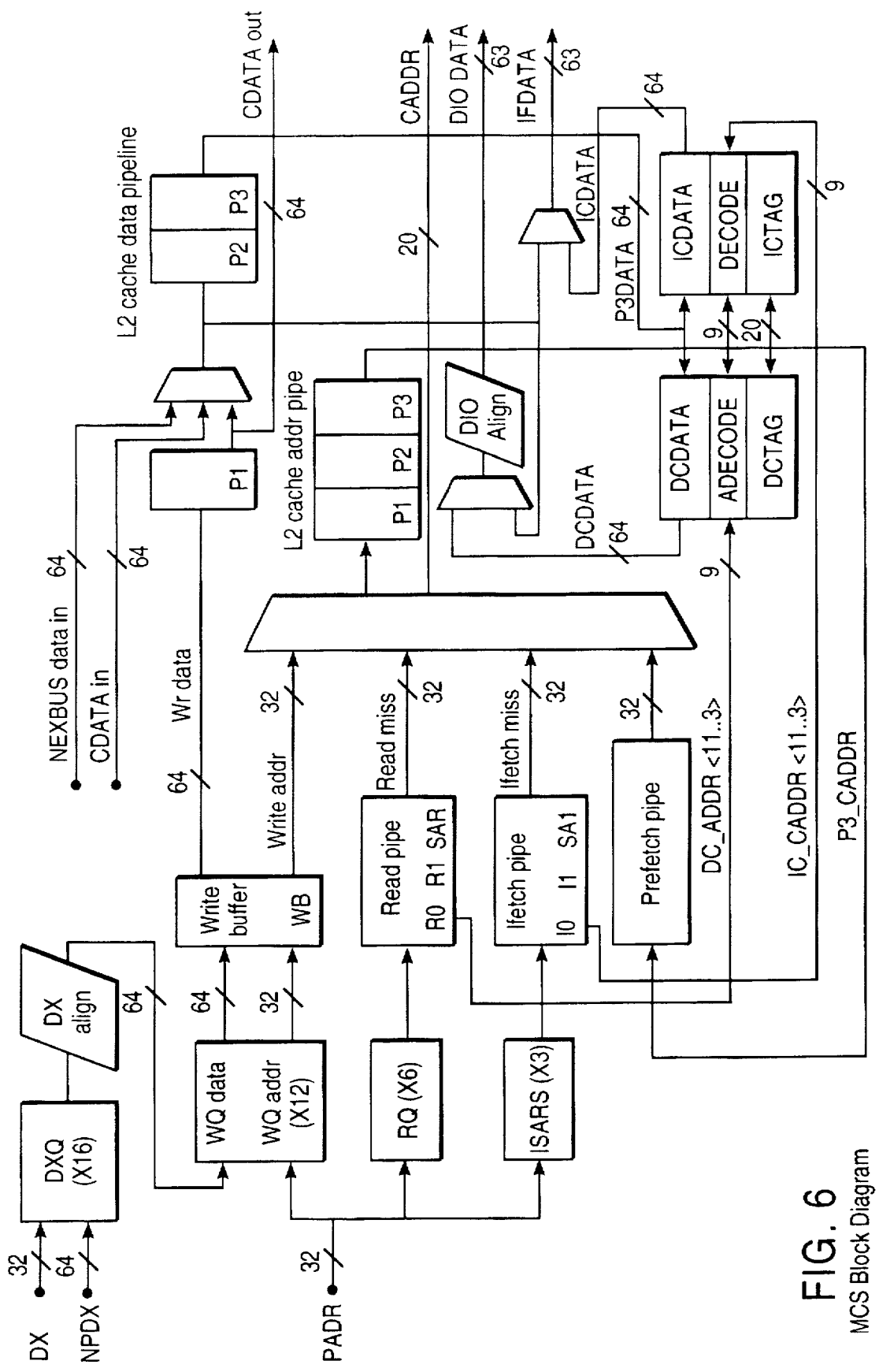
FIG. 6 is a block diagram of the memory and cache subsystem (MCS)

FIG. 6 is a block diagram of MCS 25. MCS 25 is a highly pipelined functional unit which is responsible for controlling the instruction and data caches and implements the cache coherency protocol. The MCS controls the interface to the system bus 32, supporting high speed single and block mode transfers between cache and memory. The MCS also contains write reservation tables for integer, floating point, and system writes, and includes read after write short circuit paths. MCS contains write buffers, L1C (I+D) interfaces, the L2C interface, and the external bus interface. It is responsible for serialization of memory operations and abortion of writes when required. MCS records on issue of every p-op the corresponding tag and abort group information, tracking the issue tag similar to AP. Aspects of the details of the MCS are the subject of related co-pending application No. 08/405, 268 filed Mar. 13, 1995 for Cache Control System, co-assigned to the assignee of this application and hereby incorporated by reference.

Figure 7:
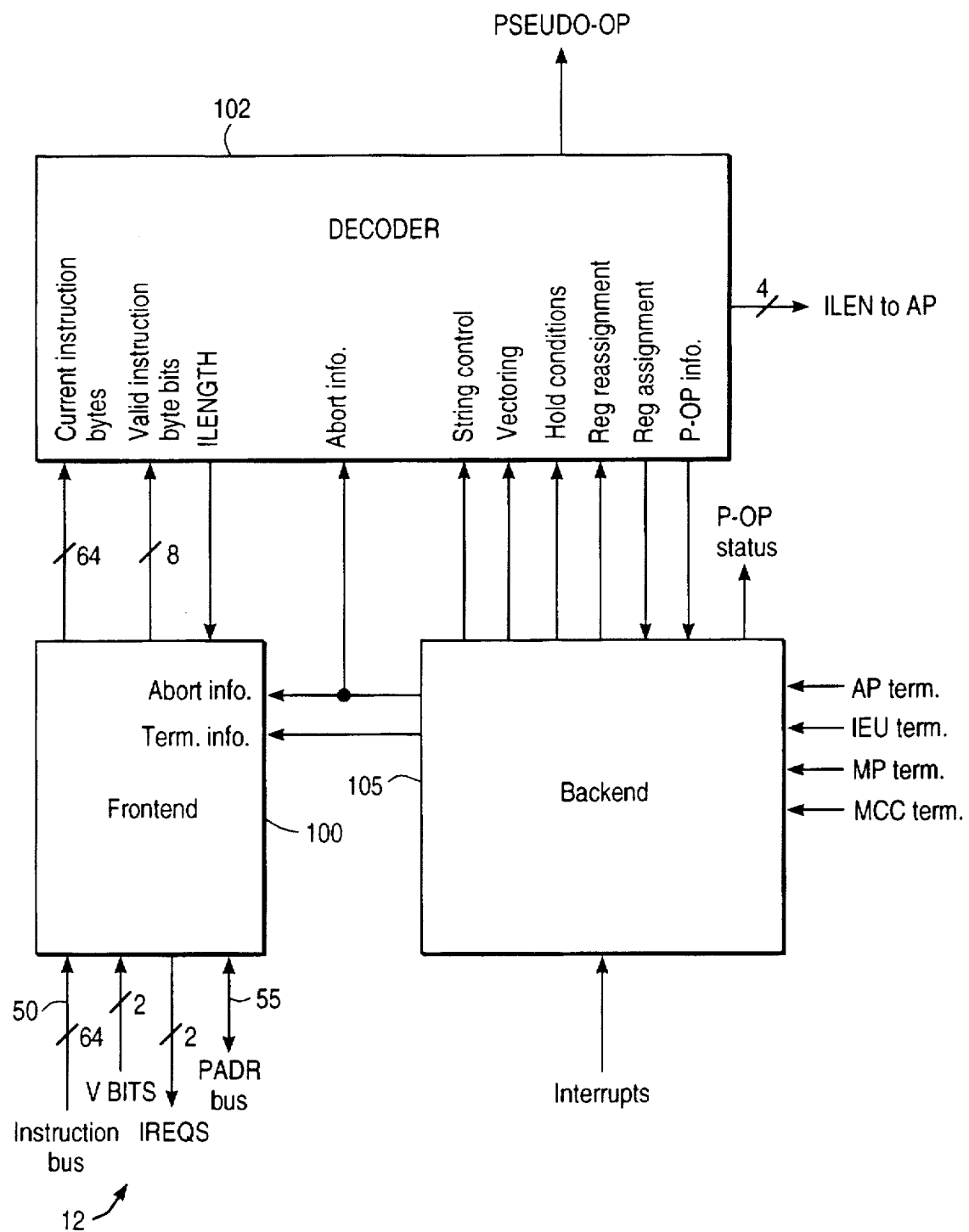
FIG. 7 is a block diagram of the decoder unit (DEC)

FIG. 7 is a block diagram of DEC 12, which comprises a Frontend 100, a Decoder 102, and a Backend 105.

Figure 8A:
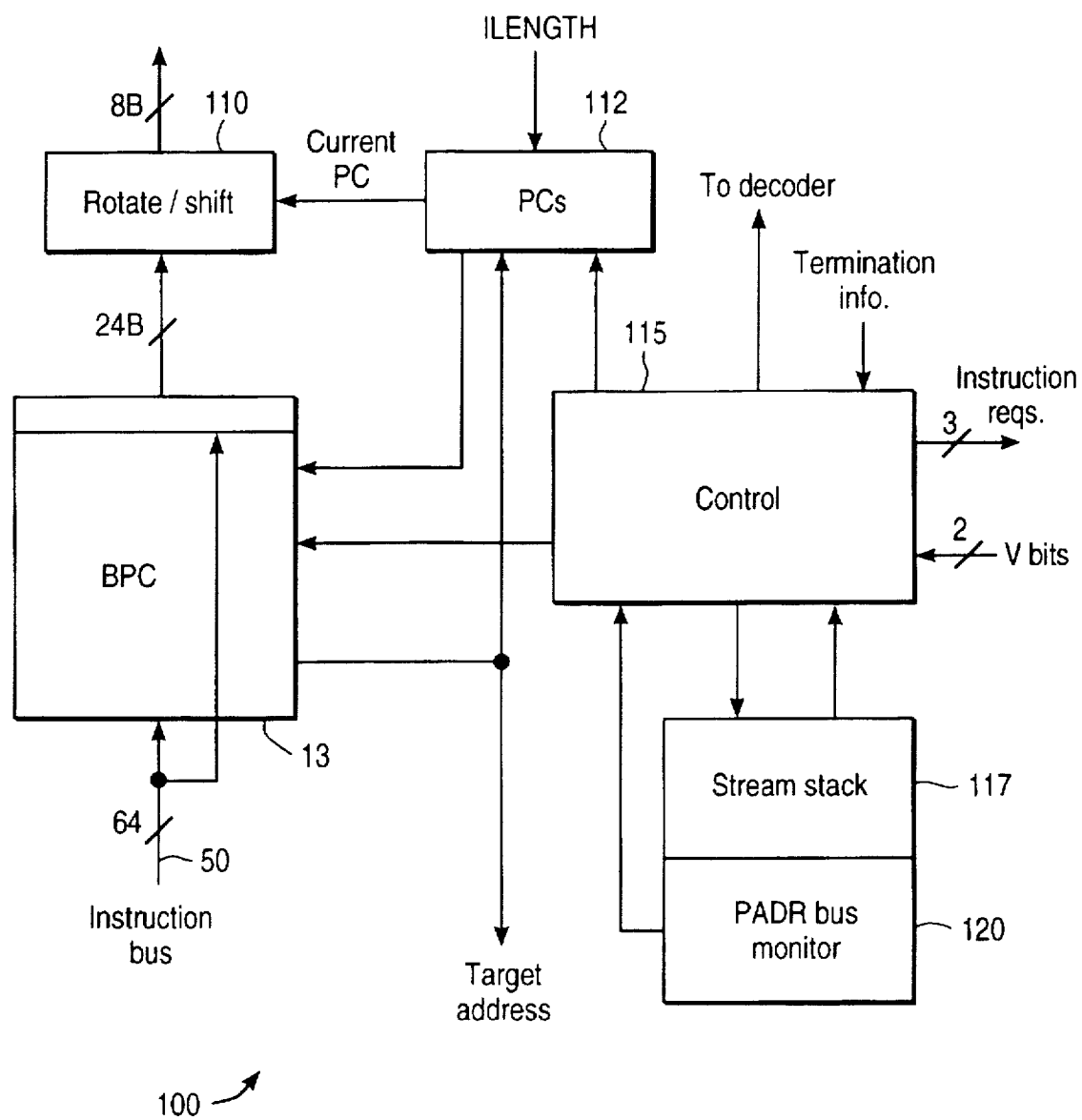
FIGS. 8A–8C are block diagrams of the frontend, decoder, and backend in the DEC.

FIG. 8A is a block diagram of DEC Frontend 100. DEC Frontend 100 is responsible for fetching and supplying instruction bytes to the Decoder. Instructions are supplied either from BPC 13 or one of three instruction buffers fed by IFETCH bus 50. Instruction bytes are supplied (24 bytes at a time) to rotate/shift logic 110 which aligns the instruction bytes on the basis of information from a PC (program counter) register 112. Eight bytes are provided to Decoder 102, which determines the instruction length and communicates it to PC logic 112. In the event that the instruction is longer than 8 bytes, 8 bytes are communicated in one cycle and up to 8 instruction bytes on the next.

Frontend control logic 115 controls a stream stack 117, and provides stream addresses to the MCS. There may be up to two outstanding branches and therefore up to three outstanding streams. The control logic issues instruction requests, specifying what stream to fetch, and receives valid bits qualifying the stream. When control logic receives an address, it increments the appropriate address register. Control logic 115 also receives signals from PAdrBus monitoring logic 120, which detects writes into the instruction stream for self-modifying code.

Figure 8B:
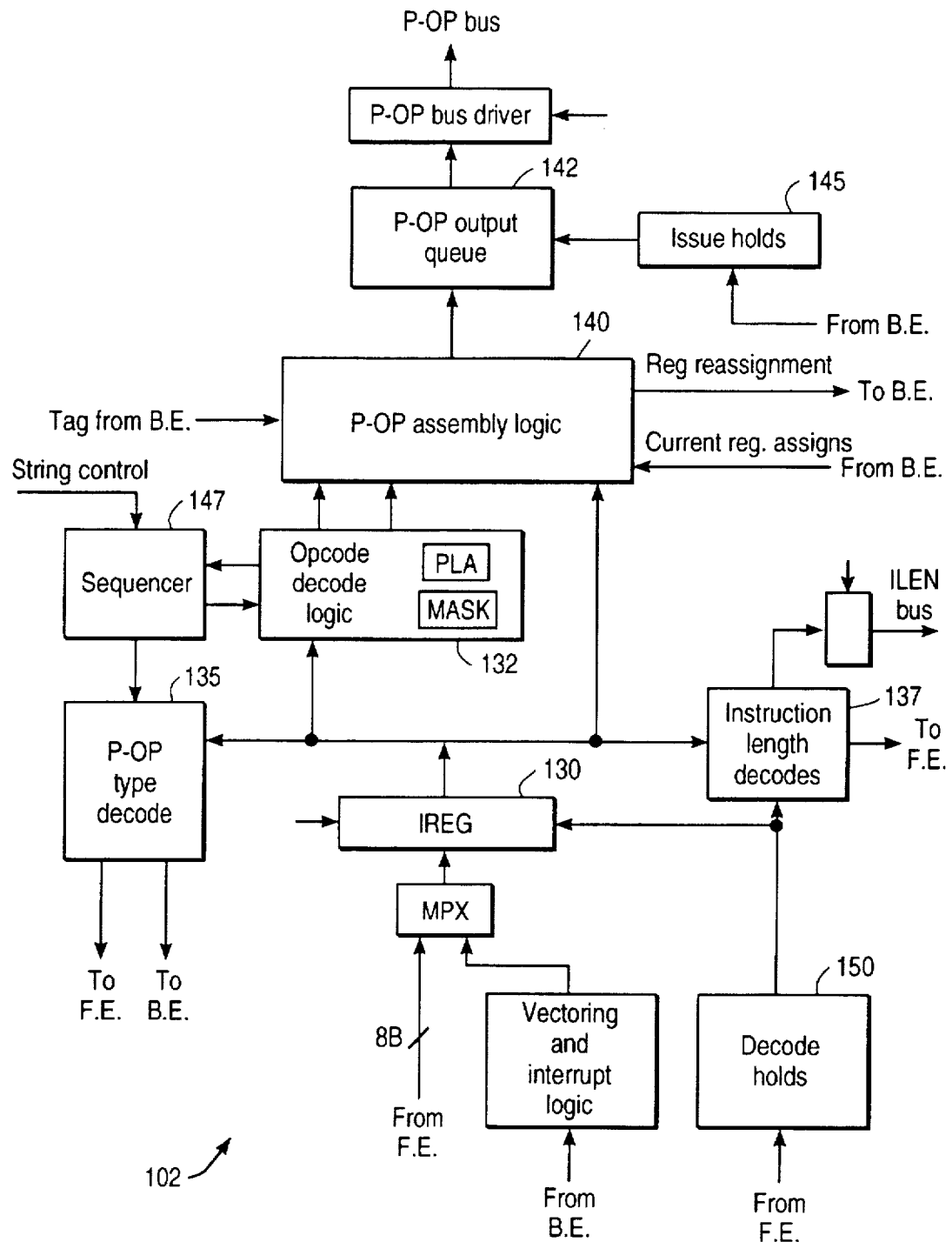

FIG. 8B is a block diagram of DEC Decoder 102. DEC Decoder 102 is responsible for decoding macro-instructions and issuing all p-op sequences over p-op bus 52. The Decoder receives instruction bytes (macro-instructions) from Frontend 100, which are loaded into an instruction register 130. The macro-instruction is decoded by decode logic 132, p-op type decode logic 135 transmits information regarding the p-op type to the Frontend and Backend while instruction length decode logic 137 communicates with PC logic 112 in the Frontend.

Decoder p-op assembly logic 140 receives p-ops from decode logic 132 and modifies them according to register assignment information from the Backend. The p-ops are loaded into a p-op output queue 142 whence they are driven onto p-op bus 52. Issuance is held up by issue hold logic 145 based on control signals from the Backend.

Decoder 102 contains a sequencer 147 to control issuance where multiple p-ops arise out of a single macro-instruction. Decode hold logic 150 prevents processing where no valid instruction bytes are incoming from the Frontend.

Figure 8C:
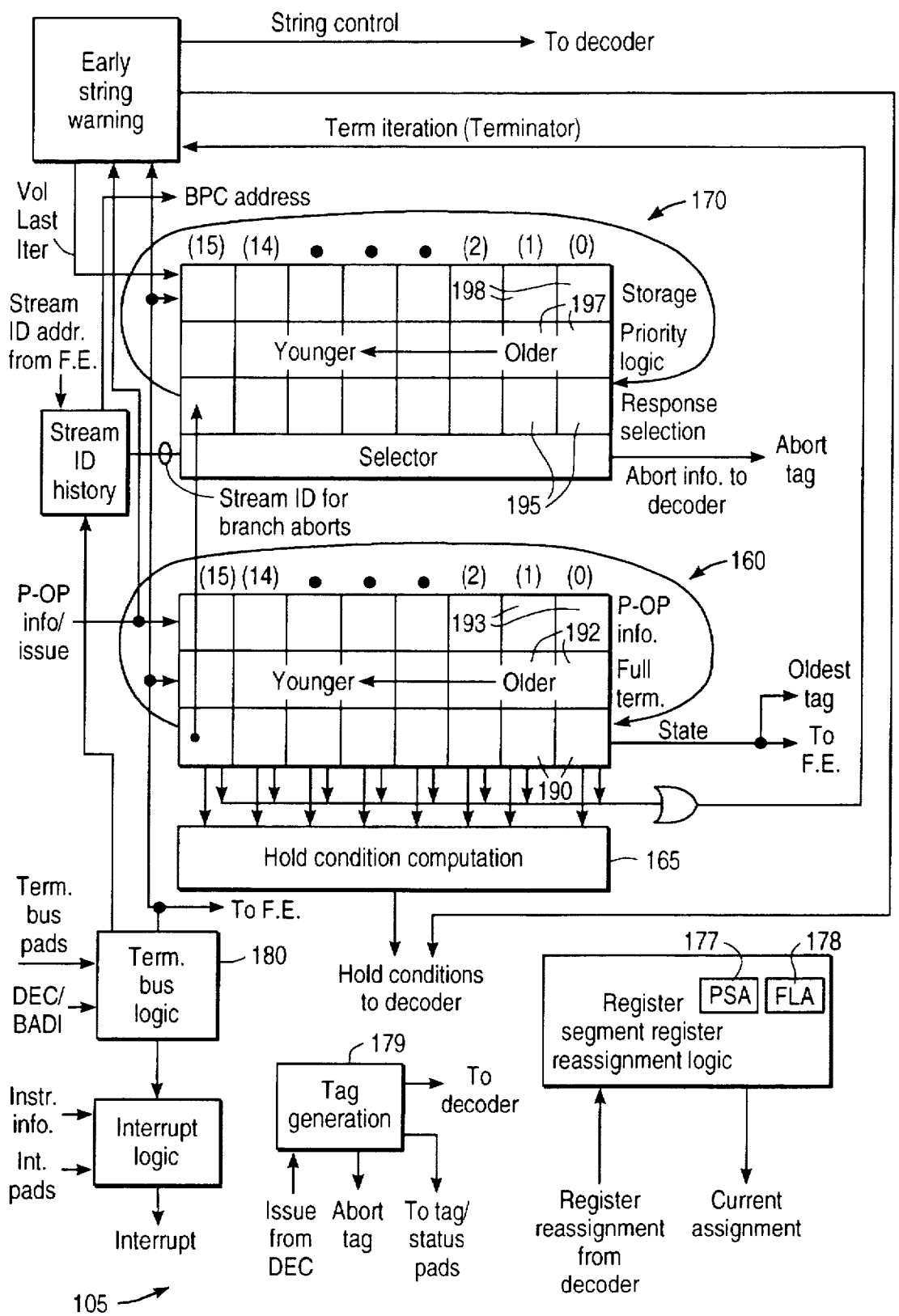

FIG. 8C is a block diagram of DEC Backend 105. Backend 105 includes tracking logic 160 to keep track of all outstanding p-ops, and hold condition logic 165, responsive to the outstanding p-ops, to control the issue of subsequent p-ops by Decoder 102 so as to continuously satisfy a variety of constraints which are required for correct, reliable CPU operation. Tracking logic 160 provides information for tag status bus 53, including the tag of the oldest outstanding p-op (OOTag). The Backend also includes abort logic 170 to handle aborting of p-ops, register reassignment logic 175 which maintains a pointer set array 177 and a free list array 178, and tag generation logic 179 to control tag status bus 53.

Backend termination bus logic 180 receives termination information from each of the functional units, making it possible for tracking logic 160 and abort logic 170 to maintain the status of each outstanding p-op.

Tracking logic 160 and abort logic 170 include registers for storing particular information concerning all outstanding p-ops. The registers are organized as 16 identical register sets, numbered 0-15 corresponding to the four least significant bits of the tags of outstanding p-ops. Since at most 14 p-ops can be outstanding, and since tags are issued sequentially, relative age can be determined on the basis of position number. Tracking logic 160 includes 16 each of state registers 190, termination registers 192, and p-op information registers 193, with associated logic. Abort logic 170 contains 16 each of response selection registers 195, priority logic registers 197, and termination storage registers 198, with associated logic.

III. A PIPELINE PARADIGM FOR INTERRELATING THE FUNCTION UNITS

The F86 is a very complex design. This complexity is quite difficult to manage, even for those closely familiar with the machine. The block diagrams in the previous section were included for the convenience of the casual reader and because they are the traditional views used in patent disclosures. However, it is believed that block diagrams may not be the best perspective view in which to present the invention.

The F86 processor can be described as a collection of independent but interacting RISC pipelines. Each pipeline consists of a series of pipeline stages that represents steps that the pipeline goes through to complete its work. It is believed that presenting a design organization that focuses on the pipeline flow of data, addresses, and control, is the best perspective for managing the complexity of the F86 and ultimately understanding the machine. In keeping with this belief, pipeline structural diagrams, pipeline timing diagrams, and text descriptions of the pipeline flow will next be presented for each F86 function unit.

There is a potential for differences between the two views. For example, in the block diagrams, the BPC exists as a single block. In the associated pipeline structural diagrams, because the BPC is used for different purposes at different pipeline stages, it appears multiple times. Even though the views appear to differ, both diagrams are accurate. The pipeline structural diagrams and the earlier block diagrams both are abstract representations of the F86 in the same sense that two different cross-sections through a multi-dimensional object are abstractions of that object. Both views are accurate and the objects they represent appear different in the two views.

The F86 pipelines interact with one another at specific points, creating pipeline dependencies that place boundaries on when each pipeline can perform each operation. Queues and register files permit largely decoupled operation, even between pipelines that contain dependencies.

We will describe the stages of each of the F86's pipelines, the interactions or dependencies that occur within a pipeline and between pipelines, and the queues and interlocks that permit dynamic scheduling. We will first introduce some concepts and terms that will be referred to throughout the pipeline descriptions, and then describe the pipelines.

PIPELINE PRIMER

A pipeline is defined to be a series of stages connected in a serial manner, such that the output of one stage is connected to the input of the next stage. A pipeline divides a complex amount of work into sequential steps. Since each stage includes a storage latch, the sequential steps are performed over a series of adjacent clock phases. The shortest pipeline is a single stage in depth. The longest pipeline is several dozen pipeline stages.

Pipelining

Pipelining in the F86 involves applying a next operation to the first stage of a pipeline before removing the results of the previous operation from the last stage of the pipeline. The F86 processor applies new stimulus to its pipelines at a rate of one new value per processor clock.

Two-Phase Clocking

Two-phase clocking is a strategy commonly used in the CMOS technology for clocking storage elements. A processor clock is roughly divided into two equal periods of time. In each period, called a phase, a clock associated with that phase is asserted. In the F86 processor, the two phases of the processor clock are called "Phase 1" and "Phase 2". The clock signals associated with these phases are called Ph1 and Ph2, respectively.

Two phase clocking usually implies that transparent latches are used as storage elements. Transparent latches are clocked by a phase clock, and propagate their data input to their data output while the phase clock is asserted. While the phase clock is deasserted, the latch retains the value that existed on the data input at the time the phase clock was last asserted.

Logic which operates in a processor clock generally consists of zero or more levels of combinational logic (CL1), followed by a Ph1 clocked latch (L1), followed by zero or more levels of combinational logic (CL2), followed by a Ph2 clocked latch (L2), followed by zero or more levels of combinational logic (CL3). All logic blocks which operate in a single processor cycle contain the L1 and L2 latches. The combinational logic (CL1, CL2, CL3) is optional.

Data flows through a transparent latch at a time which is not rigidly constrained by the clocks. New data can arrive at the input to the latch as early as a short "Hold Time" after the falling edge of the phase clock associated with latching of previous data, and as late as a short "Setup Time" before the falling edge of the phase clock associated with latching the new data. If new data arrives at the input of the latch before the rising edge of the phase clock, that data does not flow through the latch until the clock rises.

Pipeline Stages

Due to the usage of two-phase clocking, it is easiest to describe the F86 processor timing in terms of stages. Each stage is nominally a single phase in duration, and includes a block of logic that performs some useful calculation and latches its results in a transparent latch. Due to the use of transparent latches, the latches in a pipeline stage can be placed at the beginning, in the middle, or at the end of the pipeline stage.

The fact that the logic is not rigidly controlled by the clocks also allows some blurring of the boundary between one pipeline stage and the next. In this description of the microprocessor, a pipeline stage is taken to be a meaningful collection of operations performed in parallel, and mostly during a single phase clock. In reality, a stage can borrow time from either the preceding or following phase, depending upon the exact placement of the latches within the stages.

Since a pipeline stage is only one phase worth of logic and new operations are applied only once every two phases, a pipeline stage does useful work only half the time. This is a characteristic of two-phase clock designs.

During normal operation of a pipeline, operations are applied to the first stage of the pipeline once each cycle. Some number of phases (stages) after the first operation is applied, the final results of that operation become available on the output of the final stage of the pipeline. Once this pipeline latency has been observed, results become available from the final stage once per cycle.

Dependencies or Interlocks

It is common for pipelines to support more complex situations in which an operation applied to the first stage of the pipeline discovers at some later stage in the pipeline that the remaining pipeline stages can't be completed until information arrives from some other source. In the F86 processor, this source is sometimes a pipeline stage in some other (independent) pipeline, but is quite often a later pipeline stage in the same pipeline. This need for data from another source is referred to as a pipeline dependency.

For each potential dependency which can occur in a particular pipeline stage, there is logic responsible for checking to see if the dependency exists (based upon the operation being performed). If a dependency exists, this logic checks to see if the dependency can be resolved (i.e. the source pipeline stage can provided the required data at the time the destination pipeline stage requires it). This logic is often referred to as "Interlock Logic", and the detection of an active dependency which can not be immediately resolved is commonly called a Dependency Interlock.

Another type of interlock is a Resource Interlock. A Resource Interlock exists when more than one pipeline stage share a common resource, and a pipeline stage is not granted that resource when it requires the resource. Typical shared resources are internal and external multi-master busses, register file read and write ports, and other costly hardware whose total utilization does not justify multiple dedicated copies.

Pipeline Stalls

When an Interlock is detected, the pipeline stage which requires information which is currently unavailable must be held (stalled) until the information becomes available. Operations which are in later pipeline stages can continue to flow through the last stage of the pipeline.

Operations which are in earlier pipeline stages are also stalled because they need to be able to use the hardware in the stage which is interlocked before they can continue processing. Stalling of earlier stages can be thought of as performing a Resource Interlock Check on the immediately following pipeline stage. They are sharing access to the following stage with the current (possibly stalled) occupant of that stage.

Because p-ops enter the pipeline once per cycle, there is only one p-op present in any pair of adjacent pipeline stages, and it is usually sufficient to provide stall support in half of the pipeline stages.

Figure 9A:
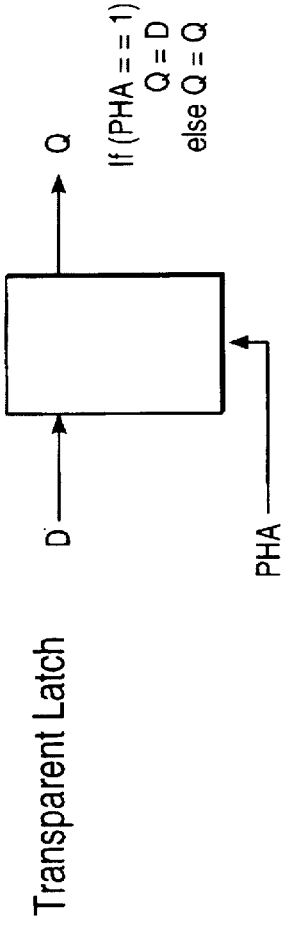
FIGS. 9A–9C show different types of latches used in the functional unit pipelines.
Figure 9B:
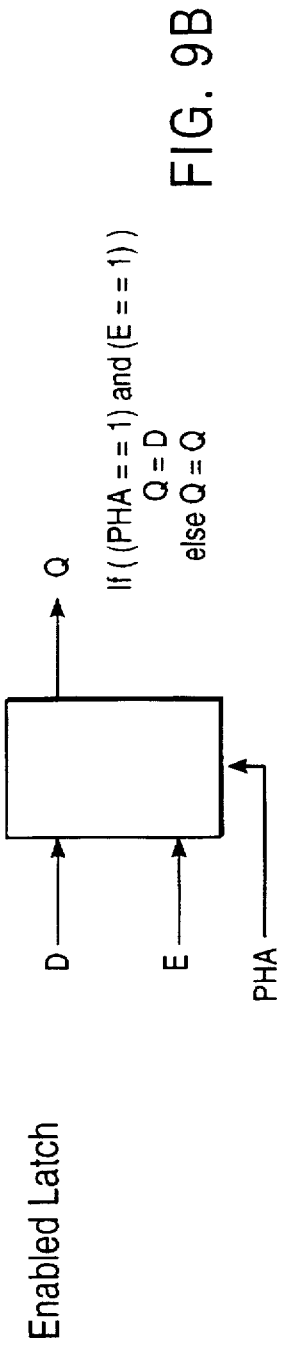
Figure 9C:
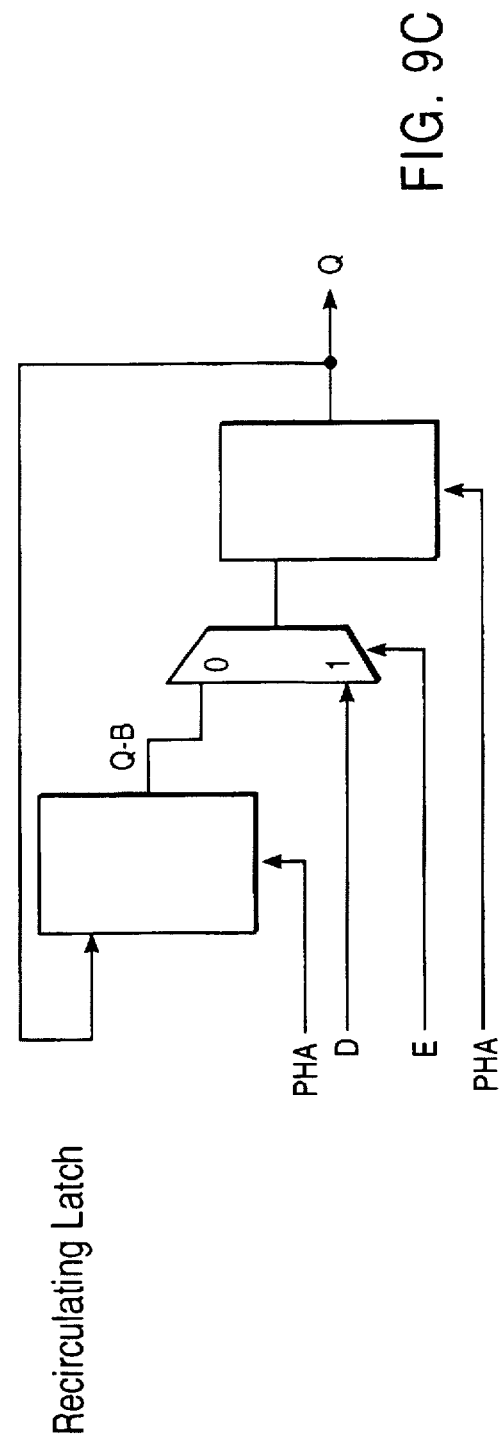

There are two common mechanisms used in the processor for supporting pipeline stalls. See FIGS. 9A–9C. The simplest mechanism is to replace transparent latches (FIG. 9A) with "enabled latches" (FIG. 9B). An enabled latch contains an additional control input which can be used to prevent the latch contents from being changed, even while the phase clock input is asserted. Stalling a pipeline stage is accomplished by disabling the latch which contains data which must be held until the stall condition is resolved.

Enabled latches have a disadvantage. The enable signal must be stable before the rising edge of the phase clock. This is contrasted with the data input which does not need to become stable until just before the falling edge of the phase clock. Determining stall conditions is quite often a critical path computation. In order to provide more time to complete the interlock checking, "recirculating latches" (FIG. 9C) are often used.

To replace a normal latch with a recirculating latch, a 2:1 multiplexor is placed on the input to the latch. The multiplexor select input is connected to the enable control signal, and selects between the new value and previous value of the latch. The previous value is created by connecting an additional latch (of the opposite phase) to the output of the first latch. While more costly, this scheme has the advantage of allowing the enable to arrive as late as one multiplexor delay plus a setup time before the falling edge of the phase clock.

Queues, Register Files, Short Circuits, and Interlock Mechanisms

It is common for two pipeline stages to communicate via information stored in a queue or register file, in addition to the latches between the stages. This has the advantage of allowing one pipeline stage to compute a value, store the value at an agreed upon register location, and continue processing without regard to when the second pipeline stage is prepared to use the information.

This queuing of information is at the heart of the dynamic scheduling of the multiple pipelines in the F86 processor. The existence of this queuing is what allows independent pipelines to process operations in the most efficient processor clock, without requiring that all other pipelines perform operations (and perform interlock stalls) in lock step.

When a source pipeline stage computes a value and places it in a register file, queue, or latch, some portion of a phase is consumed. When a destination pipeline attempts to retrieve a value from the register file, queue, or latch, again some portion of a phase is consumed. While the existence of the queue allows the destination pipeline to use information many clocks after it is created, a very common case is that the destination pipeline is in fact waiting for the information at the time it is being created.

In cases where it is common for the destination pipeline stage to be waiting for the source pipeline stage to produce information, and pipeline latency is considered to be an important consideration, it is common to provide a "Bypass" or "Short Circuit" path that allows the data input of the register file or queue to replace the data output of the register file (e.g. with a 2:1 multiplexer) so as to avoid the loss of the register write and register read times. In CMOS technology, this typically allows the destination pipeline to start using the information one cycle earlier than would otherwise be possible.

Even though two pipeline stages might communicate only indirectly through a queue, register file, or latch, an interlock check is usually still required. It can be avoided only if the pipelines are known to operate in such a manner that the source pipeline stage will always compute a value before the destination pipeline stage can need that value.

An interlock mechanism commonly used for first-in-first-out (FIFO) queues is for the queue to include a control block which maintains read and write pointers. At some agreed upon time (reset, abort cycles, etc) the read and write pointers are initialized to point to a single location in the queue. As values are produced by the source pipeline stage, they are written into the location pointed to by the write pointer, and the write pointer is advanced by one. As values are required by the destination pipeline stage, the read and write pointers are compared. If they are not equal, a value is available in the queue. The read pointer is used to access the oldest value in the queue, and the read pointer is incremented by one. If the two pointers are equal, then the queue is empty and an interlock exists.

If a short circuit mechanism is supported, the fact that the queue is empty causes the bypass path to be selected. If the source pipeline is not currently producing a result, an interlock again exists. A successful short circuit may either result in no change to the write pointer and read pointer, or it may result in both pointers being advanced by one.

An interlock mechanism commonly used for register files is for the register file to contain a set of valid bits, one for each register. When an operation is created and assigned a register location for communicating information between pipeline locations, the valid bit for that register is cleared (invalidated). Each pipeline operation is given a register identifier that can be used to access the register location. Common examples of register identifiers would be PopTags or physical register numbers derived from the virtual to physical register remapping process.

When the source pipeline stage produces a value, it presents the value and the register identifier to the register file. The register file modifies the selected register and also sets the valid bit for that register. When a destination pipeline stage requires a register value, it presents the register identifier to the register file. The register file examines the valid bit for the selected register. If it is set (valid), the value in the selected register is returned to the destination pipeline stage. If it is clear (invalid), an interlock exists.

If a short circuit mechanism is supported, the register identifier presented by the source pipeline stage is compared against the register file identifier presented by the destination pipeline stage. If they point to the same register, the bypass path is selected, independent of the valid bit check. In most cases, the register will be updated and its valid bit set, even if the value is bypassed to the destination pipeline stage.

Note that it is not uncommon for register files and queues to support multiple parallel read ports and/or multiple parallel write ports, and that some or all of the (write port, read port) pairs might implement short circuit paths. As an example, see FIG. 25 for an example of such a register file.

III PIPELINE ARCHITECTURE OF FUNCTIONAL UNITS

A Pipelines of DEC functional unit
  1 DEC IssuePipe—DEC Internal Instruction Packet Issue Pipeline
  2 DEC TermPipe—DEC Termination Processing and Response Pipeline
  3 DEC IFetchPipe—DEC x86 Macro Instruction Fetch Pipeline
  4 DEC PADRinPipe—DEC PADR Bus Input Pipeline
  5 DEC PADRoutPipe—DEC PADR Bus Output Queue Pipeline
  6 DEC StreamPipe—DEC Stream Information and Resource Management Pipeline
  7 DEC PageXPipe—DEC Sequential Instruction Fetch Page Cross Pipeline
B AP—Address Preparation Unit
  1 AP General Purpose Register File (GRF)
  2 AP P-Op Issue Pipeline
  3 AP Address Generation Pipeline
    a Address Generation in the X86 Architecture
    b Address Generation in the F86 Processor
    c Address Generation Pipeline—Memory Read
      1 APQA Read Stage
      2 Decode Stage
      3 Register Stage
      4 Adder Stage
      5 TLB Stage
      6 Termination Stage
      7 APTermA and APTermB Stages
    d Address Generation Pipeline—Pipelined Operations
    e Address Generation Pipeline—PADR Bus Generation
    f Address Generation Pipeline—Result Merging on Memory Loads
    g Address Generation Pipeline—Register Updates from the TLB Stage
    h Address Generation Pipeline—Register/Memory Updates from the Register Stage
  4 AP Memory Read Pipeline
  5 AP IEU Update Pipeline
  6 AP Retirement Pipeline
  7 AP TLB Details
    a System References
    b TLB Incrementer
    c TLB Data Path
C Add/Move Unit (AMU)
  1 Add/Move Unit P-Op Issue Pipeline
  2 Add/Move Unit Execute Pipeline
D Dual EIP Unit (DEU)
E Integer Execution Unit (IEU)
F Numeric Processor (NP)
G Memory and Cache System (MCS)
  1 MCS Padr Pipeline
  2 MCS DX Write Data Pipeline
  3 MCS DXQ Pipeline
  4 MCS Read Queue Pipeline
  5 MCS Read Miss Pipeline
  6 IFetch Pipeline
F NP PopRam register file
  1 NP Pop pipeline (Pop Issued)
  2 NP MX pipeline (Microcode Execution)
  3 NP DataRead pipeline
  4 NP DataWrite pipeline
  5 NP Term pipeline
  6 NP Out pipeline
G MCS—Memory and Cache System
  1 MCS Padr Pipeline
  2 MCS DX Write Data Pipeline
  3 MCS DXQ Pipeline
  4 MCS Read Queue Pipeline
  5 MCS Read Miss Pipeline
H IFetch Pipeline III.A. Pipelines of DEC Functional Unit DEC contains seven decoupled pipelines, Issue, Term, IFetch, PADRin, PADout, Stream, and Pagex. The Issue pipeline decodes, assembles, and issues F86 p-ops as well as related information to the functional units of the CPU, including DEC. The Term pipeline tracks outstanding F86 p-ops and provides overall CPU pipeline control information. The IFetch pipeline fetches x86 instruction bytes for the (possible) multiple outstanding x86 instruction streams. The PADRin pipeline receives the PADR bus and passes the information to other pipelines. The PADRout pipeline queues and transmits information to the PADR bus. The Stream pipeline tracks information concerning each outstanding x86 instruction stream. The PageX pipeline controls sequential fetch across page boundaries. Each of these pipelines will be described below in greater detail, followed by an explanation of how the DEC pipelines communicate with other pipelines of the CPU.

III.A.1. DEC.IssuePipe—DEC Internal Instruction Packet Issue Pipeline The DEC issue pipeline is responsible for the alignment of x86 instruction bytes and subsequent decode, assemble, and issue of (F86 p-ops). Refer to Appendix B for a description of the various issue fields.

The goal of the DEC Issue pipeline is to maintain a one F86 P-op per cycle issue rate. In order to adhere to this goal in the event of a transfer control, a Branch Prediction Cache (BPC) structure is used to maintain information about the recently encountered branches and corresponding target information.

As DEC decodes a new x86 instruction, the program counter (PC) of the x86 instruction is used to access the BPC. If the macro instruction is decoded as a branch, and the PC "hits" in the BPC, the associated instruction bytes and target address are read out of the BPC and used in alignment for subsequent decode and issue. This allows for the best case scenario of branch issue followed by target issue without any pipeline stalls.

FIG. 18 show the DEC.Issue pipeline structure and FIGS. 19A–19E show the pipeline timing diagram. Issue.BPC_PcCAM During the Issue.BPC__PCCAM stage, the PC of the F86 P-op that will subsequently be issued in the Issue.Iss1.1 stage is looked up in the BPC PCCAM. This is done so that if the F86 P-op is eventually decoded as a transfer control in the Issue.Decode stage and it exists as an entry in the BPC, no stall of the pipeline will occur. Issue.BPC__Rd In the Issue.BPC__Rd stage, the unencoded match lines passed from the previous stage are used as read select lines for a BPC read. Target bytes, the corresponding byte count, and the target address are passed to the Issue.Align stage.

Issue.Align

The Issue.Align stage is responsible for extracting x86 instruction bytes from the Instruction Buffer (IB), and output from the BPC__Rd stage, aligning the x86 instruction bytes to point to the beginning of a x86 instruction, and providing the aligned bytes and byte count to the Issue.Decode stage.

The Instruction Buffer receives data from the BPC or from the MCS via the Instruction Fetch Bus. The Align stage uses the PC and a read pointer for the current x86 instruction stream to align the x86 instruction bytes to the start the next x86 instruction.

Issue.Decode

In the Issue.Decode stage, the aligned instruction bytes from the Align stage are decoded using a dynamic programmable logic array (PLA). The outputs from the PLA are mainly control signals used by the Assembly stage (Issue.Asm/Iss1.0) to assemble internal p-op's for issue to the functional units during the subsequent Iss1.1 and Iss1.2 stages.

Additional special static hardware determines the instruction length during the Decode stage. A gate-level decode of the first three aligned bytes (normally the Opcode, Mod r/m byte, and the SIB byte) determines the instruction length. In addition, a decode is performed as to whether the instruction could be a branch, and if so, what type of branch. This decode information and aligned x86 instruction bytes are passed to the next stage.

The decoded x86 instruction length is added to the Current PC to form the next sequential PC. For sequential instructions, this next sequential PC is selected as the Current PC and sent to the Align stage to align the Instruction Buffer to the start of the next x86 instruction.

During this stage, if the PcCAM lookup in the Issue.Pc-CAM stage was a hit, the bytes that were read out of the BPC's Branch Target Cache are those associated with the target of the branch instruction currently being decoded. These target bytes are fed to the Instruction Buffer for alignment. This is referred to as the BPC__Rd stage in FIG. 18.

Issue.Asm/Iss1.0

The various fields of the internal F86 P-ops are assembled during this stage using the control signals from the Decode stage. During this stage early information about the internal instruction to be issued in the next stage is sent to the functional units via PopBus__1.

During this stage it is determined that an internal F86 P-op can be issued in the next pipeline stage. There are various reasons preventing issue:

a) not enough instruction bytes present;
b) resource limitations have been exeeded;
c) fourteen internal instruction packets, two branches, two segment register modifications;
d) need to generate an abort cycle; and
e) second cycle of two cycle internal instruction issue.

If an F86 P-op will not be issued due to one of the reasons listed above, the PC must be restored back to its previous value and re-circulated back to the alignment stage. In the a) case, the restoration operation requires two cycles instead of the usual single cycle. Instruction length information is obtained too late to control the enable on the BPC output latch, and the instruction buffer contents must be restored on the next cycle from the BPC.

If DEC detected an exception (instruction length too long or invalid LOCK prefix usage) or the Opcode Mask Register was enabled, a special F86 P-op sequence would be assembled in this stage for subsequent issue to AP, DEU and IEU for exception processing.

Issue.Iss1.1/Iss2.1

This stage transmits the first half of the F86 P-op to the various functional units via ILen__2 and PopBus__2. It contains the necessary information for the functional units to begin processing.

Issue.Iss1.2/Iss2.2

This stage transmits the second half of the F86 P-op to the various functional units via ILen__1 and PopBus__1. This stage normally contains immediate values associated with the x86 instruction.

III.A.2. DEC.TermPipe—DEC Termination Processing and Response Pipeline

The DEC Term pipeline is responsible for tracking the internal F86 P-ops from the time of issue through the time of retirement. If all the p-ops associated with an x86 instruction are processed by all functional units without any errors detected (all normal terminations), then all the F86 P-ops for the x86 instruction are simultaneously retired. If any of the functional units detect any faults on any of the F86 P-ops (faulting abnormal terminations), then all of the F86 P-ops associated with the x86 instruction are aborted and an exception processing of F86 P-ops is issued. Similarly, if any unit detects a trapping exception, then that unit signals this on the last internal F86 P-op for the x86 instruction, following internal F86 P-ops corresponding to the next x86 instruction are aborted, and an exception processing sequence is issued. A trapping style response mechanism is used to respond to mis-predicted control transfer situations (direction, address, or store into instruction stream) and string iteration stop.

This tracking mechanism is thus responsible for overall F86 control with respect to the relationship between x86 instructions and internal F86 P-ops.

An internal F86 P-op is considered "outstanding" from the time it is issued up until the time it is retired or aborted. It is considered "fully terminated" as soon as it is terminated by all functional units. Since F86 P-ops are retired or aborted in groups (normally associated with x86 instruction boundaries) an F86 P-op may be fully terminated but still remain outstanding.

The Term pipeline also provides resource control for the hardware associated with all F86 p-ops, with special limitations for transfer controls (two simultaneously issued and not fully terminated), segment register modifications (two outstanding), and some serialization cases (the transmission of the B, D, and HF bits from AP, for example).

These functions are accomplished using an input capture latch followed by four stages, to be described next.

FIG. 20 shows the DEC.Term pipeline structure and FIGS. 21A–21C show the pipeline timing diagram.

Term.Ph1

This input latch captures the first portion of the terminations sent from pipelines within AP and IEU, and all of the termination information from pipelines within DEIP and NP. This information is passed to the next stage without further processing.

Term.Term1

This stage captures the remaining termination information from pipelines within AP and IEU, combining it with the information passed from the previous stage. Termination information (normal and abnormal) is stored in an array indexed by the issue tag for the corresponding F86 P-op. A block of logic associated with each F86 P-op combines the terminations received for the F86P-op and when all the units that are required to process the F86 P-op have responded, marks the F86 P-op fully terminated. This is performed in parallel for all outstanding F86 P-ops. Certain types of abnormal terminations indicate some processing will never occur and thus no expected termination will be received. In these cases, the tracking logic effectively provides the missing termination signals for the functional unit. An example is an address fault preventing the memory read, in turn preventing IEU from terminating.

After completing the computation indicating which F86 P-op are still outstanding or not fully terminated, resource limitations, such as the number of transfer controls not fully terminated, or two segment register modifications are outstanding, are computed. This information is passed to other pipelines for resource usage control.

The Term1 stage is also the beginning of the Term pipeline processing when an internal F86 P-op is issued. The logic associated with tracking the F86 P-op is initialized to indicate the F86 P-op is outstanding and is not fully terminated. A record is made of which functional units are required to process the F86 P-op. Other specific information about the F86 P-op is also stored. For example, this may indicate information including whether the P-op is a branch or a segment register modifcation.

Term.Term2

The Term2 stage receives the per F86 P-op full termination results and abort group boundary information from the Term1 stage. The Term2 stage then propagates, in parallel, this information from the youngest to the oldest F86P-op within each abort group to determine which abort groups are fully terminated. This is followed by a propagation from oldest to youngest abort group. Any abort group which is itself fully terminated and for which all older abort groups are also fully terminated, is retired.

In parallel with this retirement propagation process, the stored termination for each F86 P-op is examined to determine if an abort response is required. This is done in parallel for all outstanding F86 P-ops. This result is passed to the next stage, and an early indication of a pending abort cycle, without specific information determining the type or reason for the abort, is also passed to other pipelines.

Term.Term3

Normal retirement information is passed from the Term2 stage to the Term4 stage via the Term3 stage.

The oldest, if any, F86 P-op requiring an abort (from Term2) is selected for abort processing. The stored information associated with the F86 P-op is read out in order to determine the type of abort and any special processing (control of the BPC or the Stream pipeline, for example) which may be also needed. The resultant information is sent to other pipelines to begin the required abort processing.

Term.Term4

The Term3 stage normal retirement information is passed to other pipelines via the TagStat_1 connection.

An abort is also signalled via an abort cycle on the TagStat_1 bus, after generation of the specific abort type and tag based on Term3 stage information.

III.A.3. DEC.IFetchPipe—DEC x86 Macro Instruction Fetch Pipeline

The DEC instruction fetch pipeline is responsible for fetching x86 instruction bytes for all outstanding streams from the memory system via MCS, passing this information to the Issue pipeline (as required) and storing the fetched data in the BPC Branch Target Cache (BTC) subsection.

The goal of the DEC IFetch pipeline is to always have prefetched bytes available for the Issue pipeline, never allowing the machine to run out of bytes to decode. This goal is generally achieved. A new stream is created whenever a transfer control is issued (the target stream associated with the branch). Up to two transfer controls may be active concurrently, corresponding to three streams: the originating stream of the first transfer control, the target stream for the second transfer control, and the target stream for the transfer control branch. The IFetch pipeline is replicated for each stream, allowing independent fetching down the active streams. This improves performance by fully exploting the high bandwidth connection to the level one cache, generally collecting x86 instruction bytes for the current and alternate streams before they are required by the Issue pipeline.

The stream containing the x86 instruction bytes for the stream currently being decoded for F86 P-op issue is the current stream. The IFetch pipeline associated with the current stream passes fetched bytes to the instruction buffer in addition to writing the data in the BTC. Only fetches for the current stream are allowed to fill data from L2 to L1 or from main memory to L2, as described in the MCS section. The other two streams, however, are still actively prefetched from L1 into the BTC. This allows a mis-predicted direction abort to restore the correct instruction buffer contents from the data stored in the BTC and immediately resume decode and issue.

Each stream is restricted to prefetching a maximum of three octets coinciding with the size of a BTC line and the size of the instruction buffer. These 24 bytes can contain from one to 24 complete x86 instructions.

The PADR Bus communicates physical addresses amongst DEC, AP, and MCS. The implied address for an instruction fetch request (ISAR) is a physical address. All fetch pipeline address operations are based on physical addresses.

The instruction fetch pipeline makes requests for sequential octets from MCS; these requests reference an implied physical address previously transferred via an ISAR update on the PADR bus. Each request is processed serially by MCS, and results in a termination sent to the DEC IFetch pipeline in a lockstep fashion: a first request is captured by MCS in Ph1, in the next Ph1 DEC sends out a second request (before receiving the termination for the first request), in the following Ph1 MCS sends a termination for the first request, and DEC includes this information in formulating a third request sent in that Ph1. This is shown in the pipeline timing diagram "DEC.IFetch". The termination indicates MCS is busy (unable to return data), data returning, end of page (no data), or an address cycle on NexBus (with or without data).

Figure 15:
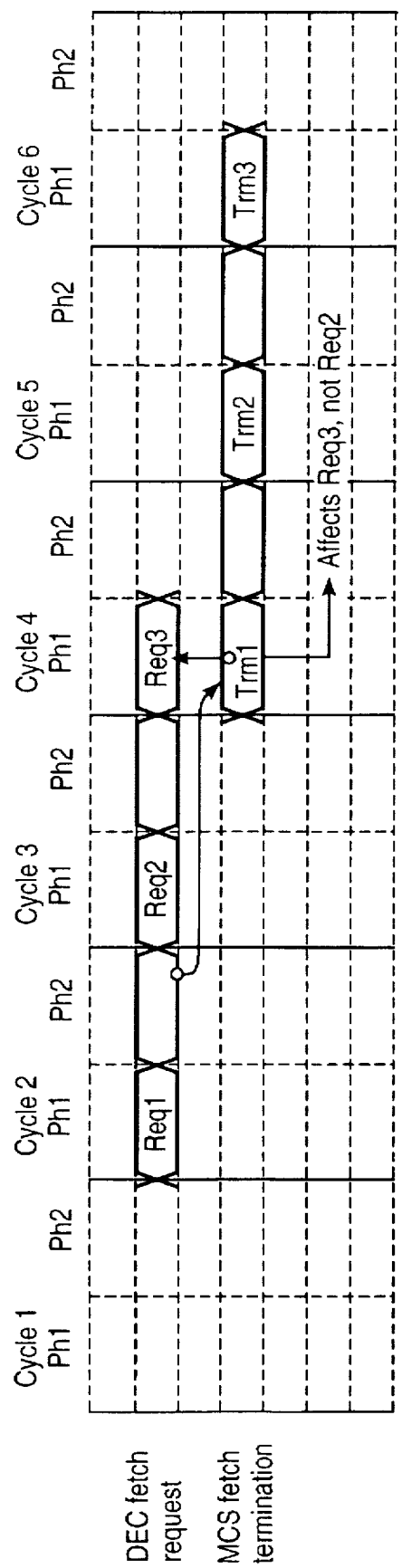
FIG. 15 is a timing diagram of the DEC's IFetch pipeline.

FIG. 14 shows the DEC.IFetch pipeline structure and FIG. 15 shows the pipeline timing diagram. As shown, there are seven stages for the IFetch pipeline.

IFetch.Req

The beginning of the IFetch pipeline pre-computes, in parallel, four possible fetch requests to send to MCS using the current IFetch pipeline state, and assuming that these four scenarios possible in the next stage. The four possible requests are as follows:

(1) Data returns from MCS concurrent with the Issue pipeline consuming an octet, the net result is the number of prefetch octets in the stream is unchanged;

(2) Data returns without concurrent consumption of an octet, the net result is one more octet in the stream;

(3) No data returns concurrent with consumption, the net result is one less octet in the stream; and (4) No data returns and there is no consumption, this leaves the number of octets unchanged.

Since the MCS fetch pipeline requires a two cycles to respond to a request with a termination, there is a single outstanding request which the DEC fetch pipeline take into account when performing the pre-computations—this is an addition to the assumption of data returning mentioned above. This pre-computation allows the next stage to quickly produce the next request with a minimum delay from an MCS termination and consumption information just received.

IFetch.NxReq

The IFetch.NxReq stage receives the pre-computed requests from the previous stage and applies them to multiplexors with select lines driven by the MCS termination and consumption information just received, sending the next request to MCS. Pending request information and termination information are passed to the next stage. When a new address is sent to an ISAR on the PADR Bus the fetch pipeline resets the number of octets for the associated stream to zero. The PADRin pipeline provides the indication of the ISAR update.

IFetch.Delay1

This stage computes the number of valid octets available to the Issue pipeline based on the information from the previous stage. Accumulated termination and pending request information is passed to the next stage.

IFetch.Delay2

This stage delays the information from the previous stage, and passes it to the next stage.

IFetch.Delay3

This stage delays the information from the previous stage, and passes it to the next stage. The Delay2 and Delay3 stages match the request receipt to data production delay in the MCS instruction fetch pipeline.

IFetch.BTC_SetUp

This stage uses the information from the previous stage to set up the BTC for the write operation for the returning instruction fetch data. The same information is used to write the instruction buffer when the returning data corresponds to the current stream.

III.A.4. DEC.PADRinPipe—DEC PADR Bus Input Pipeline

The PADR Bus input pipe accumulates the four stages of the PADR Bus transfer and passes it to the other pipelines in DEC. This requires one pipeline stage per bus phase. These four pipeline stages are shown in the DEC.PADRin pipeline timing diagram, described below.

FIG. 10 shows the DEC.PADRin pipeline structure and FIG. 11 shows the pipeline timing diagram.

PADRin.Arb

This stage latches the winner of the PADR Bus arbitration, passing this to the next stage (later processing of the transaction requires this information).

PADRin.ALo

This stage latches the operation code for the transaction (memory write, ISAR update, or cache line replacement), along with the lower 12 bits of the address and passes this to the next stage. The ISAR update information is also passed to the fetch pipeline.

PADRin.AHi

This stage latches the upper 20 bits of the physical address and passes the entire physical address to the Issue pipeline. where it is interpreted as a target address for a branch. The entire 32 bit physical address and operation code are passed to the final stage.

PADRin.Val

This stage accepts the validation of the transfer on the PADR Bus. The entire transaction is used to determine, using an associative look up in the BPC Target Address Cache (TAC), if any active x86 instruction streams are possibly modified by a PADR Bus write transaction. This information is then passed to the Term pipeline. The occurrence of a valid ISAR update is also passed to the page cross pipeline to indicate completion of processing of the Page Cross F86 p-op.

III.A.5. DEC.PADRoutPipe—DEC PADR Bus Output Queue Pipeline

The DEC PADR Bus output pipeline queues DEC ISAR updates associated with processing a branch issue or resolution, arbitrates for the PADR Bus, and emits the transaction when DEC wins the arbitration. The delay of information required to interface to the PADR bus is combined with the queue function to reduce logic. This requires five pipeline stages.

The queue input stage always accepts a request for an update. A later stage in the PADRout pipeline prevents generation of further ISAR update requests when the queue is full.

FIG. 12 shows the DEC.PADRout pipeline structure and FIG. 13 shows the pipeline timing diagram.

PADRout.PADRQ

The first stage of the pipeline accepts a request for an ISAR update PADR Bus transaction from the Issue pipeline. As previously described, the PADRout.PADRQ pipeline always accepts an update request. If the next stage (PADRout.Arb) already has a first queued update awaiting transfer onto the PADR Bus, then the PADRout.PADRQ stage retains a second queued update until the first has been sent.

PADRout.Arb

The PADRout.Arb stage accepts an ISAR update request from the PADRout.PADRQ when the Arb stage is empty. The request in the Arb stage remains there until DEC successfully wins arbitration for the PADR Bus. Then the queued update proceeds down the remainder of the PADRout pipeline, and the Arb stage accepts a queued request from the previous stage (if present). The Arb stage tracks when the PADRQ and Arb stages are both full, signalling a resource stall back to the Issue pipeline to prevent further ISAR update requests until there is space in the queue. The Arb stage signals to the page cross pipeline an indication of the presence of any queued ISAR update requests; the page cross pipeline waits to request issue of a page cross F86 p-op until all queued ISAR updates are completed. This mechanism allows the page cross pipeline to detect completion of the Page Cross F86 p-op by simply checking for any ISAR update transaction on the PADR Bus.

PADRout.ALo

This stage sends the operation code and least significant 12 bits of the physical address from the previous stage and transmits them on the PADR Bus. The remaining upper 20 bits of physical address are passed to the next stage.

PADRout.AHi

This stage sends the upper 20 physical address bits from the previous stage to the PADR Bus. The next stage receives an indication that a transfer is in progress.

PADRout.Val

The final stage in the PADRout pipeline asserts the valid bit during the last stage of the PADR Bus ISAR update transaction. Updates from DEC are always valid.

III.A.6. DEC.StreamPipe—DEC Stream Information and Resource Management Pipeline The DEC Stream pipeline has several responsibilities. These will be described following a short description of branches and streams as they are implemented in F86.

A branch, also known as a transfer control, requires an x86 CPU to begin execution at some address other than the one sequentially following the instruction of the branch. (A branch may also, as a degenerate case, force execution to the instruction contiguously after the branch). Each branch thus requires target bytes to be fetched from the target address; this window of sequential fetching is called a stream. When only sequential instructions are executing in F86, all the instructions in F86 are in a single such stream. When a branch is encountered, a new stream is allocated to the target of the branch. This stream remains active as long as the branch is not fully terminated. It also remains active as long as execution could possibly return to that stream; i.e. a branch out of the stream has been issued, possibly predicted taken, but is not yet resolved. The F86 hardware supports two active branches, resulting in a total of three active streams. A conditional branch may be issued with an incorrect predicted direction, so fetching continues (at a lower priority) for the originating stream of the branch (the current stream at the time the branch was issued) as long as the branch is not resolved. Thus in the general case all three streams are candidates for fetching.

The three available branch target streams are specified by a two bit stream identifier, called the logical stream ID. All information concerning branch target streams and the associated instruction fetch streams is transmitted, received, referenced, and stored using this stream ID. A branch issue is accompanied by a target stream ID, and all ISAR updates contain a stream ID. When there are two branches issued but not yet fully terminated (i.e., they are unresolved) there are three outstanding active streams. When another transfer control is encountered by the Issue pipeline, sufficient storage for a fourth, next to be active stream, must be available, since the Issue pipeline is not able to stall quickly enough to regenerate the information. The solution is to use four streams in the BPC, called physical streams, specified by a two bit physical stream ID. At any given time there is a one two one correspondence between a given logical stream and an associated physical stream. The unused physical stream is marked as available for use by the Issue pipeline. The DEC Stream pipeline is responsible for tracking the mapping of the three logical stream identifiers to unresolved branches in the CPU pipeline (along with the predicted directions for the branches) and the current decode stream, including the predicted directions for the branches. The Stream pipeline also tracks the four physical streams, and their correspondence to the logical streams. This information is used to guide the three individual instruction fetch pipelines, marking one of them as the current stream (to allow cache miss processing), and to select the highest priority request from among the three pipelines.

Figure 16:
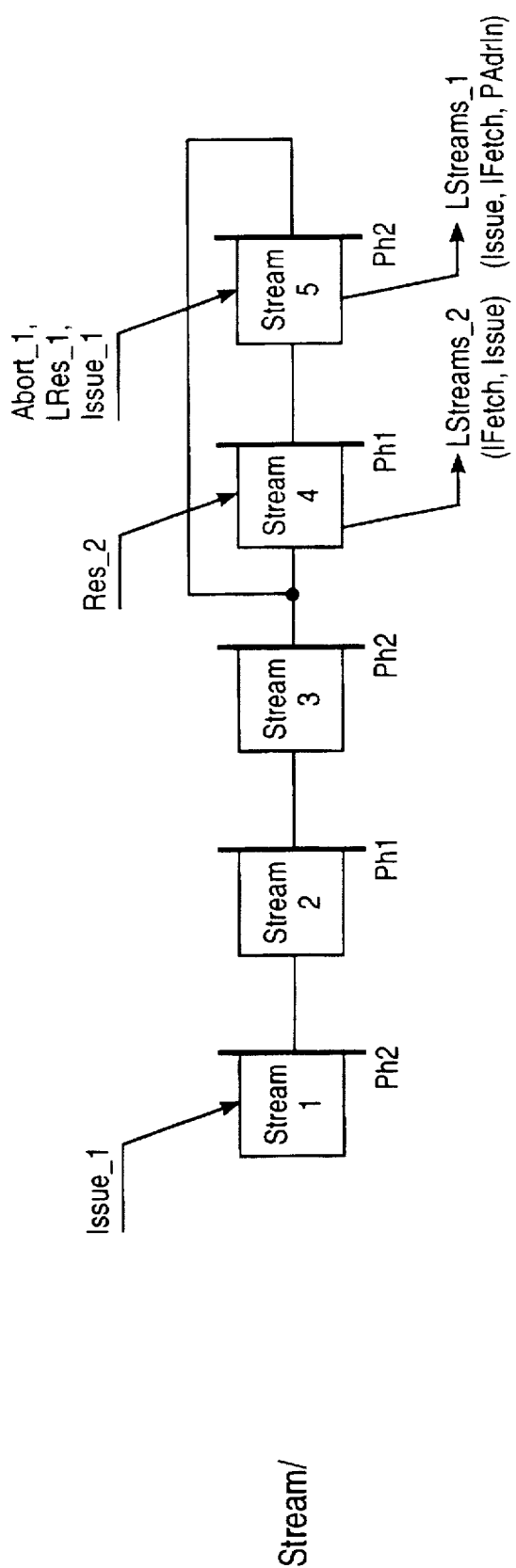
FIG. 16 is a structural diagram of the DEC's Stream pipeline.
Figures 17A, 17B:
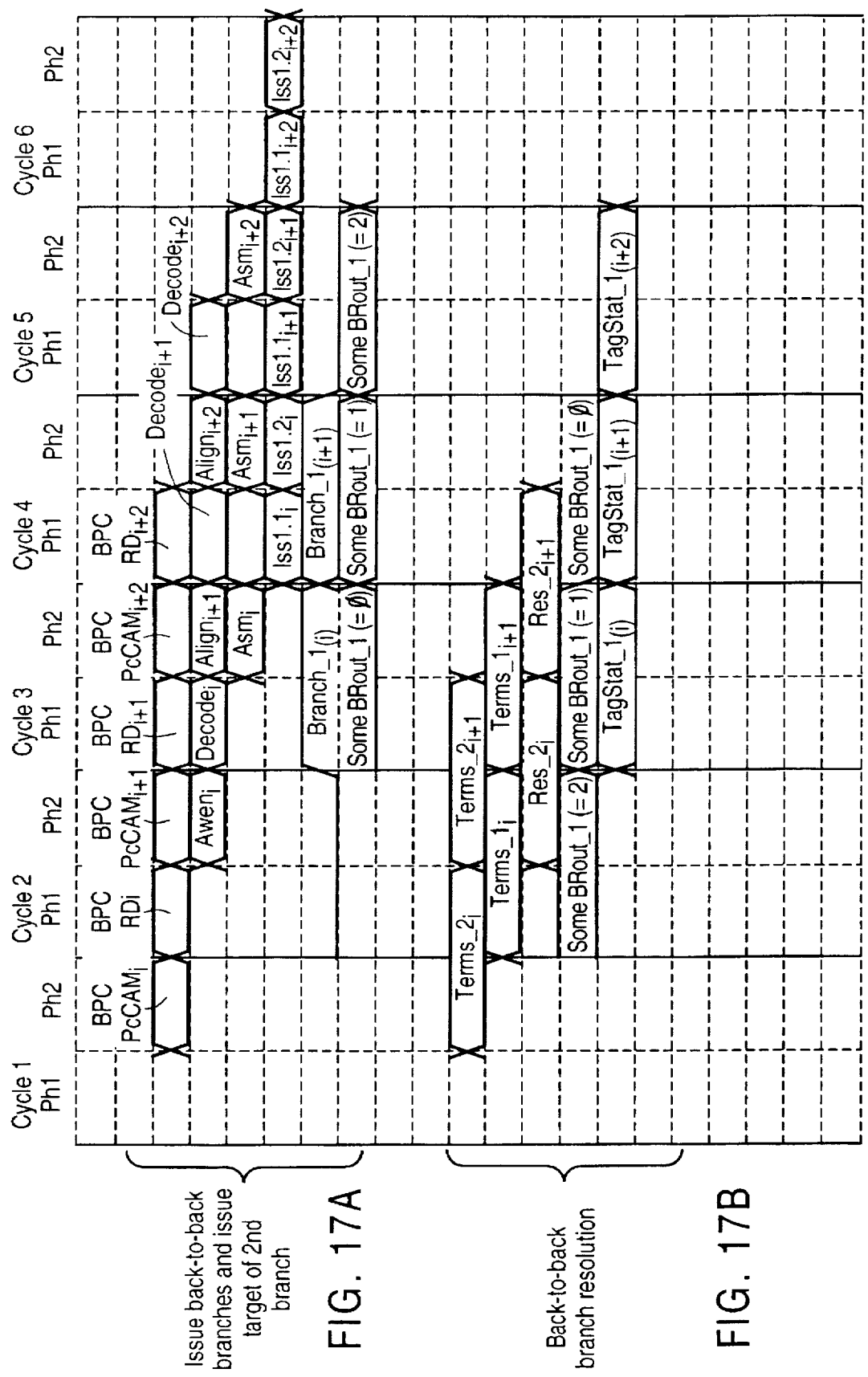
FIGS. 17A and 17B are timing diagrams of the DEC's Stream pipeline.

FIG. 16 shows the DEC.Stream pipeline structure and FIGS. 17A–17B show the pipeline timing diagram.

Stream.Stream1

The earliest stage in the Stream pipeline records the issue of a branch and the corresponding predicted direction.

Stream.Stream2

The Stream2 stage passes the previous stage information to the next stage.

Stream.Stream3

The Stream3 stage passes the previous stage information to the next stage. The Stream2 and Stream3 delays assure pipeline stages Stream4 and Stream5 receive information early in the clock phase for branch resolution. This allows the timing of the resolution hardware to be minimized. Since the Stream2 and Stream3 stages are passing branch issue information forward to resolution, and issue and resolution are guaranteed to be seaparated by several clocks, this strategy does not impede architectural performance.

Stream.Stream4

The Stream4 and Stream5 stages perform the main function of the Stream pipeline: mapping stream IDs to unresolved branches. This information is stored in a three location stack; each location has a unique stream ID, initialized during the CPU reset sequence. The top of the stack is associated with the oldest unresolved branch. When no branches are unresolved the other two locations are unused. When one branch is unresolved then the middle entry is the younger of the two branches. Lastly, when two branches are unresolved then the youngest is associated with the bottom of the stack. At all times the stream stack contains a unique stream ID in each location.

When a branch is resolved without a mispredicted direction, all three locations in the stream stack shift upwards; the top of the stack (corresponding to the oldest stream) is replaced with the middle of the stack; the bottom of the stack moves to the middle, and the top of the stack moves to the bottom. When a branch is resolved with a mispredicted direction, the above mentioned shifting occurs in conjunction with an exchange of the contents of the locations in the stack corresponding to the target and originating streams for the resolved branch.

The above processing occurs in the Stream4 and Stream5 stages. In particular, the Stream4 stage combines the branch issue and predicted direction information passed from the beginning of the pipeline with resolution information from the Term pipeline (mispredicted direction, address, or store into x86 instruction stream). This allows the Stream pipeline to recognize the stream ID associated with the branch resolution and to adjust the mapping information accordingly. The mapping information is used to guide the prioritization of fetch requests (in the IFetch pipeline) among the three streams and supplies the stream ID for the next branch to issue. When there is an abnormal branch resolution the Stream4 stage supplies the appropriate stream ID to look up relevant information in the BPC and to identify any required ISAR update transaction. The current stream ID is supplied to the Issue pipeline to restore the instruction buffer from the BTC when there is a stall awaiting macro instruction fetch data for a partially fetched instruction. The Stream4 stage is also a feedback for the last stage in the pipeline.

In addition to the logical stream tracking, the Stream4 and Stream5 stages also track the physical address. This requires retaining the mapping between the logical and corresponding physical streams from transfer control issue throughout the life of a stream. A high speed block of logic precomputes the next available free physical stream for use in the Issue pipeline, guaranteeing this physical stream is unique.

Stream.Stream5

The issue information supplied to the first stage of the pipeline is simultaneously applied to this last stage of the pipeline; this allows for immediate adjustment of the stream fetch priorities and tracking of stream ID mapping throughout the life of the branch. This issue information, along with abort information from the Term pipeline (closely related to resolution information received by the previous stage and passed to this stage) marks aborted streams as inactive in addition to adjusting the mapping as previously described.

The Term pipeline also supplies stream ID restoration information for exception processing abort cycles.

The Stream.Stream5 stage identifies outstanding physical streams to the PADRin pipeline for use in recognizing store into instruction stream cases. Stream5 information is also used in guiding the IFetch pipeline, since it provides information one stage earlier than Stream4 with respect to branch issue.

III.A.7. DEC.PageXPipe—DEC Sequential Instruction Fetch Page Cross Pipeline

Sequential x86 macro instruction fetching occurs without any address translation until the end of a page is reached. The implied address is incremented each time data is successfully returned. When the IFetch pipeline attempts to fetch across the page boundary, MCS returns a termination indicating end of page (EOP). MCS continues to return EOP for any requests down this stream until an ISAR update is made to that stream.

Independently the Issue pipeline completes decoding and issuing F86 p-ops for the macro instructions fully contained within the page. Instruction issue then stalls awaiting further x86 instruction bytes.

When there is only a single outstanding stream, indicating all branches are resolved, and the PADR output queue is empty, indicating all branch related PADR transactions are complete, a Page Cross F86 p-op is issued. The AP unit pipeline processes this Page Cross F86 p-op, providing a physical translation for the virtual address of the next x86 instruction byte. This address is provided as an ISAR update transaction on the PADR Bus.

MCS uses this update transaction and returns data for this stream when it is requested by DEC. The subsequently returned x86 instruction data enables DEC to continue issuing beginning with the instruction spanning the page boundary. DEC also uses the page cross ISAR transaction to update an internal current page latch representing the upper bits of the instruction decode PC.

The same mechanism is used when an x86 instruction boundary coincides with a page boundary.

The page cross pipeline implementing the control for this mechanism consists of two stages, described below.

FIG. 22 shows the DEC.PageX pipeline structure and FIG. 23A–23B show the pipeline timing diagram.

PageX.EOP_Detect

The first stage of the page cross pipeline receives the information enabling the issue of the page cross packet. This includes an indication that an EOP termination has been received for the current stream, whether or not there are any unresolved branches, and if there are any updates in the PADR output queue. When the current fetch stream is at the end of the page, there are no unresolved branches, and the PADR queue is empty, then the EOP_Detect stage passes a page cross request to the next stage in the pipe. An abort of any kind resets the pipeline to begin the sequence again.

PageX.PageX_Req

The last stage of the pipe signals the page cross indication to the Issue stage. In response a special single instruction vector sequence (page cross) is issued. When the ISAR update for the page cross is received (signalled by the PADRin pipeline) the pipe resets to begin the sequence again. This last stage also feeds back to the first stage.

III.B Address Preparation Unit (AP)

AP is one of the independent functional units in the processor. Its prime responsibility is to compute the addresses of instructions and operands. It also maintains a copy of the physical general registers, segment registers and descriptors, and various control and status registers. In simple cases, AP is controlled by gate level "Hardware Decode" of p-ops specified by DEC. When processing hardware decode p-ops, each pipeline stage uses the requisite fields of the p-op and translates them directly into data path control signals. AP usually pipelines one Hardware Decode p-op each cycle.

In more complicated cases, a p-op from DEC causes AP to invoke a microcode engine which has more direct control of the internal AP hardware. These cases typically manipulate various internal storage locations and may perform multiple memory address calculations before completing the operation required by DEC. Most of the protected mode x86 instructions that load segment descriptors and/or manipulate the mode of the machine are implemented in AP microcode, with assist from DEC in assigning tasks to other functional units as needed.

As a final level of control, either the hardware decode or the microcode engines may attempt a paging translation using the TLB which results in a TLB miss. In order to walk the page tables in memory to find the correct translation, multiple memory references must be made. This is treated like a pipeline "interrupt" within AP, and a dedicated "TLB State Machine" takes over control of the latter stages of the Address Generation pipeline and performs the page table walk. Once complete, the TLB State Machine returns control to the interrupted hardware decode or microcode control.

While some hardware is controlled by only one of these three mechanisms, much of AP is controlled by all three mechanisms at one time or another. In order to more clearly describe the operation of AP, the operation of the internal pipelines will be described from the point of view of hardware decode operations. The TLB State Machine will be discussed.

AP is composed of five independent pipelines:

A P-Op Issue pipeline receives operations from DEC and queues them up for execution by AP.

An Address Generation pipeline reads operations out of the operation queue and performs any specified address calculations and address translations, resulting with an address being sent to MCS and/or DEC on PADR bus and with a termination being sent back to DEC.

A Memory Read pipeline accepts operands from memory (MCS) and places them into the general register file or internal latches.

An IEU Update pipeline accepts register updates from IEU and places them into the general register file.

A Retirement pipeline updates certain internal state in response to retirement of an operation by DEC.

These pipelines communicate operand and address values between each other via a General Purpose Register File and its associated short circuit paths and interlock hardware. The register file central resource will be discussed first, followed by a description of the operation of each pipeline stage in each of the five AP pipelines.

Figure 24:
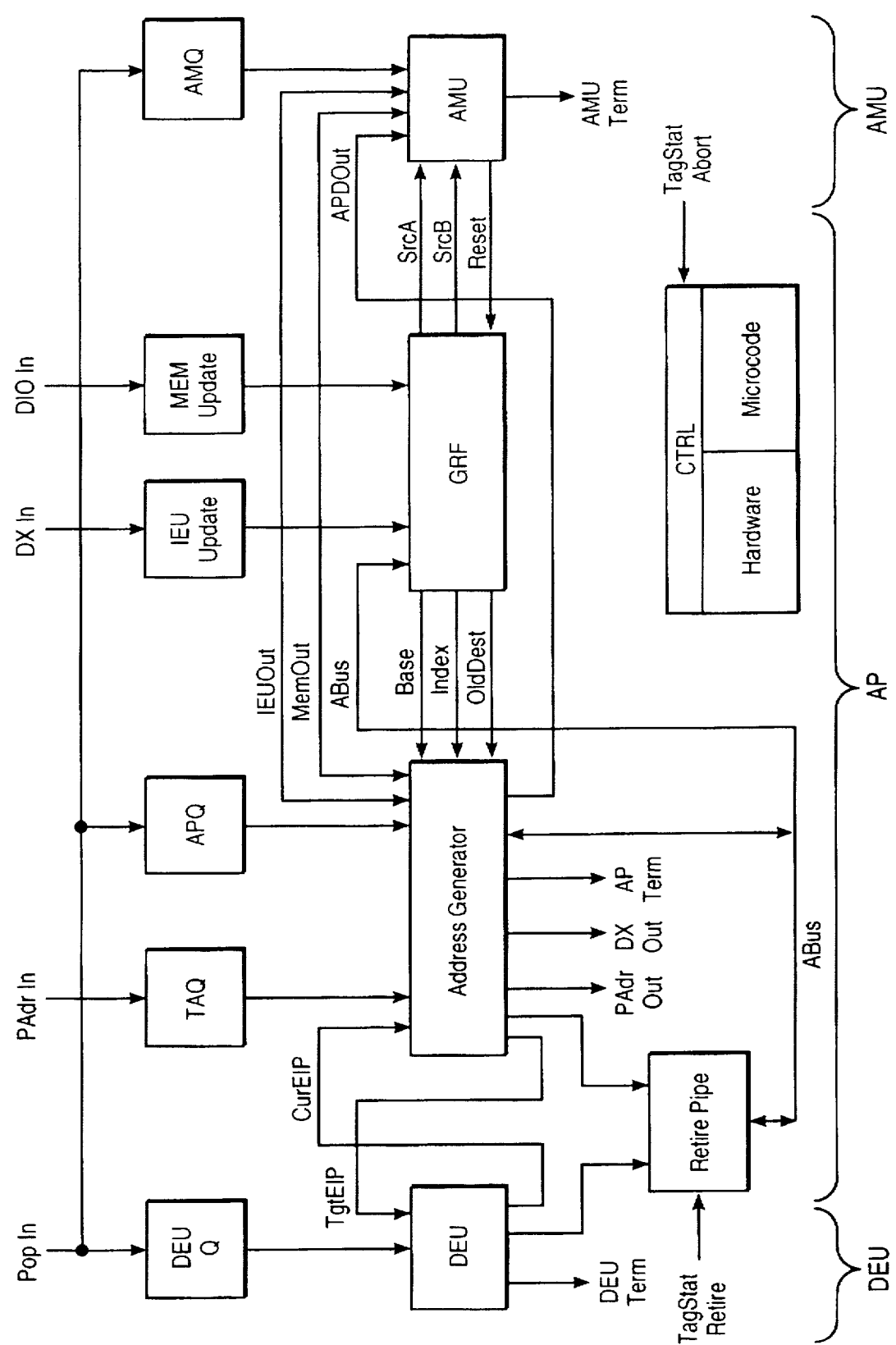
FIG. 24 is a block diagram of the pipelines of the AP, the DEU, and the AMU.

FIG. 24 shows the major pipelines and their significant connections, as well as the central resources shared by pipelines.

III.B.1 AP General Purpose Register File (GRF)

Figure 25:
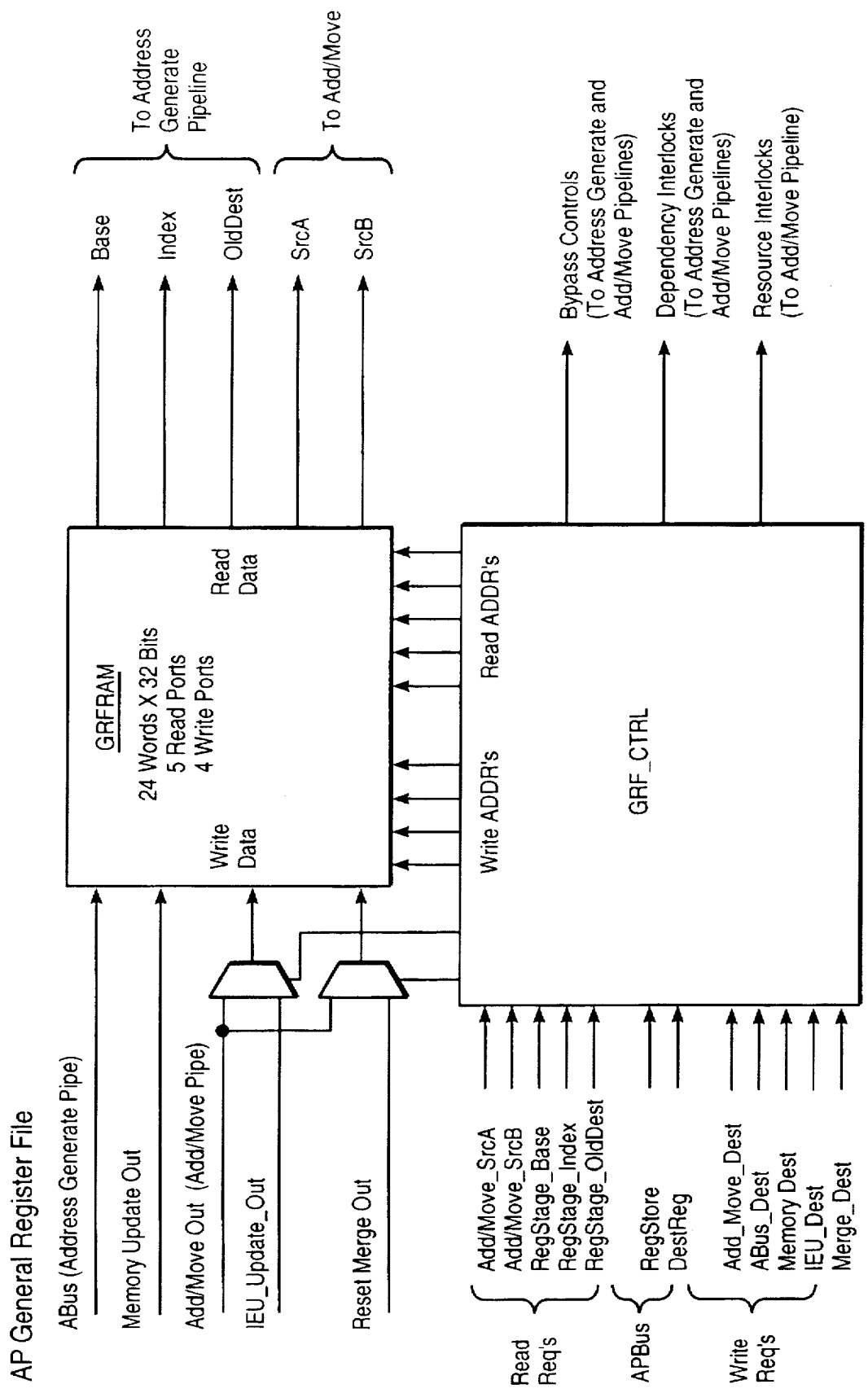
FIG. 25 is a block diagram of the general register file (GRF) in the AP.

FIG. 25 shows a block diagram of the General Purpose Register File (GRF) in AP.

The register file is a 24 word by 32 bit storage array which contains one register for each physical register that can be specified by the virtual-to-physical register remapping process, plus a single temporary which is not remapped. The register file provides multiple read and write ports to satisfy the bandwidth requirements of the various pipeline stages operating independently within AP. The Add/Move Unit (AMU) pipeline is also given access to read and write ports in this register file.

The Integer Execution Unit (IEU) pipeline contains a duplicate copy of the General Purpose Register File. This allows more read ports to be provided than might be reasonable for a single copy of the register file and, perhaps more importantly, allows IEU to reside at a physically remote location (relative to AP) on the microprocessor die. Some amount of the read/write bandwidth of each register file is used to keep the two copies coherent.

The General Register File has 5 read ports. Two read ports are dedicated to providing SourceA and SourceB Register values to the Add/Move Unit pipeline. Use of these values will be described in the Add/Move unit. Three read ports are dedicated to providing Base, Index, and OldDest Register values to the Register Stage of the Address Generate pipeline.

The General Register File has 4 write ports. One write port is dedicated to receiving a result register value from the Address Generate pipeline. One write port is dedicated to receiving a result register value from the Memory Read pipeline. One write port generally receives an "OldDest" update from the Address Generate pipeline, to be described later. When no OldDest register needs to be written by the Address Generation pipeline, this write port can be used by the Add/Move unit pipeline to store a result register value. One write port generally receives a result register value from the IEU Update pipeline. When no register needs to be written by the IEU Update pipeline, this write port can be used by the Add/Move unit to store a result register value.

If in a particular cycle the Address Generation pipeline and IEU Update pipeline both produce result register values, and the Add/Move pipeline wishes to provide a result register value, the General Register File control block will signal a Resource Interlock to the Add/Move pipeline.

The General Register File includes a control block (GRF_CTRL) which receives requests from each of the pipeline stages that require reads and writes. Included with each request is the physical register identifier provided by DEC at the time the p-op was issued. GRF_CTRL maintains a valid bit for each physical register. When a p-op is received by APQ, the RegStore and DestReg fields are passed to GRF_CTRL. If RegStore is asserted, the valid bit for the register indicated by DestReg is cleared. Any attempt by a pipeline stage to read a register whose valid bit is clear will result in GRF_CTRL signaling a Dependency Interlock to the requesting pipeline stage.

When a pipeline stage requests a write, the register identifier provided by the requesting stage is used to set the associated valid bit, as well as to select the register to be written. In addition, the register identifier is typically used for one or more bypass detections.

GRF_CTRL implements, in part, a register identifier equality comparator between each register file write port and register file read port that support bypass. The actual bypass of the 32 bit register value is performed in the pipeline stage which requested the data. GRF_CTRL indicates which bypass port should be activated by that pipeline stage. The specific bypass ports supported are described as part of the description of the destination pipeline stage.

III.B.2 AP P-Op Issue Pipeline

AP receives p-ops to be performed from DEC via the PopBus. These p-ops are ideally presented directly to the address generation pipeline as they are recieved by AP. In order to support dynamic scheduling, however, AP includes a queue (APQ) which can enqueue operations received from DEC. The APQ allows AP to defer execution when necessary without stalling the pipelines in DEC and/or those of other execution units.

DEC issues the various fields of the PopBus across three pipeline phases. On the first phase (PopBusA), DEC gives an early indication of the operation AP will be required to perform. On the second phase (PopBusB), DEC sends enough information to allow AP to determine the exact operation required, and to locate the operands that might be required. On the third phase (PopBusC), DEC sends the remaining (less time-critical) fields. The PopBusC issue of one p-op is typically overlapped with the PopBusA issue of the next p-op, resulting in one p-op being issued every two phases.

Figure 26:
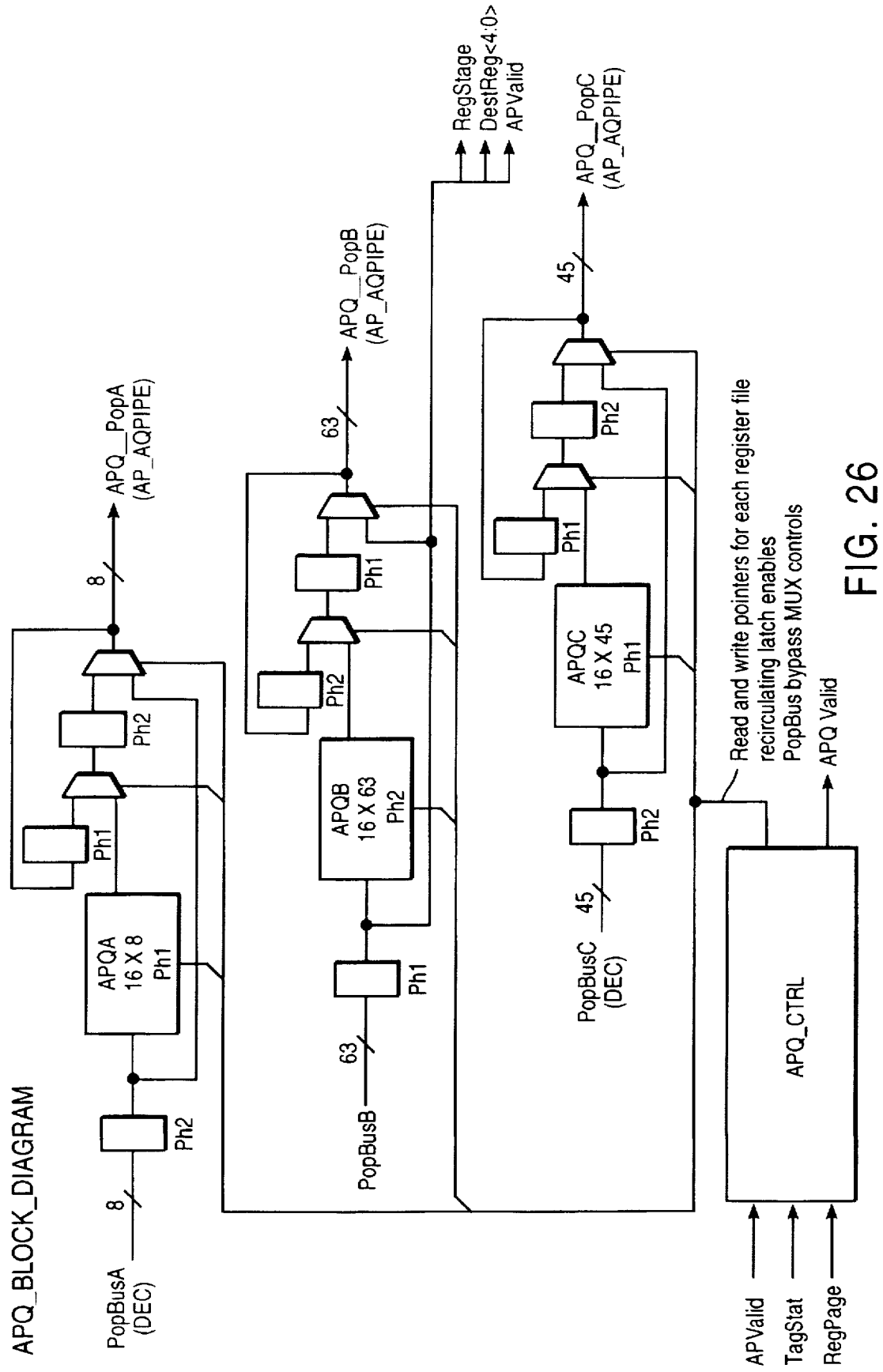
FIG. 26 is a block diagram of the AP's APQ.

The APQ consists of a control block (APQ_CTRL), and three separate data path blocks (APQA, APQB, and APQC). See FIG. 26. One data path block is associated with each of the three phases of the PopBus. Each data path block contains a 16 word register file whose width matches that of the fields transmitted during the associated PopBus phase, along with latches and multiplexors for selecting a p-op to be presented to the Address Generation pipeline.

One of the PopBusB signals is called APvalid. When asserted, this signal indicates that the p-op currently being issued requires processing by AP. APQ_CTRL maintains a write pointer into the 16 entry register files. Each time an APvalid p-op is received, it is written into the queue location pointed at by the write pointer, and the write pointer is incremented (module 4 bits) to point at the next entry. Since the p-op is received across three phases, three phase-delayed write pointers are provided by APQ_CTRL (APQ_WRPTRA, APQ_WRPTRB, APQ_WRPTRC).

A mechanism in DEC insures that before performing an abort of outstanding p-ops, AP will have completed all p-ops which are not to be aborted. This means that after the abort, AP will have no remaining enqueued p-ops. On an abort cycle, APQ _CTRL forces the read and write pointers to point at a single, common location.

After the PopBusA fields for a p-op are transferred by DEC, those fields are written into the selected location in the APQA register file in the PopBusB phase. After the PopBusB fields for a p-op are transferred, they are written into the APQB register file during the PopBusC phase. Also in this phase, if the APvalid bit on PopBusB is asserted-, the APQ_WRPTRA write pointer will be incremented. One phase after the PopBusC fields for a p-op are transferred they are written into the APQC register file. Also in this phase, the value of APQ_WRPTRA is transferred to APQ_WRPTRB. One phase later, the value of APQ_WRPTRB is transferred to APQ_WRPTRC.

Two of the PopBusB fields are RegStore and DestReg |4:0|. These two fields are examined in the PopBusC phase. If RegStore is asserted, the valid bit for the location in the General Register File specified by DestReg[4:0] is cleared, indicating that the result value has not yet been written to this register. At some later time, one of the AP pipelines will provide a result value and write it into the appropriate register in the General Register File. At that time, the valid bit for that register will be set.

Figure 27A:
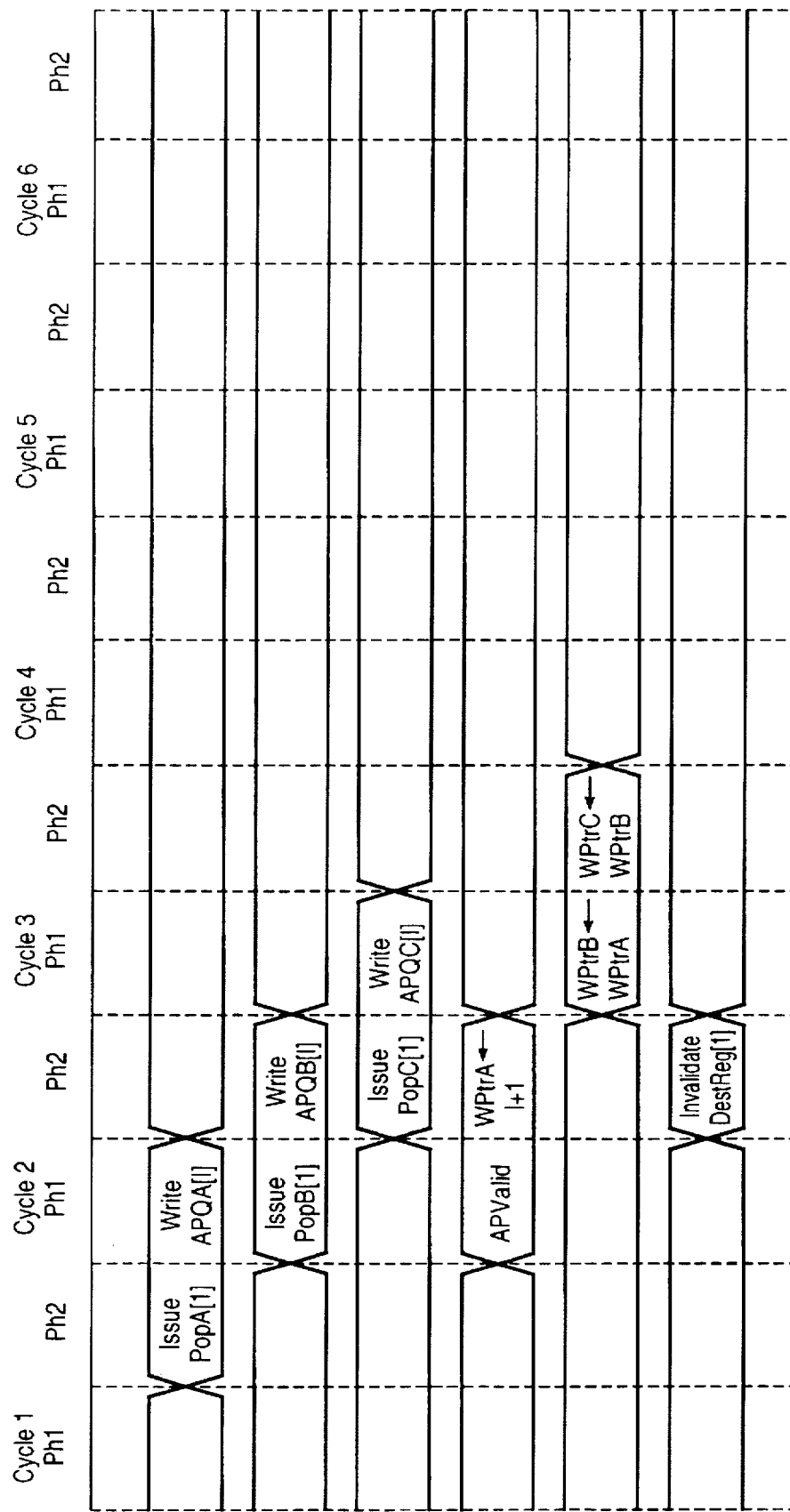
FIGS. 27A and 27B are timing diagrams of the AP's P-op Issue pipeline.

FIG. 27A is a pipeline timing diagram which shows a single p-op arriving on the PopBus across three adjacent phases. It shows various fields of the p-op being written into the three APQ register files a phase after each portion arrives, shows the APvalid bit being asserted, and shows the write pointers being incremented.

Figure 27B:
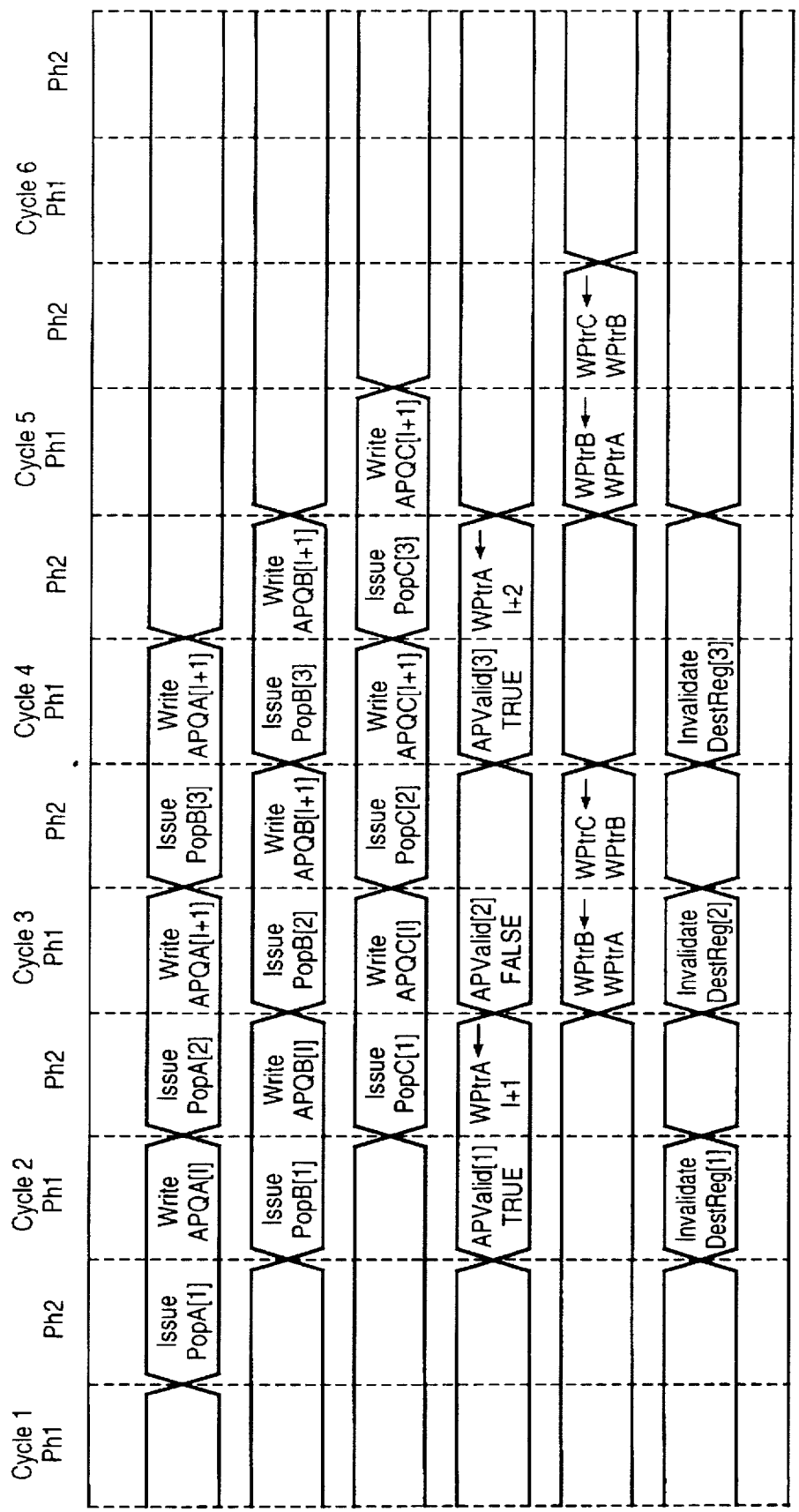

FIG. 27B is a pipeline timing diagram which shows three successive p-ops (subscripted |1|, |2|, and |3|) arriving on PopBus. Only the first and third p-ops have APvalid asserted, so the write pointer only advance for those two p-ops. The APQ register files are written for all three p-ops, but since the write pointer is not incremented, the second p-op is not actually validated. Independent of whether the operation is enqueued in APQ, the RegStore and DestReg fields are sent to the general register file and the appropriate register valid bits are cleared.

III.B.3 AP Address Generation Pipeline

The Address Generation pipeline is the main pipeline of the AP unit. It is responsible for performing various address related calculations, as well as performing updates to various registers and storage arrays located in AP.

III.B.3.a Address Generation in the X86 Architecture

The process of generating addresses can be split into three basic conceptual steps.

In the first step, various general purpose register values and displacement values are added together to form an "Effective Address". The x86 architecture provides addressing modes that combine base registers, index registers (possibly scaled by an operand size) and various sized displacements. Any combination of one or more of these components can be specified, and the result is termed the "Effective Address".

In the second step, the effective address can be adjusted according to a "Base and Bounds" segmentation process. The segmentation process involves relocating the effective address by adding it to a "Segment Base" value, and comparing the effective address against a "Segment Limit" value to prevent unrestricted access to operands in other segments. The resulting address is called an "Intermediate Address".

In the third step, the intermediate address is translated to a "Physical Address" via a two-level memory-resident lookup table. The process of translating an intermediate address to a physical address when paging is enabled is called "Paging".

The following is a conceptual description of the paging process defined by the x86 architecture.

The Paging process breaks the 32 bit intermediate and physical address spaces into collections of small, fixed sized blocks called "Pages". The size of a Page in the x86 architecture is 4096 bytes, and a Page is always aligned on a 4096 byte boundary. A Page in the intermediate address space is called a "Virtual" page. A Page in the physical address space is called "Physical Page". The base address of a Physical Page is called the Page Frame Address.

Paging involves using the intermediate address to access a two-level table structure which maps a Virtual Page to a Physical Page. The tables are stored in memory.

A first level table is called a Page Directory, and each of its entries is called a Page Directory Entry (PDE). The Page Directory is itself a 4096 byte block aligned on 4096 byte boundary, and may be thought of as occupying a Physical Page. Each PDE is four bytes in size and contains the base address of a Page Table (20bits), a Valid bit, an Accessed bit, several Protection bits, and several Attribute bits.

The base address of the currently active Page Directory is given by a dedicated register called CR3. Each separate task (or process) may have a unique Page Directory, allowing each task to have its own virtual to physical address mapping.

Each of the second level tables is called a Page Table, and each of its entries is called a Page Table Entry. The Page Table is also a 4096 byte block aligned on a 4096 byte boundary, and can be thought of as occupying a Physical Page. Each PTE is four bytes in size and contains the base address of a Physical Page (i.e. a 20 bit Page Frame Address), a Valid bit, an Accessed bit, a Dirty bit, several Protection bits, and several Attribute bits. The base address of a Page Table is given by a valid PDE.

If the Valid bit of a PDE is not asserted, then the remaining fields of the PDE are undefined, and no second level table is currently available for the requested intermediate address. Similarly, if the Valid bit of a PTE is not asserted, then the remaining fields of the PTE are undefined, and no physical Page Frame is currently available for the requested intermediate address. In either of these cases, the instruction that generated the address is aborted (faulted) and a Page Fault Exception is signaled to the operating system.

The Protection bits of the PDE are compared against the current privilege level of the processor and against the type of memory reference being made. The Protection bits of the PTE are similarly compared. If either of these checks results in a protection violation, the instruction that generated the address is aborted (faulted) and a Page Fault Exception is signaled.

The intermediate address is broken into three portions. Bits |31:22| are used as an index into the Page Directory. Bits |21:12| are used as an index into the Page Table. Bits |11:0| are used as the index into the selected Physical Page (the Page Frame), and are also called the Page Offset.

In addition, the operating system can disable the paging process by clearing a control register bit (i.e. CR0.PG). In this case the most significant 20 bits of the Intermediate Address become the Page Frame Address without translation.

In summary, the conceptual steps performed in translating an intermediate address when paging is enabled are as follows. The CR3 register is combined with bits |31:22| of the intermediate address and the selected PDE is read from memory. The PDE Valid and Protection bits are checked and a Page Fault Exception is signaled if necessary. The Base of the Page Table (extracted from the PDE) is then combined with bits |21:12| of the intermediate address and the selected PTE is read from memory. The PTE Valid and Protection bits are checked and a Page Fault Exception is signaled if necessary. The Page Frame Address is extracted from the PTE, and combined with bits |11:0| of the intermediate address to form the full 32 bit Physical Address.

III.B.3.b Address Generation in the F86 Processor

What is needed is a collection of microprocessor structures and techniques that permit an advanced microprocessor to maintain compatibility with the large installed base of x86 hardware and software while overcoming the limitations of the x86 architecture to provide performance competitive to other architectures.

The following sections will describe the techniques and hardware used in the F86 processor to enhance the performance of the x86 architecture. Included will be a description of how the effective and intermediate addresses are computed in parallel. This parallel implementation of the effective address and intermediate address computations is the subject of a co-pending patent application. A Translation Lookaside Buffer (TLB) is used to accelerate the translation of the intermediate address to the physical address. A dedicated state machine called the TLB State Machine is responsible for accessing the memory based tables when the TLB can't provide the translation. Operation of the TLB and TLB State Machine will be described in more detail below.

Figure 28:
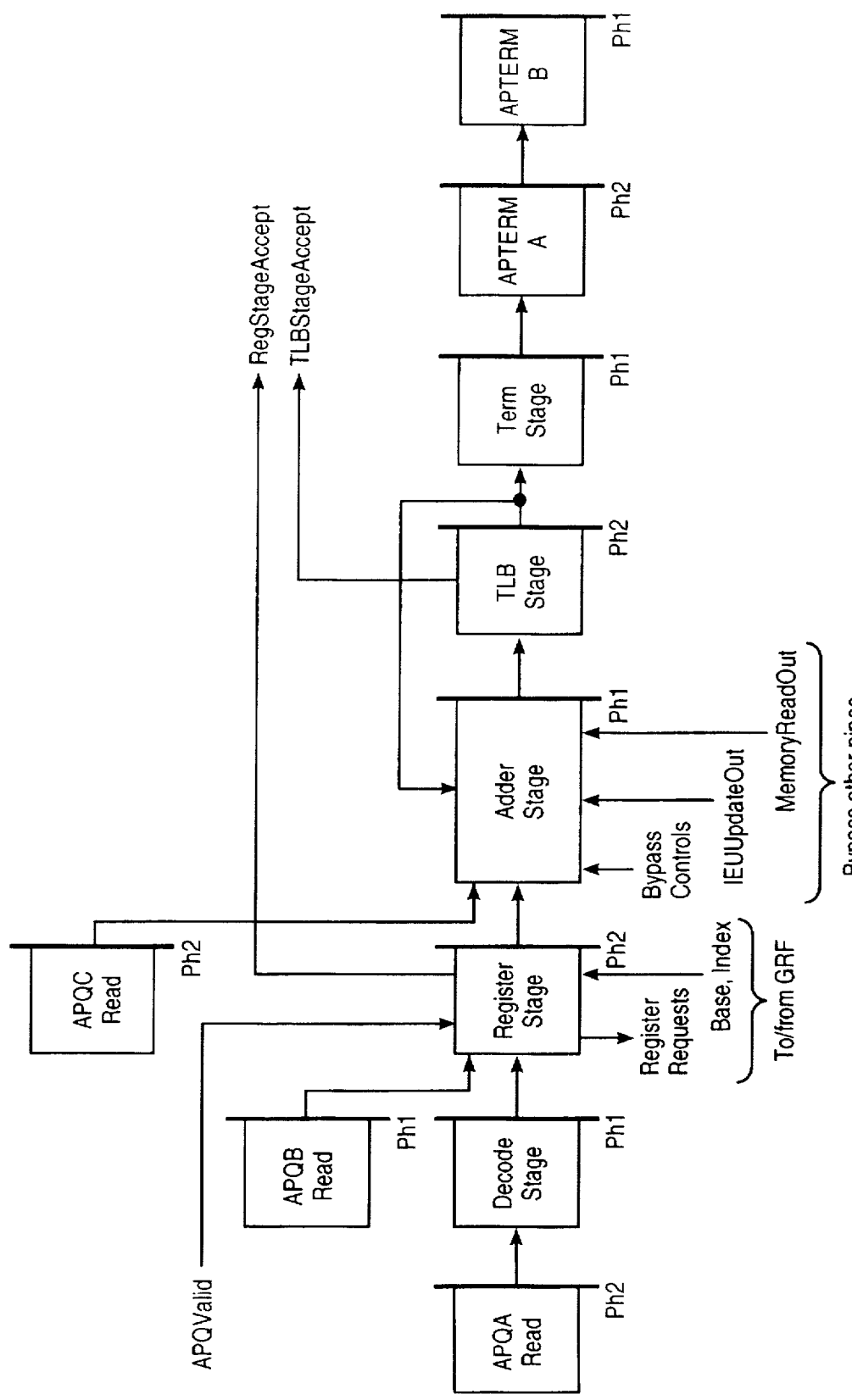
FIG. 28 is a structural diagram of the AP's Address Generation pipeline.

FIG. 28 shows the eight pipeline stages that make up the Address Generation pipeline.

The first pipeline stage (APQA Read) extracts a next operation to be performed from the APQ p-op queue.

The second pipeline stage (Decode) decodes information received from the APQA Read stage and determines what type of work will be performed.

The third pipeline stage (Register Stage) acquires the operands required for forming the effective and intermediate address from the register files.

The fourth pipeline stage (Adder Stage) formats the operands and performs the address calculations for effective and intermediate addresses. Although described above as sequential steps, the processor forms both addresses in parallel.

The fifth pipeline stage (TLB Stage) performs the intermediate to physical address translation if paging is enabled, checks segmentation limits, and computes auto-increment/decrement values for pointer registers. If paging is not enabled, the intermediate address is used as the physical address.

The sixth pipeline stage (Termination Stage) performs various protection and exceptional case checks and prioritizes any problems discovered in prior pipeline stages.

The seventh (APTermA) and eighth (APTermB) pipeline stages are just pipeline latches, and are used to send a resulting normal or abnormal termination to the DEC unit.

Figure 29:
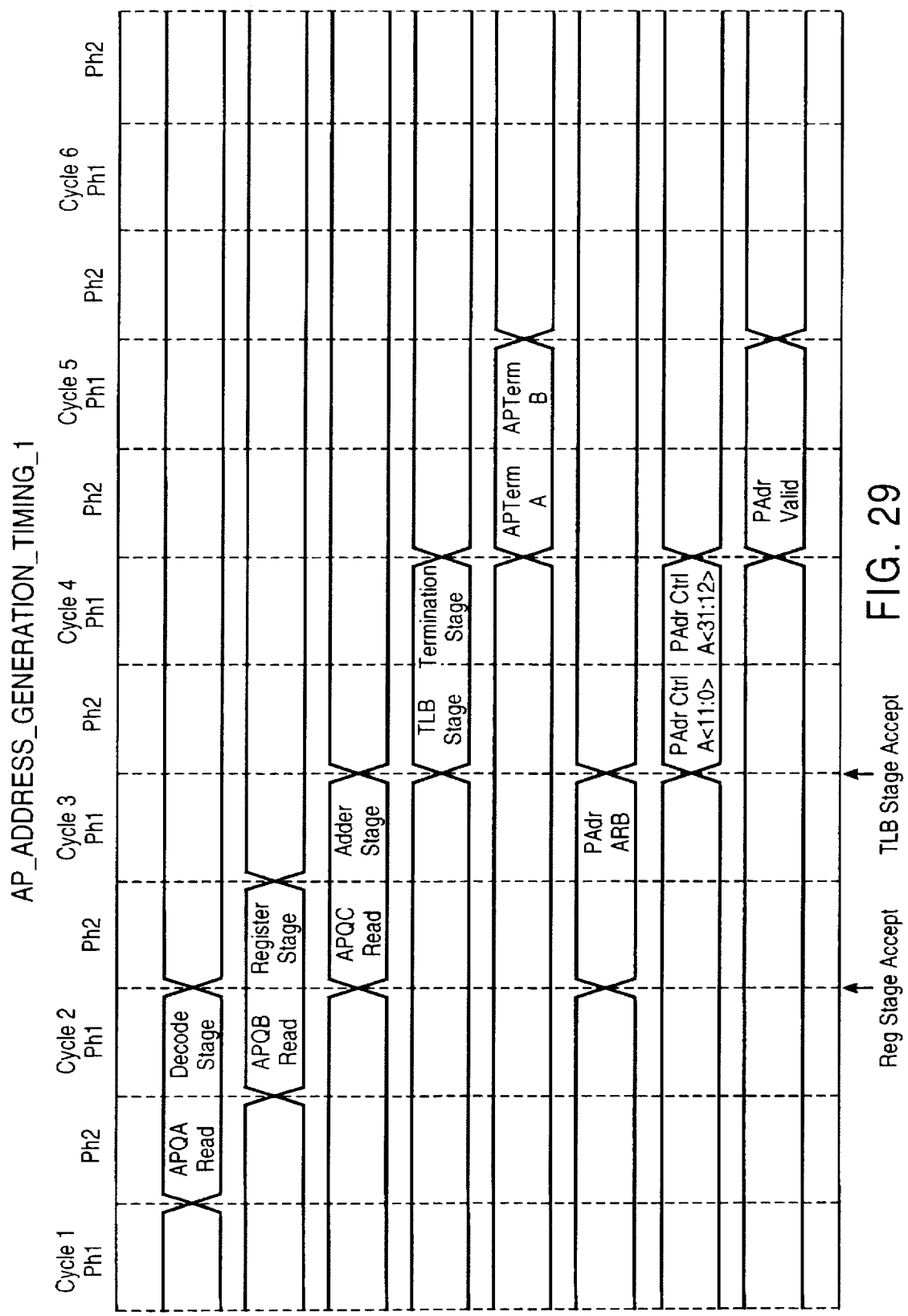
FIG. 29 is a timing diagram of the AP's Address Generation pipeline.

FIG. 29 shows how an operation flows down the Address Generation pipeline. The stages have been combined into conceptual pairs so as to more clearly illustrate the degree to which multiple operations can be simultaneously operating, and to give a framework for describing pipeline stall points.

III.B.3.c Address Generation Pipeline—Memory Read

Due to the complexity of the Address Generation Pipeline, each stage will be introduced in the context of what tasks are performed in that stage for a simple memory read address computation. Afterwards, the pipeline stages will be revisited for each of several parallel functions that occur as a p-op flows down the pipeline.

III.B.3.c.1 APQA Read Stage

The APQA Read stage begins by reading a p-op from the register file in APQA. A read pointer is implemented by APQ_CTRL. During reset and on p-op abort cycles, the read and write pointers are set to a common value. A control signal from APQ_CTRL (APQ_Valid) tells the Address Generation pipeline that a valid p-op is available for processing. At the same time as the APQA register file is read, DEC is possibly sending PopBusA fields for a new p-op. APQ is responsible for short circuiting the incoming PopBus p-op when the queue is empty.

A control signal is generated by the Register Stage (RegStageAccept) which indicates whether it is capable of accepting the p-op that has been selected and decoded in the APQA Read Stage and Decode Stage. If RegStageAccept is asserted, APQ_CTRL advances the read pointer in time to begin extracting the next p-op (or bypass the PopBus if the queue is empty). III.B.3.c.2 Decode Stage The Decode Stage receives the APPopGrp|7:0| field from APQA. This field defines the operation to be performed by AP. APPopGrp is decoded to determine what type of operations will be performed in the Address Generate pipeline. Also during this stage, the APQB register file is being read and DEC is possibly sending PopBusB fields for a new p-op. At the end of the stage, one of these two p-ops is selected for presentation to the Register Stage.

III.B.3.c.3 Register Stage

The Register Stage receives control information from the Decode stage. It also receives the PopBusB p-op fields from the APQB register file or a bypass from the PopBus. The Register Stage performs additional decode of the p-op fields available to it, and locates any register operands required for address generation. Also during this stage, the APQC register file is being read and a pipeline within DEC is possibly sending PopBusC fields for a new p-op. At the end of the stage, one of these two p-ops is selected for presentation to the Adder Stage.

The p-op field EASpec|4:0| specifies whether or not each of the three effective address components (Base, Index, Displacement) should be included in the effective address computation. If EASpec specifies that an Index register value be included, EASpec also specifies a scaling (1, 2, 4, 8) which should be applied to the Index value. Looking at EASpec, the Register Stage determines if a Base and/or Index register is required.

The p-op field SrcAReg|4:0| specifies a physical register to be used as the Base value, assuming EASpec indicates a Base should be used. The Register Stage examines the valid bit for the specified register and forces a pipeline stall if that register is not yet valid. Otherwise, the specified register is read out on the Base Read port of the General Register File.

The p-op field IndexReg|4:0| specifies a physical register to be used as the Index value, assuming EASpec indicates that an Index should be used. The Register Stage examines the valid bit for the specified register and forces a pipeline stall if that register is not yet valid. Otherwise, the specified register is read out on the Index Read port of the General Register File.

The SrcAReg and IndexReg fields are presented to the General Register File, along with decode information from EASpec to indicate whether registers are required. The General Register File checks the valid bits for any required registers, and checks for any necessary bypasses by comparing the register numbers with any register file writes that are about to be performed.

If the valid bit for a required register is not set, and if no bypass source can provide the value, then a dependency interlock will be asserted. This causes RegStageAccept to be deasserted, which in turn causes APQ to stall. The stalled p-op will be passed to the Register Stage on each processor cycle until the interlock is resolved (or the p-op is aborted). Some other execution unit will eventually validate the required register, freeing the interlock.

The Register Stage implements three possible bypass sources for the base and index registers. Data can be bypassed from the TLB Stage of the Address Generation pipeline, from the output of the Memory Read pipeline, or from the output of the IEU Update pipeline. These pipeline stages will be described later.

In addition to deasserting RegStageAccept, the Register Stage will tell the following Adder Stage that no valid p-op is being passed down the pipeline this cycle.

The p-op field SegReg|3:0| specifies the physical segment that the address calculation should be relative to. The Register Stage reads out the specified Segment Base value from the Segment Base Register File and the specified Segment Limit and Control values from the Segment Limit Register File. The Granularity Bit of the selected segment is used to format the 20 bit limit value into the correct 32 bit limit. As will be described later, only AP modifies Segment Base and Limit values. Since AP processes p-ops in x86 instruction program order, no valid bit checking is required. Updates to the segmentation related registers will be described later.

Many of the other functions performed in the Register Stage will be described later.

III.B.3.c.4 Adder Stage

Figure 30:
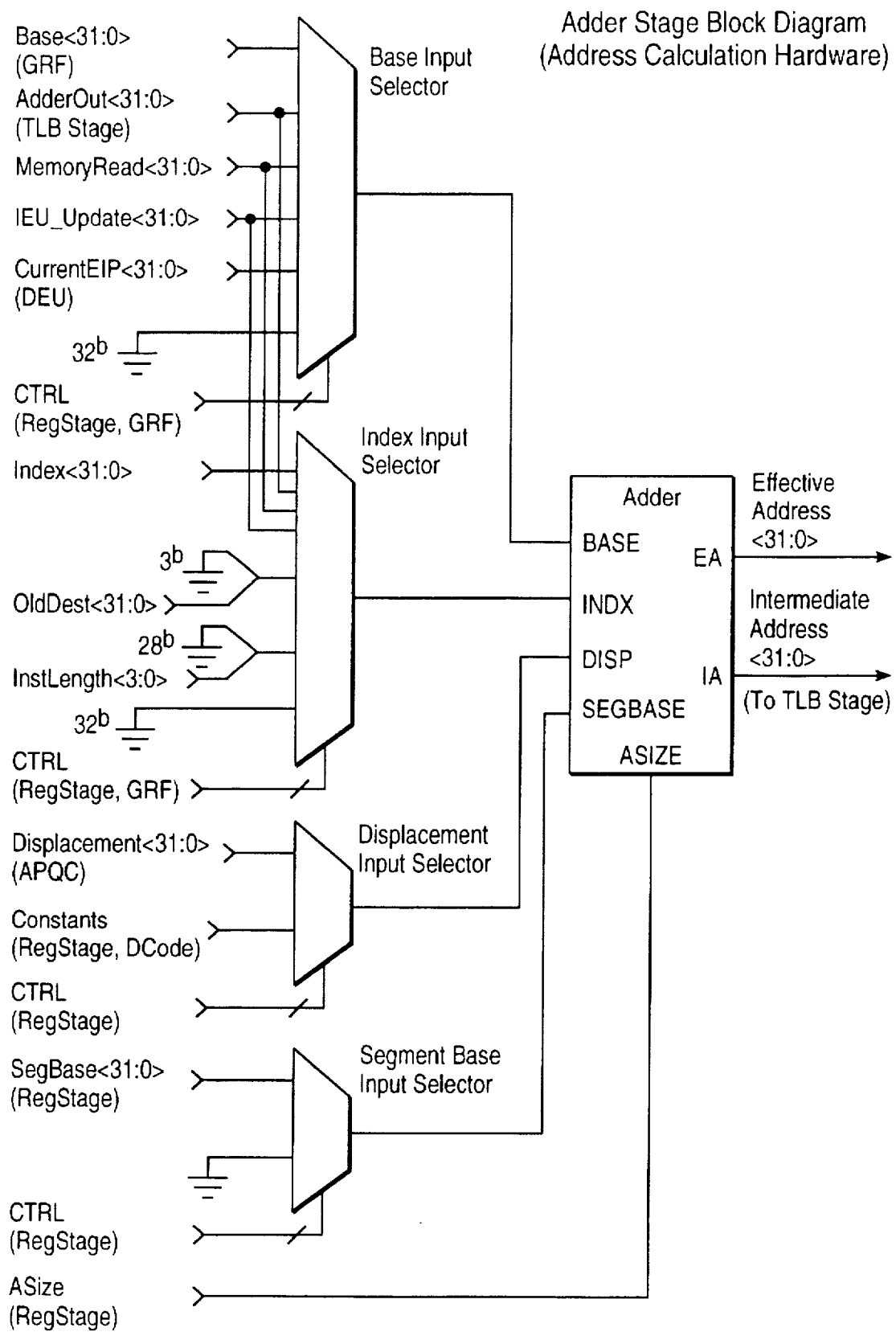
FIG. 30 is a block diagram of the Adder stage of the AP's Address Generation pipeline.

The Adder Stage receives the decoded information from the Register Stage, the register values acquired during the Register Stage, and the displacement and other fields from the APQC register file or a bypass from the PopBus. The Adder Stage also receives Bypass Control fields from the General Register File and bypass values from the IEU Update pipeline, Memory Read pipeline, and TLB Stage. The Adder Stage performs three and four input adds to compute the effective and intermediate addresses, as specified by the p-op. See FIG. 30 for a block diagram of the portions of Adder Stage that are essential to forming a memory read address.

The first step in performing the address computation is to select and format the effective address input values. The EASpec and Bypass Control values together describe what values should be gated to the adder inputs.

The Base Input Selector selects a base value from one of 6 sources. If EASpec indicates that no base should be used, the constant zero is selected. If the General Register File indicates that a register was available in the register file, the register file output is selected. If the General Register File indicates that the desired register will be available from one of the three short circuit sources, the appropriate short circuit source is selected. Finally, if the Decode Stage indicated that an instruction pointer relative branch target address computation is required, the Current EIP will be selected. A DEU pipeline is responsible for providing the Current EIP. Handshaking between the Address Generation pipeline and the DEU pipeline on branch p-ops will be described later.

The Index Input Selector selects an index value from one of 7 sources, and then performs any required scaling of that value. If EASpec indicates that no index should be used, the constant zero is selected. If the General Register File indicates that a register was available in the register file, the register file output will be selected. If the Register Stage indicates that the desired register will be available from one of the three short circuit sources, the appropriate short circuit source is selected. A special purpose input is used to support an address calculation peculiar to implementing the Bit Test instructions, using the OldDest register read port. Finally, if the Decode Stage indicates that an instruction pointer relative branch target address computation is required, the instruction length of the current branch instruction will be selected from the ILen|3:0| value extracted from APQB and piped down from the Register Stage.

Following the Index Input Selector is a Index Scaling multiplexor. This multiplexor shifts the selected index value by 0, 1, 2, or 3 bits left, as indicated by the EASpec field.

The Displacement Input Selector selects between the Displacement fields from the APQC register file (or PopBusC bypass) and various simple constants. The simple constants are selected based upon controls from the Decode Stage. If AP needs to perform an address calculation with a pre-decremented stack pointer, the stack pointer would be selected as the base value and the pre-decrement constant would be selected as the displacement value. Displacements may require sign extension.

The Segment Base Input Selector selects between the segment base read from the Segment Base Register File by the Register Stage, and the constant zero for address calculations which are not relocated by segmentation (e.g. I/O addresses).

The Effective Address adder performs a 3 input addition between the base, scaled index, and displacement values. The 3 inputs are first compressed to two values with a 32 bit carry save adder (CSA). The p-op field ASize specifies whether the effective address calculation will be performed modulo 16 bit or modulo 32 bit arithmetic. This information is piped down from the Register Stage. If ASize indicates modulo 16 bit arithmetic, the upper 16 bits of the unassimilated sums and carrys from the CSA are forced to zero. A carry propagate adder (CPA) is then used to add the unassimilated sums and carrys. If ASize indicates modulo 16 bit arithmetic, the carry out of bit 15 of the CPA is also forced to zero.

Figure 31:
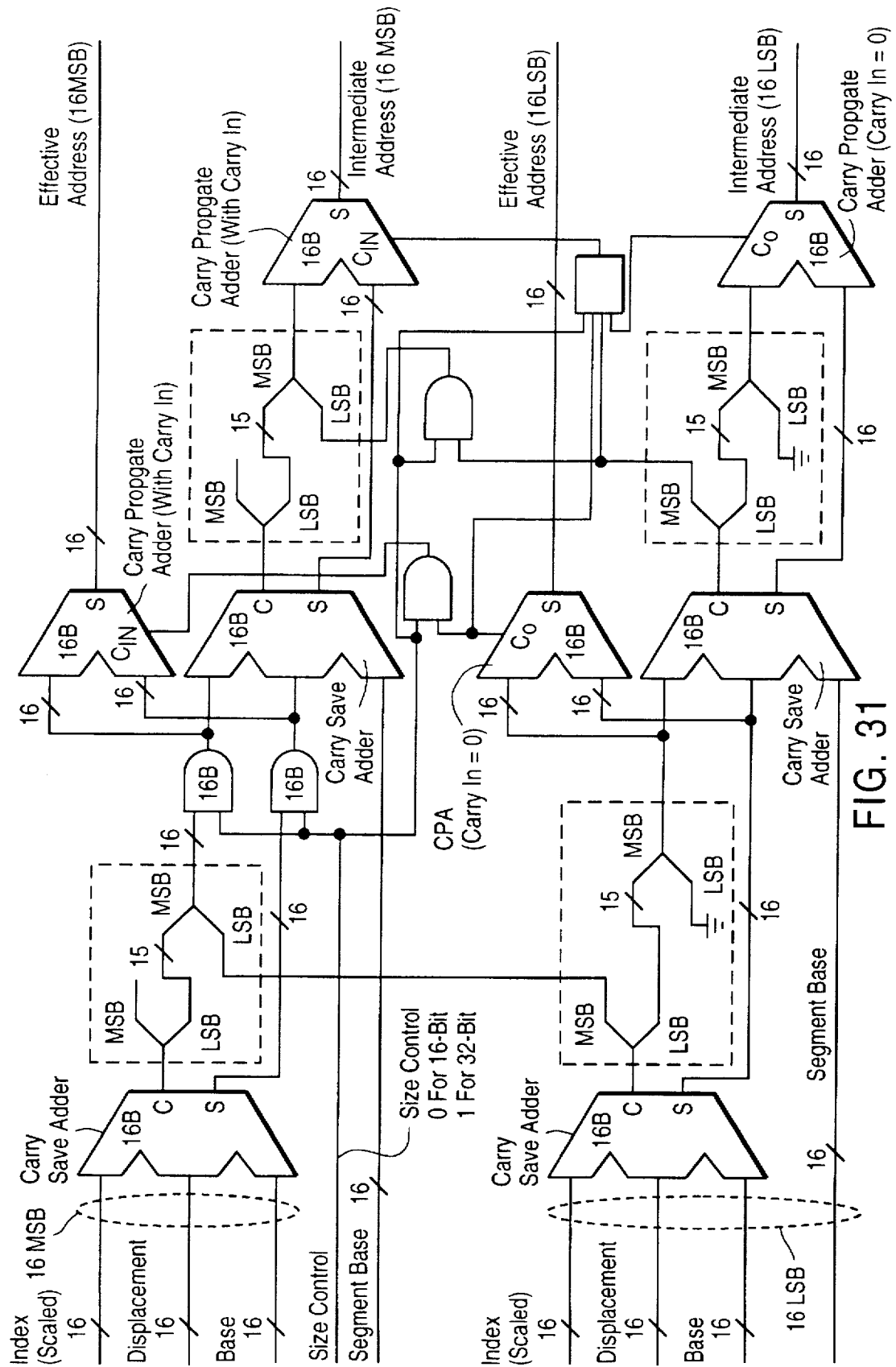
FIG. 31 is a block diagram of an adder for concurrent generation of effective and intermediate addresses.

The intermediate address is conceptually computed by first computing the effective address (modulo ASize) and then performing a 32 bit add of the selected Segment Base and the Effective Address. In order to significantly reduce the latency in finding the intermediate address, the effective and intermediate addresses are computed essentially in parallel. This parallel implementation of the effective address and intermediate address computations is the subject of a co-pending patent application. See FIG. 31.

The unassimilated sums and carrys from the effective address CSA (after clearing the upper 16 bits if necessary) are combined with the Segment Base using a second CSA. The carry out of bit 15 of this second CSA is forced to zero if modulo 16 effective address arithmetic is required. The sums and carrys from the second CSA are then added in a CPA to get the intermediate address. A combinational block receives the ASize specification, the carry out of bit 15 of the effective address CPA, the carry out of bit 15 of the second CSA, and the carry out of bit 15 of the intermediate address CPA and determines the appropriate carry in to bit 16 of the intermediate address CPA.

The "Adder Pipe" block passes control information from the Register Stage to the TLB Stage. Some bit encoding and decoding is performed while transferring the information.

Many of the other functions performed in the Adder Stage will be described later.

III.B.3.c.5 TLB Stage

The TLB Stage receives decoded information from the Adder Stage, and the effective address and intermediate address values computed by Adder Stage. The TLB Stage performs Segment Limit checks on the effective address and translates the intermediate address to a physical address according to the demand paging mechanism.

Similar to the Register Stage and RegStageAccept, the TLB Stage can also stall the Address Generation pipeline by asserting a signal called TLBStageAccept. If TLBStageAccept is deasserted, the Adder Stage is stalled with a recirculating latch, and the Adder Stage outputs are repeatedly sent to the TLB Stage until after TLBStageAccept is asserted.

If the TLB Stage stalls the Adder Stage, all previous stages of the Address Generation pipeline are also stalled. In particular, the Decode Stage is stalled in the same manner as if RegStageAccept had been deasserted. Other pipelines in AP are unaffected by the stall of the Address Generation pipeline (whether due to RegStageAccept or TLBStageAccept), except as limited by Dependency Interlocks.

There are multiple reasons for deasserting TLBStageAccept, and many of these will be described below.

The effective address from the Adder Stage is presented to a Segment Limit Check Comparator. The Register Stage used the SegReg p-op field to read out a Segment Limit value from the appropriate physical (remapped) Segment Limit Register File location, and the Adder Stage passed this value on down to the TLB Stage.

The comparator accepts the effective address, the operand size (actually operand size minus 1), the current Default Bit, information as to whether the segment is an expand-up or expand-down segment, and the Segment Limit and performs a limit check on the entire operand. The details of this comparator are described in the patent "Expand Up and Expand Down Segment Limit Fault Detection", Ser. No. 08/339,592, Docket NM. 1994.2 Widigen et al. The results of the limit check will be pipelined down to the Termination Stage for prioritization with other exceptions detected during execution of the p-op.

The TLB Stage includes the TLB State Machine. This state machine is, in part, responsible for performing a page table lookup process. The TLB State Machine will be described in more detail later. For the purposes of discussing the behavior of the TLB Stage in the formation of a memory address, it is only necessary to note that the TLB State Machine is capable of providing a translation by accessing the memory based tables when this is required.

The TLB Stage includes a 32 entry 4-way set associative "Translation Lookaside Buffer" (TLB). This cache is used to accelerate the page translation process by remembering the results of recent successful translations performed by the TLB State Machine.

When the TLB State Machine completes an address translation, an entry in the TLB cache is selected for remembering this translation. The TLB entry contains fields for storing the most significant 20 bits of the intermediate address, the Page Frame Address from the PTE acquired by the TLB State Machine, a Valid bit, and composite values of the Protection and Attribute bits collected by the TLB State Machine from the PDE and PTE.

Having introduced the TLB and the TLB State Machine first, the TLB Stage operates as follows. The most significant 20 bits of the intermediate address from the Adder Stage is presented to the TLB, which examines the set of Virtual Pages for which it has the cached Physical Page information. If the TLB has an entry corresponding to the Virtual Page, the Page Frame Address and associated Protection and Attribute bits are read out of the TLB and presented to the Termination Stage.

If the TLB does not have information for the Virtual Page, a TLB Miss is signaled. The TLB Stage stalls the Address Generation pipeline by deasserting TLBStageAccept, and starts up the TLB State Machine. In a process that will be described later, TLB State Machine references the page tables and creates an entry in the TLB. The pipeline is then restarted and the TLB is again referenced.

All during the TLB State Machine operation, the Adder Stage holds the initiating intermediate address, stalled by TLBStageAccept. Once the new translation has been written to the TLB, the TLB State Machine completes, and TLBStageAccept is deasserted. The intermediate address from the Adder Stage is again presented to the TLB, this time with no possibility of a TLB miss.

In F86, the TLB is used to translate memory read addresses, memory write addresses, and memory read-modify-write addresses for data operands. In addition, the TLB is used to translate the target addresses for branch instructions. The branch prediction mechanism predicts the results of the branch target translations by predicting physical target addresses. Instruction prefetch mechanism in DEC and MCS do not require TLB assistance for translating instruction addresses for sequential prefetch within a page. When a sequential prefetch reaches a page boundary, MCS informs DEC of the need for a page translation, and DEC sends a Page Cross p-op to AP. The TLB is used to translate the first byte of the next sequential Virtual Page.

In F86, address translation through paging is optional. When paging is disabled, the physical and intermediate address values are always equal. This is accomplished by an additional input bus (NonPagedAddress[32:12]) on the TLB and an associated control input (NotPaged). When the PagingDisabled input is asserted, the TLB presents the NonPagedAddress as the Page Frame Address output, without regard to the TLB contents. This mechanism is used when paging is disabled by the operating system, for addresses to non-memory locations (e.g. I/O ports), and by the TLB State Machine when it accesses the page tables themselves.

In F86, two composite Protection bits are provided by the TLB to the Termination Stage. The User/Supervisor bit is used to check if the program generating the address is running at sufficient privilege to access the memory location. The Read/Write bit is used to restrict the types of memory references that can be made to the page. Checks using these bits are performed in the Termination Stage. These bits are undefined on addresses which are not paged, and protection checks are not made on these references.

If the Termination Stage detects a protection violation using the composite Protection Bits read out of the TLB, a pipeline stall is again created by deasserting TLBStageAccept. Rather than depend upon the Protection bits cached in the TLB (which are not kept coherent with the memory tables by any hardware mechanism), the TLB State Machine is invoked to perform a fresh translation using the memory based tables.

If while accessing the memory based tables the TLB State Machine determines that there is a protection violation, the instruction that created the memory reference will be aborted and a Page Fault Exception will be signaled.

If upon rechecking the memory tables, the protection checks are met, then the TLB entry is updated to include the new field values and the pipeline is restarted by asserting TLBStageAccept. The intermediate address that has been held in the Adder Stage is allowed to flow through the TLB Stage, this time with no possibility of a protection violation being detected in the Termination Stage.

Many of the other functions performed in the TLB Stage will be described later. Also, the TLB State Machine, and handling of TLB Misses and creation of new translations in the TLB will described later.

III.B.3.c.6 Termination Stage

The Termination Stage accepts decode information that has been passed down from previous pipeline stages, as well as status information that has been collected as the p-op has flowed down the pipeline. Both sets of information are used in the Termination Stage to detect various exceptions defined by the x86 architecture. In some cases, actual checks get performed in prior stages, rather than in the Termination Stage, and the results of those checks are passed to the Termination Stage.

The results of the segment limit check performed in the TLB Stage also arrives in this stage and is prioritized. This limit check covers memory operands, branch target addresses, and page cross addresses. Code segment limit checks on instructions themselves is handled by DEU (up to two per cycle) independently, and these limit faults are terminated to DEC on the DEU Termination bus.

Protection related bits from the selected physical Segment Limit Register File location that was used to compute the intermediate address arrives at the Termination Stage for protection checking.

Beyond performing most of the exception checks, the Termination Stage is responsible for prioritizing the multiple exceptions that may have been detected and choosing the single exception which is the one which should be signaled to the software.

The Termination Stage also checks various internal exceptions which are defined by the hardware implementation architecture (such as mis-predicted branches) which require that DEC initiate an exceptional pipeline clean-up operation.

The exception prioritization is best described as a truth table which takes as inputs the type of p-op being processed and a variety of control signals which indicate the presence of various exceptions. This truth table then specifies the correct termination, x86 defined interupt vector number (if any), and the type of exception Error Code that will be pushed onto the exception handler's stack.

The Protection bits provided by the TLB are checked against the Current Privilege Level, as given by the segmentation related hardware, and the type of memory reference being performed. Unlike the checks described above, these do not result in an exception. Instead, the pipeline is stalled and the TLB State Machine references the memory based tables and performs the checks on the information in memory. The TLB State Machine provides a indication of a Page Fault Exception to the Termination Stage if it detects that either it can't complete the translation (PDE or PTE is invalid) or that the memory reference does not pass the CPL and/or reference type checks.

A few other functions performed in the Termination Stage will be described later.

III.B.3.c.7 APTermA and APTermB Stages

The APTermA Stage receives a termination from the Termination Stage. This termination is sent to DEC on dedicated wires across two pipeline stages, where it is received by the DEC.Term pipeline. Table T2 shows the encodings of the two portions of the AP Termination.

A few other functions performed in the APTermA Stage will be described later.

III.B.3.d Address Generation Pipeline—Pipelined Operations

So far, the Address Generation pipeline has been described as a series of stages that perform a set of operations for a single p-op. Address generation is in fact pipelined, with a new p-op being started down the top of the pipeline in each processor clock. Up to four p-ops are being processed at any one time in this pipeline.

In contrast to previous x86 implementations, the speculative out-of-order execution supported by the multiple independent pipelines in F86is capable of performing multiple address related calculations and address translations in parallel and even out of the x86 instruction program order.

As an illustration, the following address related activities are likely to be occuring in the various pipelines of the processor. In this enumeration, the terms "first x86 instruction", "second x86 instruction", "third. . ." are used to indicate the parallelism, but due to out-of-order execution they do not necessarily infer the program ordering of the x86 instructions The BPC PCCAM and BPC Read Stages of the DEC Issue pipeline can be predicting a fully translated branch target physical address for a first x86 instruction.

The Align and Decode Stages of the DEC Issue pipeline can be calculating a fully translated branch target physical address for a second x86 instruction.

The Assembly Stage of the DEC Issue pipeline can be translating the virtual register specifications that, in part, make up the virtual address specification for a third x86 instruction into the remapped physical registers used to support speculative out-of-order execution.

The Adder Stage of the AP Address Generation pipeline can be performing parallel address calculations for both the effective and the intermediate addresses for a fourth x86 instruction using the physical general register and physical segment register values provided by DEC.

When Debug Register Checks are enabled, the DEU unit can be translating the effective instruction pointer for the x86 instruction in the Adder Stage of the AP Address Generation pipeline into an intermediate EIP for debug checks (using a local copy of the physical segment descriptor corresponding to virtual segment CS).

The TLB Stage of the AP Address Generation pipeline can be performing operand or branch target address page translation for a fifth x86 instruction.

The DEU unit can be performing effective address calculation for sixth and seventh x86 instruction based upon the Code Segment D-Bit and instruction lengths provided by DEC. DEU also performs the corresponding Code Segment Limit checks for these two instructions using a local copy of the physical segment descriptor corresponding to virtual segment CS.

III.B.3.e Address Generation Pipeline—PADR Bus Generation

One of the additional functions performed as a p-op flows down the Address Generation pipeline is the placement of any resulting physical address on the PADR bus for transmission to the appropriate pipelines in DEC and/or MCS. The specification for the PADR bus can be found in Appendix E.

The DEC PADR In pipeline observes all memory write addresses so as to detect self-modifying code and passes any such possibility to the DEC Term pipeline. The DEC PADR In pipeline also receives all branch target addresses and uses those addresses to align and decode instructions, make future branch target address predictions, and to detect self-modifying code.

The MCS PADR Pipeline receives PADR transactions and enqueues them in one or more of three address queues. One queue is dedicated for holding operand read addresses, one for holding write addresses, and one for holding instruction fetch addresses. These queues and their related pipelines are described in the MCS portion of this document.

In the Register Stage, the p-op MemRef[1:0] and Decode Stage information is decoded to determine whether the p-op specifies an address calculation that must be transmitted on PADR bus. If not, no further reference is made to the PADR bus during the remaining stages of the Address Generation Pipeline. The rest of this section assumes that AP needs to utilize PADR bus.

In the Adder Stage, AP arbitrates for control of the PADR bus. DEC and MCS are also possible PADR bus masters. In this stage, AP also decodes various p-op fields to determine what values are required for most of the control related fields of the PADR bus. Also in Adder Stage, the intermediate address is computed, as described previously. At the end of this stage, AP knows whether or not it was successful in acquiring PADR bus.

In the TLB Stage, AP checks to see if it won the arbitration. If not, the TLBStageAccept signal will be deasserted, causing the p-op to be stalled in the Adder Stage. The immediately following p-op will also be stalled in the Decode Stage.

If AP won the arbitration, the various control fields which specify the meaning of the PADR bus transaction are placed on PADR bus to DEC and MCS. These include Stream and Operation fields for defining what is to be done with the address, PopTag for pipeline tracking, Operand Size, etc. Also in this stage, the least significant 12 intermediate address bits are sent to DEC and MCS. These bits are not modified by the paging process and are therefore available at the conclusion of the Adder Stage.

The TLB Stage also performs intermediate to physical address translation, as described previously. In the Termination Stage, the 20 most significant bits of the physical address are placed on PADR bus for transmission to appropriate pipelines in DEC and MCS. Since these bits become available only at the end of the TLB Stage phase, this is the earliest these bits can be sent.

The physical address is split into lower 12 bit Physical Page Offset Address and upper 20 bit Physical Page Frame Address portions because the on-chip instruction and data caches (in MCS) are capable of beginning the cache lockups and data reads with only the Page Offset Address. One phase is used to read the cache tag and data RAMs. The Page Frame Address arrives one phase after the Page Offset Address, just in time to be compared against the tags that have been read from the tag RAM. This overlap of TLB translation and Tag RAM read results in an improvement in pipeline depth (latency).

In the APTermA Stage, the PADR Valid bit is driven to DEC and MCS. If AP had any difficulty in executing the p-op, the PADR transaction can be invalidated in this final phase.

AP sometimes sends branch target addresses on PADR in the speculation that DEC may have incorrectly predicted the target address. The reduces pipeline latency in the case where an incorrect prediction was made and AP needs to transmit the calculated address on PADR. In the more common case where the prediction is correct, AP uses the PADR Valid bit to negate the PADR bus transaction. This will be described in more detail later.

III.B.3.f Address Generation Pipeline—Result Merging on Memory Loads

One additional function performed by the Address Generation pipeline is to prepare the Memory Read pipeline for receiving memory data on memory load p-ops.

A small 16 word by 6 bit queue called the DIORAM is used to pass control information from the Address Generation pipeline to the Memory Read pipeline. This queue is addressed by the least significant four bits of the PopTag associated with the p-op which scheduled a memory read. The Queue contains a single bit field which indicates whether AP is expecting to receive memory read data for that p-op tag, and a 5 bit field which contains the physical register which should receive the memory read data.

In the Register Stage, the p-op fields are decoded to determine whether or not the Address Generation pipeline will be scheduling a memory read to load a general purpose register.

In the Adder Stage, the PopTag for the p-op is used to address the DIORAM. The MemoryDataExpected bit for the addressed entry is loaded with the required value. The physical register number from the p-op DestReg|4:0| field is also stored into this entry. Since the Adder Stage necessarily precedes the completion of address generation, and therefore the return of memory read data, no valid bit is required for this entry. By the time the Memory Read pipeline needs to access the information, it is guaranteed to be valid.

The Address Generation pipeline must also prepare the destination register for receiving memory read data. In particular, the problem of "Result Merging" must be addressed.

Result merging refers to a problem that occurs when an instruction modifies only a subset of the bits of a virtual register. An example would be the x86 instruction "MOV AX,BX". This instruction moves the least significant 16 bits of the EBX register into the least significant 16 bits of the EAX, leaving the most significant 16 bits of EAX unchanged.

Since the virtual to physical remapping process results in assignment of a new physical register for all bits of the virtual register, it is necessary to copy the unmodified virtual register bits from the old physical register to the new physical register. The p-op field OldDest|4:0| provides the old physical register, and DestReg|4:0| provides the new physical register for the virtual register which is being modified.

On a load from memory to a general purpose register, this Result Merging must be accomplished. During the Register Stage of the Address Generation pipeline, the OldDest|4:0| p-op field is used to access the old physical register value from the General Register File. If a memory load is being performed, the Address Generate stage will stall (by deasserting RegStageAccept) if OldDest is not available from the register file. No bypass paths are supported. A dedicated register file read port is used to access the register value.

During the Adder Stage, the OldDest value read from the register file is written into the DestReg physical register. The write port is shared with the Add/Move unit, with Adder Stage having priority. All 32 bits of the DestReg value are written.

The DestReg is not validated on this write, since all that has been accomplished by the Address Generation pipeline is the transfer of the old value to the new register. It is left up to the Memory Read pipeline to update the necessary portions of the new register and validate it for use by other pipelines. As for the DIORAM, the transfer for old to new physical register is guaranteed to be completed by adder stage before memory data can be returned.

The Memory Read pipeline will be described later.

III.B.3.g Address Generation Pipeline—Register Updates from the TLB Stage

Another function performed by the Address Generation pipeline is to auto-increment or auto-decrement a pointer register value and update the General Register File with the new value.

Some instructions in the x86 architecture access a memory operand via a pointer register, with an implied auto-decrement or auto-increment of the pointer value. Examples of these instructions are stack push/pop operations and repeated string instructions. Stack Push operations require that the pointer be decremented before computing the operand address. This is accomplished by applying the decrement to the displacement input to the effective address adder.

Stack Pop operations and repeated string instructions require that the pointer be modified after first computing the address of the operand. A dedicated adder called the Post Adder is implemented in AP to perform these modifications.

In the Register Stage, the OldDest register is read out of the General Register File just as described above for setting up a register load from memory. In this case, the OldDest value is just pipelined down through the Adder Stage to the TLB Stage.

In the TLB Stage the Post Adder performs a 32-bit add of the effective address from the Adder Stage and a small sign extended 13-bit constant generated in the Decode Stage (or microcode). The OldDest value passed in from the Adder Stage replaces the upper 16-bits of the post adder result if a 16-bit result merge was required.

AP implements a 32-bit precharge-discharge bus (ABUS) for reading and writing a large number of distributed registers and latches. The precharged bus structure is convenient in CMOS technology for multiple-source, multiple-destination busses.

A value can be placed upon ABUS in either the Adder Stage or in the Termination Stage. Arbitration is performed in the Register and TLB Stages. If the p-ops in both stages require the ABUS, the TLB Stage wins and the Register Stage deasserts RegStageAccept to implement the resource interlock. Use of ABUS in the Register and Adder Stages will be described later.

In the Termination Stage, the updated pointer value is placed on the ABUS, and in the same stage it is written into the General Register File location specified by the p-op DestReg field. The output of the Post Adder is passed to the Adder Stage where bypasses on the Base and Index register values are implemented. The output of the Post Adder is also passed to the Add/Move unit where bypasses on the SrcA and SrcB register values are implemented.

III.B.3.h Address Generation Pipeline—Register/Memory Updates from the Register Stage The Register and Adder Stages can perform a wide variety of transfers between a source register and a destination value. Source register values can come from a general purpose register, a special register defined by the x86 architecture, or a special purpose internal register. Most sources can also be a destination. The source register value can also be passed via the DXBUS to IEU in order to update a destination register in IEU. The source register value can also be passed via DXBUS to MCS to update cache and/or memory location.

The source value is extracted from a register file during the Register Stage, and placed on the ABUS during the Adder Stage. Since ABUS is a shared resource with the Termination Stage, a resource interlock may cause the p-op which requires ABUS from the Register Stage to be stalled (by deasserting RegStageAccept).

Also during the Register Stage, the OldDest port of the General Register File reads any required general register for result merging (i.e. if the source operand is expected to be merged into the lower 16 bits of a 32 bit general register value. Each of the ABUS sources that is required by the x86 architecture to support result merging uses a split ABUS driver. The upper and lower 16 bit halves can be independently enabled to drive ABUS. If a result merge is required, OldDest[31:16] is enabled onto ABUS[31:16] and the source operand is enabled only onto ABUS[15:0].

During the Adder Stage, the value placed on ABUS can be written to any of the ABUS destination registers. The General Register File can be written using the same write port mentioned in the section on "Register Updates from the TLB Stage", since both writes are performed with data on the ABUS. Some of the special register destinations are organized into register files (e.g. the Segment Selector Register File), and others are individual registers composed of latches.

If the new general register value needs to be transferred to a pipe in IEU in order to update the IEU General Register File, or if the destination is a cache or memory location, then the Address Generation must use the DXBUS to transfer the data to IEU or MCS, respectively. The Register Stage arbitrates for DXBUS. The Address Generation pipeline always wins this arbitration. Other masters on the DXBUS must implement resource interlocks and pipeline stall logic. Control fields are driven to indicate the destination of the transfer during the Adder Stage. The ABUS data is driven onto DXBUS during the Adder Stage.

Table T1 lists most of the registers that are read and written via ABUS in the manner just described.

III.B.4 AP Memory Read Pipeline

The Memory Read pipeline is one of the five independent pipelines in AP. This pipeline is a four stage pipeline which accepts operands from memory (MCS) and places them into the general register file or internal latches.

In the first pipeline stage, MCS sends the PopTag of the p-op which originated the memory read request on the DIO bus. This stage occurs in clock Phase 2.

In the second pipeline stage, MCS sends the Valid bit on the DIO bus. It also provides the "Framing" bits which define the number of bytes that are about to be returned by MCS. The Memory Read pipeline uses the PopTag from the first stage and performs a read of the DIORAM. As described above, the DIORAM is a table which contains a 2 field entry for each of 16 outstanding p-op tags. The first field (MemoryDataExpected) indicates whether memory data arriving for the p-op which needs to be written into the AP General Register File. The second field (DestReg[4:0]) provides the physical register number that should be written.

In the third pipeline stage, MCS sends the memory read operand on the DIO bus. The Memory Read pipeline passes the MemoryDataExpected and the DestReg[4:0] values to the AP General Register File for bypass comparison checks and to prepare for a register file write. It also decodes the Framing bits and tells the General Register File whether all 4 bytes of the register will be updated, or whether only the least significant two bytes will be written. The latter represents the case mentioned previously where the Address Generation pipeline prepared the register file for result merging by writing the OldDest register value into the DestReg location.

In the fourth pipeline stage, the memory read data which arrived in the previous stage is provided to a dedicated write port on the General Register File and written to the appropriate register location. The memory read data is also made available to the Adder Stage of the Address Generation pipeline for bypass on the Base and Index register values, and also to the Add/Move unit pipeline for bypass on the SrcA and SrcB register values.

III.B.5 AP IEU Update Pipeline

The IEU Update pipeline is one of the five independent pipelines in AP. This pipeline accepts register updates arriving from IEU on DX bus and places them into the general register file. This is the mechanism used to keep the AP register file consistent with changes to register values performed by IEU.

In the first pipeline stage, IEU places a control field (TransferType) on DX bus which indicates whether data is being transferred to MCS (memory write data) or to AP (register write data). It places on DX bus the physical register number that should be updated in AP's General Register. It also places on DX bus the operand value to be written. This stage occurs in clock Phase 1.

In the second pipeline stage, the IEU Update pipeline decodes TransferType and generates a control signal to the AP General Register File to indicate whether a register update needs to be done by this pipeline. The pipeline also sends the physical register number received in the previous stage to the General Register File for bypass comparison checks and to prepare for a register file write. The IEU Update data is piped to the next pipeline stage.

In the third pipeline stage, the IEU Update data which arrived in the first stage is written into the appropriate General Register File location. The write port is shared with the Add/Move unit pipeline. The IEU Update pipeline has priority over the Add/Move unit for usage of this port. The IEU update data is also made available to the Adder Stage of the Address Generation pipeline for bypass on the Base and Index register values, and also to the Add/Move unit pipeline for bypass on the SrcA and SrcB register values.

III.B.6 AP Retirement Pipeline

The AP Retirement pipeline responds to the TagStat bus from DEC. At the time that TagStat indicates retirement of one or more p-ops, the Retirement pipeline is responsible for locating any floating point related p-ops. If the pipeline determines that a floating point p-op has been retired, multiple register files indexed by PopTag are read out and written into the floating point environment registers.

The register files were loaded with values by the Address Generation pipeline and the DEU pipeline.

The floating point history stacks are described in more detail later.

III.B.7 AP TLB Details

The TLB State Machine takes over the TLB Stage of the Address Generation pipeline when it becomes necessary to reference the memory based page tables for an intermediate address which either misses in the TLB lookup, or hits in the TLB, but is found in the Termination Stage to have a protection violation. As will be described later in this section, the TLB State Machine also handles misaligned operands, which require two TLB translations and may require that up to two translations be done utilizing the memory based tables.

In order to reference the memory based tables, the TLB State Machine requires access to several other pipelines in AP. In particular, it needs to issue memory reference addresses on the PADR, it needs to receive memory read data from MCS, and it needs to send memory write data to MCS.

III.B.7.a System References

As described previously in'126, p-ops are issued with associated tags, and addresses and operands carry the tags of the originating p-ops. The memory/cache subsystem accepts operand read addresses along with an associated tag. The memory/cache subsystem returns read data, and provides the tag that it was given with the address. Execution units receive data and identify which p-op that data is associated with by its tag.

An additional mechanism is required to allow the TLB State Machine to perform memory references that were not explicitly scheduled by DEC when the p-ops were issued. Reads and writes which are created by the TLB State Machine while accessing the memory based page tables are called "System Reads" and "System Writes", respectively.

The need for an additional mechanism can be highlighted by an example. DEC issues a p-op with PopTag "1" which performs a read of an operand from memory and stores the result in a general purpose register. In the case of a TLB Hit, the Address Generation pipeline generates the physical address of the operand and places that address on PADR bus. The PADR bus PopTag field is set to "1" by AP. The MCS uses the PADR address and locates the required data in the DCache and returns the data on the DIO bus. The DIO bus PopTag field is set to "1" by MCS. IEU (and AP) is waiting to receive the read data from MCS. Upon seeing a transfer for PopTag "1" on DIO bus, IEU takes the data from the bus and writes it into the appropriate physical general register location.

Now assume that the Address Generation pipeline instead detects a TLB Miss and the TLB State Machine is activated to reference the memory based page tables. The operand address that was placed on the PADR is invalidated in the last PADR bus phase using the PADR valid bit, since AP was unable to complete the address transfer (i.e. it could not provide Physical Address bits |31:12|. The TLB State Machine (by a mechanism yet to be described) generates an address to read a Page Directory Entry. This address needs to be placed on PADR. If it is sent using a PADR PopTag value of "1", then the data that gets returned will do so with a DIO PopTag value of "1", causing IEU to believe that the operand value is being returned, rather than a PDE entry that was created in trying to compute the address of the operand value.

The situation on a memory write also has difficulties with a TLB Miss. A p-op with PopTag "1" is issued by DEC and IEU sends write data on DXBUS with PopTag "1". The data is placed in the DX Buffer in MCS awaiting a matching address for PopTag "1". The DX Buffer is indexed by PopTag, and contains only one location to store write data for that tag. When the PADR transfer for PopTag "1" arrives, that address is placed in the Write Reservation Queue, and the data for tag "1" is read from the DX Buffer and stored into the same Write Reservation Queue entry.

When a TLB Miss occurs in generating the PADR address for a write, the write address is invalidated using the PADR bus Valid bit. The TLB State Machine generates an address to read a Page Directory Entry. If the Accessed attribute of that entry is not asserted, then a locked read-modify-write must be created by the TLB State Machine to set the Accessed bit. When AP sends the write address for setting the Accessed bit, if it does so with PopTag "1" the DX Buffer will try to match up the IEU provided operand write data and place it in the Write Reservation Queue entry assigned to the PDE write.

These two examples show why allowing the TLB State Machine to create memory reads and writes for which DEC did not specifically allocate p-op tags creates problems for a machine that uses tags to match up information from independent pipelines.

System Reads and Writes allow the TLB State Machine to create reads and writes which do not have associated p-op tags. When AP generates a System Read, MCS first completes all older reads, and then performs cache lookups and/or main memory reads as necessary to access the requested value. The data is returned on DIO with a special indicator which tells execution units that this data is for a System Read and should not be matched with any pending p-ops awaiting read data. After scheduling a system read, the TLB State Machine waits for the system data to arrive on DIO bus and receives that data with hardware which is separate and parallel to hardware which receives tagged data.

When AP generates a System Write, it is actually treated like a read, in that it flows down the MCS read pipeline instead of being queued in the Write Reservation Queue. AP also provides the system write data on DX Bus, and this is received with special hardware in MCS. Only a single system write may be pending in MCS at any one time. Once MCS has received a system write, it arbitrates for PADR bus and prevents AP from generating additional addresses until the system write has been completed to cache and/or main memory.

The above two paragraphs imply a serialization of memory operations which surrounds the system references which is atypical of normal tagged references. The pipelines not specifically responsible for handling system references continue operation in the normal way without regard to the specialized system reference protocol.

III.B.7.b TLB Incrementer

If an operand straddles a four-byte boundary, two physical addresses must be issued to MCS via the PADR bus. The first address is for he lower addressed portion of he operand and he second address is for the higher addressed portion. A pipeline stall will occur (by deasserting TLBStageAccept) and the TLB State Machine will be invoked to perform the TLB translation for the second half of the operand and to place that address on PADR bus.

The TLB Stage has a dedicated incrementer which is used for operands which are misaligned across a four-byte boundary. In the first cycle in which an intermediate address is accepted by the TLB from the Adder Stage Stage, the TLB Incrementer computes the intermediate address of the next sequential word by incrementing IntermediateAddress |31:2| and clearing IntermediateAddressfl 1:0|.

The TLB Incrementer includes a PageCross output which is asserted if he misaligned operand also straddles a page boundary (i.e. a carry out of bit 11 is detected). MCS requires that any memory references due to a TLB miss (on either page) must be issued on PADR bus before the two PADR bus cycles for the misaligned operand.

When the TLB State Machine is invoked for a misaligned operand and the PageCross signal from the TLB Incrementer is asserted, then the first PADR cycle for the operand is aborted. The TLB Sate Machine handles any TLB Miss that might have ben detected on he first portion of the operand, then performs a translation of he second portion off the operand (selecting the TLB Incrementer's output), and handles any TLB Miss detected on that address.

At this point, the TLB State Machine can be assured that both Virtual Pages have cached translations in the TLB. The intermediate address for the first portion of the operand is again translated, this time placing the physical address on the PADR bus. Then the intermediate address for the second portion of the operand is again translated, this time placing the physical address on the PADR bus.

III.B.7.b TLB Data Path Description

The data path which contains the TLB contains additional latches and multiplexors which are used by the TLB State Machine to generate the addresses required to address the memory based page tables.

Figure 32A:
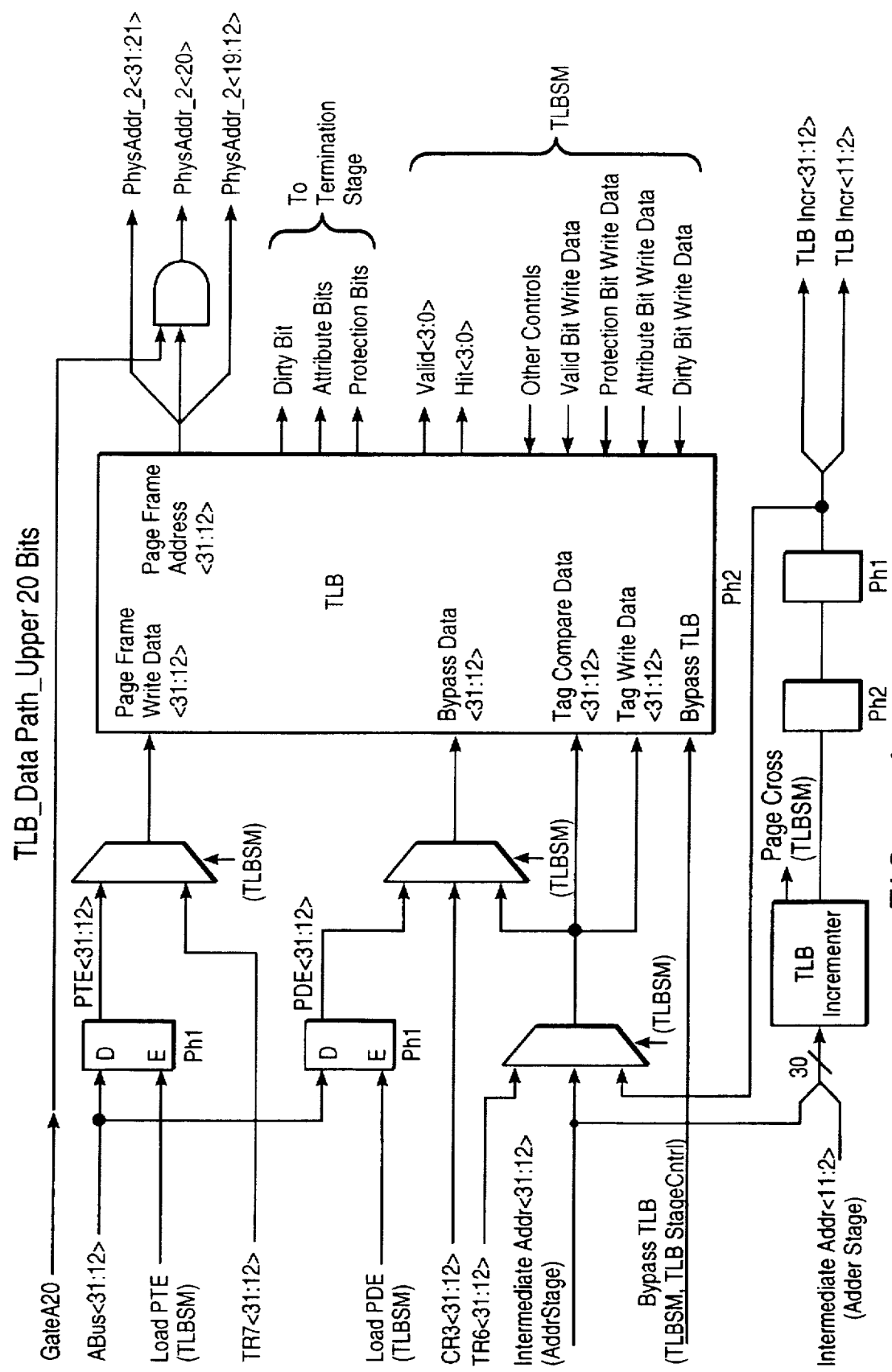
FIGS. 32A and 32B form a block diagram of the TLB datapath.
Figure 32B:
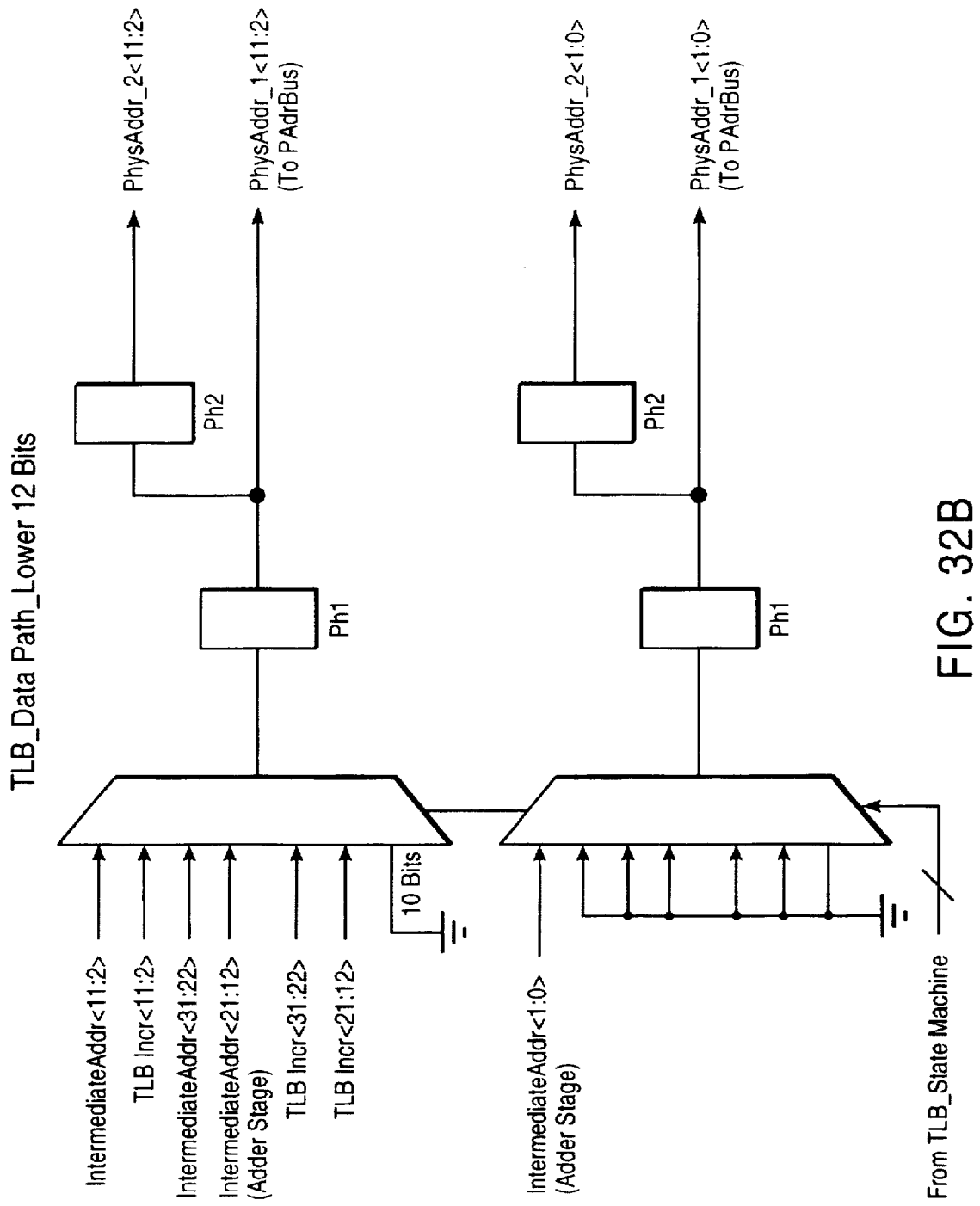

FIG. 32B is a block diagram for the least significant 12 bits of the TLB Data Path. FIG. 32A is a block diagram for the most significant 20 bits of the TLB Data Path. The main block in the TLB Data Path is the TLB itself.

Two registers are implemented for storing the PDE and PTE values, respectively, as the TLB State Machine reads these values from cache or memory.

The TagCompareAddress|31:12| input to the TLB is an intermediate address which will be used in the TLB to locate recently referenced page translations. A 3:1 multiplexor in the TLB Data Path selects between the intermediate address from the Adder Stage, the incremented intermediate address from the TLB Incrementer, and the most significant 20 bits of the TR6 (used for TLB testing) as the value presented on TagCompareAddress.

The BypassData|31:12| input provides a value which can bypass the normal TLB translation function and can e placed on the PageFrameAddress |31:12| output of the TLB. The BypassTLB input to the TLB is asserted when the BypassData should be placed on PageFrameAddress without translation. It is asserted for non-memory addresses (such as I/O addresses, interrupt acknowledge "addresses", halt and shutdown "addresses"), it is asserted for memory references when paging is disabled by control register bits, and it is asserted by the TLB State Machine when referencing the Page Directory and Page Table entries.

The BypassData is generated by multiplexors which can select a value from the intermediate address from Adder Stage, the incremented intermediate address from the TLB Incrementer, TR6 (for TLB testing), CR3 (to read from the Page Directory), and a PDE register (loaded from ABUS with the PDE value read from memory, and used to read from the Page Table).

The TagWriteData |31:12| input to the TLB is used by the TLB State Machine to write an intermediate address tag into the TLB when creating a new cache entry. It is coupled to the multiplexor which provides he TagCompareAddress value.

The PageFrameWriteData |31:12| input to the TLB is used by the TLB State Machine to write a page frame address into the TLB when creating a new cache entry. The PageFrameWriteData value is generated by a 2:1 multiplexor which selects between the PTE registers (loaded from ABUS with the PTE value read from memory), and the TR7 register (for TLB testing).

The TLB also has various Protection bit, Attribute bit and control inputs and outputs, as shown in FIG. 32A.

The Page Offset Address can come from a number of sources. A multiplexor controlled by the TLB State Machine controls a multiplexor which selects a PhysicalAddress |11:0| value. The least significant two bits of each of these sources is zero, except for bits |11:0| of the intermediate address from the Adder Stage.

In order to address operand and instruction locations, the multiplexor can select bits |11:0| of the intermediate address from the Adder Stage, or bits |11:2| of incremented intermediate address from the TLB Incrementer.

In order to address a Page Directory Entry, the multiplexor can select bits |31:22| of the intermediate address from the Adder Stage or bits |31:22| of the intermediate address from the Adder Stage or bits |31:22| of the incremented intermediate address from the TLB Incrementer.

In order to address a Page Table Entry, the multiplexor can select bits |21:12| of the intermediate address from the Adder Stage or bits |21:12| of the incremented intermediate address from the TLB Incrementer.

On an Instruction Fetch Page Cross p-op, the multiplexor can select the constant zero (i.e. the first byte of a page).

III.C Add/Move Unit (AMU)

The Add/Move Unit (AMU) performs integer operations on register and immediate values. Its goal is to keep those register values which are likely to be used in addresscalculation in a valid state in the AP General Register File. To accomplish this goal, it is given read and write port access to the AP General Register File, and includes a simple ALU.

The following describes the operation of the Add/Move unit pipelines, shown in FIGS. 33 and 34. FIG. 33 shows the block diagram for the Add/Move unit.

There are two independent pipelines in the Add/Move unit. The AMU P-Op Issue pipeline receives p-ops from DEC via the PopBus and places them into the Add/Move P-Op Queue (AMPQ). The second pipeline reads p-ops from AMPQ, decodes the p-op, reads required physical register values from the AP General Register File, performs the required ALU functions and writes the results back to the AP General Register File.

III.C.1 Add/Move Unit P-Op Issue Pipeline

The Add/Move Unit P-Op Issue Pipeline consists of three stages. The first stage of the AMU P-Op Issue pipeline receives the PopBusB fields of a p-op from DEC. Fields of interest to AMU on this transfer are AMexecute_2, APGrpValid, SrcAReg|4:0|, SrcBReg|4:0|, DestReg|4:0|, OperSpec|2:0|, and Opcode|7:0|. These p-op fields are sufficient to allow AMU to determine the operation to be performed, locate source operands, and specify the destination register. This stage occurs in processor Phase 1.

The second stage of the pipeline receives the PopBusC fields of a p-op from DEC. Fields of interest to AMU are on this transfer are Imm8[7:0], ImmDispHi[15:0], and ImmDispLo[15:0]. Also in this stage, the PopBusB fields (except AMexecute_2, APGrpValid) are stored into a 16-entry register file (AMPQB). The AMPQ uses read and write pointers in the same manner as the APQ described in the section on the AP P-Op Issue pipeline.

The third stage of the pipeline stores the PopBusC fields into a second 16-entry register file (AMPQC). Also in this pipeline stage, the AMexecute_2 and APGrpValid PopBusB signals are examined to determine if a valid p-op has been received that needs to be processed by AMU. If so, a write pointer is incremented to point at the next AMPQB/AMPQC location. If not, the write pointer will not be advanced, and on the next cycle the same AMPQ location will again be written.

Like APQ, the AMPQ provides a bypass for the case where the queue is empty (read and write pointers are equal). AMPQ also has a unique behavior in that when DEC determines that one or more p-ops must be aborted, AMPQ sets its read and write pointer equal to one another. This is done without regard to whether any or all of the p-ops enqueued in AMPQ would have been aborted had PopTag comparisons been performed. This is acceptable because AMU is an accelerator for general register modifications, and is not responsible for permanently modifying the register values. The IEU will eventually perform the calculation and update both the AP and IEU register files (possibly overwriting a value in the AP register file which has been computed earlier by AMU).

III.C.2 Add/Move Unit Execute Pipeline

The first stage (AMPQB Read) of the AMU Execute pipeline reads a p-op from the AMPQB register file. This is done in PH1, concurrent with a possible PopBusB p-op issue by DEC. At the end of the AMPQ Read stage, either the AMPQB p-op or the new PopBusB p-op is selected for use in the following AMU Decode Stage, depending upon whether AMPQ is empty. This stage operates in processor Phase 1.

The second stage (AMU Decode) accepts the PopBusB collection of p-op fields and decodes them to generate control signals required to format the ALU input and control the ALU operation in AMU. The SrcAReg and SrcBReg fields are passed to the AP General Register File. The General Register File reads the requested registers using two read ports which are dedicated to AMU. It also compares the register requests against register file write requests to determine if bypasses should be activated for either register.

Also during the second pipeline stage, the AMPQ register file is read to extract any immediate or displacement value required by the p-op.

The second stage receives the SrcA and SrcB register file values from the AP General Register File along with bypass control signals. It also receives 32-bit register result busses from the Address Generation pipeline, the Memory Read pipeline, and the IEU Update pipeline. Near the end of this stage, the SrcA and SrcB Selector logic chooses the appropriate pair of operands for presentation to the AMU ALU.

Finally, during the second stage the DestReg physical register number is sent to the AP General Register File along with a request to write that register. Since the AMU does not have a dedicated write port, the General Register File performs a Resource Interlock check on each of two other write ports that are shared between AMU and other sources (mentioned above). If both of these ports are being used by the other pipelines, AMU is stalled for a cycle and the AMPQ read pointer is not advanced.

During the third stage (AMU Execute), the outputs of the SrcA and SrcB Selectors are presented to the ALU. The ALU performs addition (and increment), subtraction (and decrement), transfer SrcA, transfer SrcB, logical AND, logical OR, etc. Following the ALU is a result merge function for the case where only 16 bits of one of SrcA/SrcB are being modified. At the end of this pipeline stage, the merged results of the ALU are written directly into the DestReg General Register File location.

Since the AMU result value is available just in time to complete the General Register File write, and since in the very next processor phase the value is available on the read ports, no bypass paths are provided from the AMU result bus to other pipelines.

All operations performed by AMU are also performed independently by IEU; updating the private copy of the general purpose registers in IEU (the AMU register writes only affect the AP copy of the general purpose registers). These IEU results are also written into the AP general purpose register file. Since the AMU executions every instruction sent to it, even if the destination register valid bit is already set, it is possible for AMU to execute an instruction IEU has already executed. This superfluous operation is harmless and results in some logic reduction.

When the Add/Move Control block receives an abort indication from DEC, it sets the input queue write pointer to the value of the read pointer. This has the side affect of indicating there are no internal instructions in the queue. Queued operations which are not aborted are thereby abandoned (AMU execution of an operation is optional). Any operation in progress is allowed to complete: the destination register will become valid. If the operation allowed to complete was not aborted, then validating the destination register is clearly correct. If the operation allowed to complete was aborted, then marking the destination register valid is harmless, since it will not be referred to as a source until it has been used in issue as a destination again, which will reset the valid bit. No exceptions are detected by AMU. Thus the AMU sends no termination back to DEC.

III.D Dual EIP Unit (DEU)

For more information about the DEU, see the copending application cited above.

III.E Integer Execution Unit (IEU)

The IEU was described in detail in the '126 patent. IEU contains a collection of pipelines for receiving operands from AP and/or MCS, for receiving p-ops from DEC, for executing p-ops, for sending results to AP and/or MCS, and for sending terminations to DEC. These pipelines are similar in nature to those described in the execution units above.

III.F Numeric Processor (NP)

NP_PIPE Document:

The NP functional unit is responsible for processing all floating point x86 instructions. NP functions as an independent numeric processing unit, similar to IEU. This allows concurrent processing of integer and floating point operations. NP maintains various x87 programmer visible machine state, including the Control Word, Status Word, and Tag Word, as well as an 8 register stack for storage and processing of floating point operands. The 8 register stack locations are renamed similar to the general purpose and segment registers in the integer units.

Overall execution of instructions in the NP pipelines is controlled by the Instruction State Machine (ISM) described later in this document. All pipelines in NP interact with the ISM either directly or indirectly.

NP contains 6 pipelines. The NP.Pop pipeline receives P-Ops from DEC and stores decoded information into the NP.PopRam register file. The NP.MemoryRead pipeline loads data from the NP data bus into the appropriate internal register. Conversely, the NP.DataWrite pipeline writes data to the NP data bus from an internal register. The NP.MX pipeline reads P-Ops from the NP.PopRam register file and executes them in microcode. The NP.Term pipeline terminates P-Ops in order in NP. The NP.Out pipeline is used to emulate the IBM error handling mechanism used on all IBM compatible PCs. These pipelines contain inter-dependencies described later in this document.

Instruction State Machine (ISM)

Figure 35:
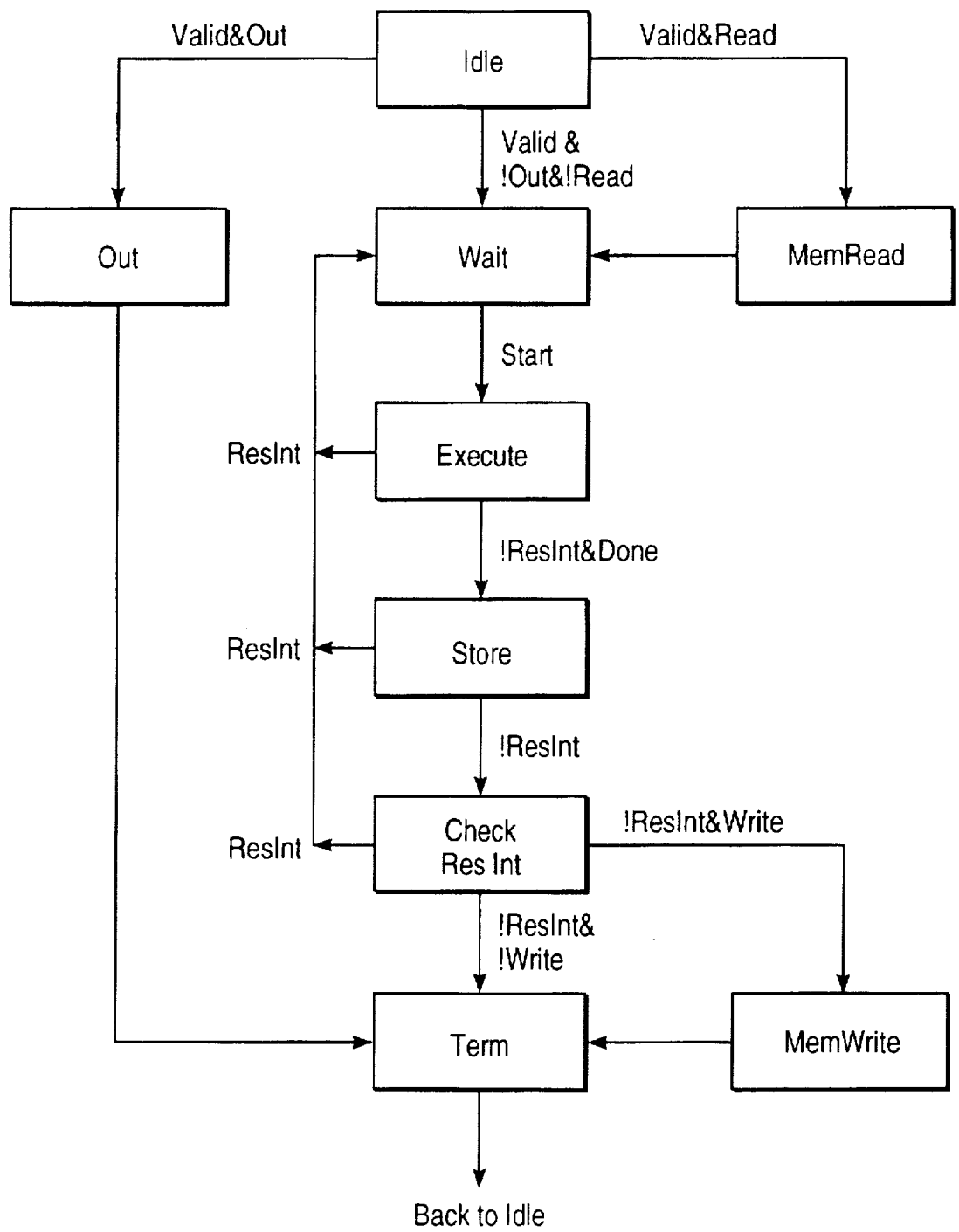
FIG. 35 is a state diagram of the NP's Instruction State Machine (ISM)

Sixteen identical state machines, one for each of the sixteen p-op tags, track the state of the corresponding p-op within NP. This allows each P-Op to be processed independently of each other. The ISM is linked closely with the NP.MX pipeline described below. See FIG. 35.

There are a total of 9 states in each of the 16 ISMs; each state is represented by a single bit. Thus, there are 9 16 bit wide vectors representing the entire state across the 16 state machines.

For example, the Idle states for all 16 p-ops are represented as a 16 bit wide vector. A single 1 in any particular bit location indicates the corresponding P-Op is in the Idle state. Thus the condition where there are no P-Ops active in NP would result in the vector Idle=1111 1111 1111 1111. P-Ops active in NP would result in a zero in the corresponding P-Op tag location. When 3 P-Ops are active in NP, the Idle vector would contain 3 zeros whose bit locations match the P-Op tags of the 3 active P-Ops.

The 9 states in ISM are Idle, MemRead, Wait, Execute, Store, CheckResInt, MemWrite, and Term. These states are briefly described below.

Idle: This state indicates the P-Op is not active in NP. When a P-Op has reached the NP.Pop.Store stage a valid bit is asserted; this allows the corresponding ISM to leave the Idle state.

MemRead: This state indicates that the P-Op is waiting to read data from the NP data bus.

Wait: This state indicates that the P-Op is waiting to be executed by microcode when the resources become available.

Execute: This state indicates that microcode is executing the P-Op.

Store: This state indicates that microcode is storing results to the destination registers.

CheckResInt: This state indicates the result interrupt hardware is checking for result interrupts.

MemWrite: This state indicates that the P-Op is waiting to write data to the NP data bus.

Term: This state indicates that the P-Op is waiting to be indicated as terminated to DEC.

Out: This state is used exclusively by the NP.Out pipeline for emulating IBM style error handling.

NP.PopRam register file

The NP.PopRam register file is a 16 location storage array containing decoded information regarding a particular P-Op to be executed as well as the corresponding virtual to physical register mapping information. This register file has a single read and a single write port. It allows dynamic pipeline scheduling of the NP.MX pipeline which depends on NP.Pop.Store pipeline stage information.

NP.Pop pipeline (Pop Issued)

Figure 36:
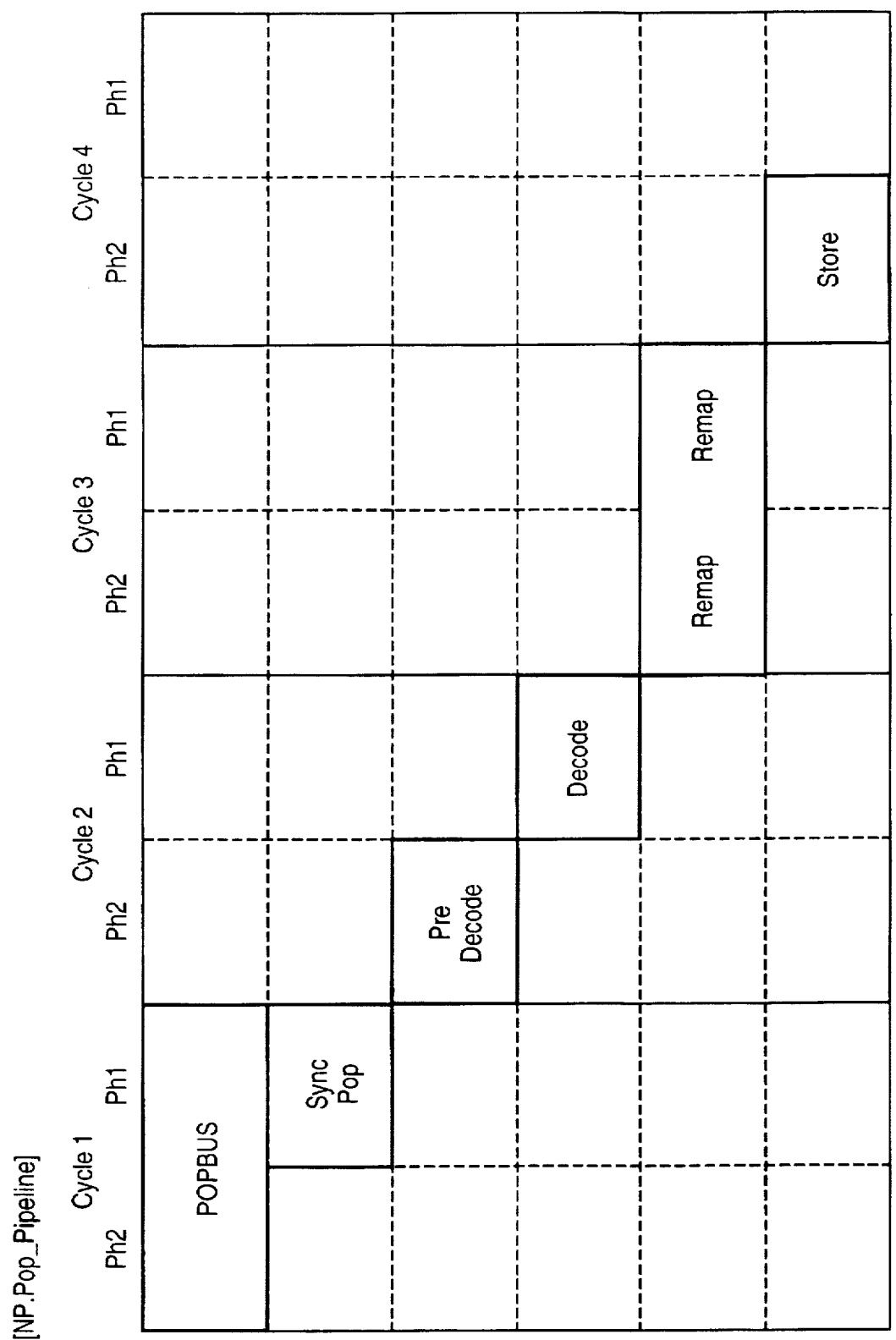
FIG. 36 is a timing diagram of the NP's P-op pipeline.

NP receives P-Ops from DEC via POPBUS. The P-Ops are queued by NP into a register file (NP.PopRam) in order to support dynamic scheduling. This pipeline is similar to the other p-op queues in F86. See FIG. 36.

The external bus, POPBUS, changes during Ph2 and is internally synchronized to Ph1. This occurs in the SyncPop stage.

After synchronization, the P-Op is pre-decoded in the PreDecode stage to determine whether the P-Op is a NULL type. This information is used to update the internal P-Op tag counter.

The Decode stage decodes the P-Op into a set of internally used signals controlling various portions of hardware such as register renaming, stack pointer control, and P-op specific information.

The Pop.Remap stage assigns the next free physical register to the virtual destination register (one of the eight programmer visible floating point stack locations) and passes this assignment to the next stage. This mechanism is similar to the general purpose and segment register renaming implemented in the DEC BackEnd.

The Pop.Store stage stores decode, register renaming, and other information from the previous stages into the NP.PopRam register file and sets a valid bit to be read later by the NP.MX pipeline.

NP.MX pipeline (Microcode Execution)

Figure 37:
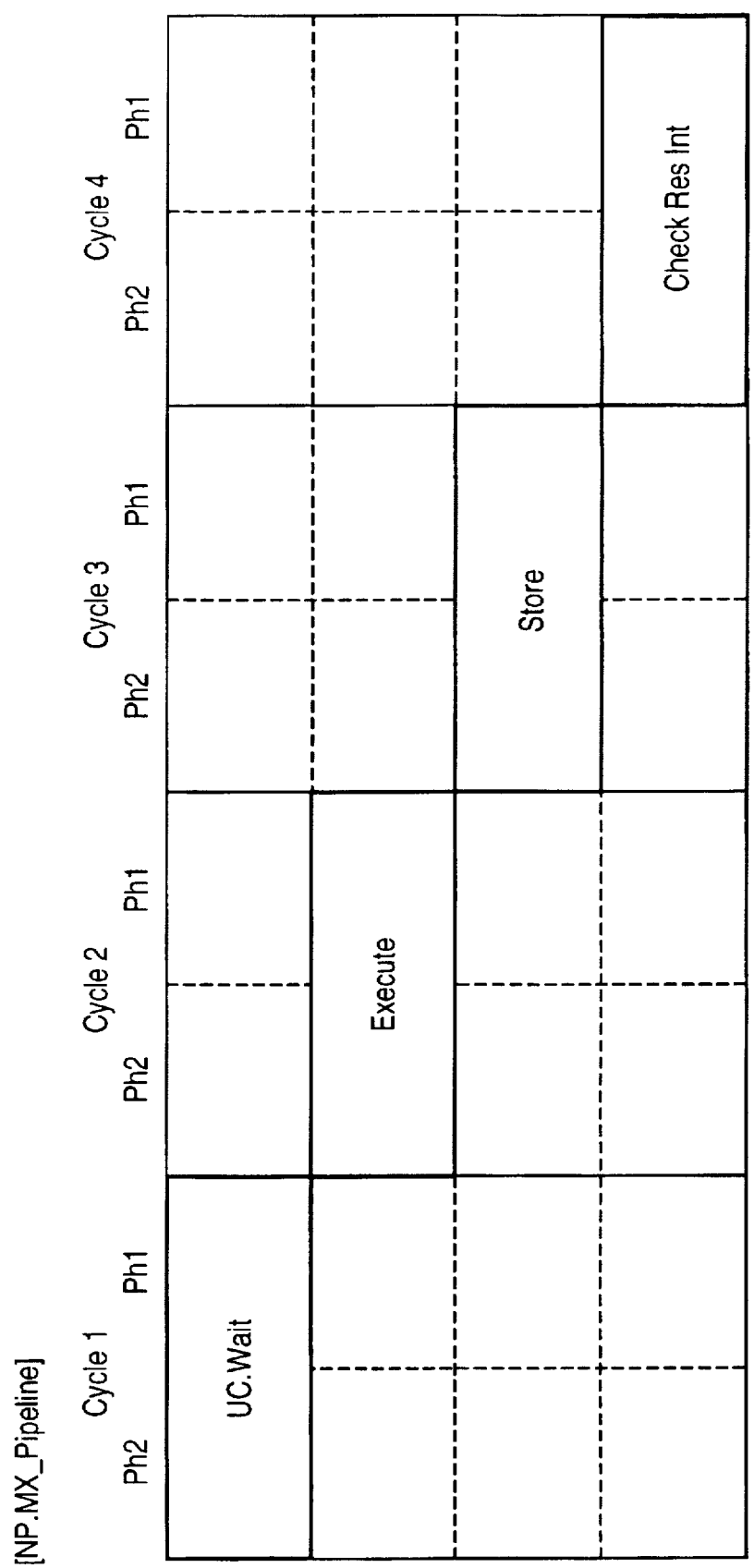
FIG. 37 is a timing diagram of the NP's MX pipeline.

All floating point P-Ops are executed one at a time, in the order received, without overlapping by microcode. To accomplish this the NP.MX pipeline is responsible for fetching the next P-Op to be executed and issuing it to microcode. The NP.MX dynamically schedules itself by reading the NP.PopRam register file independently of the NP.Pop pipeline. See FIG. 37.

The UCWait stage (microcode pending) represents a holding stage for P-Ops pending execution by microcode. These P-Ops are read in order and executed one at a time. The valid bit set by the completion of the Pop.Store stage for a given P-Op indicates the P-Op is awaiting microcode resources. This 16 bit vector stored in the NP.PopRam register file is scanned by a carry look ahead block to determine the next oldest P-Op to execute.

Microcode starts processing the P-Op starting from the microcode address entry point decoded by the NP.Pop pipeline. Microcode indicates this event by advancing the NP.MX pipeline to the Execute stage. The NP.MX pipeline stalls the folowing P-Op at the UCWait stage until the microcode pipeline resources are available to start processing the corresponding P-Op. Thus, the microcode Execute stage is a resource interlock and stalls the previous pipeline stage via recirculating latches until available. In addition, the Execute stage stalls for a given P-Op until the P-Op has completed execution (this takes at least two cycles, and for transcendental F86 P-Ops may require more than 100 cycles).

Once execution is completed for a P-Op, the microcode resource is available and the P-Op in the MX.Execute stage of the pipeline advances to the MX.Store stage. Since microcode is available, the next younger P-Op marked valid in the NP.PopRam register file (previously stalled in the MX.UCWait stage) can advance to the Execute stage. During the MX.Store stage permanent changes are written to the destination physical registers.

The CheckResInt stage allows for the processing of result interrupts generated by microcode. Result interrupts are taken when microcode detects special results, such as zero, requiring additional processing. When a result interrupt is taken, the ISM for every P-Op takes note of this by resetting its state back to ISM.Wait if is in any of the three states ISM.Execute, ISM.Store, or ISM.CheckResInt. As noted in the description of the ISM, this effectively resets the pipeline back to the MX.UCWait stage. The P-Op previously receiving the result interrupt is then processed again by microcode, except this time with a new entry point determined by the result interrupt hardware.

The first cycle in the MX.Execute stage is guaranteed to never make permanent state changes. A result interrupt is always detected in the first cycle of the MX.Execute stage. This allows the result interrupt mechanism to reset the pipeline back to the MX.UCWait stage, since the result interrupt will always occur before microcode can permanently change register values.

NP.MemoryRead pipeline

This pipeline is similar to other data read pipelines existing in other functional units in F86. The NP memory read pipeline allows NP to read data from the NP data bus independently of processing other p-ops. The pipeline starts when the ISM for a P-Op enters the MemRead state. Data is read in order and the data bus hardware resource is locked up until it completes. Once the read is complete, another memory read or write can be performed. A dependency exists in the UCWait stage of the NP.MX pipeline for P-Ops which go through the NP.MemoryRead pipeline.

NP.DataWrite pipeline

This pipeline is similar to other data write pipelines existing in other functional units in F86. It allows NP to write data to the NP data bus and decouples this operation from other processes not dependent on the write. The pipeline starts when the ISM for a P-Op enters the MemWrite state. Data is written in order and the data bus hardware resource is locked up until it completes. Once the write is complete, another memory read or write can be performed. A dependency exists in the UCWait stage of the NP.MX pipeline for P-Ops which go through the NP.DataWrite pipeline.

NP.Term pipeline

This pipeline is similar to termination pipelines existing in other functional units in F86. The NP.Term pipeline allows NP to terminate P-Ops in order as soon as NP is able to. NP must terminate P-Ops in the same order as they are received. P-Op processing for two given P-Ops may reach the Term state out of order with respect to the issue order of the two P-Ops. The required in order termination is implemented as a dependency of younger P-Op terminations on completion of older P-Op terminations; this stalls the processing of the younger P-Ops appropriately.

For example, the P-Op FNOP can reach the Term state in the ISM before an FSTSW which was issued earlier if the FSTSW is still waiting to write onto the data bus. In this case, the FNOP termination must be-held up until the FSTSW has written on the data bus and finally gets terminated. Once FSTSW is terminated, the pipeline can go ahead and terminate the FNOP.

NP.Out pipeline

The floating point error handling protocol implemented on an IBM standard personal computer requires recognition of the error condition, signalling the error to an external interrupt controller, and preventing further floating point x86 instruction execution until an output port write to 0xF0 and 0xF1 occurs.

The NP.Out pipeline implements the NP processing required for this function. This includes, but is not limited to: reporting an abnormal termination to the DEC.Term pipeline for the floating point x86 instruction following the one generating the error, signalling a pending interrupt when this following x86 instruction is retired, scanning for output port writes to I/O addresses 0xF0 and 0xF1, and resetting internal state upon receipt of these writes. The NP.Out pipeline also controls the other pipelines in NP to prevent further execution of floating point x86 instructions from the time the error on the first x86 instruction is detected through the time of the writes to 0xF0 and 0xF1.

III.G MCS—Memory and Cache Subsystem

MCS's primary responsibility is to return operand and code data to the execution units and to store data to memory. It contains independent instruction (IC) and data (DC) first level caches, and controls the interface to a unified second level cache (L2) and to the system bus (NX).

The MCS consists of eleven independent pipelines. The inputs and outputs to the pipelines are placed on several input and output busses. There are three major input busses connecting the execution unit to MCS. These busses are PADR, which provides read and write data addresses as well as Instruction Fetch Stream addresses, DX, which provides write data, and IFREQ, which requests data for one of the three Ifetch streams.

The PADR bus includes both address and control fields relating to the address. The PADR control fields describes the type of address, (read, write, I/O reference, Instruction Stream Update, Interrupt Acknowledge, or Halt/Shutdown), and other related information, such as operand length, instruction tag, etc. Valid PADR address are written into one of the three address queues on MCS: Read queue (RQ), Write queue (WQ), and Instruction Stream Address Register (ISAR) Queue. The read and write queues provide a mechanism to hold off additional PADR entries if they become full by stalling the Address Generation Pipeline within AP|. The-ISAR queue entries are simply overwritten by the most recent stream update.

There are three possible sources for DX data—it can either be received from the Register and TLB Stages of the Address Generation pipeline in AP, the DX output pipeline in IEU or the Mem Write Pipeline in NP on chip. In any case, the DX data is written into a queue (DXQ) where it is held until it can be matched with the appropriate address, and written into the write queue.

There are three output busses from MCS to the F86 execution units. These busses are DIO, which is used to return read data to AP, IEU, and Floating point Execution units, IFData, which is used to return ifetch data to DEC, and MCS_PADR, which is provided to the BPC for the cache coherency.

As mentioned earlier, MCS is composed of eleven independent pipelines. The source and destination points of these pipelines have just been identified. Most of these pipelines and their interactions with the pipelines of other execution units in the processor will be described in more detail in this document. The following summary includes both pipelines which will be described in detail later in this document and also pipelines within MCS which are not fully described:

1) PADR Pipeline (PADR →WQ, RQ, ISAR, DXQ ): The PADR pipeline accepts PADR data from either AP or DEC and writes it to one or more of the destinations: read queue, write queue, ifetch queue, data queue.

2) DX Pipeline (DX →DXQ): The DX pipeline accepts DX data from either AP/IEU or NPDATA (floating point write data). It stores the write data into a write queue, indexed by tag.

3) DXQ Pipeline (DXQ →WQ): The DXQ pipeline waits for a valid write address to arrive from PADR and then writes data into the appropriate WQ entry.

4) Ifetch Pipeline (IFREQ →IFData): The Ifetch Request pipeline accepts Ifetch requests from DEC, and attempts to return ifetch data and its associated termination status (IFTRM).

5) Ifetch Miss Pipeline: The Ifetch Miss Pipeline initiates a replacement of L2 Ifetch data into the ICache.

6) Read Queue Pipeline (RQ →DIO): The read queue pipeline returns read data from Dcache, or the write pipeline. If a read address fails to hit on the cache or the write pipeline, it is loaded into the Read miss register (R1).

7) Read Miss Pipeline (R1 →DIO): The read miss pipeline returns read data from L2 or system bus.

8) Write Queue Pipeline (WQ →DC, L2): The write queue pipeline writes data to both the dcache and level 2 cache.

9) The Prefetch Pipeline: The Prefetch Pipeline handles level two to level one replacements, after they are initiated-by the Read or Ifetch Miss Pipelines.

10) The System Bus Pipeline: The System Bus Pipeline handles system bus to level two replacements and level two writebacks to system bus.

11) The L2 Pipeline: The L2 pipeline provides resources for other MCS pipelines which require access to Level 2 Cache.

III.G.1 MCS Padr Pipeline

Figure 38:
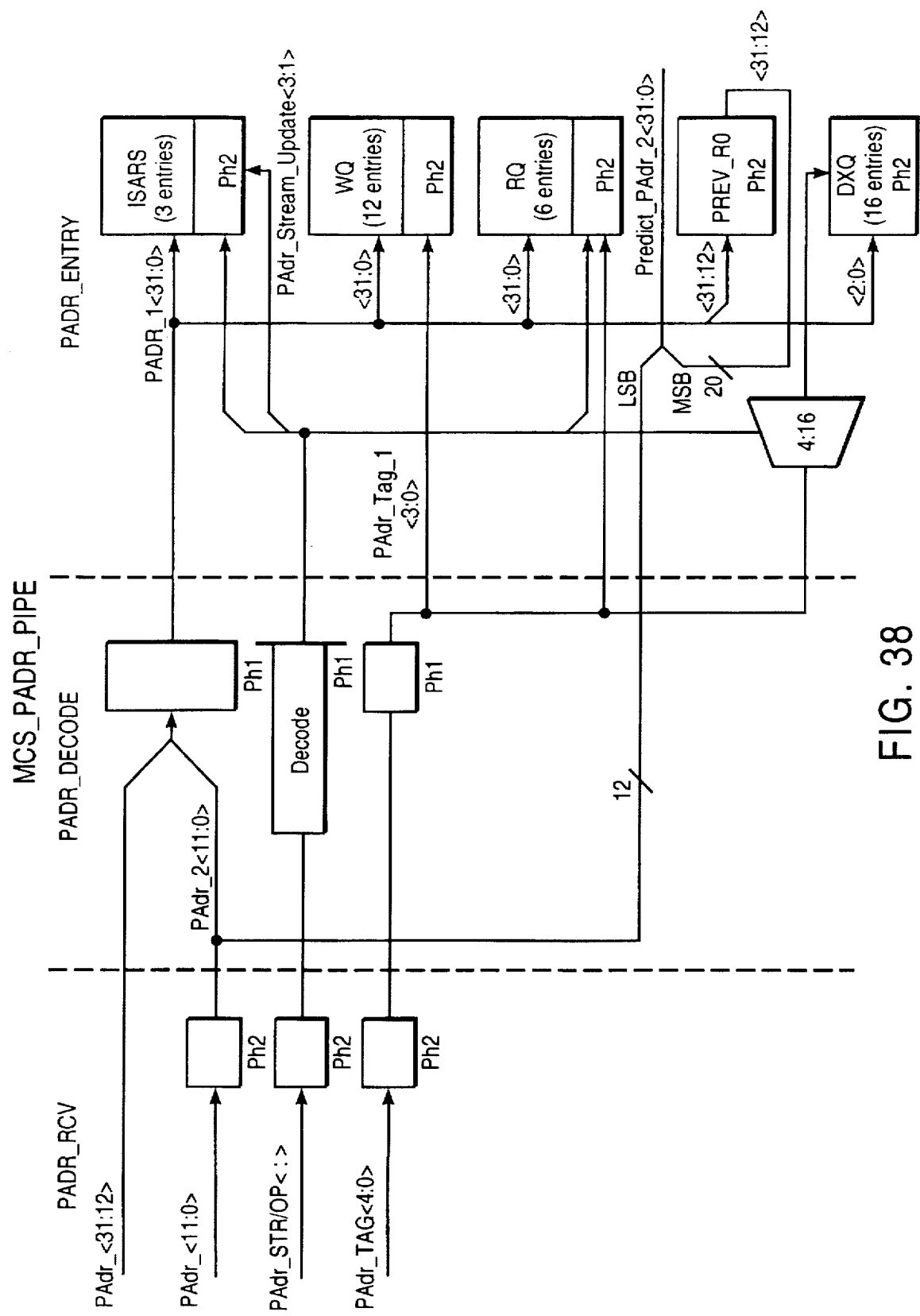
FIG. 38 is a structural diagram of the MCS's PAdr pipeline.

FIG. 38 shows a three stage pipeline. The first stage of the pipeline, PADR_RCV, receives the Physical Page Offset portion of the address (11...0) of the address and the control fields associated with the address. The Page Offset of the PADR address is available one phase before the Physical Page Frame address (31...12) because it does not have to undergo a TLB translation when paging is turned on.

Most of the control fields associated with the PADR address are sent on the same phase as the Physical Page Offset address. The major control fields received during PADR_RCV are operand length, p-op tag, PADR stream, and PADR Operation and stream/op. The PADR stream and operation in particular contains a great deal of information including operation type (I/O, read, rmw, intack, stream update, etc...) and other control bits particular to certain types of operations (locks, interlocks, stream update selection, etc...) However, the control information encoded in these fields must be decoded before it can be used by MCS. The PADR page offset address and its associated control arrives at the end of PH2, and latched in PH2 latches.

During the second stage of the pipeline, PADR_ DECODE, the PADR Stream and Operation fields are decoded to generate all of the MCS specific control fields necessary for writing the PADR entry into one or more of the various queues. In addition to generating the write enables for the some of queues, the PADR decoder creates the control fields specific to each of the destination queues. The decoded control information will be latched along with the address into the appropriate queues, as needed.

The physical page frame address <31...12> and the PADR valid bit arrive late during the PADR_DECODE phase and are latched in PH1 latches.

In the third stage of the pipeline, PADR_WR_ENTRY, the 32-bit PADR_ADDR_1 bus and the decoded control are written into one or more of the queues WQ, RQ, ISAR, and DXQ. Each field of the decoded information is written to one or more of the destination pipes in MCS, as needed. Writes are written into the write-queue (WQ) and Write Data Queue (DXQ). Reads are written into the read Queue (RQ). Instruction stream updates are written into the Instruction Stream Registers (ISARS). Also during this stage, the PADR physical page frame address that was latched on the previous cycle, is compared against some page-based cacheability registers described in the following paragraph in order to determine page cacheability status. The Page based cacheability registers in MCS are loaded by hypercode, and can be programmed to allow certain areas of the physical page frame address to be specified as MMIO, write through, or write protected. This feature of F86paging is described more thoroughly in the hypercode specification. The cacheability status of the current PADR page is derived just in time to be latched along with the other PADR control fields at the end of the PADR_WR_ENTRY phase.

The read queue and write queues are implemented as FIFO circular buffers. When one of the queues becomes full, MCS signals to AP that it may not send any more PADR data until space becomes available in whichever queue is currently full. This creates a stall in the AP Address Generation pipeline which is described more fully in that section.

If the queues are not full, PADR Memory references may create entries in either the read queue, or the write queue, or in the case of read-modify-writes, both queues. The DXQ is always written by PADR data at the same time as the write queue, but the DXQ is organized differently than the write queue. It is organized by the p-op tag rather than as a FIFO, so PADR_TAG is used to index into the DXQ. Furthermore, the DXQ requires only 3-bits of address (for alignment), and a few other control fields. When creating an entry in the write queue, all 32-bits of address and a dozen control bits are required. These control bits include write byte enables, I/O and cachability status (write thru, or noncachable page data) information.

In the current implementation, MCS's Read Queue has six entries and the write queue has twelve entries. Ifetch update addresses are written into whichever one of the three ISAR registers, was specified by the PADR control field. The ISAR registers can be overwritten at any time, in any order so there is no case to consider of the ISAR register being full.

In the case of misaligned memory references, PADR will send two PADR addresses, and two entries must be created in either the read queue or write queues. The control information for misaligned entries designates whether an entry is the first or last entry of a misaligned reference. There is no concept as a misaligned Ifetch stream, since code alignment is handled entirely within DEC.

In addition to writing one of the queues described above, PADR Page Frame Address may be written into the PREV_ R0 Register. This register holds the most recent valid PADR write address. The PREV_R0 address is described in further detail in the Read Queue Pipeline Section.

III.G.2 MCS DX Write Data Pipeline

Figure 39:
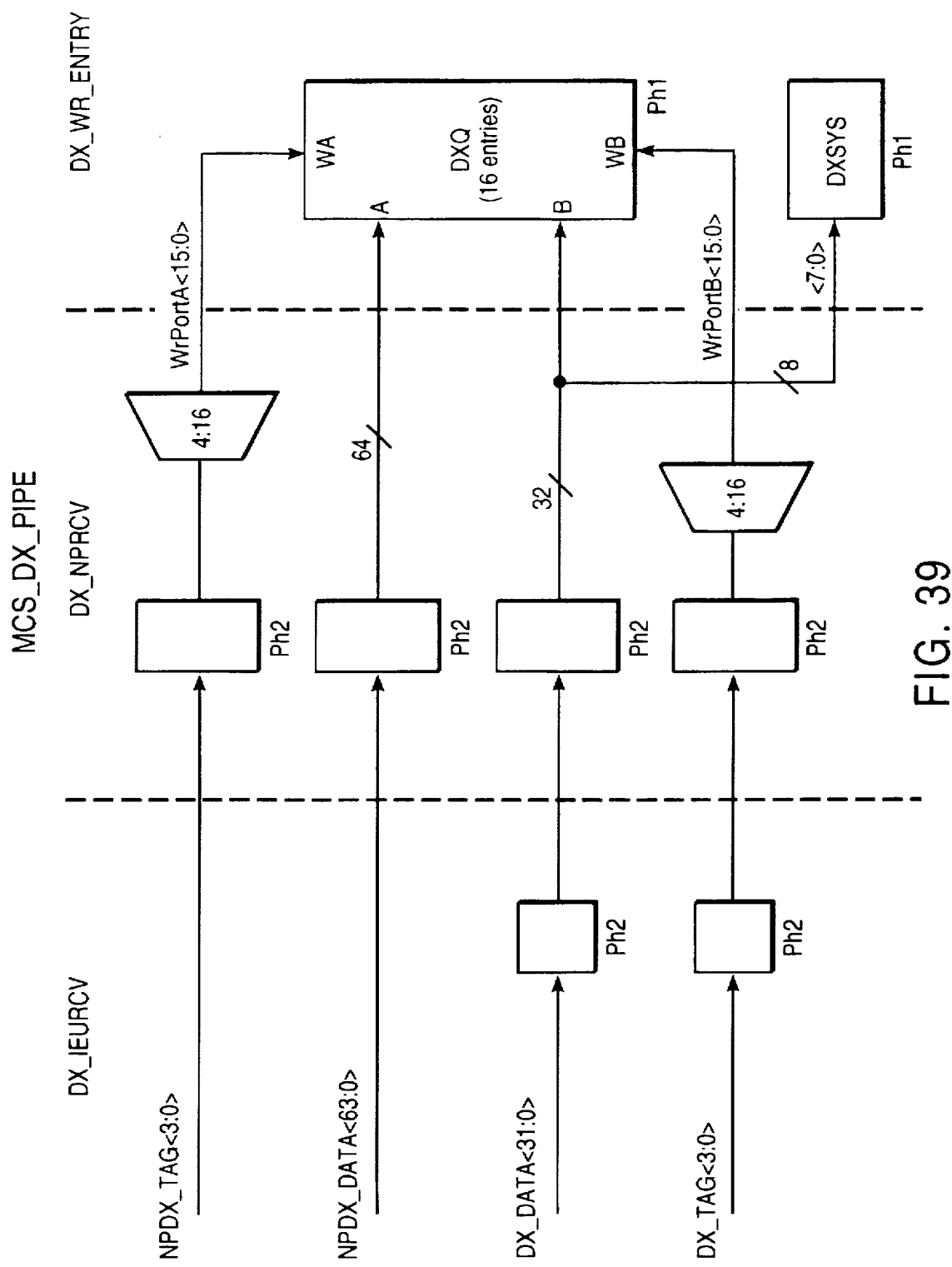
FIG. 39 is a structural diagram of the MCS's DX pipeline.

FIG. 39 shows a three stage pipeline. The-DX pipeline receives write data from three sources, the Register and TLB Stages of the Address Generation pipeline in AP, the DX output pipeline in IEU, and the Mem Write pipeline in NP. Since each write operation may be either integer or floating point, but not both, the 16 entry DXQ register file stores data from either source. The DXQ is organized by p-op tag, so that the write data is written into whatever entry in the write queue is designated by its p-op tag. There is no way to hold off DX data if it the appropriate DXQ entry is full, so MCS must take care to remove old DXQ entries in before a new write to the same tag can be issued. This is an important issue for the DXQ, (and it will be discussed in the following DXQ pipeline section) but it does not affect the writing of DX data into DXQ register file. There is no mechanism in F86 for stalling the DX data coming from any of the execution pipelines.

The creation of write queue entries is a straight forward process of writing data received from the execution units into the DXQ location specified by the DX tag field. It is impossible for NP and IEU/AP writes to share a p-op tag, so they may not overwrite each other's data. On the other hand, DX Data may be received from both NP and IEU/AP buses simultaneously, so the two write sources cannot be combined. The DXQ is therefore implemented as a 2-write port, 1-read port register file.

The only irregularity in the DXQ has to do with system write data. System writes are generated by AP's Address Generation Pipeline as a result of paging operatings. They are not associated with instructions issued by DEC, and therefore, their p-op tag values are not unique, and cannot be used to index into DXQ. Because of the way that MCS schedules system writes however, it is possible to guarantee that only one system write can be outstanding at a time.

AP is guaranteed to only have one system write outstanding at a time because system reads and writes are done in order, and all system writes occur as part of read-modify-write sequences. The read of RMW #2 is unable to return data to AP before the write of RMW #1 has been completed.

System writes are guaranteed to be only one byte (and therefore cannot be misaligned). Because of these restrictions, a single system write register is provided in the DXQ to store system write data. Throughout all MCS pipelines, system writes are treated as special cases and are not stored in the write queue along with the all other writes.

The first stage of the DX pipeline is DX_IEURCV. This stage latches DX data (32-bits), tag and control from the AP/IEU execution units. The data is held here in order to Align it with data arriving one phase later, from NP.

The second stage of the DX pipeline is DX_NPRCV. This stage latches DX data (64-bits), p-op tag and control from the NP execution unit. Also during this stage, the p-op tag control field is decoded to become the DXQ write data write pointer. In the case of system write data, the system write latch enable is selected rather than the DXQ write pointer enable.

The data is actually written to the DXQ register file (or the one byte system data register) during the PH1 DX_WR_ENTRY phase. When data is written into a DXQ entry, an associated "data valid" bit is set for that entry. The data valid bit is cleared when the data is read from the DXQ into the write queue.

III.G.3 MCS DXQ Pipeline

The function of the DXQ Write Data Pipeline is to select the oldest entry within the DXQ for which both the PADR address control, and DX data have been written, and write that data into the write queue (WQ). It is the task of the DXQ pipeline to guarantee that the DXQ data entry "n" been successfully written to the write queue by the time the DX data for the subsequent tag "n" arrives from the execution units and needs to reuse that DXQ location. This is necessary because there is no mechanism in F86 for stalling the execution pipelines which supply DX data. To complicate things further for DXQ, it must be assumed that the DX write data can be received from the various execution unit pipelines in any order, and that write data may arrive at MCS entirely asynchronously relative to the address. In other words, DX data for write "n" may arrive before, simultaneously, or after, MCS receives the corresponding write address. Furthermore, the DX data for write "n" from received from IEU may arrive before or after NPDX data "n+1" received from the floating point unit. Also, writes may be retired by the execution units as soon as both address and data are sent to MCS, so DEC is may reissue another write a shortly after MCS receives address or data for a previous write with the same tag.

The upshot of these pipeline control considerations, is that it is critical for the DXQ logic to guarantee that the oldest entry that has received both address and data is selected and written to the write queue on each cycle. There is guaranteed to be a 3 cycle grace period between the time when DXQ receives the oldest outstanding write address or data for tag "n", and the time when the execution units may attempt to reuse that tag. This gives DXQ enough time to keep ahead of DEC, but only if it is careful to always write the oldest possible write data on every cycle.

Figure 40:
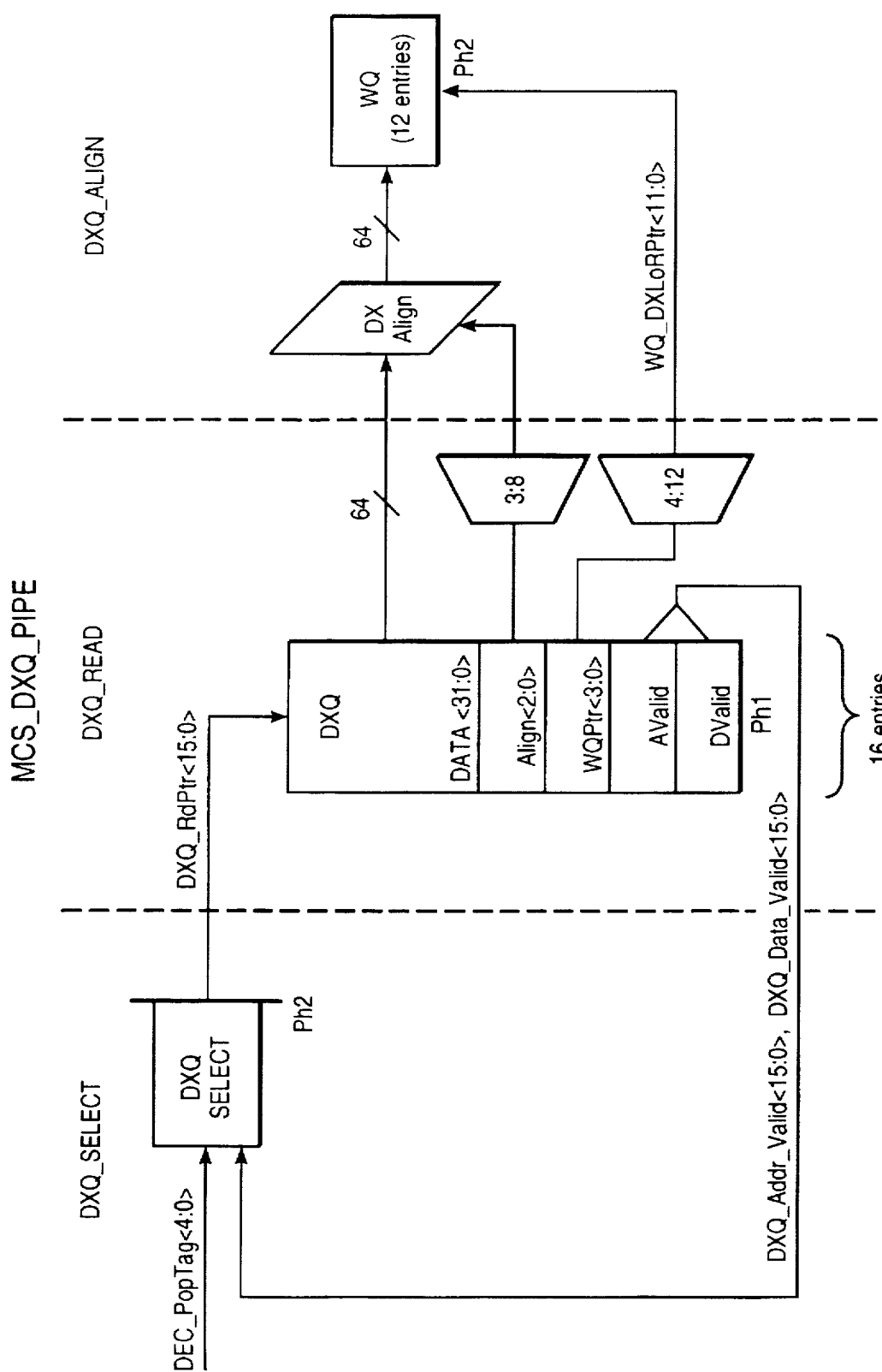
FIG. 40 is a structural diagram of the MCS's DXQ pipeline.

The DXQ pipeline is illustrated in FIG. 40.

In the first stage of the DXQ pipeline, DXQ_READSELECT, a carry chain is used to select the oldest entry in DXQ which has received both the address alignment and control fields (see PADR pipeline), and the DX data (see DX Write Data pipeline). MCS keeps track of the most recent P-OP TAG issued by DEC, and this information is used to initiate the carry chain. During the DXQ_READSELECT PH2 stage, the address valid and data valid bits of each entry of DXQ are examined, searching forward from the current DEC P-OP TAG. A forward search is done so that the "next" entry scheduled to be overrun by DEC can be moved into the Write Queue. Once a DXQ entry is written into the write queue its valid bits are cleared for both PADR and DX related entries.

In the case that DXQ data is associated with a misaligned write address, the second PADR transfers must have occurred before the DXQ will recognize that the address has "arrived" and may become a candidate for writing into the write queue.

In the second stage of the DXQ pipeline, DXQ_READ, the DX data and alignment control field is read from the DXQ tag location selected on the previous phase. In addition to the data, the PADR control information read includes the alignment control (address bits 2:0), and the destination address of the associated write queue entry. These control fields are decoded to produce the DX alignment selects and the Write Queue DX Write pointer respectively.

In the third stage of the DXQ pipeline, DXQ_ALIGN, the DXQ data is actually aligned and written into the write queue. In the case of a misaligned write, the aligned DXQ data is written simultaneously into both entries of the write queue.

III.G.4 MCS Read Queue Pipeline

The MCS Read Queue to DIO pipeline is one of the most complicated pipelines within MCS. It consists of five stages. A brief summary of the overall operation will be given before the individual pipeline stages are discussed. The read pipeline describe in this section deals only with reads that can be returned from either the Dcache or the write pipeline. If a read misses in both the Dcache and write pipelines, it must load the Read Miss register (R1) and attempt to return data from L2. The read miss pipeline is describe in an different section.

Under certain circumstances, a read may hit in the dcache and/or write pipeline, but it may be disallowed from returning data. In these cases, such as in the case of a misaligned reference, or a locked read; the read queue pipeline will "stall" and recirculate the same read address every cycle, until the interlock is resolved. A read may load the read miss register and attempt to return L2 data, only if it is entirely misses both dcache and the write pipeline. Any read which hits on earlier write data that has not been written to cache, and cannot be short circuited, causes a pipeline stall. Most of the stall conditions for reads in the read queue pipeline involve conflicts between the read address and pending writes. For example a read may hit a write in the write queue that has not yet received its, data, or it may hit on a write in the write queue that does not contain all of the bytes required by the read.

The "write pipeline" refered to in this section contains both the twelve entry write queue containing pending writes, but also all L2 pipeline stages involved is processing writes that are currently in progress. Since Dcache is write thru, all writes must write both Dcache and L2. This takes several cycles, so the "write pipeline" that can provide read short circuit data includes both the twelve entry write queue and any L2 and Dcache writes currently in progress. The address registers associated with the entire write pipeline are described in detail in the Write Pipeline Section.

In cases where a read address matches on multiple entries in the write pipeline, a carry chain is used to selected the youngest valid matching write, that is older than the read currently in progress.

Figure 41:
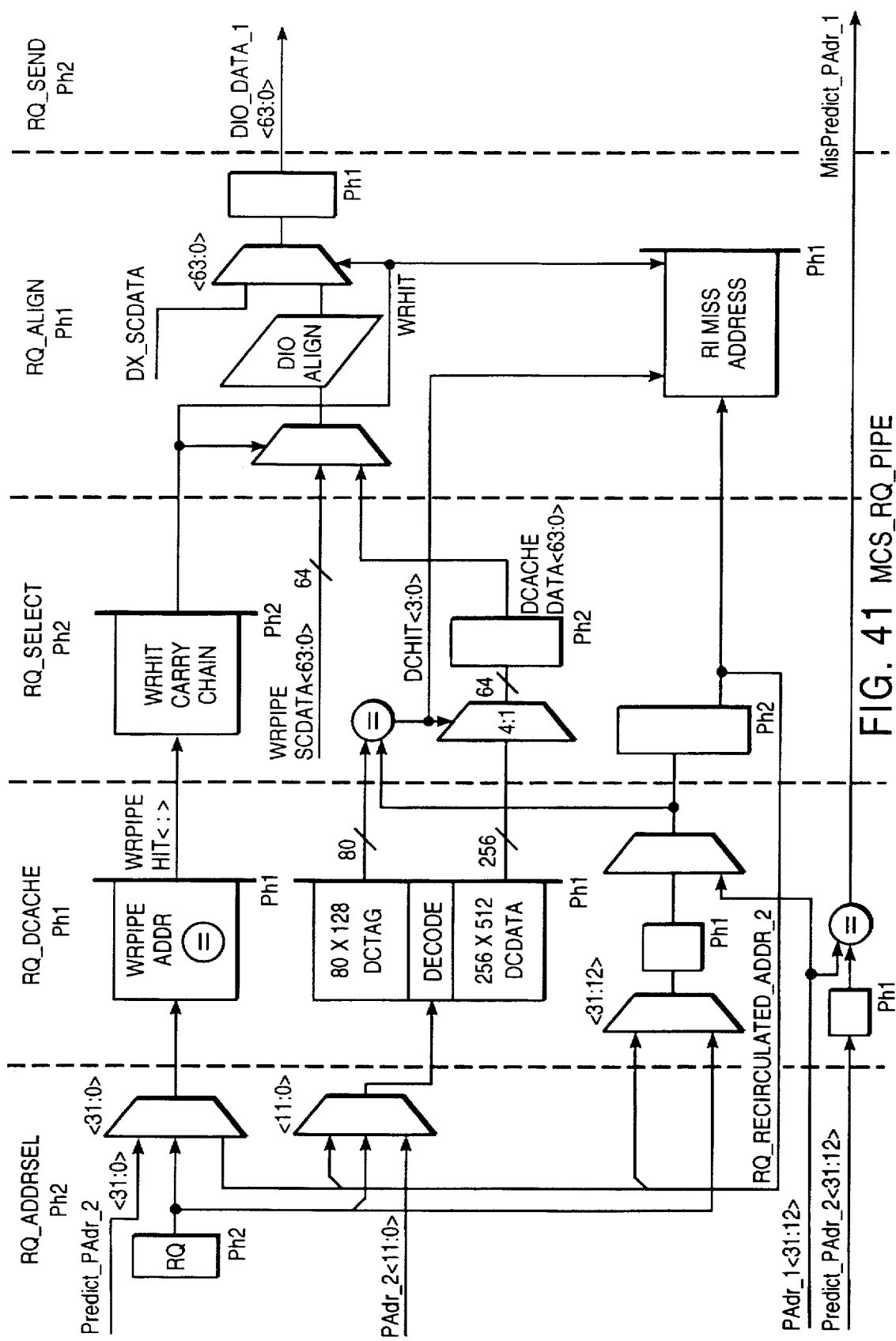
FIG. 41 is a structural diagram of the MCS's RQ pipeline.

The read queue pipeline is illustrated in FIG. 41. The first stage of the read pipeline is referred to as RQ_ADDRSEL. It selects one of three source addresses as the index to read the Dcache data and tags. The three candidate addresses are RQ_Addr: This is the oldest read address in the read queue.

RO_Addr: This is the recirculated dcache read address from the previous cycle. It is reselected in case of a read queue pipeline stall.

PADR_Addr: This is the PADR address currently being written in PADR_DECODE stage of the PADR pipeline. It is selected if there is no stall, and the read queue is empty.

When PADR address is selected to address dcache, it saves a cycle of latency relative to writing the address to the read queue and then reading it back out. This optimization significantly complicates the read queue pipeline because the PADR address must be selected by RQ_ADDRSEL before the PADR control information has been decoded, and before the physical page frame address actually arrives on MCS. At the time the PADR address is selected to access dcache, the PADR bus is not known to be an actual read, or even a valid PADR transfer. Reads that are executed directly off the PADR bus, must therefore re-evaluate their status after the PADR transfer has been completed and be prepared to stall if there are problems.

The fact that the PADR Physical Page Frame address <31. . .12> arrives one phase later than the Physical Page offset is not a problem for addressing the dcache, because the 16K dcache is configured as a four way set associative, so only the lower 12 address bits are needed to address the cache. The index portion of the address corresponds to the early arriving Physical Page Offset PADR_2<11 . . . 3>, and the tag portion corresponds to the later arriving Physical Page Frame address, (bits 31. . .12 only). The tag comparision is not done until the phase after the PADR physical page frame address has arrived.

Although the late arriving Page Frame Address is not a problem for addressing the cache, the full 32 bit physical address is needed early in order to complete the write pipeline address comparisons. There are two possible ways for the read queue pipeline to solve this problem. MCS implements both solutions, and hypercode sets a configuration bit to select the mode. In one mode, only the Offset portion of PADR is compared against the write queue pipeline when the read queue pipeline is processing a read directly from PADR. If there is a match on the Page Offset, the read is stalled, and tried again with the full address on the following cycle. If there is no match on the page offset, the read is allowed to proceed. In the other mode, the PREV_RO register (described in the Padr pipeline section) is used to predict the PADR Page Frame address. Once the actual Page Frame Address arrives, it compares itself to the predicted version and stalls the read if there is a mismatch. Since subsequent reads and writes are often to the same page of memory, the PREV_RO register, which saves the last valid write page address, is a good predictor of the actual PADR page address.

To summarize: the first stage of the read pipeline's task is to select which of three addresses to use to index into the dcache, and to compare against the write queue pipeline. This task is complicated by the difficulties associated with short circuiting PADR read addresses directly from the PADR bus rather than reading them from the read queue. In addition to PADR and read queue addresses, the read queue pipeline may recirculate the previous read address in case of a read queue pipeline "stall". The address selected by the read queue pipeline to address the dcache and compare against the write pipeline can be refered to as the RO address.

The second stage of the read pipeline is RQ_DCACHE. During this phase PH1 stage, data and tags are read from port A of Dcache. Also during this phase, the 32 bit RO address is compared to all "eligible" entries of the write pipeline. A write pipeline entry is eligible to provide short circuit read data if it is older than the read in progress. In the case of multiple write pipeline matches, the youngest entry is selected by way of a carry chain which gives highest priority to the write most recently written to the write queue, which is determined to be "older" than the active read. In order to determine which write queue entries are older than the read in progress, the current read tag is compared against all unretired write queue entries. Only writes which are older than the read are allowed to participate in the short circuit carry chain selection.

The third stage of the read pipeline is RQ_SELECT. During this PH2 select, the tag comparisons are completed and in-case of a dcache hit, dcache output data is selected from the appropriate bank. Also during this cycle, short circuit data is read from the youngest eligible write pipeline entry if there were any valid address matches. By then end of the RQ_SELECT cycle, it has been determined whether any valid data can be read from dcache or the write pipeline, and the appropriate data has been selected. If for any reason, the read must be recirculated (due to a partial match on a write, a misaligned reference, or some other pipeline stall condition), RQ_ADDRSEL stage is informed that it must recirculate the read in progress rather than advancing to a new read from the RQ or PADR bus.

One of the most common reasons for stalling the read pipeline occurs when a read hits on an older write which has not yet received DX data. If this case is detected, the read pipeline assumes the data is on its way and prepares to short circuit the data directly from the DX bus. If the DXtag does not match the tag of the write-queue hit entry, then the DIO valid bit is killed off and RO is recirculated on the following cycle. This short circuit path saves two cycles required to write the data first from DX bus to DXQ, and then from DXQ to the write queue.

One more function of the RQ_ADDRSEL stage is to detect all of the error conditions associated with PADR short circuit reads. By the RQ_ADDRSEL stage, the PADR control has been fully decoded, the PADR Page Frame Address has arrived and compared itself to PREV_RO (if it is being used), and all padr specific match conditions have time to resolve themselves.

To summarize, the tasks of the RQ_Select phase two stage are as follows:

compare dcache tags to RO <31. . .12>, detect dcache hit and select one of four dcache data banks.

complete write pipeline comparison calculations and generate write pipeline short circuit read pointer (if read hit on writes).

in case of PADR read, examine PADR control bits and take approprite action (stall and retry, die off, or procede )

in case of stall due to missing write data, prepare to sc from dx bus.

detect any write pipeline interlock that prevents returning read data immediately, or require read to be retried on the following cycle.

latch DIO VALID bit to be returned to execution unit on the following cycle.

The fourth stage of the read pipeline is RQ_ALIGN. Only reads which have not stalled and recirculated in R0 are active during RQ_ALIGN. A read enters RQ_ALIGN in one of three conditions:

1) It has either read its data from dache or is in the process of reading its data from a short circuit entry in the write queue. In this case, the appropriate read data must be selected from dache or the write pipeline, and the data must be must be aligned and latched to prepare to return DIO data on the following cycle.

2) It has determined that it has hit on the DX bus data and is prepared to short circuit it data from DX. In this case the alignment muxes are bypassed and the aligned DX data is short circuited directly to DIO.

3) It is either a noncacheable read, or it has completely missed both dcache and the write queue, or it is a locked read which is not allowed to read its data from the dcache. In this case the read must write the read miss register R1 during the RQ_ALIGN phase. If the read miss register is unavailable for any reason, the condition is detected early enough to cause subsequent read misses to stall in R0 while waiting to load R1.

III.G.5 MCS Read Miss Pipeline

The read miss pipeline is responsible for doing an L2 tag read, and in case of an L2 hit, reading the data from L2 and returning that data to the DioBus, where it is passed to the Memory Read Pipeline in AP and IEU and to the Data Read Pipeline in NP. In order to accomplish these feats with a minimum of resources it shares a common L2 pipeline with all other MCS L2 Clients. This L2 pipeline is the subject of a co-pending application and has been described in the document Cache Control System, but it will be reviewed here in order to provide the context for understanding the Read Miss Pipeline. The interaction between the Read miss pipeline and the L2 pipeline will be described in detail before an attempt is made to define the specific stages associated with a Read Miss Pipeline L2 Access. Much of the following discussion of the L2 pipeline interface and its relationship to the Read access pipeline is common to all MCS pipelines which require access to L2 Cache.

The shared MCS L2 pipeline allows other pipelines within MCS to assume control over the address and data registers and address comparators associated with L2 access. In addition to the Read Miss Pipeline, these other pipelines include the Ifetch Miss Pipeline, the Write Queue Pipeline, the System Bus Pipeline and the Data Prefetch Pipeline. These pipelines are collectively referred to as L2 clients in this document. They are not all described in detail and have different functions than the Read Miss Pipeline but use L2 resources in a similar manner. As stated previously, this utilization of resources is the subject of a copending patent application.

The L2 pipeline itself does not have any state. It simply sends address and data down a fixed pipeline, and delivers address and data to the L2 Cache and port B of the Level 1 Caches. It cannot stall, and there is very minimal control logic associated with it, other than the arbitration logic. It does provide address comparisons at various stages of the pipeline, but interpretation of the comparison data is left up to the clients. The L2 Clients are also responsible for monitoring and storing L2 tag and status information, and for providing controls for L2 and port B of Level 1 caches.

The read miss pipeline is one of L2's clients. It requests L2, and tells L2 weather to do a tag or data read. It monitors the L2 Tag comparison results and saves L2 status and bank select information. If an L2 to L1 replacement needs to be scheduled it provides the appropriate controls to L1 as well as L2. If the Read Miss Pipeline is granted access to L2 immediately, it provides the address and controls for an L2 reference. If it is not allowed immediate access, it maintains cache coherency by snooping on any L2 activity that may affect its state. A snoop/invalidate for example, may invalidate a line which the read miss state machines thinks it hit. The read miss state machine would detect this activity correct its state. Likewise, the read state machine can obtain cacheable data from the L2 pipeline if the read which returned the data was initiated by another client, such as the write queue pipeline.

Since pipeline snooping activities occur only when the read miss state machine (or other client of interest), is not granted L2, these capabilities are not referred to by the Read Miss Pipeline description which follows. These activities are important for cache coherency, but are not of critical interest for performace optimizations. They are addresssed here to describe the mechanism for maintaining cache coherency among competing L2 clients.

Figure 42:
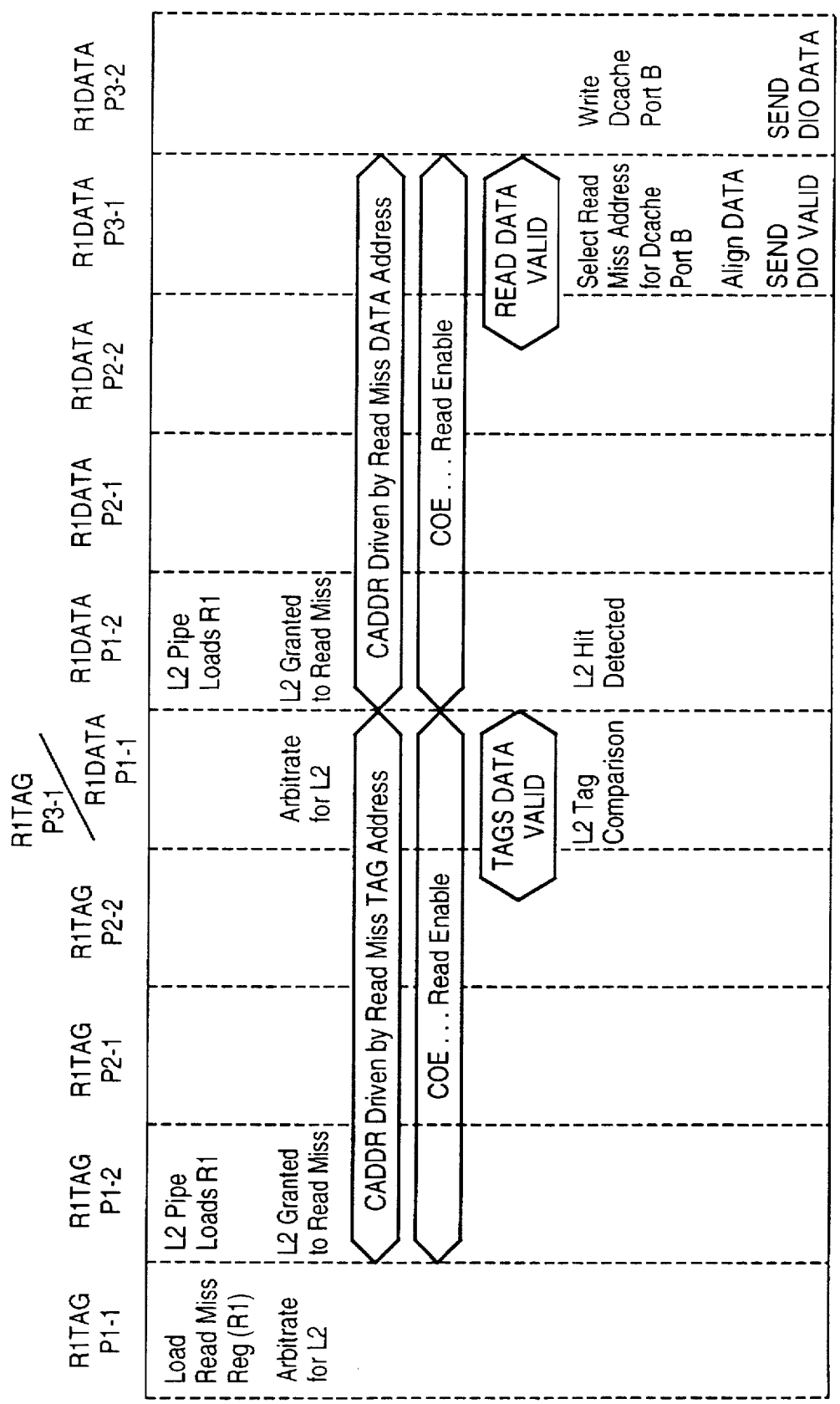
FIG. 42 is a timing diagram of L2 access for the Read Miss pipeline.

MCS's L2 interface requires 2 cpu cycles per L2 access. In addition, the phase prior to L2 access is used to arbitrate among various L2 clients, and the phase after L2 access is used to access port B of the dcache and/or icache for the purpose of doing L2→L1 replacements, or L2 & Dcache data writes. (Dcache is write thru, so all writes go to L2). MCS's internal L2 pipeline is therefore 3 cycles long and allows a new L2 access every 2 cycles. The MCS L2 pipeline stages may be referred to as P1, P2 and P3 throughout this document. FIG. 42 illustrates the level 2 cache timing in the context of the Read Miss Pipeline.

Besides servicing read misses via the R1 pipeline, the Level 2 interface must also service writes, ifetch misses, and L2 write backs and replacements for the system bus interface. Because there are multiple independent pipelines that require access to the Level2 Cache, an arbitration cycle is required to select the highest priority pipeline operation, and mux its address to drive CADDR. The arbitration and mux selection for L2 occurs during the phase P1__1. All pipelines that request Level 2 access must be prepared to stall if they are denied access to L2. In case of a read miss, the Read address is loaded into R1 in the same Phase 1 (P1__1) cycle that it initiates a request for L2 cache. If L2 is granted to the read miss, then R1 assumes control of L2 Cache for the following two cycles. If the read miss is denied access, then the R1 pipeline stalls and continues to request L2 until it is granted access.

If the read miss is granted access to L2 Cache it first performs a tag lookup to determine whether or not the data exists in L2. The tag data arrives in MCS at the beginning of P3__1. Since P1__1 of the following cache access cycle overlaps P3__1 of the previous cycle, the Read Miss pipeline must arbitrate for a data read cycle before the tag hit, or bank select is known. If the read pipeline is granted access to L2, even though a tag miss occurred, it does not do the read, but the L2 pipeline is not granted to any other requesters.

Once the read miss pipeline is granted access to L2 for the data read, the DIO read data can usually be returned 2 cycles later. (There are some irregular conditions, such as misaligned reads, which must merge data from two independent read cycles, but in most cases, L2 read data can be returned immediately.) L2 Read data has a higher priority access to DIO than RQ, (since R1 is always handling an older read), so when R1 is ready to return data to DIO, RO may stall.

Whenever a read is satisfied from L2, it must initiate an L2→L1 replacement, as well as return DIO read data. The read pipeline itself however, is responsible only for writing the first of the four words of a L2→L1 replacement. The other three words are handled by the prefetch pipeline. This prefetch pipeline is also described in a copending patent application. The details of the prefetch operation will not be discussed here, but since the L2→L1 replacement of the first octet done as part of the original read, it is considered part of the Read miss pipeline.

Now that the fundamentals of the L2 pipeline and Read Miss pipeline interface have been discussed, it is possible to desribe the 10 phase pipeline required to return read data from the Level 2 cache. FIG. 42 illustrates a read miss pipeline sequence with no stalls. In this diagram, R1 is granted two subsequent L2 accesses, so R1TAG_P3_1 and R1DATA_P1_1 stages overlap. They can however occur as two independent stages, and so they are are described as such in the text that follows.

In the first stage of the read miss pipeline, R1TAG_P1_1, the read miss address is loaded into the R1 register, and at the same time, arbitrates for access to L2.

If L2 is granted, the R1 address is used to access L2 to do a tag read. In R1TAG_P1_2, the read miss address is driven onto the CADDR bus, cache read enable is asserted, and the read miss address is loaded into the internal MCS cache address pipeline, stage P1_2.

During R1TAG_P2_1, the L2 tag read is in progress. The read miss address proceeds down the L2 address pipeline to stage P2_1. During R1TAG_P2_2, the L2 tag data returns from L2 cache. The read miss address is latched in P2_2, and is buffered passed to the cache tag comparison logic. Without knowing whether or not the address "hit" in L2, R1 requests an L2 read on the following cycle.

During R1TAG_P3_1, the L2 tag/status data is compared with the P2_2 read miss address (P2_ADDR_2<31. . .16>). In case of a cache hit, the L2 bank select is determined and prepares to drive CADDR in the following cycle. In case of an L2 miss, the read miss pipeline kills the L2 Read request in progress and attempts to load SAR, the L2 Read Miss address register.

During R1DATA_P1_1 (same as R1TAG_P3_1 in the diagram), R1 arbitrates for, and is granted L2 access for a data read. The R1 address is selected to drive CADDR on the following cycle.

During R1DATA_P1_2 the R1 address is driven onto the CADDR bus, and the read miss address is again loaded into theinternal MCS cache address pipeline, stage P1_2.

During R1DATA_P2_1, the L2 data read is in progress. The read miss address proceeds down teh L2 address pipeline to stage P2_1. At this point, the read is gaurenteed to succeed. The R1 passes alignment and other control fields to DIO, and is then free to a reload new read miss address. The read can no longer stall, the DIO pipeline is informed that read data is immanent and control switches to auto-pilot.

During R1DATA_P2_2, the read data returns from the L2 cache. During R1DATA_P3_1, the read data is latched in MCS, and then selected and alligned by the DIO logic. The DIO_VALID signal is passed to the execution units. The Read miss address, now in P3_1, is selected to access the dcache port B on the following cycle.

During R1DATA_P3_2, the read data is written to port B of the dcache. The first octet of L2→L1 replacement is complete, DIO Data is returned to the execution unit, and the R1 pipelines work is done.

III.G.6 Ifetch Pipeline

When Dec issues a request (IFREQ), it specifies which one of the three ISARS (Instruction Stream Address Registers) MCS should use to address the A port of the Icache. If the selected address hits in Icache, or if MCS detects that the address is in the process of being read from L2 or the system bus, MCS will return the data on the 64 bit IFDATA bus to DEC. Whenever MCS successfully returns Ifetch data, the Icache address (IQ_ADDR) is incremented and written back to the appropriate ISAR register.

The ISAR based Ifetch mechanism is not allowed to increment across page boundaries. For this reason, only bits <11. . .3> of the ISAR are incremented in case of a successful code fetch. If the ISAR overflows, or is loaded with a potentially corrupt address, MCS will signal EOP (end of page) to DEC and request that the stream be updated by AP. A stream update is considered by MCS to be potentially corrupt if it comes from DEC's PADR Out pipeline, and has a page offset of zero because the address may have overflowed when it was generated by DEC's. MCS will refuse to return data from an overflowed ISAR until it has been updated by AP's Address generation pipeline. The ISAR registers are updated by PADR as described in the PADR Pipeline section.

The function of the Ifetch pipeline is to accept Ifetch Requests from DEC and when possible, to return Ifetch data from the requested ISAR three phases later. Whether or not it is possible to return Ifetch data, the ifetch pipeline must send DEC a termination status on the IFTRM bus to inform DEC the IFetch status. A simplified list of the IFTERM status codes are as follows:

| IFTERM | Ifetch Stream Condition |
|---|---|
| DATA | IFDATA is valid, ISAR for requested stream has been incremented |
| MISS | ISAR for requested stream is known to be an L2 cache Miss. Dec should discontinue requesting down this stream until a GALE is detected. |
| EOP | The ISAR for the requested stream has overflowed or is invalid. This stream must be updated before Ifetching can continue. |
| RETRY | Ifetch was not able to return data for the current stream, but it is not known to be a L2 Cache miss. DEC may continue to request down this stream. |

In case of an Ifetch Miss, the Ifetch request address attempts to load the Ifetch miss address register, I1. The manner in which Ifetch misses are handled by MCS is very similar to that described by the Data Read Miss pipeline, which is described in another section.

Figure 43:
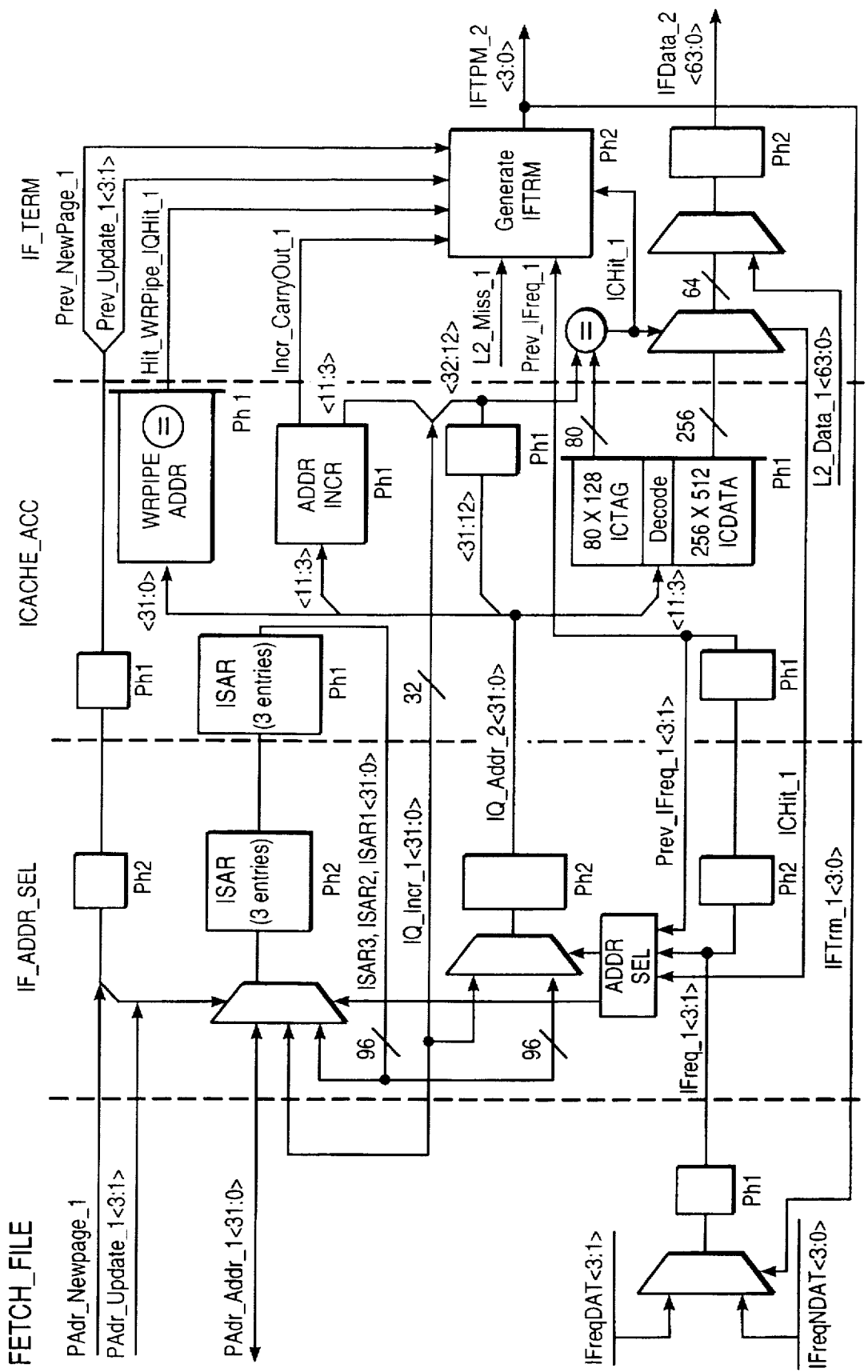
FIG. 43 is a structural diagram of the MCS's IFetch pipeline.

FIG. 43 shows 4 stages in the process of servicing an Ifetch Request.

The first stage of the Ifetch Pipeline is STRM_REQ_RCV. In this Phase 1 stage, MCS receives two versions of the IFREQ Stream, and selects one of them, based on the termination of the previous Ifetch Request. The IFREQ<3. . .1> input indicates an active request down one of the three ISARS. It is possible that DEC may chose not to make any request, in which case no Ifetch stream will be selected, and MCS will terminate as "RETRY".

The second stage of the Ifetch Pipeline is IF_ADDR_SEL. In this phase 2 stage, the IFREQ stream select is used to select which address to use to address port A of the Icache. If the current Ifetch request is for a different stream than the previous request, then the selected ISAR register can be selected directly to address Icache. In the case of two successive requests to the same stream however, the termination of the previous request must be considered. If the previous request was a data "hit", then the incremented IQ address, must be fedback to address ICache. If the previous request failed to return data for any reason however, the ISAR may be reread, since it has not yet been incremented.

If a stream is begin updated by PADR on the same cycle that DEC is making a request, then the Ifetch Pipeline will not be allowed to return data. This condition is detected during the IF_ADDR_SEL stage, and stored until it is time for MCS to return IFTRM status, two phases later.

The isar stream address which is selected during IF_ADDR_SEL is referred to as the IQ address. In addition to being used to address port A of the Icache, it is used to do comparisons against the write pipeline in order to detect writes into the instruction stream. The write pipeline includes both the 12 entry write queue (WQ), and any L2 address pipeline registers that may contain writes currently in progress.

The third stage of the Ifetch Pipeline is ICACHE_ACC. In this phase 1, stage, Tag and Data are read from port A of the Icache. At the same time, the ICache Address <11...3>is incremented, so it will be available to update ISAR, or feedback to Icache address on the following cycle.

Also during this phase the IQ address is compared to all write entries in the write pipeline in order to detect writes into instruction stream. If any such address matches are detected, the ifetch pipeline will not be allowed to return data. Also during the phase, the IQ address is compared to the addresses of valid data that exists in the L2 pipe (described in detail in the read miss pipeline section). If valid ifetch data is in the process of being read from L2 or system bus, it can be short circuited by the ifetch pipeline. This is the mechanism that must be used to return noncacheable ifetch data because the data will never be updated to icache.

The fourth stage of the Ifetch pipeline is called IF_TERM. During this phase 2 stage, Icache tag comparisons are performed, and all other information pertaining to generating the Ifetch Termination status is collected and evaluated. The Icache hit information is used to set select one of 4 Icache data banks to drive Ifdata in case of an Icache hit. Also during this cycle, the Requested ISAR is updated with either the incremented address in the case of a an ifetch "hit", or it is reloaded with the original ISAR value, in case of an ifetch "miss".

The Ifetch Termination is evaluated in this cycle, and it is latched in Phase 2, in order to return to DEC on the following phase. The following equation provides a simplified description of the logic which determine the ifetch termination during this stage. As described above, there are four major terminations (DATAHIT, MISS, EOP, and RETRY). There other variations on the termination involve the return of noncacheable data, and a GALE bit to signal to DEC that data will soon return for a previously issued MISS. This termination description omits these variations.

```
If (there was no request, or dec made a request to
   an invalid stream) then IFterm = retry ;
else if (the requested ISAR overflowed the counter
   last time it was incremented after returning data)
   then IFterm = EOP ;
else if (the requested ISAR was recently loaded from
   DEC with a linear address of "0", indicating that
```

-continued

```
   DEC's own page increment logic may have overflowed)
   then IFterm = EOP ;
else if (the requested ISAR is currently in the
   process of being update) the IFterm = retry ;
else if (the IQ address hit on a write in the write pipeline)
   then IFterm = retry ;
else if (the icache returned ifetch data; or ifetch data
   can be retrieved from the L2 pipeline, then IFterm = data ;
else if (ISAR address missed in icache, but has been
   successfully loaded into the L2 Miss register to await
   a system bus reference ) then IFterm = miss ;
else if (ISAR address missed in icache, but is not known to
   have missed in L2) then IFterm = retry ;
```

The IFTERM data is latched at the end of PH2 during this stage, and is sent to DEC on the following phase. The IFDATA is not sent to dec for several more phases, as required by dec pipeline constraints.

IV HARDWARE ASSISTS FOR SELECTED CISC "FEATURES"

A. Repeated string instructions

B Address Processor Debug Logic

C Hyper Mode

D Hyper Mode Opcode Mask Register Description

E Hyper Code escapes

F HyperDebugger

G Floating Point History Stack

IV. HARDWARE ASSISTS FOR SELECTED CISC OPERATIONS

B.Repeated string instructions

The standard x86 instruction set architecture specifies a set of repeated string instructions, for example, copying a contiguous set of source operand data units from one region of memory to another. The data units in such repeated string instructions may be eight, 16, or 32 bits; the two regions of memory may overlap; the operation may proceed from high to low addresses or low to high addresses; and the iteration count for the operation is specified in a general purpose register. (See various x86 Programmer's Reference Manuals for more details.)

Such repeated string instructions require special handling in processors that allows out-of-order execution of instructions. Because the number of iterations required to implement these string instruction is dependent on a register value and, in the present invention, the decoder is normally issuing operations well ahead of the functional units, the count of iterations may not even be available inside the functional units (much less the decoder) when the string macro instruction is encountered. Thus the decoder is unaware of how many p-op packets are required to complete the operation. According to the present invention, a state machine in the decoder continuously issues a sequence of internal operations to the functional units to implement each iteration of the string instruction. IEU is responsible for determining when the iteration count is exhausted, and when it does it sends an abnormal termination for the last p-op of the current iteration to the retirement logic. The retirement logic provides a mechanism to stop the sequence issue, abort the extra iterations, and continue to the next x86 macro instruction.

This method of operation is obviously inefficient since an abort is guaranteed, and this wastes processor cycles. An optimization according to an embodiment of the invention allows IEU to send to DEC, as part of the termination for an iteration, an indication of the remaining count once that count is available. This is used to prevent issue of extra p-ops for the x86 string macro instruction, avoid the abort cycle, and begin decode and issue for the next sequential x86 macro instruction. This optimization is only effective on longer repeated string instructions, where the iteration count may become available before the iterations are completed. For shorter repeated string instructions, or for situations where IEU is running behind DEC, the abort mechanism described above may be employed. In one embodiment, this optimization may be selectively enabled by setting an early string warning bit in a DEC configuration register. The following describes more specific implementation details.

Referring back to FIG. 7, the IEU termination bus is connected to the BackEnd 105; issued p-op packets are emitted onto the Pseudo-Op bus from the Decoder; the P-Op Info bus indicates the type of issued p-op packet from the Decoder to the BackEnd (see the POPINFO column in the following p-op sequences). The connection from the BackEnd to the Decoder "String Control" is asserted to force the Decoder to proceed to the x86 instruction following the string. One of the Hold Conditions sent from the BackEnd to the Decoder is used to cease issue of p-op packets when too many have already been issued for the corresponding x86 string macro instruction.

Referring back, FIG. 8B shows the "String Control" connection to the Sequencer block. It forces the state machine from the Loop state, where string iterations are issued forever, to the Last state, where processing begins for the next x86 macro instruction. Also shown are the P-Op bus connection to the functional units, the Issue Holds input from the BackEnd, and the P-Op Info field computed by the P-Op Type Decode block.

Referring back, FIG. 8C shows the "String Control" signal generated by the Early String Warning block. Early String Warning block receives termination information from IEU via the Term Bus Logic block, and P-Op Info and Issue information from the Decoder. The TermIter input, indicating IEU has terminated the count check p-op of the string iteration, is generated by ORing across all the tracking machines individual outputs asserted when IEU terminates the corresponding p-op and it is marked as "repSTOP" (one such p-op exists for each iteration). The "ValLastIter" signal from the Early String Warning logic is asserted during the issue of the last iteration of p-op packets for the x86 string macro instruction, but only when the optimization is successful. This prevents the tracking machine associated with the last pop packet of this last iteration from generating an abort cycle in response to the eventual IEU abnormal termination, since no abort is required. A Hold Condition output is asserted from the Early String Warning logic when an overrun condition (too many iterations issued) is detected.

Figure 44:
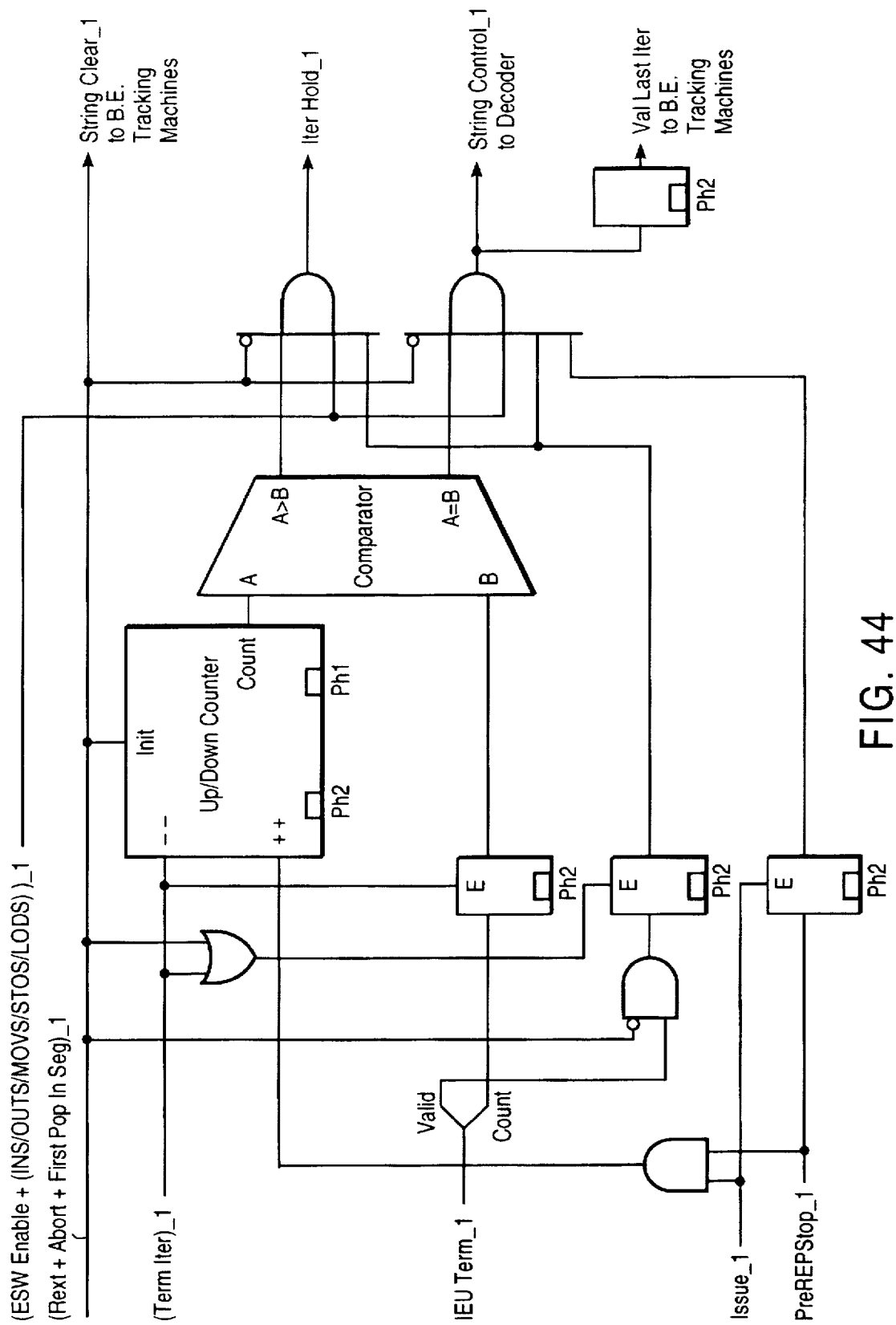
FIG. 44 is a block diagram of the early string instruction warning circuitry of the DEC.

FIG. 44 is the block diagram for the Early String Warning logic. An up/down counter contains the count of currently outstanding string iterations. It is initialized on hardware reset, an abort cycle, or when the first p-op packet for a string is issued via the "Reset+Abort+FirstPopInSeq" input. The "TermIter" input decrements the count when IEU has processed an iteration; the count is incremented when a valid string iteration is issued ("Issue AND PreREPstop"). This running count of outstanding iterations is continuously compared to the most recently available remaining count indication from IEU. A latch, enabled when "TermIter" is active, stores the three bit count simultaneously received from IEU. This latch feeds one leg of the comparator; the up/down counter feeds the other leg. One output from the comparator, "A>B", is asserted whenever it is not possible to move to the next x86 instruction without an abort: either too many iterations have been issued or exactly enough. The exactly enough case fails optimization because the underlying mechanism requires detection of the condition before issue of the last iteration, and the exactly enough case is detected just after issue of the last iteration. The second comparator out, "A=B", is asserted when the last required iteration is just to issue. In both cases the comparator output requires further qualification. "IterHold" (used to prevent further issue when it is not possible to move to the next x86 instruction without an abort) and "StringControl" (asserted to continue to the next macro instruction without an abort) are asserted only when the configuration bit enabling the Early String Warning logic is asserted, and when one of the count only controlled x86 string macro instructions are in progress. This is performed via the "ESWenable* (INS!OUTS!MOVS!STOS!LODS)" input. "Reset+Abort+FirstPopInSeq" immediately inhibits "IterHold" and "StringControl". The last qualification for both "IterHold" and "StringControl" is receipt of a valid remaining iteration count from IEU (marked by the assertion of the most significant bit of the IEUterm field); a latch enabled by "TermIter" or "Reset+Abort+FirstPopInSeq" and loaded with a one when IEU is sending a value from one two seven and "Reset+Abort+FirstPopInSeq" is deasserted. "StringHold" has one remaining qualification: a latch enabled on issue of any p-op packet and loaded with a one when a PreREPstop packet is issued. This identifies the particular portion within the sequence of p-op packets where "StringControl" is required to change. "StringClear" is logically identical to "Reset+Abort+FirstPopInSeq" and is sent to the BackEnd tracking machines to clear the bit marking the last p-op packet in the string iteration. "ValLastIter" (sent to the BackEnd tracking machines during the issue of the last iteration of a successful optimization to inhibit an abort cycle upon the eventual IEU abnormal termination) is a latch delay of "StringControl".

The x86 instruction specified count register, eCX, is a general purpose register participating in the register renaming scheme. The underlying mapped physical registers are duplicated in IEU and AP; both units decrement the count individually, although only IEU examines it to send termination information back to DEC. Similarly, both AP and IEU contain physical registers with the renamed eSI and eDI register values and a single (not renamed) copy of the direction flag (DF) determining whether the reference moves from high to low or low to high addresses. This allows AP and IEU to independently compute incremented (or decremented) values for eSI and eDI in each iteration.

Table T3 shows relevant portions of the p-op packet sequences for the relevant x86 string instructions. In all cases (except LODS) the sequencing is the same for all operand sizes (8, 16, or 32 bits) available to the instruction.

The F86 p-ops marked "prerepSTOP" in the POPINFO column are associated with assertion of the "PreREPstop" input to the Early String Warning logic. The "FirstPopInSeq" is asserted upon issue of the first p-op packet of each of these sequences, identified by "ON" in the POP-SEQ column on the left. The packets marked with "repSTOP" in the POPINFO column are processed in the BackEnd tracking machines to provide the "TermInfo" signal.

The INS, OUTS, and MOVS sequences show the use of a temporary register in IEU (Treg). This is required because only a single memory (or I/O) reference is possible within each p-op packet, therefore a temporary location must be used to effect the memory to memory transfer.

The x86 LOOP instructions specify a count manipulation and optional condition check in combination with a conditional transfer control. This allows a single instruction to combine loop count decrementing with transferring back to the beginning of the loop when more iterations remain.

DEC translates this x86 instruction into a single p-op dividing the work between functional units. The count manipulation and condition code check are performed by IEU; the transfer control target computation occurs in AP. This conditional transfer control is predicted by the decoder identically to other conditional transfer controls, (normally the LOOP instruction is predicted taken), so IEU performs the direction check and signals a misprediction identically to other conditional transfer controls. AP is unaware of the more complicated processing performed by IEU, and performs the target address calculation and checking as it would for simpler conditional transfer controls.

C. Address Processor Debug Logic

Referring back to the block diagram of Address Processor (AP) 15 shown in FIG. 2, it is seen that the AP includes four debug address registers (DR). Each DR has one input of each comparator of a pair of comparators attached to it. One comparator of each pair is a 32 bit comparator which has its other input connected to the intermediate address of the Extended Instruction Pointer (EIP) value generated by the DEU unit while the other comparator of each pair has its other input connected to the aligned intermediate address generated for an operand memory reference. In contrast to just marking those p-ops needing operand or transfer control target address generation for processing by the AP, whenever any of the 4 DRs is enabled all p-ops are marked by the DEC for processing by the AP. In addition, whenever any of the DRs are modified by a p-op the AP quiesces (waits until all older p-ops are completed without fault), waits until the DEU has marked the p-op valid and that the instruction has no code segment limit fault, and then modifies the DR as specified by the p-op.

The DEU computes the 32 bit effective address of the each p-op being processed for up to two p-ops per cycle and stores the resultant value into an EIP History RAM structure indexed by the tag of the p-op. A valid bit is associated with the address and indicates the validity of each entry in the EIP History. The effective address for each p-op is read from the EIP History RAM by the AP as addressed by the tag the AP is processing. The value read is added to the base of its code segment which is held in a shadow register within the DEU. The resultant sum is the intermediate EIP address of the p-op. When the value being read from the EIP History RAM is valid the intermediate EIP address is compared to each of the 4 DRs to determine if any of the DRs match. If the value being read from the EIP History RAM is not valid the AP waits until the DEU has completed the EIP calculation for that tag.

The intermediate operand address generated by the AP Address Generation pipeline for the operands specified by the p-op is generated by its 4 input adder with inputs comprised of the Base register value, the scaled Index register value, the Displacement value of the p-op, the Segment Base register value, and the size control which specifies 16 v. 32 bit addressing. If the resultant intermediate address of the operand plus the length of the operand extends across a 4 byte (quad) alignment boundary, multiple aligned quad intermediate addresses will be pipelined to the operand input of each pair of comparators. The first quad intermediate address is always equal to the resultant intermediate address from the 4 input adder with the 2 least significant bits excluded. This aligned quad address together with control signals indicating the operand's bytes in the quad aligned boundary is connected to the operand input of each pair of 30 bit comparators plus byte compare logic. Additional cycles of quad aligned address and their associated byte control signals will be Following the DR comparisons in each cycle the match results are pipelined to AP's Termination stage where operand matches are accumulated until the completion of all cycles of the instruction. The Termination stage takes the match results together with any faults detected during processing, prioritizes them, and generates a termination to the DEC.

D. Hyper Mode

According to the present invention, the processor adds a new execution mode to those in prior art x86-type processors. Code written while in the new mode may be regarded as being a bridge between assembly code and micro code. Many of the hidden x86 registers and flags are made visible to the instruction set in the new mode. The invention also adds new registers and flags, as well as instructions to manipulate these resources. Instructions are also provided to manipulate the various cache structures. Reset and initialization is handled differently according to the invention than in the x86.

As the 80x86 architecture has grown, additional modes have been defined so as to allow the architecture to grow beyond the limitations of previous generations without becoming incompatible with those previous generations. Prior art x86-type processors currently support a number of different operation modes, including 16-Bit Real Mode, 16 Bit Virtual 8086 Mode, 16 Bit Protected Mode, and 32 Bit Protected Mode.

The invention incorporates additional capabilities over those of the x86 architecture. In the invention, it is desirable to extend the architecture to allow more direct control over the hardware resources within the processor. According to the invention, this additional functionality is added by use of an additional execution mode—Hyper Mode. While in the new mode, the available instruction set is a superset of the x86 protected mode instruction set. As such, this mode is termed "Hyper Mode". Code executed while in Hyper Mode is termed "Hyper Code".

According to the invention, the processor may be in any of the x86 modes when it detects a reason for entering Hyper Mode. Hyper Mode is then entered, the situation is dealt with using the extensions available under Hyper Mode, and then the machine is returned to the mode it was in prior to Hyper Mode entry.

It is useful for purposes of understanding the invention to have a generic name for whatever mode the processor was in prior to entry into Hyper Mode. This mode is termed "Mortal Mode". Mortal mode may be any of the modes available in an x86-type processor.

According to various embodiments of the invention, the processor enters Hyper Mode for a number of different reasons, each having a Hyper Code handler which is invoked. A number of possible reasons that various embodiments of the invention may enter Hyper Mode are described below.

One reason for entering Hyper Mode is to handle Reset and to perform the proper hardware initialization. Two different types of Reset are supported by the invention. Hard Reset is invoked before the machine has been initialized and must operate out of ROM BIOS without support of working DRAM memory. From an external view, the processor comes out of Hard Reset already in Hyper Mode, and executing from address 0xFFFF_0000. The internal view is described later. Soft Reset is invoked after the machine has in fact been initialized, and uses a block of DRAM memory for communication between hardware microcode and software Hyper Code. This mechanism is used for all Hyper Mode entry points except Hard Reset.

Another possible reason for entering Hyper Mode according to the invention is the processor encountering undefined opcodes. The processor will trap all undefined opcode patterns by entering into Hyper Mode. In most cases, the handler for undefined opcodes will return to mortal mode signalling that the x386 defined #UD exception should be taken. However, the handler can also decode the invalid opcode and take action in response. This has several interesting benefits. Among these benefits is that the additional Hyper Mode instructions can be made available to Mortal Mode programs. When a programmer includes one of the new opcodes, the processor according to the invention refuses to recognize that opcode in Mortal Mode (for compatibility reasons), and the undefined opcode handler is invoked. The handler can then decide if that particular program should be allowed to execute that particular instruction. One advantage to this aspect of the invention is that future x86 generations are likely to add instructions which use undefined opcodes. By trapping in hardware to a Hyper Code routine, there is a good chance that a processor built according to the invention can emulate these new instructions. Of course, the invention may also incorporate new instructions outside the x86 standard via the Hyper Mode mechanism if that is deemed useful. This aspect of the invention also allows for the handling of a number of undefined opcodes which perform interesting functions on the x386. Rather than implementing these functions in hardware, the invention allows them to be implemented as needed in software.

In order to gain control over the hardware breakpoint mechanisms and support both intermediate and physical address breakpoints, the F86 must be made aware of changes to the page tables. In order to do this, x86 instructions which affect linear to physical mapping will be trapped as invalid opcodes. The original instruction can then be re-executed in Hyper Mode and appropriate information can be extracted for intermediate address breakpoint emulation.

Another possible reason for entering Hyper Mode is to handle emulation of floating point instructions which are either not implemented in hardware, or whose implementations have not been thoroughly debugged.

Another possible reason for entering Hyper Mode is Protected Mode Support. As will be known to those familiar with standard x86 programming, a number of the protected mode transfer control instructions are very complex. These instructions take hundreds of cycles to complete on the x86. The microcoded implementation on the x86 is sufficiently slow that in many cases systems programmers have avoided use of these instructions. These instructions may be most efficiently implemented according to the invention in Hyper Mode.

Call gates can be referenced only by JMP and CALL instructions. Call gates may or may not cause a change in privilege level. Those that do change privilege level are typically used to implement application system calls to the operating system. According to the invention, call gates may be implemented in Hyper Code. The Far Return to a Lower Privilege Level is the return path from a call gate that caused an increase in privilege level. The significant difference between this return and one that does not cause a privilege level change is the extra checking/clearing of data segment registers that needs to be done. These tasks may be handled according to the invention in Hyper Code.

Two significantly different interrupt cases can cause a change in privilege level. The first case is an interrupt that occurs during normal protected mode operation, with the DPL of the IDT descriptor being numerically lower than the CPL. The second case is an interrupt that occurs when the CPU is in VM86 mode (guaranteed to change privilege level from 3 to 0). In this case, the data segment registers must also be saved on the interrupt stack. This may also be handled in Hyper Code.

The Interrupt Return to a Lower Privilege Level is the return path from an interrupt handler that was entered with an increase in privilege level and may also be handled in Hyper Code. Here, as for interrupts, there are two cases. The first is a normal protected mode IRET to a lower privilege level. The second case is an IRET from a V86 monitor (that runs in protected mode) back to the VM86 task that was interrupted. Besides the CS and SS segment registers, the data segment registers have to be reinitialized prior to the return to the VM86 task.

A task switch can be caused by a CALL or JMP instruction to a task gate or TSS descriptor. A CALL sets up a subsidiary ("nested") task, while JMP unilaterally transfers control to the new task with no return path to the old one. A task switch can also be caused by execution of an IRET instruction with the NT (Nested Task) bit set in EFLAGS. This is the only way a "nested" task can return control to the calling task. A task switch can also be caused by execution of an INT instruction with the IDT entry being a task gate. Finally, a task switch can be caused when a hardware interrupt or an exception is detected for which the IDT entry is a task gate. In any case, according to the invention, these task switches may be handled in Hyper Code.

When an I/O instruction needs to perform an I/O bit map permission check, the invention may trap to Hyper Mode where an appropriate check can be made. Likewise, when a Debug Exception is detected in Mortal Mode, the invention may trap to Hyper Mode.

In order to support Hyper Mode, it is necessary to have a small amount of read/write memory which can be used to communicate information between hardware and the Hyper Code software. According to the invention, a single 4096 byte page, called the Hyper Page, is allocated for this purpose. A 20 bit register (the Hyper Page Register, or HPR) in the AP contains the physical page address of the Hyper Page. Since the Hyper Page is always aligned on 4 Kbyte boundaries, the Hyper Page Register need only provide the upper 20 address bits.

There are two ways in which the processor can enter Hyper Mode. The first is the special case of Power Up Reset. A signal on NexBus indicates that the entire system (processors, caches, memory, I/O) should be reset. The processor will enter Hyper Mode and begin executing at a special address in high memory.

In a current embodiment, all other reasons for entering Hyper Mode share a common mechanism. A stack is established in the Hyper Page, a small amount of internal state is pushed onto the stack, some initialization of internal state takes plates, the processor selects a routine within the Hyper Page for handling the problem, and control is transferred to that handler.

Changes from Hyper Mode to Mortal Mode only occur in response to new x86 instructions. These instructions use values on the Hyper Stack to restore the state of the machine to the proper Mortal Mode values and resume Mortal Mode execution.

The Hyper Stack allows two-way communication between microcode and Hyper Code. Hyper Code is expected to examine the values passed in by microcode as part of entry into Hyper Mode. Before returning to Mortal Mode. Hyper Code should appropriately modify the information on the Hyper Stack.

There are two instructions which can be used to exit Hyper Mode. The RETH instruction is used when execution has completed normally and no exceptions need to be reported in Mortal Mode. The INTH instruction is used when execution has detected an exception which needs to be reported in Mortal Mode.

According to the invention, certain aspects of machine behavior are modified by the fact that the machine is in Hyper Mode. The following discussion describes what it means to be in Hyper Mode.

Non-maskable interrupts (NMI), hardware interrupts, and Soft Reset are disabled while in Hyper Mode. The NF and IF bits are not actually modified, but are overridden.

Single Step traps are disabled by clearing the TF bit in EFLAGS. Attempting to single step a Hyper Code machine by programming TF=1 after entry into Hyper Mode is not recommended, but should work like any other exception detected in Hyper Mode.

The default address and operand sizes are always 32 bits in Hyper Mode. These values may generally be overridden by use of the AS: and OS: instruction prefixes. The DBit and BBit of the Code and Stack segments respectively are not actually modified, but are overridden.

Hyper Mode adds a new address space called the Absolute Segment or PS. The segment always has a segment base of 0x0000_0000, and a 4 GByte segment limit. The Page Tables are not consulted for Absolute Segment addresses. This results in an Effective=Intermediate=Physical address equivalence.

Hyper Mode also adds a new address space called the Intermediate Segment or IS. The segment always has a segment base of 0x0000_0000, and a 4 GByte segment limit. The Page Tables ARE consulted for Intermediate Segment addresses. This results in an Effective= Intermediate equivalence, but Intermediate addresses are translated through Page Tables to Physical addresses.

As in Mortal Mode, address formation is done relative to a default segment. Segment override prefixes may be used in many cases to cause address formation to be done relative to a different segment.

The default segment in Hyper Mode is always the Physical Segment. This encompasses the various Mortal Mode cases in which the default segment is DS or SS. Implicit references which in Mortal Mode use a segment which cannot be overridden by segment prefixes (e.g., SS on stack pushes or ES on repeated strings) will also use the PS segment in Hyper Mode. If a segment override prefix may be used in Mortal Mode, then it can also be used in Hyper Mode.

Mortal Mode allows CS, SS, DS, ES, FS, and GS to be specified as segment override prefixes. Hyper Mode extends this to include two temporary segments (HS and IS), the task state segment (TR), and the intermediate segment (IS). Unfortunately, the opcode space does not allow for any additional prefix override bytes. As such, a Segment Bank Flag has been defined which indicates which groups of segments the segment override prefixes will refer to. The following table gives the mapping from prefix byte value to the selected segment for the two banks.

| Prefix Byte | BANK = 0 | BANK = 1 |
|---|---|---|
| 0x26 | ES | HS |
| 0x2E | CS | CS |
| 0x36 | SS | SS |
| 0x3E | DS | IS |
| 0x64 | FS | TR |
| 0x65 | GS | IS |

The Bank Flag may be modified by executing one of the new instructions. It is always zero in Mortal Mode.

Address formation in any of the existing or new segments will still create intermediate and physical addresses which will be compared against the debug registers for breakpoint hits. This allows the debug facilities to be used in Hyper Mode.

Current Privilege Level (CPL) is not modified by entering or exiting Hyper Mode. However, all instructions and most memory references are executed as if CPL were zero. The only exception is a memory reference which uses a segment override prefix to perform a Mortal Mode access. Such a reference will use the Mortal Mode CPL value to determine success or failure in the normal Mortal Mode fashion. If an exception is detected, the Hyper Mode Exception Handler will be invoked. CPL may in fact be modified by new F86instructions. This allows a Hyper Code program to avoid failing protection checks on Mortal Mode accesses if necessary (e.g. TSS references in some cases).

A number of new instructions are defined by the invention which allow access to new state and features within the processor. To insure compatibility with existing 80386 applications, these instruction are recognized only in Hyper Mode.

Attempting to execute a new instruction in Mortal Mode will result in an Undefined opcode entry into Hyper Mode. Hyper Code can then decide whether to perform the instruction and return or just signal the Mortal Mode INT#6 exception. Attempting to execute a new instruction in Hyper Mode will proceed normally, and an Undefined Opcode will not be detected.

Push and Pop of EFLAGS act slightly differently in Hyper Mode than from standard x386 instructions in that all 32 bits are read and written, independent of the original Mortal Mode and CPL values.

Some standard x86 instructions do not work in a meaningful fashion in Hyper Mode according to a current embodiment of the invention. They can be executed, and in general the F86 hardware will attempt to do what it would do if it were in Mortal Mode. Since it is not actually in mortal mode, the resulting behavior is at best bizarre and at worst will send the machine into an unknown state.

E. Hyper Mode Opcode Mask Register Description

In one embodiment, the invention incorporates features including a new hypermode instruction to allow emulation of instructions which do not execute correctly under normal conditions. According to this embodiment of the invention, instruction opcodes are arbitrarily (though somewhat intelligently) combined into 64 groupings. Each group is sometimes referred to as a "bin". The bins are identified by a bin number. The group/bin assignment is contained in the f86 p-op database. If a particular instruction is not executing correctly, than its group is marked for emulation via the mask register within DEC. The mask register has been expanded to two bits as follows:

00—Normal operation

01—DECEXCP p-op issued resulting in hypermode entry

10—Force issue of instruction to AP

11—Hold issue of instruction until no p-op's are outstanding

Figure 45:
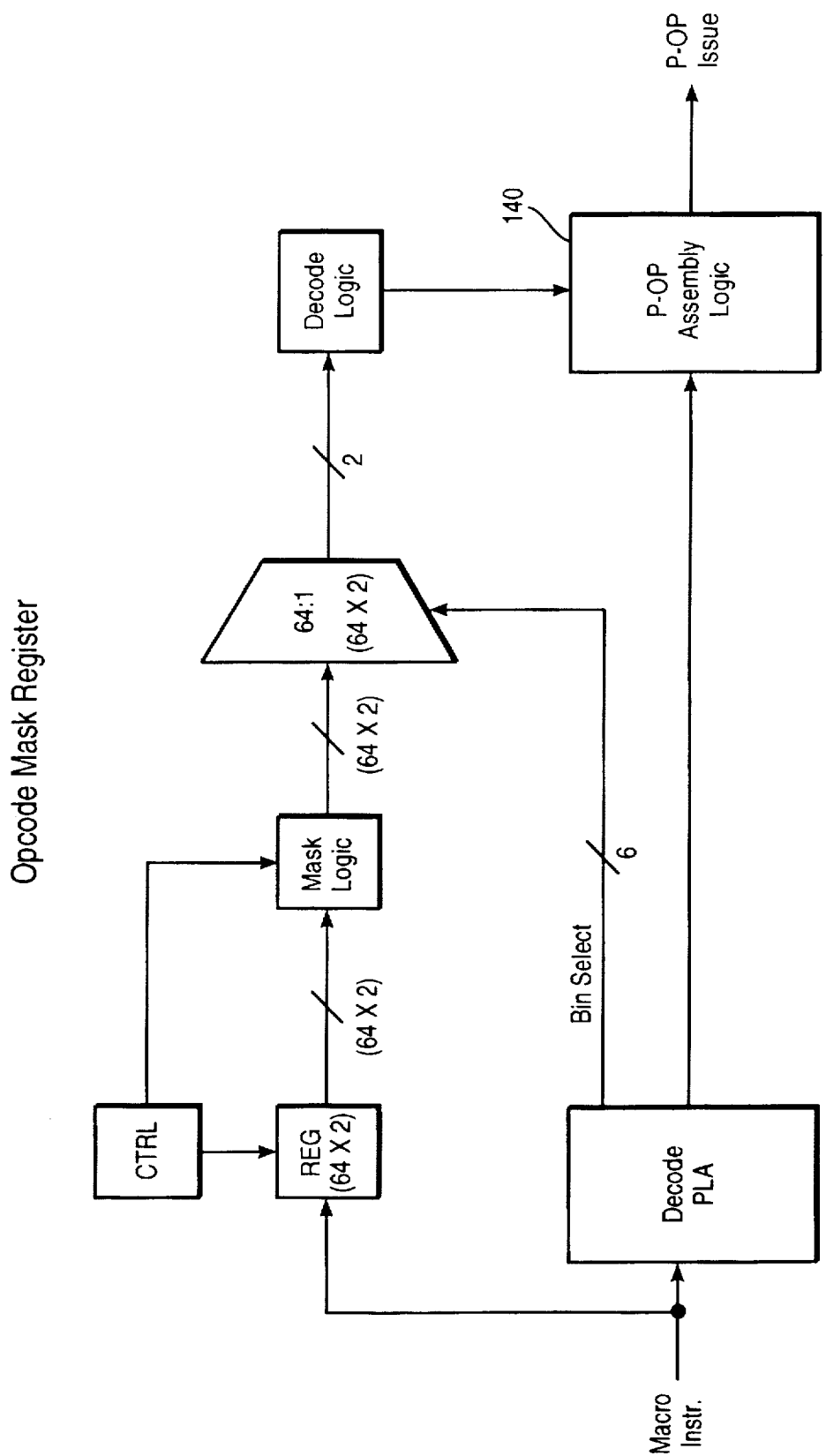
FIG. 45 is a block diagram of the OPCODE mask register of the DEC used in execution hypermode instructions.

In this implementation, the opcode mask register is backward compatible with previous versions of the processor in that if the msb is not programmed it behaves as previously defined. FIG. 45 shows the opcode mask register structure included in the DEC. In a particular embodiment, the specifics of the opcode mask register are as follows:

Instruction: MOV OPCMSK,Ib
P-op Mnemonic: NOOP
Encoding:

| 00001111 | 11111010 | 11 00 bbbb | Mask Byte |

The bbbb field of the Mod R/M byte contains which of the 16 bytes is to be loaded. To insure backward compatibility the encoding bbbb=0000–0111 programs the 1sb of the mask register and bbbb=1000–1111 programs the msb. Though the opcode mask register is 64×2 bits, only locations 60–0 are allowed to be loaded, with locations 63–61 being hard-wired as follows:

| bit | value | reason |
|---|---|---|
| 63 | 01 | To cover the #UD opcodes (always DECEXCP) |
| 62 | 0, (HFBIT ¦¦ HyperEn) | To allow hypermode instructions |
| 61 | 01 if in hypermode, reg value otherwise | To disallow HLT in hypermode |

After RESET the machine is in hypermode (HFBIT active) and the Opcode Mask Register is cleared, except for the hard-wired bits. As part of the hypermode initialization, the Opcode Mask Register is loaded, if desired, by executing the LOPCMSK hypermode instruction and specifying which mask bytes are to be loaded and with what data. Table T4 shows the bin groupings according to one embodiment for the 80386 opcodes.

The bin number is contained in the F86 p-op database and is decoded by the decoder PLA for each instruction. The bin number is used to perform a 64-to-1 selection of the 64×2 opcode mask register. The 2-bit value is decoded as described above. If the value "01" is detected, the p-op that was to be issued is converted to a DECEXCP p-op, the APGrpValid signal is cleared, and no further p-op's are issued until the "Hyper" termination is sent by the AP unit. At that time, the CALLHA p-op is generated and the entry to hypermode is made with the bin number information passed along as part of the CALLHA p-op sequence. Based on this bin number, the hypercode determines the appropriate action to take; instruction emulation or a Null emulation (useful for pipeline related problems). After the emulation, the hypercode returns instruction execution to the instruction immediately following the instruction that caused the DECEXCP.

In addition, CFG0[31] is used to mask the DECEXCP p-op. This is used in the following scenario: A bin number refers to several instructions and only one of the group requires emulation. Upon decoding the instruction, a DECEXCP is issued (due to the bin setting), hypermode is entered and hypercode determines that in fact this instruction is allowed to execute, sets CFG0[31], and returns to the original instruction which executes due to the masking.

F. Hyper Code escapes

According to the invention, Hyper Mode may be used to handle a number of other conditions the occur during processor operation through the mechanism of Hyper Code escapes. Among uses for these escapes is a powerful debug capability with many advantages over prior processors. Hyper Code escapes which may be incorporated in various embodiments of the invention are described below.

(1)Debug Escape. In one embodiment of the invention, setting a bit in configuration register 1 (cfg1) causes all debug related 'hits' to be trapped to Hyper Code. Normally, when the address of an operand fetch or instruction fetch hits in the debug registers (DR0–DR7), the CPU generates an INT 1 (debug exception). When 'debug escape' is set, however, all instruction and data breakpoints as well as single-step traps cause an entry into Hyper Code instead. In a further embodiment, the debug escape mechanism is used by the invention to implement a HyperDebugger (HDB). HDB is an OS independent (even transparent) software/hardware debugger. The debug escape mechanism may also be used to patch or extend the debug exception handling mechanism (to fix a hardware bug, or to add a new feature), before returning to mortal mode.

(2)Exception Escape. In a further embodiment of the invention, setting a bit (XESC) in configuration register 1 (cfg1) causes all non-debug exceptions and faults to be trapped to Hyper Code. Normally, only when the exception handler requires a change in privilege level would Hyper Code be called. When XESC is set, however, these exceptions (divide error, overflow, bounds violation, device not available, double fault, invalid TSS, segment not present, stack fault, protection violation, page fault floating point error) unconditionally cause an entry into Hyper Code instead. The XESC mechanism allows the invention to workaround hardware bugs in the exception handling mechanism via Hyper Code.

(3) 'resetCpu' signal. In a further embodiment of the invention, the processor may be provided with a pin to allow a resetCPU signal that will cause an immediate entry into Hyper Code. Note that this is not a 'power-on reset', but a separate signal, with its own pin. It is normally used to signal 'soft reset' (which is accomplished by the Hyper Code) and is also used to signal a System Management Interrupt (SMI). Having an external pin that sends the CPU into Hyper Code is very useful. It allows external events to be signaled directly to Hyper Code. Since critical CPU state is saved upon Hyper Code entry, and Hyper Code runs in a separate address space, Hyper Code's handling of the external event is easily made transparent to any running OS or application.

Besides using this pin to implement soft reset and SMI entry, the invention may also use it in HDB (the HyperDebugger) and in an instruction trace tool (HTRACE). In both of these applications, a button is wired to the resetCPU pin. HDB uses this as a 'hot button' to immediately suspend normal instruction execution and enter debug mode. When HDB is running, pressing the hot button causes an immediate entry into the debugger. Since the resetCPU pin is non-maskable, HDB can gain control even if the CPU has interrupts masked off. HTRACE (special Hyper Code that traces instruction execution for performance analysis and modeling) also uses the resetCPU 'hot button' technique.

(4)Shutdown escape. In a further embodiment of the invention, setting a bit in cfg1 (configuration register 1), causes all 'shutdown' events to be trapped to Hyper Code. (An x86 processor enters shutdown mode when it encounters another exception condition while processing a double-fault. It is similar to halt, except that only an NMI or RESET can restart the CPU ). The shutdown escape mechanism can be used to patch or extend the shutdown handling mechanism (to fix a hardware bug, or to add a new feature), before returning to mortal mode.

(5) External Interrupt Escape. In a further embodiment of the invention, setting a bit in cfg1 (configuration register 1), causes all external interrupts to be trapped to Hyper Code. The interrupt escape mechanism may be used to patch or extend the interrupt handling mechanism (to fix a hardware bug, or to add a new feature), before returning to mortal mode. It also could be used in implementation of a system management mode, where external interrupts need to be intercepted and examined in order to determine whether the system should be woke up from a power-conserving (sleep) mode.

G. HyperDebugger

According to the one embodiment, the invention is provided with a hyperdebugger (HDB). The HDB uses Hyper Mode which allows it to be completely independent of the OS or application being run. Typically, a debugger is running in the same address space or physical memory as the OS or application. In practice this means that the debugger can not be used with multiple operating systems, and, it usually means that the debugger cannot be used on some kernel tasks (like interrupt handlers, IO drivers, etc). Furthermore, if an OS or application changes system tables like the page tables, descriptor tables and IDT, a normal debugger cannot be used.

This embodiment of the invention avoids all of these drawbacks by 1) running the debugger in hypermode and 2) entering hypermode when certain debug conditions are met.

Running the HDB in Hyper Mode gives the hyperdebugger its own address space that is unaffected by the mortal OS or application. This also means that the debugger is completely transparent to the OS. So, rather than having several debuggers (one for each OS) a processor having this feature of the invention can use just one, the HDB.

Another advantage to running in hypermode is that HDB has access to CPU internal state, and can display and modify internal state. This is something that a normal (SW-based) debugger is incapable of doing, since the CPU internal state is not visible to it.

The Hyper Code escape mechanisms described above allow hypermode be entered for purpose of invoking the hyperdebugger. HDB uses one or more or the following escape mechanisms at any given time:

(1) debug escape—allows HDB to use the normal debug registers to set and manage instruction breakpoints and data breakpoints and allows it to use eflags.tf (the single-step trap flag) to implement single stepping.

(2) undefined opcode escape—used by HDB to cause instruction breakpoints by using a special 1 byte instruction that is normally an undefined opcode. The one byte opcode 'F1' is normally undefined. It causes an entry into Hyper Code. Hyper Code normally will cause an 'undefined opcode' exception for mortal mode. But, if HDB is enabled, Hyper Code will enter the debugger. Thus, a normally undefined opcode is used by HDB as a 'breakpoint' instruction.

(3) masked opcode bins—any opcode or groups of opcodes (even all opcodes) will trap to Hyper Code, by setting the appropriate opcode bin masks. When HDB is enabled, opcode bin hits cause an entry into the debugger. This allows HDB to breakpoint on selected opcodes.

(4) resetCPU—when HDB is enabled, this pin is used as a 'hot button' to force entry into the debugger.

H. Floating Point History Stack

As will be familiar to those with experience in x86 programming, the 80386 architecture specifies that errors detected by instructions executed by the 80387 numeric coprocessor are not made available to the processor until the coprocessor instruction following the instruction in which the error arose. The '387 coprocessor is provided with an ERROR pin on which it signals an error to the '386 processor on the instruction following the instruction during which the error occurred.

In order to maintain compatibility with prior x86 processors, this architectural feature must be handled specially by the current invention so that out-of-order execution does not result in a numeric processor error not being accurately detected. These coprocessor errors are sometimes referred to as imprecise exceptions, because an indeterminate number of non-floating point processor instructions may occur before the exception is handled. The mechanisms needed to compatibly handle these instructions also effectively ensure correct operation of the NP in an out-of-order executing environment.

Handling imprecise exceptions that can occur in the invention requires saving the x86 architecture opcode, code pointer, and data pointer in dedicated registers.

During each cycle, AP stores the system parameters opcode, CSptr, dataselptr, effaddr in floating point history stacks indexed by tag. If the instruction does not require an address, the operand information is undefined. DEU stores the EIP in a history stack indexed by tag.

The following 5 fields are loaded into their history stacks, independent of whether the p-op is associated with an NP instruction.

effaddr: The effective operand address is saved in a history stack by AP at operand address generation time.

eip: The effective EIP address is saved in a history stack by DEU at the time that the EIP for the instruction is processed. This history stack is the one used for restoring EIP's in the event of exceptions.

dataselptr: The 3 bit physical segment number for the operand's segment is saved in a history stack at operand address generation time.

CSptr: The 3 bit physical segment number for the code segment is saved by AP at operand address generation time.

opcode: An 11 bit opcode is saved in a history stack by AP at operand address generation time.

As p-ops are issued, a bit (per tag) is set if the p-op should modify the floating point environment. Integer, floating point control, and later p-ops in floating point abort groups will clear the bit.

Each cycle (except during aborts), AP checks to see if any "NP" p-ops have retired. If so, AP copies the youngest retired p-op from the stacks (dereferencing the selector pointers) to "retired" latches. These are the architecturally visible NP environment registers.

One carry look-ahead chain scans across all tags retired on this cycle to determine whether any p-ops should modify the floating point environment. In parallel, a second look-ahead chain locates the youngest (most recently issued) such p-op. The history stack values are read out for the selected tag for the opcode, eip, operand effective address, code segment number, and operand segment number.

The code segment number is used to read the associated selector value from the selector file using a dedicated read port. This relies on the fact that later modifications to the virtual segment will not have modified the old physical segment values until after that physical segment has been freed up by retirement of the segment modification instruction.

The operand segment number is used to read the associated selector value from the selector file using a second dedicated read port. Ditto on the fact that the physical selector is unchanged up until after retirement of the floating point op.

The EIP stack is read out using the same port used to reload CEIP during aborts. During abort cycles, tagstat doesn't contain retirement information, so no NP pop can be newly retired.

Two instructions are associated with the floating point history stack and behave as follows:

FSTENV—First AP quiesces to make sure the environment registers are up to date. Then AP will send the environment register data to memory in a format dependent on the FSTENV's execution mode (protected/real mode, 16/32 bit operand size). If executed while in real mode. The CS:EIP in the environment registers are converted to a intermediate address the format requires.

FLDENV—First AP quiesces as it does before loading any other single resource register. Then AP loads the environment registers with the pieces read in from memory according to the FLDENV's execution mode. In real mode, the eip/effaddr are loaded with the intermediate address and the selectors are zeroed. This way, the same real mode FSTENV intermediate address calculations could be used. The FSTENV/FLDENV were done this way to produce the same results as an x86, even under conditions of FSTENV in one mode and FLDENV in a different mode.

V. LAB DEBUG

Advancements in semiconductor fabrication technology have enabled microprocessor designers to achieve a high level of integration, which was previously unattainable. For instance, using current technology, over 3.5 million transistors can be fabricated on a wafer having a relatively small die size. This permits, in the case of the F86, the DEC, AP, IEU, MCS, MAU, DEU, L1D$, and L1I$ functional units to be located on a single chip. Although such integration is desirable because it provides many advantages, there are also disadvantages associated with it. In particular, since data flow can only be observed through the chip's input and output pins, data flow among the internal buses cannot be determined. As a result, designers are faced with a very difficult task of debugging problems occurring in, for example, the internal buses interconnecting the various functional units.

To resolve this problem, logic is provided for the purpose of debugging hardware problems within the chip. This logic, referred to as "lab debug", defines test modes in which existing I/O pins may either be dedicated to debug or used intermittently for debugging purposes.

When lab debug is activated (setting the processor in debug mode), it extracts information, such as control signals, tags, valids, and other signals, from the internal buses and routes it to the I/O buses or the chip's output signal pins. In this manner, the data from the internal buses can be bypassed onto the I/O buses, thus enabling designers to ascertain the data and control flow between the functional units of the system.

Figure 46:
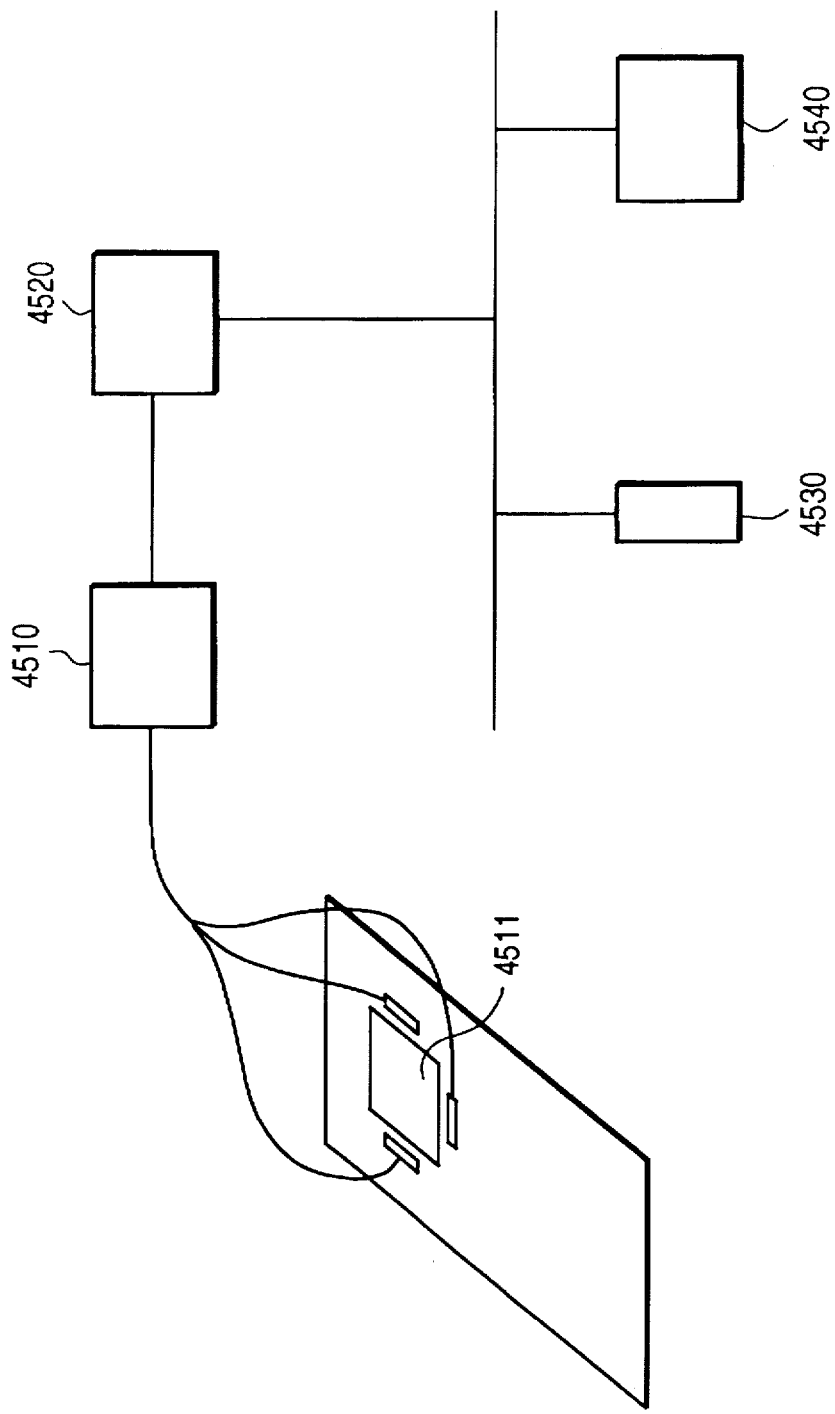
FIG. 46 is a block diagram of a system for testing a chip incorporating the Lab Debug circuitry.

FIG. 46 illustrates a system for analyzing the information obtained via lab debug. The system may comprise a logic analyzer 4510 coupled to a computer 4520, a storage device 4530, and a work station 4540. A network, such as a local area network (LAN), interconnects the computer, storage device, and work station.

To test processor 4511, the probes of the logic analyzer are connected to the processor's output pins. The user programs the logic analyzer to trigger on an event, such as a specific address, data, or instruction. When triggered, the logic analyzer collects information and downloads it into computer 4520. The information, in its raw form, may then be stored in storage device 4530 via the network. Work station 4540 may then be used to process the raw data to determine, for example, instruction and data flow of the processor for each captured cycle.

Figure 47:
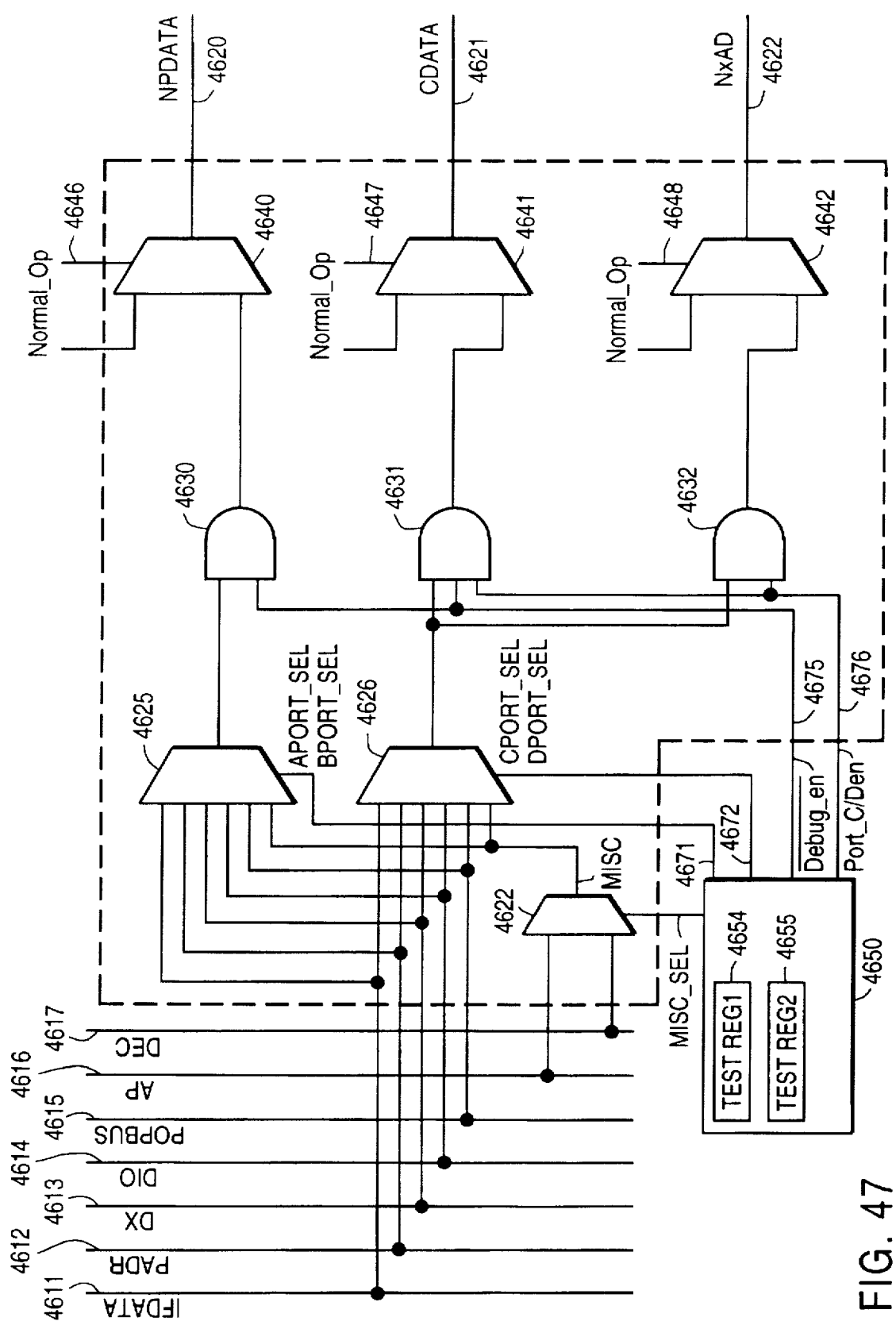
FIG. 47 is a block diagram of the Lab Debug circuitry.

FIG. 47 illustrates a block diagram of lab debug 4601 according to the present invention. As shown, a bypass logic 4505 bypasses information from the internal data buses IFDATA 4611, PADR 4612, DX 4613, DIO 4614, POPUS 4615, AP 4616, and DEC 4617 to the NPDATA 4618, CDATA 4619, and/or NxAD 4620 buses.

In order to reduce the number of inputs into the bypass logic, a multiplexer 4622 selects between signals from AP 4616 and DEC 4617 buses. A control logic 4650 generates the appropriate signals to regulate routing of debug information to the output buses. The bypass logic is programmed through test registers 4654 and 4655 in control logic 4650.

Bypass logic 4605 includes 4 32-bit output ports (ports A, B, C, and D). Ports A and B are defined as primary ports for outputting data onto the NPDATA bus. Ports C and D, the secondary ports, output data onto the CDATA and NXAD buses. Due to inherent limitation on the availability of the output buses, particularly with respect to the CDATA and NxAD buses, lab debug employs only two 32-bit ports to service both these buses. This can be effectively achieved by configuring both ports C and D to alternately output data onto the CDATA and NXAD buses. Table T5 maps the output ports A, B, C, and D to the output buses.

TABLE T5

| Port name; | Output signal name |
|---|---|
| Debug Port A | NPDATA [31:0] |
| Debug Port B | NPDATA [63:32] |
| Debug Port C | CDATA [63:32] |
| Debug Port C' | NxAD [62:32] |
| Debug Port D | CDATA [31:0] |
| Debug Port D' | NxAD [31:0] |

Furthermore, since there are unused pins on the F86, they will be dedicated to output specific signals. Table T6A–T6B list the dedicated output pins.

TABLE T6A

| Fortune pin | Debug signal | Signal Duration | |
|---|---|---|---|
| NPDATA [31:00] | Port A | | PH2, PH1 |
| NPDATA [63:32] | Port B | | PH2, PH1 |
| HROM | AP_PADRVALID_2 | VALID | PH2, PH1 |
| CPARITY [7] | DEC_REC_2 | | PH2, PH1 |
| SLOTID [3] | MCSPADRHLD_2 | PH2, PH1 | |
| CPARITY [6] | PADR_1 [22] | STREAM, OP | PH2, PH1 |

TABLE T6A-continued

| Fortune pin | Debug signal | Signal Duration | |
|---|---|---|---|
| CPARITY [5] | PADR_1 [21] | STREAM, OP | PH2, PH1 |
| CPARITY [4] | PADR_1 [20] | STREAM, OP | PH2, PH1 |
| NPPOPBUS [9] ## | PADR_1 [19] | STREAM, OP | PH2, PH1 |
| CPARITY [2] | PADR_1 [18] | STREAM, OP | PH2, PH1 |
| CPARITY [1] | PADR_1 [17] | STREAM, OP | PH2, PH1 |
| CPARITY [0] | PADR_1 [16] | STREAM, OP | PH2, PH1 |
| NPPOPBUS [8] ## | PADR_2 [20] | Trn | PH2, PH1 |
| CPARITY [3] | PADR_2 [25] | ADDR | PH2, PH1 |
| SLOTID [2] | PADR_TAG_2 [4] | | PH2, PH1 |
| SLOTID [1] | PADR_TAG_2 [3] | | PH2, PH1 |
| SLOTID [0] | PADR_TAG_2 [2] | | PH2, PH1 |
| DEVICEID [1] | PADR_TAG_2 [1] | | PH2, PH1 |
| DEVICEID [0] | PADR_TAG_2 [0] | | PH2, PH1 |
| CDATA [63:32] | Port C | | PH1, PH2 |
| BAD [63:32] | Port C' | | PH1, PH2 |
| CDATA [31:00] | Port D | | PH1, PH2 |
| BAD [31:00] | Port D' | | PH1, PH2 |
| SERIALOUTAP | DXVALID select; | 0 = IEU, 1 = AP | PH1, PH2 |
| EXTERNALSEL [7] | DXVALID | | PH1, PH2 |
| EXTERNALSEL [8] | AP_DXSYSTEM_2 | | PH1, PH2 |
| EXTERNALSEL [6] | DX_TT_2 [1] | | PH1, PH2 |
| EXTERNALSEL [5] | DX_TT_2 [0] | | PH1, PH2 |
| EXTERNALSEL [4] | DX_TAG_2 [4] | | PH1, PH2 |
| EXTERNALSEL [3] | DXTAG_2 [3] | | PH1, PH2 |
| EXTERNALSEL [2] | DX_TAG_2 [2] | | PH1, PH2 |
| EXTERNALSEL [1] | DX_TAG_2 [1] | | PH1, PH2 |
| EXTERNALSEL [0] | DX_TAG_2 [0] | | PH1, PH2 |
| PARERR* | DIO_TRM_2 | | PH1, PH2 |
| EXTERNALSEL [9] | DIO_SYSTEM_1 | | PH1, PH2 |
| EXTERNALSEL [10] | DIO_VALID_1 | | PH1, PH2 |
| SERIALOUTBNDRY | IFREQ_STREAM_1 | [1] encoded | PH1, PH2 |
| SERIALOUTDEC | IFREQ_STREAM_1 | [0] encoded | PH1, PH2 |
| NPPOPBUS [10] ## | IFREQ_SECONDARY_1 | | PH2, PH1 |
| NPPOPBUS [11] ## | IFREQ_STARVED_2 | | PH1, PH2 |
| SPARE [2] | IFTRM_2 [2] | | PH1, PH2 |
| TESTPWR* | IFTRM_2 [1] | | PH1, PH2 |
| SPARE [0] | IFTRM_2 [0] | | PH1, PH2 |
| SERIALOUTMCS | IFMATCH_2 | | PH1, PH2 |

These bits have valid debug data only on cycles w/NPPOPBUS [15] = 0

TABLE T6B

| Fortune Pin | Comments | Signal Duration |
|---|---|---|
| NPTAG [4:0] | DIO_TAG_2 [4:0] | PH2, PH1 |
| NPTAGSTAT [4:0] | TAGSTAT_1 [4:0] | PH2, PH1 |
| NPPOPTAG [4:0] | POPTAG_2 [4:0] | PH2, PH1 |
| NPPOPBUS [14] | HFBit | PH2, PH1 |
| NPPOPBUS [13:11] | SrcBReg [2:0] | PH2, PH1 |
| NPPOPBUS [7:0] | Opcode [7:0] | PH2, PH1 |
| ANALYZEOUT | | PH1, PH2 |
| BAD INUSE | | |

Each port can be programmed in a different test mode to output specific internal signals. The test modes, as defined by lab debug, include signals from the major buses of the processor. Table T7 lists the test modes defined for lab debug. A maximum of four different debug modes, depending on the availability of the output ports at any given cycle, can be activated during each cycle. Furthermore, each of the test modes can be directed to at least two of the output ports.

TABLE T7

| Mode | | | Signal names | | | |
|---|---|---|---|---|---|---|
| PADR - | [31:12] | PADR_2 | [19:0] | | | |
| | [11:0] | PADR_1 [15:4] | | | | |
| DX - | [31:0] | DX_DATA_2 | [31:0] | | | |
| DIO - | [31:0] | DIO_DATA_1 | [31:0] | | | |
| IFREQ_1 - | [31:0] | IFDATA_2 | [63:32] | | | |
| IFREQ_2 - | [31:0] | IFDATA_2 | [31:0] | | | |
| POPBUS_1 - | [31:28] | POPBUS_2 | [47:44] | SegReg | [3:0] | |
| | [27:25] | POPBUS_2 | [43:41] | DestSReg | [2:0] | |
| | [24:20] | POPBUS_2 | [40:36] | SrcAReg | [4:0] | |
| | [19:15] | POPBUS_2 | [35:31] | IndexReg | [4:0] | |

TABLE T7-continued

| Mode | | | Signal names | | |
|---|---|---|---|---|---|
| | |14:13| | POPBUS_2 | |26:25| | SrcBReg | |4:3| |
| | |12:8| | POPBUS_2 | |21:17| | DestReg | |4:0| |
| | |7:0| | POPBUS_1 | |39:32| | Imm8 | |7:0| |
| POPBUS_2 (DEC) - | |31| | Unused | | | |
| | |30| | | | LastPOP | |
| | |29:25| | POPBUS_1 | |44:40| | StatMod | |4:0| |
| | |24| | POPBUS_1 | |45| | Lock | |
| | |23| | POPBUS_2 | |54| | APGrpValid | |
| | |22:21| | POPBUS_2 | |28:27| | MemRef | |1:0| |
| | |20:17| | POPBUS_2 | |53:49| | EASpec | |4:0| |
| | |16| | POPBUS_2 | |30| | ASize | |
| | |15| | POPBUS_2 | |29| | TwoCyc | |
| | |14| | POPBUS_2 | |16| | RegStore | |
| | |13:11| | POPBUS_2 | |15:13| | OperSize | |2:0| |
| | |10:8| | POPBUS_2 | |12:10| | OperSpec | |2:0| |
| | |7:0| | POPBUS_1 | |39:32| | Imm8 | |7:0| |
| POPBUS_3 |AP| - | |31:16| | POPBUS_1 | |31:16| | ImmDispHi | |15:0| |
| | |15:0| | POPBUS_1 | |15:0| | ImmDispLo | |15:0| |

A multiplexer 4625 dictates the test modes for ports A and B according to a control signal 4671 generated by control logic 4650. The output of multiplexer 4625 and debug_enable signal 4675 from the control logic are coupled to AND gate 4630. The debug_enable signal is generated by programming the appropriate field in one of the test registers to switch on the bypass logic. Thus, AND gate 4630 prevents debug data from being routed to the output ports unless the processor is in debug mode.

The selected debug information from AND gate 30 is coupled to one input of multiplexer 4640. The other input of multiplexer 4640 receives data from the processor in normal operating mode (normal_op). A signal 4646, which is generated by the NP interface, controls multiplexer 4640. This permits debug signals to be output onto the NPDATA bus only when neither the F86 nor NP unit needs the bus.

A multiplexer 4626 determines the test modes for ports C and D according to a control signal 4672. The multiplexer's output and debug_enable signal 4675 are both coupled to AND gates 4631 and 4632. The AND gates, like AND gate 4630, output debug data from ports C and D only when debug mode is activated. Output of AND gate 4631 and normal_op data are coupled to multiplexer 4641. Multiplexer 4641, depending on control signal 4647 from L2 interface, drives either debug data or normal_op data onto the CDATA bus. A control signal 4648 from the NXVL interface causes multiplexer 4642 to either drive debug data or normal_op data onto the NxAD bus 4622.

Traffic on the CDATA bus, under normal operation, depends on the number of cache hits (or misses) in the L1 cache. However, unpredictability of cache hits and misses causes difficulty for outputting debug information onto this bus. Nevertheless, there is a small window of opportunity in which the CDATA bus is available for outputting debug data, for example, after a L1 cache hit read or IFETCH. In order to assure that bus contention between the functional units and lab debug is prevented, control logic 4650 will be programmed to generate a port_C/D_enable signal only during cycles available for lab debug. Port_C/D_enable signal is coupled to AND gate 4631, thus permitting debug information to be output by ports C and D only when the CDATA bus is available.

Figure 48A:
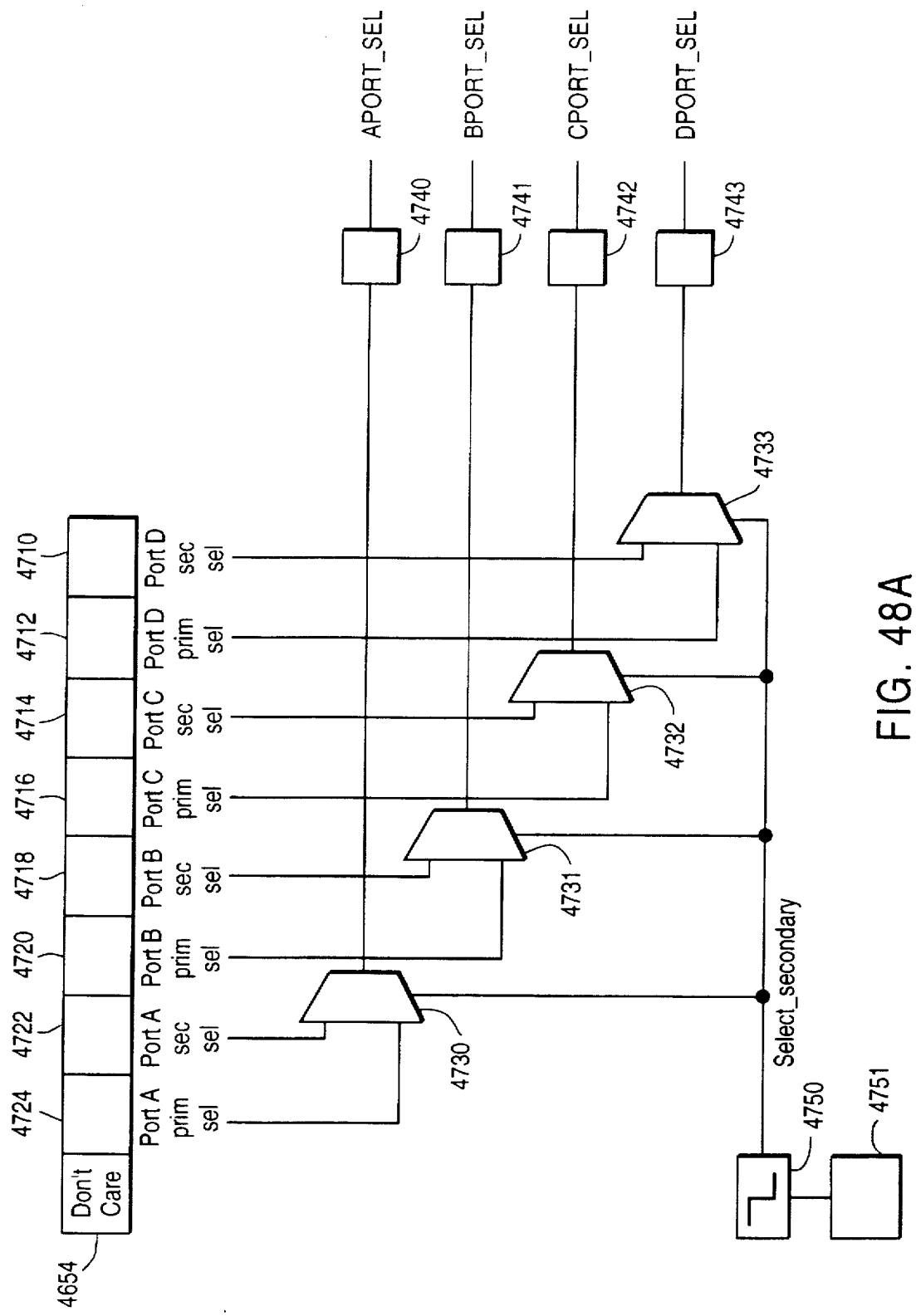
FIGS. 48A and 48B are block diagrams of the control circuitry of the Lab Debug circuitry.
Figure 48B:
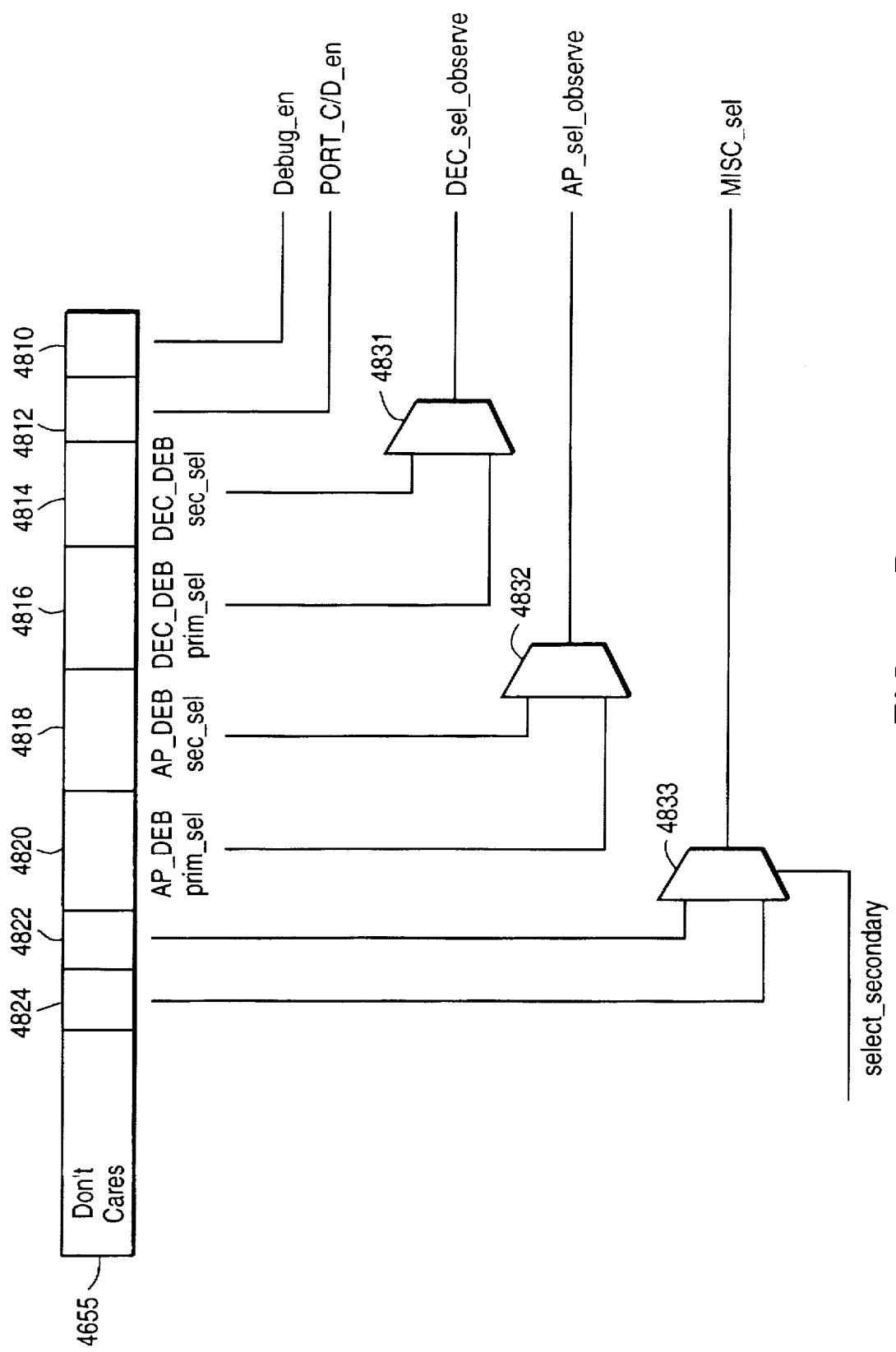

As previously described, output ports A, B, C, and D are programmed in various test modes by writing into the control logic's test registers 4654 and 4655. To increase versatility in the bypass circuit, each port can be programmed to switch to a secondary test mode. FIGS. 48A-48B show the test registers and a diagram of the associated logic for outputting control signals generated for programming the output ports.

Referring to FIG. 48A, test register 4654 contains fields 4710-4724 for selecting the primary and secondary debug modes for each output port. Field 4710 and 4712, which select the secondary and primary debug modes for port D, are coupled to a multiplexer 4733. Field 4714 and field 4716, which select the secondary and primary debug modes for port C, are coupled to a multiplexer 4732. Fields 4718 and 4720, which select the secondary and primary debug modes for port B, are coupled to a multiplexer 4733. Fields 4722 and 4724, which select the secondary and primary debug modes for port A, are coupled to a multiplexer 4733. The output of multiplexers 4730 and 4731 are coupled to decoders 4740 and 4741. Since the fields corresponding to ports A and B are 3 bits wide, the decoders are 3 to 8 decoders. The output of multiplexers 4732 and 4733, which corresponds to ports C and D, are coupled to 2 to 4 decoders 4742 and 4743. The output of the decoders control the multiplexers that determine which signal groups are read by each port.

A detector circuit 4750 is provided to accept an external input signal from, for example, a logic analyzer 4751. This signal may be the trigger signal used to activate the logic analyzer to collect data for a certain number of cycles. When the detector circuit detects the negative edge of the external signal, it generates a select_secondary signal. The select_secondary signal causes multiplexers 4730-4733 to pass data from the secondary debug mode fields 4710, 4714, 4718, and 4722. Thus, the control logic provides two configurations, the primary and secondary test modes, for directing debug signals to the debug output ports. Normally, the primary test mode signals are routed to debug outputs. However, on the negative-to-positive transition of the ANALYZER_IN signal, the secondary test mode signals will be directed to debug outputs. Table T8 contains the definition for the fields in test register 1.

TABLE T8

| Register Bits | Functions |
|---|---|
| [3:2] | Port D Primary mode selection. Set to 00 on reset. |
| [1:0] | Port D Secondary mode selection. Set to 10 on reset. |

TABLE T8-continued

| Register Bits | Functions |
|---|---|
| | 00 - IFREQ_1 |
| | 01 - MISC \|31:0\| |
| | 10 - DX |
| | 11 - PADR |
| \|7:6\| | Port C Primary mode selection. Set to 00 on reset. |
| \|5:4\| | Port C Secondary mode selection. Set to 10 on reset. |
| | 00 - IFREQ_2 |
| | 01 - MISC \|41:32, 21:0\| |
| | 10 - DIO |
| | 11 - P6PBUS1 |
| \|13:11\| | Port B Primary Mode selection. Set to 000 on reset. |
| \|10:8\| | Port B Secondary Mode selection. Set to 000 on reset. (bits \|10:8\| are XORed with Fortune IO NSPARE \|2:0\|). |
| | 000 - PADR |
| | 001 - |
| | 010 - DIO |
| | 011 - MISC \|31:0\| |
| | 100 - POPBUS_1 |
| | 101 - MISC \|41:32, 21:0\| |
| | 110 - |
| | 111 - IFREQ_2Port C Primary mode selection. Set to 00 on reset |
| \|19:17\| | Port A Primary mode selection. Set to 100 on reset. |
| \|16:14\| | Port A Secondary mode selection. Set to 100 on reset. |
| | 000 - PADR |
| | 001 - DX |
| | 010 - |
| | 011 - MISC \|31:0\| |
| | 100 - POPBUS_1 |
| | 101 - MISC \|41:32, 21:0\| |
| | 110 - |
| | 111 - IFREQ_1 |

Referring to FIG. 48B, test register 4655 comprises fields dd10–dd24. Field dd1O is the debug enable field dd1O for generating the debug_enable signal in order to set the processor in debug mode. Resetting the processor during debug mode causes the output ports of the bypass logic to be programmed in their default configurations. The processor remains in the debug mode until the bypass logic is disabled by writing a 1 to field 4810. Also, when Debug mode is off and the NP is not present, the NP interface will be forced to 0s to put the its signals in a known state. Field 4812, which is defined as the debug port C/D enable field, generates the port_C/D_enable signal for controlling the flow of debug data onto CDATA bus.

obtaining all the signals from the DEC or the AP functional units is not be feasible since this would require a significant number of inputs into bypass logic. To reduce the number of inputs, each unit is provided with decoding logic to set it in various debug output modes. Each debug output mode defines a group of signals to output to the lab debug output ports. Tables T9A–T9C define the debug output modes for the DEC and Tables T10A–T10D define the debug output modes for AP.

TABLE 9A

DEC Debug mode 1:

| \|41:34\| | IR0 \|7:0\| |
|---|---|
| \|33:26\| | IR1 \|7:0\| |
| \|25:18\| | IR2 \|7:0\| |
| \|17:14\| | ILen_1 \|3:0\| |
| \|13:10\| | ILen-2 \|3:0\| |
| \|9:7\| | IBSrc \|2:0\| |
| \|6:4\| | IBEnb1 \|2:0\| |
| \|3\| | IValid |
| \|2\| | ReBtoreIB_1 |

TABLE 9A-continued

DEC Debug mode 1:

| \|1\| | AMexe_1 |
|---|---|
| \|0\| | DEC2EIP1POP_1 |

TABLE T9B

DEC Debug mode 2:

| \|41:34\| | SelectPC_1 \|7:0\| |
|---|---|
| \|33:32\| | SelectPG_1 \|1:0\| |
| \|31:26\| | PopInfo_1 \|5:0\| |
| \|25:20\| | Tagstat_1 \|5:0\| |
| \|19:18\| | CurRP_1 \|1:0\| |
| \|17\| | PopHold_1 |
| \|16:10\| | PopHoldConds_1 \|6:0\| |
| \|9:0\| | S_ALL_abstore_1 \|9:0\| |

TABLE T9C

DEC Debug mode 3:

| \|41:38\| | APTerm_2 \|3:0\| |
|---|---|
| \|37:34\| | APTerm_1 \|3:0\| |
| \|33:28\| | IEUTerm_2 \|5:0\| |
| \|27:22\| | IEUTerm_1 \|5:0\| |
| \|21:1S\| | EIPTerma_2 \|6:0\| |
| \|14:13\| | EIPTermb_2 \|1:0\| |
| \|12:11\| | Valid_2 \|1:0\| |
| \|10\| | Consume_2 |
| \|9\| | RawBadIFHit_2 |
| \|8\| | Hit_2 |
| \|7\| | CloneHit_2 |
| \|6\| | IFMatch_1 |
| \|5:3\| | IFTrm_1 \|2:0\| |
| \|2:0\| | spare |

TABLE 10A

AP Debug mode 0 or 4: 42 bits

| \|41\| | BITMAP_FLT_2* |
|---|---|
| \|40\| | NOT_386TASK_FLT_2* |
| \|39\| | PAGE_FAULT_2 |
| \|38\| | AP_PADR_REQ_1 |
| \|37\| | RFOD_ACCESS_2 |
| \|36\| | RFA_ACCESS_2 |
| \|35\| | RFC_SEL_AM_2 |
| [34:32] | CURR_SS_1<2..0> |
| [31:29] | CURR_CS_1<2..0> |
| \|28\| | D_BIT_2 |
| \|27\| | B_BIT_2 |
| \|26:24\| | UADDDR_LAB_2<2..0> |
| \|23\| | ABORT_EIP_STAGE_1 |
| \|22\| | STR3_LD_2 |
| \|21\| | STR2_LD_2 |
| \|20\| | STR1_LD_2 |
| \|19\| | AB2CUR_1 |
| \|18\| | NX2CUR_1 |
| \|17\| | CUR2CUR_1 |
| \|16:10\| | EIPTERMA_1<6..0> |
| \|9:8\| | EIPTERMB_1<1..0> |
| \|7\| | EIPH_VALID_2* |
| \|6\| | LOCKSTEP_2 |
| \|5\| | EIP_ACCEPT_2 |
| \|4\| | NEXTNEXT_VALID_1 |
| \|3\| | EIP_BR_STALL_1 |

TABLE 10A-continued

AP Debug mode 0 or 4: 42 bits

| | |
|---|---|
| [2] | EIP_POP1_VALID_1 |
| [1] | EIP_POP2_VALID_1 |
| [0] | EIP_BR_1 |

TABLE 10B

AP Debug mode 1 or 5: 42

| | |
|---|---|
| [41] | DIO_FRAMING_1<3> |
| [40] | DIO_EXPECTED_WREN_2* |
| [39] | AM_VAILD_2 |
| [38] | AM_ACCEPT_2 |
| [37] | AMPOP_VALID_1 |
| [36] | AMPQ_SC_1 |
| [35] | RF_UPDATE_CONFLICT_2 |
| [35] | ANYIO_STALL_1 |
| [33] | DIO_DATA_TO_USQ_1 |
| [32] | US_DIO_DATA_FOR_USQ_1 |
| [31] | TLB_ACCEPT_2 |
| [30] | TRM_ENABLE_2 |
| [29] | EIP_STALL_AP_2 |
| [28:21] | UADDR_LAB_2<7..0> |
| [20:13] | AP_GRP_2<7..0> |
| [12] | REG_STAGE_ACCEPT_2 |
| [11] | US_EXECUTING_1 |
| [10] | UC_ACCEPT_2 |
| [9] | ADDER_STAGE_VALID_2 |
| [8] | POP_VALID_1 |
| [7] | US_HOLD_POP_2* |
| [6] | US_APQ_HOLD_2 |
| [5] | AP_STALL_QUIESCING_2 |
| [4] | DIO_STALL_2 |
| [3] | RFOD_DATA_INTLCK_2* |
| [2] | RFB_DATA_INTLCK_2* |
| [1] | RFA_DATA_INTLCK_2* |
| [0] | GRP_VALID_1 |

TABLE 10C

AP Debug mode 2 or 6: 42

| | |
|---|---|
| [41] | TRM_STRING_2 |
| [40] | CAPTURE_SEL_2 |
| [39] | STRING_CAPTURE_2 |
| [38] | QUIESCED_TRM_TAB_1* |
| [37] | TRM_PADR_INV_2 |
| [36] | C_BIT_UPDATE_2 |
| [35] | MISPA_SEL_2* |
| [34] | NO_TRAPS_2 |
| [33] | FORCE_TPAGET_2* |
| [32] | FORCE_MISPA_2* |
| [31] | FORCE_TRAP_2 |
| [30] | FORCE_NORMAL_2 |
| [29] | DEFERRED_2POP_2* |
| [28:27] | TRM_XCPT_TYPE_2<1..0> |
| [26:24] | TRM_INTCODE_2<2..0>* |
| [23] | TRM_STAGE_VALID_2 |
| [22] | QUIESCE_FAULT_2 |
| [21] | TRM_SP_HYPER_FAULT_2 |
| [20] | TRM_DBL_FAULT_2 |
| [19] | TRM-DBL-PAGE-FLT-2* |
| [18] | TRM_IDTR_LIM_FLT_2 |
| [17] | TRM_SEQ_LIMIT_FAULT_2 |
| [16] | TRM_DEBUG_TRAP_TPAGET_2 |
| [15] | TRM_SEG_PROT_FAULT_2 |
| [14] | TRM_HYPER_FAULT_2 |
| [13] | TRM_SEG_NOT_PRES_2 |
| [12] | TRM_GP_SENSITIVITY_2 |
| [11] | TRM_CS_LIMIT_FAULT_2 |

TABLE 10C-continued

AP Debug mode 2 or 6: 42

| | |
|---|---|
| [10] | TDEL_DC_NOT_PRES_1* |
| [9] | SEG_TYPE_FAULT_1* |
| [8] | TRM_FAULT_EXCEPTION_2* |
| [7:4] | APTERM_2<3..0> |
| [3:0] | APTERM_1<3..0> |

TABLE 10D

AP Debug mode 3 or 7: 42

| | |
|---|---|
| [41:38] | FRAMING_1<3..0> |
| [37-32] | XPOPBUS_1<45..40>\I |
| [31-0] | XPOPBUS_1<31..0>\I |

The remaining fields. 4814-4824, are used for selecting the primary and secondary debug output modes for the DEC and AP units. Fields 4814 and 4816 select the debug output mode for the DEC unit in the primary and secondary test modes. Fields 4818 and 4820 select the AP unit's debug output mode in the primary and secondary test modes. The outputs from fields 4814 and 4816 are coupled to a multiplexer 4831. The outputs from fields 4818 and 4820 are coupled to a multiplexer 4832. The output of multiplexer 4831 (DEC_sel_observe) is transmitted to the DEC unit while the output of multiplexer 4832 (AP_sel_observe) is transmitted to the AP unit. The control input for the multiplexers is coupled to the select_secondary signal from the detector circuit.

Fields 4822 and 4824 are the AP primary mode selection and AP secondary mode selection fields. These fields are connected to a multiplexer 4833, which is controlled by the select_secondary signal, for generating the misc_sel signal. The misc_sel signal, as previously described, controls the multiplexer in the bypass logic that regulates whether AP or DEC debug information is routed to the output ports. Table 11 contains the definition for the fields in test register 2.

TABLE 11

| Register Bits | Functions |
|---|---|
| [0] | Disable debug. Set to 0 on reset.<br>0 - Debug is on.<br>1 - Debug is disabled |
| [1] | Debug data for CDATA. Set to 0 on reset.<br>0 - Debug signals do not appear on CDATA.<br>1 - Debug signals appear on CDATA. |
| [3:2] | DEC Secondary mode selection. Set to 00 on reset.<br>(bits [3:2] are XORed with Fortune IO BADP [1:0])<br>00 - POPBUS_2<br>01 - DEC_1<br>10 - DEC_2<br>11 - DEC_3 |
| [5:4] | DEC Primary mode selection. Set to 00 on reset. |
| [11:9] | AP Primary mode selection. Set to 000 on reset. |
| [8:6] | AP Secondary mode selection. Set to 000 on reset.<br>(bits [8:6] are XORed with Fortue IO BADP [4:2].)<br>000 - AP_0<br>001 - AP_1<br>010 - AP_2<br>011 - AP_3<br>100 - AP_4<br>101 - AP_5<br>110 - AP_6<br>111 - AP_7 ) (POPBUS_3) |
| [13] | AP Primary mode selection. Set to 0 on reset. |

TABLE 11-continued

| Register Bits | Functions |
|---|---|
| \|12\| | AP Secondary mode selection. Set to 0 on reset.<br>0 - Select AP misc. signals.<br>1 - Select DEC misc. signals. |

In some embodiments, a comparison circuit may be provided to compare the physical address (PADR |31:0|) against a desired value in order to generate an output signal to, for example, a logic analyzer. The circuit includes four registers (MCS Match registers) which are used to control this circuit. These registers are loaded by writing to the following Hyperspace addresses:

| | |
|---|---|
| 1160xxxxx | MCS Match Register 0 |
| 1164xxxxx | MCS Match Register 1 |
| 1140xxxxx | MCS Match Register 2 |
| 1144xxxxx | MCS Match Register 3 |

The PADR |31:0| is routed to a comparator in the circuit that compares against values stored in registers 1 and 0 under control of a mask in MCS Match registers 3 and 2. When a bit of the mask is 1 the corresponding signal bits participate in the compare. Table 12 describes the function of the MCS match registers.

TABLE 12

| Match Register | Bits | Function |
|---|---|---|
| | [20:0] | MATCH compare A data bits [15:0] of debug mode signals. Set to 0 on reset. |
| | [20:0] | MATCH compare A data bits [31:16] of debug mode signals. Set to 0 on reset. |
| | [20:0] | MATCH compare A mask bits [15:0] of debug mode signals. Set to 0 on reset. |
| | [20:0] | MATCH compare A mask bits [31:0] of debug mode signals. Set to 0 on reset. |

VI. CONCLUSION

Although the present invention has been described using a particular illustrative embodiment, it will be understood that many variations in construction, arrangement and use are possible within the scope of the invention. The present invention is thus to be considered as including all possible modifications and variations encompassed within the scope of the appended claims.

APPENDICIES

A number of Appendices are filed as part of this application to further explain details of various specific embodiments of the invention. In some details, the Appendices may incorporate details from earlier embodiments that have been modified. In cases where the disclosure in the Appendices conflicts with that in the specification, the specification should be considered to supercede the Appendices.

Appendix A lists various aspects of the p-op issue and the virtual architecture.

Appendix B lists other aspects of the p-op issue and the virtual architecture including a signal dictionary and timing indications of the issuance of p-ops.

Appendix C includes a timing diagram of a p-op issue from DEC and lists issue related signals between DEC and the functional pipelines.

Appendix D is a reproduction of processor databook for a specific product which embodies many aspects of the invention.

Appendix E describes various aspects of the physical address bus specification.

DESCRIPTION OF ATTACHED TABLES

In addition to tables embedded in the text of the specification, the following attached tables further illustrate aspects of the invention.

Table T1 lists ABUS sources and destinations.

Table T2 shows termination bus transfers and related processing.

Table T3 shows relevant portions of the p-op packet sequences for the relevant x86 string instructions.

Table T4 shows the bin groupings according to one embodiment for the 80386 opcodes.

We claim:

1. A method of operating a microprocessor to execute a binary program, said program being compatible with a CISC architecture, comprising:

decoding a first and second CISC instruction, said second instruction having a program order after said first instruction;

translating each of said CISC instructions into at least one packet of operation commands, at least one of which packets comprises multiple operation commands, wherein any packet contains operation commands of only one CISC instruction;

issuing said packets to a plurality of pipelined RISC-like execution units, each of said packets being referred to as an outstanding packet upon being issued, said units having a plurality of interacting pipelines, at least one of said pipelines having pipeline interlock logic, said execution units being capable of superscalar pipelined execution, portions of at least two operation commands within at least one of said packets being issued in a same machine cycle;

speculatively executing a plurality of said operation commands associated with said second instruction in a plurality of said execution units, terminating within a first machine cycle;

executing a plurality of said operation commands associated with said first instruction in a plurality of said execution units, terminating within a second machine cycle, said second machine cycle occurring later in time than said first machine cycle; and retiring one of said packets of operation commands as a unit, thereby causing said one packet to cease being an outstanding packet, all operation commands within said one packet having terminated.

2. The method of claim 1, further comprising:

communicating between at least some pipeline stages within said plurality of interacting pipelines via a physical register file to selectively stall at least one of said pipeline stages.

3. The method of claim 2, wherein said CISC architecture is the industry standard X86 architecture.

4. The method of claim 1, wherein said issuing comprises issuing, for each of said packets, portions of all operation commands within said each packet within the same machine cycle as one another.

5. The method of claim 1, wherein said issuing comprises issuing said packets using a plurality of control signals, the control signals used for at least one packet including shared control fields received by more than one of said execution units.

6. The method of claim 1, wherein each of said execution units has its own queue and is free to execute commands largely independent of other of said execution units.

7. The method of claim 5, wherein the shared control fields include a destination specifier.

8. The method according to claim 1, wherein:
the method further comprises assigning a tag to each of said packets, said tag being selected such that every outstanding packet has a unique tag and the relative age of two packets may be determined based on inspection of their tags;
at least some of said execution units are capable of terminating said operation commands normally or abnormally and providing termination results with reference to said tags to indicate termination and abnormality;
a particular execution unit, of said execution units, receiving an operation command to execute is, at least under some conditions, free to execute the operation to termination whether or not a previously issued operation to another functional unit has been executed to termination; and
said retiring of said one packet comprises retiring said one packet no earlier than any outstanding packet that was issued before said one packet.

9. The method according to claim 1, wherein said first CISC instruction is a branch instruction, the method further comprising:
predicting the program path following said first CISC instruction, wherein said second CISC instruction lies within said predicted path;
detecting whether said prediction of the program path following said first instruction is incorrect; and
if said prediction is incorrect, aborting all issued operation commands associated with said second CISC instruction.

10. The method according to claim 9, further comprising prefetching a third CISC instruction in an alternate program path following said first CISC instruction, said alternate path different from said predicted path.

11. The method according to claim 9, wherein said second CISC instruction is a branch instruction, the method further comprising:
predicting the program path following said second CISC instruction, herein referred to as the second predicted program path, before said detecting of whether said prediction of the program path following said first instruction is incorrect;
decoding a third CISC instruction that lies within said second predicted path;
translating said third CISC instruction into at least one packet of operation commands;
issuing said at least one packet translated from said third CISC instruction to said execution units;
speculatively executing a plurality of said operation commands from said third CISC instruction in a plurality of said execution units;
detecting whether said second predicted path is an incorrect prediction; and
if said second predicted path is an incorrect prediction, aborting all issued operation commands associated with said third CISC instruction.

12. The method according to claim 1, wherein:
said executing of operation commands associated with said first instruction comprises operating a primary integer execution unit to perform an integer operation;
said speculatively executing of operation commands associated with said second instruction comprises operating a supplemental integer execution unit to perform an integer operation involving register or immediate operands;
said operating of said primary and supplemental integer execution units is capable of being performed at least partially in parallel.

13. The method according to claim 1, wherein:
said executing of operation commands associated with said first instruction comprises operating a primary address processor to compute an address; and
said speculatively executing of operation commands associated with said second instruction comprises operating a supplemental address processor to advance an instruction address pointer during sequential instruction execution within page boundaries;
wherein said operating of said primary and supplemental address units is capable of being performed at least partially in parallel.

14. A computer processor for executing a binary program, said program being compatible with a CISC architecture, the processor comprising:
a decoder for decoding CISC instructions;
a translator coupled to said decoder for translating each of said CISC instructions into at least one packet of operation commands, wherein any packet contains operation commands of only one CISC instruction, and at least one packet translated from one of said CISC instructions comprises more than one operation command;
a command issuer for issuing said packets for execution, each of said packets called an outstanding packet upon being issued;
a plurality of execution units coupled to receive said operation commands for executing said operation commands, each execution unit capable of executing at least one operation command, at least one of said plurality of execution units capable of terminating said operation commands normally or abnormally and providing termination results to indicate termination and abnormality of said termination; and
a retirement controller responsive to said termination results for retiring packets, thereby causing said packets to cease being outstanding packets, each packet being retired only if all operation commands within said each packet have terminated.

15. The computer processor according to claim 14, wherein said execution units are adapted to respond to the retiring of a given outstanding operation command by making irreversible the changes made by the given operation command to portions of the computer processor's state.

16. The computer processor according to claim 14, further comprising an abort processor, responsive to an abnormal condition, for initiating the aborting of all outstanding operation commands issued no earlier than a particular packet of operation commands, said particular packet herein referred to as the abort boundary.

17. The computer processor according to claim 16, wherein:
said abort processor is adapted to respond to the situation that said abnormal condition is a fault-type condition encountered by an operation command associated with a particular CISC instruction by determining said abort boundary as the earliest issued outstanding packet associated with said particular CISC instruction; and said abort processor is adapted to respond to the situation that said abnormal condition is a trap-type condition encountered by an operation command associated with a particular CISC instruction by determining said abort boundary as the packet issued earliest after all packets associated with said particular CISC instruction.

18. The computer processor according to claim 17, wherein said abort processor is adapted to further respond to at least one of said situations by initiating an exception handling sequence.

19. The computer processor according to claim 16, wherein said abort processor is adapted, if said abnormal condition comprises abnormal termination results for multiple operation commands of a single packet, to identify and respond to a highest priority one of said abnormal termination results.

20. The computer processor according to claim 16, wherein:
- the computer processor further comprises a branch predictor for predicting the program path to be taken following a CISC branch instruction; and
- said abort processor is adapted to respond to the situation that said abnormal condition is a detection of the incorrectness of a path prediction by determining said abort boundary as the earliest issued outstanding packet that was issued because of said incorrect prediction.

21. The computer processor according to claim 16, wherein:
- at least some of said execution units are adapted to maintain archival versions of portions of the computer processor's state that have changed in association with execution of outstanding operation commands; and
- when a given outstanding operation command is aborted, to revert portions of the computer processor's state to an archival version existing before execution of said given aborting outstanding operation command.

22. The computer processor according to claim 16, wherein at least some packets specify a memory write, the computer processor further comprising:
- a buffer for buffering memory writes for at least a period of time during which their originating operation commands are outstanding but not retired; and
- a write controller for fulfilling a buffered write to cache or memory when its originating operation is retired and discarding a buffered memory write from said buffer when its originating operation is aborted.

23. The computer processor according to claim 14, wherein at least one of said CISC instructions specifies a memory write, the computer processor further comprising:
- a buffer for buffering memory writes for at least a period of time during which their originating operation commands are outstanding but not retired; and
- a write controller for fulfilling a buffered write to cache or memory when its originating operation is retired.

24. The computer processor according to claim 23, further comprising a read controller for returning buffered write data to subsequent read operations before the write data is placed in cache or memory.

25. The computer processor according to claim 14, wherein said execution units comprise pipelines comprising pipeline stages, the computer processor further comprising:
- queues for communication between some of said pipeline stages.

26. The computer processor according to claim 25, further comprising a bypass path for communication between two particular pipeline stages that communicate via a particular queue when said particular queue is empty.

27. The computer processor according to claim 14, wherein said command issuer is adapted to issue a packet using a plurality of control signals, including shared control fields received by more than one of said execution units.

28. The computer processor according to claim 14, wherein each of said execution units has at least one input queue, thereby enabling at least in some cases one execution unit to provide information to another execution unit without regard to when said other execution unit is prepared to use said information.

29. The computer processor according to claim 14, wherein said retirement controller is adapted to track abort groups which each comprise a plurality of packets and retire any packet in an abort group only when all packets in the abort group may be retired.

30. The computer processor according to claim 14, wherein:
- an outstanding packet all operation commands of which have been terminated normally is referred to as having completed; and
- said retirement controller is adapted to retire all packets associated with a particular CISC instruction only if said all associated packets are completed packets and no packet issued earlier than said all associated packets is still outstanding.

31. The computer processor according to claim 14, wherein said command issuer is responsive to CISC instructions from an instruction set architecture wherein the programmer-visible state includes m modifiable virtual registers, and there is a known upper limit n on the number of outstanding register-modifying packets, the computer processor further comprising:
- at least (m+n) physical registers;
- a register relabeler for maintaining mappings from at least some of said virtual registers to said physical registers, reversibly remapping a virtual register to a physical register in response to a given packet that seeks to modify said virtual register, and reversing said reversible remapping in response to a detected abnormal condition, said reversing thereby restoring the content of said virtual register to a value that existed at a time prior to detection of said abnormal condition while avoiding the need to move data between said physical registers.

32. The computer processor according to claim 31, wherein said execution units comprise pipelines comprising pipeline stages, the computer processor further comprising:
- a valid bit associated with each physical register for signaling whether data in said physical register is ready or not ready for use; and
- interlock circuitry for stalling a pipeline stage which attempts to access a register whose valid bit indicates non-validity.

33. The computer processor according to claim 32, wherein said register relabeler is adapted to set at least one of said valid bits to indicate valid in response to termination of a particular operation command whether or not the particular operation command has been retired.

34. The computer processor according to claim 31, further comprising an ordered free-list of pointers to physical registers, said free list having a head end and a tail end, a pointer at said head end pointing to a non-assigned physical register:
- wherein said register relabeler is adapted to reassign a virtual register from an old physical register to said non-assigned physical register, remove said pointer at said head end from said free-list, thereby leaving a next-ordered pointer of said pointers at said head end, and add a pointer to said old physical register to said tail end; and wherein the size of the free-list is sufficiently large in light of n to ensure that, by the time a particular pointer added to said tail end reaches said head end, no virtual register remains mapped to the physical register pointed-to by said particular pointer.

35. The computer processor according to claim 34, further comprising a pointer set for storing the physical register mappings of said virtual registers.

36. The computer processor according to claim 35, wherein said pointer set is part of an array of pointer sets, each pointer set in said array corresponding to processor state as existing prior to the issuance of a packet of operation commands.

37. The computer processor according to claim 34, wherein said free-list is part of an array of free-lists, each free-list in said array corresponding to processor state as existing prior to the issuance of a packet of operation commands.

38. The computer processor according to claim 14, wherein:

there is a known upper limit on the number of outstanding packets at any given time; and the computer processor further comprises a tagger for assigning a tag to each of said outstanding packets, each of which packets is insured to have a unique tag in view of said known limit, wherein the relative age of two of said outstanding packets may be determined based on comparison of their tags' values.

39. The computer processor according to claim 14, wherein at least some of said CISC instructions are branch instructions, the computer processor further comprising:

a branch predictor for predicting the program path following an outstanding branch instruction;

a prediction verifier for detecting incorrectness of said predicted program path; and an abort processor responsive to said detected incorrectness for initiating the aborting of all outstanding operation commands issued as a result of said incorrect program path prediction.

40. The computer processor according to claim 39, further comprising an instruction fetch unit adapted to pre-fetch at least one instruction corresponding to an alternate program path not predicted by said branch predictor, said pre-fetching operative to minimize delay in the event of a branch misprediction.

41. The computer processor according to claim 39, wherein said branch predictor is adapted to predict program path for a second outstanding branch instruction before correctness of a predicted program path for a first outstanding branch instruction has been determined.

42. The computer processor according to claim 14, wherein said execution units comprise:

a primary integer execution unit for performing integer operations; and a supplemental integer execution unit for performing integer operations involving register and immediate operands.

43. The computer processor according to claim 42, wherein:

said execution units comprise an address processor for computing addresses; and said address processor is coupled to receive data produced from said supplemental integer execution unit, thereby minimizing said address processor's dependence on said primary integer execution unit.

44. The computer processor according to claim 14, wherein said execution units comprise:

an address processor for computing addresses; and a supplemental address processor for advancing an instruction address pointer during sequential instruction execution within page boundaries and thereby relieving said address processor of said address pointer advancing task.

45. The computer processor according to claim 14, wherein said command issuer is adapted to limit the number of outstanding packets to a number greater than 7.

46. The computer processor according to claim 14, wherein two of said execution units are capable of executing in mutual parallel two operation commands from one of said packets.

47. A computer processor for executing a binary program, said program being compatible with a CISC architecture, the processor comprising:

a decoder for decoding CISC instructions;

a translator coupled to said decoder for translating each of said CISC instructions into at least one packet of operation commands, wherein each packet comprises at least one operation command, and any packet contains operation commands of only one CISC instruction;

a command issuer for issuing said packets for execution, each of said packets called an outstanding packet upon being issued;

a tagger for assigning a tag to each of said outstanding packets, said tag selected such that each outstanding packet has a unique tag;

a plurality of execution units coupled to receive said operation commands for executing said operation commands, wherein:

each execution unit is capable of executing at least one operation command, at least one of said execution units is capable of terminating said operation commands normally or abnormally and providing termination results including the terminated command's tag to indicate termination and abnormality of said termination, and a particular execution unit, of said execution units, receiving an operation command to execute is, at least under some conditions, free to execute the operation to termination whether or not a previously issued operation to another functional unit has been executed to termination; and a retirement controller responsive to said termination results for retiring said outstanding packets of operation commands, said retirement controller for allowing a particular packet to become a retired packet, thereby ceasing to be an outstanding packet, only if all outstanding packets that were issued before said particular packet, as determined with reference to said tags, are retired no later than said particular packet.

48. The computer processor according to claim 47, wherein said particular execution unit, after terminating a given operation command, becomes available to execute another operation command whether or not the given operation command has retired.

49. The computer processor according to claim 47, wherein:

there is a known upper limit n to the number of simultaneously outstanding packets; and said tagger is adapted to issue tags sequentially over a range of at least 2n, whereupon the relative age of two of said outstanding packets may be determined by signed comparison of their tags.

50. The computer processor according to claim 47, wherein:

there is a known upper limit n to the number of simultaneously outstanding packets;

a tag is represented as an N-bit vector (where N is equal to or greater than n) in which at most one bit is set; and said tagger is adapted to issue tags in a manner permitting the set of outstanding operations to be represented by a contiguous group of bits in an N-bit vector.

51. The computer processor according to claim 47, wherein said retirement controller is adapted to signal successful retirement of operation commands to at least some of said execution units by providing a tag that marks the boundary between outstanding and retired operations.

52. The computer processor according to claim 47, further comprising an abort processor, responsive to an abnormal condition, for initiating the aborting of all outstanding operation commands issued no earlier than a particular packet of operation commands according to a comparison of tags, said particular packet herein referred to as the abort boundary.

53. A computer processor for executing a binary program, said program being compatible with a CISC architecture, the computer processor comprising:

a decoder that decodes a first and a second CISC instruction, said second instruction having a program order after said first instruction;

a translator that translates each of said decoded CISC instructions into at least one packet of operation commands, wherein any packet contains operation commands of only one CISC instruction;

a command issuer for issuing said packets for execution, each of said packets being referred to as an outstanding packet upon being issued;

a plurality of pipelined execution units coupled to said command issuer, each execution unit capable of executing at least one operation command, said execution units for speculatively executing and terminating said operation commands and providing termination results to indicate termination and abnormality, two of said execution units capable of executing operation commands from one of said packets in parallel, said execution units capable of terminating operation commands associated with said second instruction within a first machine cycle and terminating operation commands associated with said first instruction within a second machine cycle, said second machine cycle occurring later in time than said first machine cycle; and a retirement controller responsive to said termination results for retiring said packets, thereby causing said packet to cease being outstanding packets, each packet being retired as a unit.

54. The computer processor according to claim 53, wherein the command issuer is adapted to issue portions of at least two operation commands within one of said packets in a same machine cycle as said each other portion.

55. The computer processor according to claim 53, wherein said CISC architecture is the industry standard X86 architecture.

56. The computer processor according to claim 53, wherein:

the computer processor further comprises a tagger for assigning a tag to each outstanding packet, said tag being selected such that every outstanding packet has a unique tag;

at least one of said execution units is adapted to provide said termination results with reference to the tag of said terminated operation command; and said retirement controller is adapted to allow a particular packet to become a retired packet, thereby ceasing to be an outstanding packet, only if all outstanding packets that were issued before said particular packet, as determined with reference to said tags, are retired no later than said particular packet.

57. The computer processor according to claim 53, wherein said command issuer is adapted to issue a packet using a plurality of control signals, the control signals for one of said packets including shared control fields received by more than one of said execution units, said shared control fields being issued within a single machine cycle.

58. The computer processor according to claim 53, further comprising:

a branch predictor that predicts the program path following said first CISC branch instruction, given that said first CISC instruction is a branch instruction;

a prediction verifier for detecting incorrectness of said predicted program path, herein referred to as the first predicted path; and an abort processor responsive to said prediction verifier for initiating the aborting of all outstanding operation commands issued as a result of incorrectly predicting said first predicted path.

59. The computer processor according to claim 58, further comprising an instruction fetch unit adapted to pre-fetch at least one CISC instruction corresponding to an alternate program path not predicted by said branch predictor, said pre-fetching operative to minimize delay in the event that said first predicted path is incorrect.

60. The computer processor according to claim 58, wherein said branch predictor is adapted, given that said second CISC instruction is a branch instruction lying within said predicted program path following said first CISC instruction, to predict the program path following said second CISC instruction before said prediction verifier has detected whether said first predicted path is incorrect.

61. The computer processor according to claim 60, wherein:

said prediction verifier is adapted to detect incorrectness of said predicted program path following said second CISC instruction, herein referred to as the second predicted path; and said abort processor is adapted to respond to a detected incorrectness of said second predicted path by initiating the aborting of all outstanding operation commands issued as a result of said incorrect second program path prediction.

* * * * *

UNITED STATES PATENT AND TRADEMARK OFFICE
CERTIFICATE OF CORRECTION

PATENT NO. : 5,781,753
DATED : July 14, 1998
INVENTOR(S) : McFarland, et. al.

It is certified that error appears in the above-identified patent and that said Letters Patent is hereby corrected as shown below:

Title page, item [73], should read --

Assignee: Advanced Micro Devices, Inc., Sunnyvale, California --

Signed and Sealed this

Seventeenth Day of November, 1998

Attest:

BRUCE LEHMAN

Attesting Officer

Commissioner of Patents and Trademarks